US012460226B2

(12) United States Patent
Stedman

(10) Patent No.: US 12,460,226 B2
(45) Date of Patent: Nov. 4, 2025

(54) COMPOSITIONS AND METHODS FOR TREATING DUCHENNE MUSCULAR DYSTROPHY

(71) Applicant: The Trustees of the University of Pennsylvania, Philadelphia, PA (US)

(72) Inventor: Hansell Stedman, Norristown, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 1420 days.

(21) Appl. No.: 17/047,990

(22) PCT Filed: Apr. 16, 2019

(86) PCT No.: PCT/US2019/027675
§ 371 (c)(1),
(2) Date: Oct. 15, 2020

(87) PCT Pub. No.: WO2019/204303
PCT Pub. Date: Oct. 24, 2019

(65) Prior Publication Data
US 2021/0155956 A1 May 27, 2021

Related U.S. Application Data

(60) Provisional application No. 62/658,464, filed on Apr. 16, 2018.

(51) Int. Cl.
C12N 15/86 (2006.01)
C07K 14/47 (2006.01)

(52) U.S. Cl.
CPC .......... C12N 15/86 (2013.01); C07K 14/4708 (2013.01); C12N 2750/14121 (2013.01); C12N 2750/14122 (2013.01)

(58) Field of Classification Search
CPC .......... C12N 15/86; C12N 2750/14121; C12N 2750/14122; C12N 2750/14143; C07K 14/4708; A01K 2227/105; A01K 2267/0306; A61K 48/005
See application file for complete search history.

(56) References Cited

U.S. PATENT DOCUMENTS

| 6,162,796 | A  | 12/2000 | Kaplitt et al. |
| 6,596,535 | B1 | 7/2003  | Carter |
| 7,078,387 | B1 | 7/2006  | Leiden et al. |
| 7,125,717 | B2 | 10/2006 | Carter |
| 7,186,552 | B2 | 3/2007  | Wilson et al. |
| 7,282,199 | B2 | 10/2007 | Gao et al. |
| 7,456,683 | B2 | 11/2008 | Takano et al. |
| 7,771,993 | B2 | 8/2010  | Stedman et al. |
| 7,790,449 | B2 | 9/2010  | Gao et al. |
| 7,892,824 | B2 | 2/2011  | Duan et al. |
| 7,906,111 | B2 | 3/2011  | Wilson et al. |
| 8,318,480 | B2 | 11/2012 | Gao et al. |
| 8,734,809 | B2 | 5/2014  | Gao et al. |
| 8,927,514 | B2 | 1/2015  | Chetterjee et al. |
| 9,102,949 | B2 | 8/2015  | Gao et al. |
| 2003/0148968 | A1 | 8/2003 | Hammond et al. |
| 2004/0192593 | A1 | 9/2004 | Draghia-Akli et al. |
| 2007/0054871 | A1 | 3/2007 | Pastore et al. |
| 2010/0186103 | A1 | 7/2010 | Gao et al. |
| 2013/0045186 | A1 | 2/2013 | Gao et al. |
| 2014/0124086 | A1 | 5/2014 | Jean et al. |
| 2015/0079038 | A1 | 3/2015 | Deverman et al. |
| 2015/0315612 | A1 | 11/2015 | Wilson et al. |
| 2017/0051257 | A1 | 2/2017 | Vandenberghe et al. |
| 2017/0275649 | A1 | 9/2017 | Vandendriessche et al. |
| 2017/0368198 | A1 | 12/2017 | Xiao et al. |

FOREIGN PATENT DOCUMENTS

| WO | WO-1994/011506 | 5/1994 |
| WO | WO 1997/022696 A1 | 6/1997 |
| WO | WO-2000/038518 | 7/2000 |
| WO | WO-2001/070816 | 9/2001 |
| WO | WO 2001/083695 | 11/2001 |
| WO | WO-2002/029075 | 4/2002 |
| WO | WO-2002/066612 | 8/2002 |
| WO | WO-2002/066613 | 8/2002 |
| WO | WO-2002/066614 | 8/2002 |
| WO | WO-2002/066615 | 8/2002 |
| WO | WO-2003/042397 | 5/2003 |
| WO | WO-2005/027995 | 3/2005 |
| WO | WO-2005/030292 | 4/2005 |
| WO | WO-2005/033321 | 4/2005 |
| WO | WO-2005/108617 | 11/2005 |
| WO | WO 2005/118611 A2 | 12/2005 |

(Continued)

OTHER PUBLICATIONS

Aarts et al., A solution to dependency: using multilevel analysis to accommodate nested data, Nat Neurosci, vol. 17(4):491-6, Apr. 2014.
Altschul et al., Basic local alignment search tool, J Mol Biol., vol. 215(3):403-10, Oct. 1990.
Djinovic-Carugo et al., The spectrin repeat: a structural platform for cytoskeletal protein assemblies, FEBS Lett, vol. 513(1):119-23, Feb. 2002.
Matkar et al., Cardiac gene therapy: are we there yet, Gene Ther., vol. 23(8-9):635-48, Aug. 2016.

(Continued)

Primary Examiner — Fereydoun G Sajjadi
Assistant Examiner — Masudur Rahman
(74) Attorney, Agent, or Firm — Howson & Howson LLP

(57) ABSTRACT

Described herein are triple-splice mutants of dystrophin or utrophin and methods of use thereof for treating Duchenne Muscular Dystrophy. Also provided are viral vectors which comprise a nucleic acid encoding a triple-splice mutant dystrophin or utrophin under the control of regulatory elements direct expression thereof. Compositions are also provided which contain such viral vectors formulated for delivery to a human patient.

17 Claims, 37 Drawing Sheets
Specification includes a Sequence Listing.

(56) References Cited

FOREIGN PATENT DOCUMENTS

| WO | WO-2006/110689 | 10/2006 |
|---|---|---|
| WO | WO 2010/048586 A1 | 4/2010 |
| WO | WO-2010/138263 | 12/2010 |
| WO | WO-2011/126808 | 10/2011 |
| WO | WO-2012/112832 | 8/2012 |
| WO | WO-2013/004943 | 1/2013 |
| WO | WO-2014/151341 | 9/2014 |
| WO | WO-2015/054653 | 4/2015 |
| WO | WO-2015/164786 | 10/2015 |
| WO | WO-2016/049230 | 3/2016 |
| WO | WO-2016/065001 | 4/2016 |
| WO | WO 2016/115543 A2 | 7/2016 |
| WO | WO-2016/172008 | 10/2016 |
| WO | WO-2017/160360 | 9/2017 |
| WO | WO-2017/180854 | 10/2017 |
| WO | WO 2017/221145 | 12/2017 |
| WO | WO 2018/053632 | 3/2018 |
| WO | WO 2018/053632 A1 | 3/2018 |

OTHER PUBLICATIONS

McCarty et al., Self-complementary recombinant adeno-associated virus (scAAV) vectors promote efficient transduction independently of DNA synthesis, Gene Therapy, vol. 8(16)1248-1254, Aug. 2001.

Parry et al., Analysis of the three-alpha-helix motif in the spectrin superfamily of proteins, Biophys J., vol. 61(4):858-67, Apr. 1992.

Rincon et al., Genome-wide computational analysis reveals cardiomyocyte-specific transcriptional Cis-regulatory motifs that enable efficient cardiac gene therapy, Mol Ther., vol. 23(1):43-52, Jan. 2015.

Röper et al., The 'spectraplakins': cytoskeletal giants with characteristics of both spectrin and plakin families, J Cell Sci., vol. 115(Pt 22):4215-2, Nov. 2002.

Song et al., Suite of clinically relevant functional assays to address therapeutic efficacy and disease mechanism in the dystrophic mdx mouse, J Appl Physiol (1985), vol. 122(3): 593-602, Mar. 2017.

Yan et al., A novel chimeric adenoassociated virus 2/human bocavirus 1 parvovirus vector efficiently transduces human airway epithelia, Mol Ther., vol. 21(12):2181-94, Dec. 2013 (Epub Jul. 2013).

Zhou et al., Sequence and structure relationships within von Willebrand factor, Blood, vol. 120(2):449-58, Jul. 2012.

Altschul et al., Gapped BLAST and PSI-BLAST: a new generation of protein database search programs. Nucleic Acids Res, vol. 25(17):3389-402, Sep. 1997.

Arruda et al., Peripheral transvenular delivery of adeno-associated viral vectors to skeletal muscle as a novel therapy for hemophilia B, Blood, vol. 115(23): 4678-88, Jun. 2010.

Arruda et al., Regional intravascular delivery of AAV-2-F.IX to skeletal muscle achieves long-term correction of hemophilia B in a large animal model, Blood, May 2004.

Bridges et al., Global cardiac-specific transgene expression using cardiopulmonary bypass with cardiac isolation, Ann Thorac Surg, vol. 73(6): 1939-46, Jun. 2002.

Calcedo et al., Adeno-associated virus antibody profiles in newborns, children, and adolescents, Clin Vaccine Immunol., vol. 18:1586-1588, 2011.

Ch'ng et al., Antisense RNA complementary to 3' coding and noncoding sequences of creatine kinase is a potent inhibitor of translation in vivo, Proc. Natl. Acad. Sci. USA, vol. 86:10006-10010, Dec. 1989.

Colin et al., Stealth predation and the predatory success of the invasive ctenophore Mnemiopsis leidyi, Proc Natl Acad Sci U S A \, vol. 107:17223-17227, Oct. 2010.

Davey et al., Induction of immune tolerance to foreign protein via adeno-associated viral vector gene transfer in mid-gestation fetal sheep, PLoS One, vol. 31;12(1):e0171132, Jan. 2017.

Davis et al., Localization and structure of the ankyrin-binding site on beta2-spectrin, J Biol Chem., vol. 284:6982-6987, Mar. 2009.

Duan et al., AAV Micro-dystrophin gene therapy for Duchenne muscular dystrophy, Mol Ther, vol. 26(10):2337-2356, Oct. 2018.

Finn et al., HMMER web server: 2015 update, Nucleic Acids Res, vol. 43:W30-38, Jul. 2015.

Foster et al., Codon and mRNA sequence optimization of microdystrophin transgenes improves expression and physiological outcome in dystrophic mdx mice following AAV2/8 gene transfer, Mol Ther., vol. 16(11):1825-32, Nov. 2008.

Gao et al., Adeno-associated viruses undergo substantial evolution in primates during natural infections, Proc. Natl. Acad. Sci. U.S.A., vol. 100(10):6081-6086, May 2003.

GenBank accession No. AAA53189.1, dystrophin [*Homo sapiens*], May 2000.

GenBank accession No. AAS99264, capsid protein VP1 [Adeno-associated virus 9], Jul. 2004.

GenBank accession No. AL357149, Human DNA sequence from clone RP11-352E13 on chromosome 6, complete sequence, Jan. 2013.

GenBank accession No. X69086, *H.sapiens* mRNA for utrophin, Oct. 2008.

Gregorevic et al., rAAV6-microdystrophin preserves muscle function and extends lifespan in severely dystrophic mice, Nat Med., vol. 12(7):787-9, Jul. 2006.

Gregorevic et al., Systemic delivery of genes to striated muscles using adeno-associated viral vectors, Nat Med., vol. 10(8):828-34, Aug. 2004.

Hinderer et al., Severe toxicity in nonhuman primates and piglets following high-dose intravenous administration of an adeno-associated virus vector expressing human SMN, Hum Gene Ther., vol. 29(3):285-298, Mar. 2018.

Hnia et al., ZZ domain of dystrophin and utrophin: topology and mapping of a beta-dystroglycan interaction site, Biochem J., vol. 401(3):667-77, Feb. 2007.

Hopf et al., Mutation effects predicted from sequence co-variation, Nat Biotechnol., vol. 35:128-135, Feb. 2017.

Hordeaux et al., The neurotropic properties of AAV-PHP.B are limited to C57BL/6J mice, Mol Ther., vol. 26(3):664-668, Mar. 2018.

Ishikawa-Sakurai et al., ZZ domain is essentially required for the physiological binding of dystrophin and utrophin to beta-dystroglycan, Hum Mol Genet., vol. 13(7):693-702, Apr. 2004.

Katz et al., Cardiac gene therapy: optimization of gene delivery techniques in vivo, Hum Gene Ther, vol. 21(4):371-80, Apr. 2010.

Kelley et al., The Phyre2 web portal for protein modeling, prediction and analysis, Nat Protoc., vol. 10:845-858, Jun. 2015.

Kennedy et al., Micro-utrophin improves cardiac and skeletal muscle function of severely affected D2/mdx mice, Mol Ther Methods Clin Dev., vol. 11: 92-105, Dec. 2018.

Kobayashi et al., Sarcolemma-localized nNOS is required to maintain activity after mild exercise, Nature, vol. 456(7221):511-5, Nov. 2008.

Koenig et al., The complete sequence of dystrophin predicts a rod-shaped cytoskeletal protein, Cell, vol. 22;53(2):219-28, Apr. 1988.

Koenig et al., The molecular basis for Duchenne versus Becker muscular dystrophy: correlation of severity with type of deletion, Am J Hum Genet, vol. 45(4):498-506, Oct. 1989.

Kontrogianni-Konstantopoulos et al., Muscle giants: molecular scaffolds in sarcomerogenesis, Physiol Rev., vol. 89:1217-1267, Oct. 2009.

Kornegay et al., Widespread muscle expression of an AAV9 human mini-dystrophin vector after intravascular injection in neonatal dystrophin-deficient dogs, Mol Ther., vol. 18(8):1501-8, Aug. 2010.

Krupnick et al., Inspiratory loading does not accelerate dystrophy in mdx mouse diaphragm: implications for regenerative therapy, J Appl Physiol, vol. 94(2): 411-9, Feb. 2003.

Landfeldt et al., The burden of Duchenne muscular dystrophy: an international, cross-sectional study, Neurology, vol. 83(6):529-36, Aug. 2014.

Larcher et al., Characterization of dystrophin deficient rats: a new model for Duchenne muscular dystrophy, PLoS One, vol. 9(10): e110371, Oct. 2014.

(56) References Cited

OTHER PUBLICATIONS

Le Guiner et al., Long-term microdystrophin gene therapy is effective in a canine model of Duchenne muscular dystrophy, Nat Commun., vol. 8:16105, Jul. 2017.
Lock et al., Absolute determination of single-stranded and self-complementary adeno-associated viral vector genome titers by droplet digital PCR, Hu Gene Therapy Methods, vol. 25(2):115-25, Apr. 2014 (Epub Feb. 2014).
Lock et al., Analysis of particle content of recombinant adeno-associated virus serotype 8 vectors by ion-exchange chromatography, Hum Gene Ther Methods, vol. 23(1):56-64, Feb. 2012.
McDonald et al., The cooperative international neuromuscular research group duchenne natural history study-a longitudinal investigation in the era of glucocorticoid therapy: Design of protocol and the methods used, Muscle Nerve, Jul. 2013.
Mead et al., Diaphragm remodeling and compensatory respiratory mechanics in a canine model of Duchenne muscular dystrophy, J Appl Physiol, vol. 116(7): 807-15, Apr. 1985.
Mendell et al., Dystrophin immunity in Duchenne's muscular dystrophy, N Engl J Med., vol. 363(15):1429-37, Oct. 2010.
Mendell et al., Myoblast transfer in the treatment of Duchenne's muscular dystrophy, N Engl J Med, vol. 333(13):832-8, Sep. 1995.
Mingozzi et al., AAV-1-mediated gene transfer to skeletal muscle in humans results in dose-dependent activation of capsid-specific T cells, Blood, vol. 114(10):2077-86, Sep. 2009.
Mishra et al., Functional improvement of dystrophic muscle by repression of utrophin: let-7c interaction, PLoS One, vol. 18;12(10):e0182676, Oct. 2017.
Moroz et al., The ctenophore genome and the evolutionary origins of neural systems, Nature, vol. 510:109-114, Jun. 2014.
Muthu et al, The crystal structures of dystrophin and utrophin spectrin repeats: implications for domain boundaries, PLoS One, vol. 7(7):e40066, Jul. 2012.
Nakamura et al., Generation of muscular dystrophy model rats with a CRISPR/Cas system, Sci Rep, vol. 4: 5635, Jul. 2014.
Nichols et al., Translational Data from AAV-Mediated Gene Therapy of Hemophilia B in Dogs, Hum Gene Ther Clin Dev, vol. 26(1):5-14, Mar. 2015.
Odom et al., Microutrophin delivery through rAAV6 increases lifespan and improves muscle function in dystrophic dystrophin/utrophin-deficient mice, Mol Ther., vol. 16(9):1539-45, Sep. 2008.
Ortega et al., The structure of the plakin domain of plectin reveals an extended rod-like shape, J Biol Chem., vol. 291(36):18643-62, Sep. 2016.
Pegoraro et al., SPP1 genotype is a determinant of disease severity in Duchenne muscular dystrophy, Neurology, vol. 76(3):219-26, Jan. 2011 (ePub Dec. 2010).
Petrof et al., Dystrophin protects the sarcolemma from stresses developed during muscle contraction, Proc Natl Acad Sci U S A., vol. 90(8):3710-4, Apr. 1993.
Putnam et al., The amphioxus genome and the evolution of the chordate karyotype, Nature, vol. 453(7198): 1064-71, Jun. 2008.
Rasowo et al., Development of Novel Muscle-Specific Adeno-Associated Viral Vector Constructs for Gene Therapy of Duchenne Muscular Dystrophy, European Scientific Journal, vol. 10(18), Jun. 2014.
Robertson et al., Dramatic elevation in urinary amino terminal titin fragment excretion quantified by immunoassay in Duchenne muscular dystrophy patients and in dystrophin deficient rodents, Neuromuscul Disord, vol. 27(7): 635-645, Jul. 2017.
Ryan et al., The genome of the ctenophore Mnemiopsis leidyi and its implications for cell type evolution, Science, vol. 342:1242592, Dec. 2013.
Sadler, Biochemistry and genetics of von Willebrand factor, Annu Rev Biochem., vol. 67:395-424, Jul. 1998.
Santiago-Ortiz et al., AAV ancestral reconstruction library enables selection of broadly infectious viral variants, Gene Ther., vol. 22(12):934-46, Dec. 2015.

Scharfmann et al., Long-term in vivo expression of retrovirus-mediated gene transfer in mouse fibroblast implants, Proc. Natl. Acad. Sci. USA, vol. 88:4626-4630, Jun. 1991.
Schreiber-Katz et al., Comparative cost of illness analysis and assessment of health care burden of Duchenne and Becker muscular dystrophies in Germany, Orphanet J Rare Dis, vol. 9:210, Dec. 2014.
Searle et al., Building a metal-responsive promoter with synthetic regulatory elements, Mol. Cell. Biol., vol. 5:1480-1489, Jun. 1985.
Shi et al., Role of antigen-specific regulatory CD4+ CD25+ T cells in tolerance induction after neonatal IP administration of AAV-hF. IX, Gene Ther., vol. 20(10):987-96, Oct. 2013.
Smith et al., Molecular basis of canine muscle type phosphofructokinase deficiency, J Biol Chem, vol. 271(33): 20070-4, Aug. 1996.
Smith et al., Sequencing of the sea lamprey (*Petromyzon marinus*) genome provides insights into vertebrate evolution, Nat Genet, vol. 45(4): 415-21, Apr. 2013.
Solovyev et al., Automatic annotation of eukaryotic genes, pseudogenes and promoters, Genome Biol., vol. 7(Suppl 1):S10, Aug. 2006.
Song et al., Effects on contralateral muscles after unilateral electrical muscle stimulation and exercise, PLoS One, vol. 7(12):e52230, Dec. 2012.
Song et al., Non-immunogenic utrophin gene therapy for the treatment of muscular dystrophy animal models, Nat Med., vol. 25(10):1505-1511, Oct. 2019.
Sonnemann et al., Functional substitution by TAT-utrophin in dystrophin-deficient mice, PLoS Med., vol. 26;6(5):e1000083, May 2009.
Srivastava et al., The Trichoplax genome and the nature of placozoans, Nature, vol. 454(7207): 955-60, Aug. 2008.
Srivastava et al., The Amphimedon queenslandica genome and the evolution of animal complexity, Nature, vol. 466:720-726, Aug. 2010.
Su et al., Uniform scale-independent gene transfer to striated muscle after transvenular extravasation of vector, Circulation, vol. 112(12):1780-8, Sep. 2005.
Toniolo et al., Masticatory myosin unveiled: first determination of contractile parameters of muscle fibers from carnivore jaw muscles, Am J Physiol Cell Physiol., vol. 295(6):C1535-42, Dec. 2008.
UniProtKB—O43707 (ACTN4_HUMAN), Feb. 2001.
UniProtKB—O60437 (PEPL_HUMAN), Jun. 2001.
UniProtK—P02549 (SPTA1_HUMAN), Spectrin alpha chain, erythrocytic 1, Jun. 1986.
UniProtKB—P11277 (SPTB1_HUMAN), Spectrin beta chain, erythrocytic, Jul. 1989.
UniProtKB—P11532 (DMD_HUMAN), Oct. 1989.
UniProtKB—P12814 (ACTN1_HUMAN), Alpha-actinin-1, Oct. 1989.
UniProtKB—P15924 (DESP_HUMAN), Desmoplakin, Apr. 1990.
UniProtKB—P35609 (ACTN2_HUMAN), Alpha-actinin-2, Jun. 1994.
UniProtKB—P58107 (EPIPL_HUMAN), Epiplakin, Jun. 2001.
UniProtKB—Q01082 (SPTB2_HUMAN), Spectrin beta chain, non-erythrocytic 1, Nov. 1997.
UniProtKB—Q03001 (DYST_HUMAN), Dystonin, Oct. 1996.
UniProtKB—Q08043 (ACTN3_HUMAN), Alpha-actinin-3, Feb. 1995.
UniProtKB—Q13813 (SPTN1_HUMAN), Spectrin alpha chain, non-erythrocytic 1, Nov. 1997.
UniProtKB—Q92817 (Evpl Human), Envoplakin, Jun. 2001.
UniProtKB—Q9UPN3 (MACF1_HUMAN), Microtubule-actin cross-linking factor 1, isoforms 1/2/3/5, Jun. 2001.
VanBelzen et al., Mechanism of deletion removing all dystrophin exons in a canine model for DMD implicates concerted evolution of X chromosome pseudogenes, Mol Ther Methods Clin Dev., vol. 4:62-71, Dec. 2016.
Vandenberghe et al., Efficient serotype-dependent release of functional vector into the culture medium during adeno-associated virus manufacturing, Hum Gene Ther., vol. 21(10):1251-7, Oct. 2010.
Wang et al., Adeno-associated virus vector carrying human minidystrophin genes effectively ameliorates muscular dystrophy in mdx mouse model, Proc Natl Acad Sci U S A., vol. 97(25):13714-9, Dec. 2000.
Winder et al., Dystrophin and utrophin: the missing links, FEBS Lett., vol. 369:27, Aug. 1995.

(56) References Cited

OTHER PUBLICATIONS

Yue et al., Safe and bodywide muscle transduction in young adult Duchenne muscular dystrophy dogs with adeno-associated virus., Hum Mol Genet., vol. 24(20):5880-90, Oct. 2015.

Zanta-Boussif et al., Validation of a mutated PRE sequence allowing high and sustained transgene expression while abrogating WHV-X protein synthesis: application to the gene therapy of WAS, Gene Therapy, vol. 16:605-619, May 2009.

Zincarelli et al., Analysis of AAV serotypes 1-9 mediated gene expression and tropism in mice after systemic injection, Mol Ther., vol. 16(6):1073-80, Jun. 2008.

Zinn et al., In silico reconstruction of the viral evolutionary lineage yields a potent gene therapy vector, Cell, vol. 12(6):1056-68, Aug. 2015.

Zoghbi et al., Three-dimensional structure of vertebrate cardiac muscle myosin filaments, Proc Natl Acad Sci U S A, vol. 105:2386-2390, Feb. 2008.

Harper et al., Modular flexibility of dystrophin: implications for gene therapy of Duchenne muscular dystrophy, Nat Med., vol. 8(3):253-61, Mar. 2002.

Ibraghimov-Beskrovnaya et al., Primary structure of dystrophin-associated glycoproteins linking dystrophin to the extracellular matrix, Nature, vol. 355(6362):696-702, Feb. 1992.

Schatzberg et al., Molecular analysis of a spontaneous dystrophin 'knockout' dog, Neuromuscul Disord., vol. 9(5):289-95, Jul. 1999.

Stedman et al., Myosin gene mutation correlates with anatomical changes in the human lineage, Nature, vol. 25;428(6981):415-8, Mar. 2004.

Gao et al., New recombinant serotypes of AAV vectors, Curr Gene Ther, vol. 5(3):285-97, Jun. 2005.

Greelish et al., Stable restoration of the sarcoglycan complex in dystrophic muscle perfused with histamine and a recombinant adeno-associated viral vector, Nat Med, vol. 5(4):439-43, Apr. 1999.

Kunkel et al., Analysis of deletions in DNA from patients with Becker and Duchenne muscular dystrophy, Nature, vol. 322(6074):73-7, Jul. 1986.

Mouly et al., Myoblast transfer therapy: is there any light at the end of the tunnel, Acta Myol, vol. 24(2):128-33, Oct. 2005.

Putnam et al., Sea anemone genome reveals ancestral eumetazoan gene repertoire and genomic organization, Science, vol. 317:86-94, Jul. 2007.

Tinsley et al., Expression of full-length utrophin prevents muscular dystrophy in mdx mice, Nat Med, vol. 4(12): p. 1441-4, Dec. 1998.

Tskhovrebova et al., Titin: properties and family relationships, Nat Rev Mol Cell Biol., vol. 4:679-689, Sep. 2003.

Webster et al., Fast muscle fibers are preferentially affected in Duchenne muscular dystrophy, Cell, vol. 52(4): 503-13, Feb. 1988.

International Search Report and Written Opinion issued on International Patent Application No. PCT/US19/27675, dated Oct. 7, 2019.

Supplementary European Search Report issued in European Patent Application No. 19787746, dated Feb. 4, 2022.

Office Action for Japanese Patent Application No. 2020-557155, issued Jan. 10, 2024, with unofficial English translation provide local agent.

Office Action for Brazilian Patent Application No. BR1120200211796, issued Dec. 26, 2023 (unofficial English translation provide local agent).

Office Action for Canadian Patent Application No. 3099958, issued Dec. 13, 2023.

GenBank Accession No. CAA48829.1, utrophin (dystrophin related protein) [*Homo sapiens*], Oct. 7, 2008.

NCBI Reference Sequence: NP_004000.1, dystrophin isoform Dp427p1 [*Homo sapiens*], Dec. 11, 2017.

Office Action and Search Report for Chinese U.S. Appl. No. 19/787,746, issued Jul. 5, 2022, with unofficial translation provide local agent.

Office Action for Chinese Patent Application No. 201980040365.8, issued Feb. 23, 2023, with unofficial translation provide local agent.

Office Action for Japanese Patent Application No. 2020-557155, issued Apr. 5, 2023, with unofficial translation provide local agent.

Applicant's Amendment and Response in European Patent Application No. 19787746.7, filed Sep. 5, 2022.

Beggs AH, et al. Additional dystrophin fragment in Becker muscular dystrophy may result from proteolytic cleavage at deletion junctions. Am J Med Genet. Oct. 1, 1992;44(3):378-81.

|    | A | B | C | D | E | F | G | H | I | J |
|----|---|---|---|---|---|---|---|---|---|---|
| 1  | LQGEIEAHTDVY... | | | | | | | | | |
| 2  | | | | | | | | | | |
| 3  | L | | | | | | | | | |
| 4  | Q | | | | | | | | | |
| 5  | G | | | 4 | | | | | | |
| 6  | E | | | | 3 | | | | | |
| 7  | I | | | | | | 2 | | | |
| 8  | E | | | | | | | 1 | | |
| 9  | A | | | | | | | | 2 | |
| 10 | H | | | | | | | | | 3 |
| 11 | T | | | | | | | | | 4 |
| 12 | D | | | | | | | | | |
| 13 | V | | | | | | | | | |
| 14 | Y | | | | | | | | | |
| 15 | | | Q | E | D | L | E | Q | E | Q | V |
| 16 | | | | | | | | | | |
| 17 | | | | | ...QEDLEQEQV | | | | | |

FIG. 5

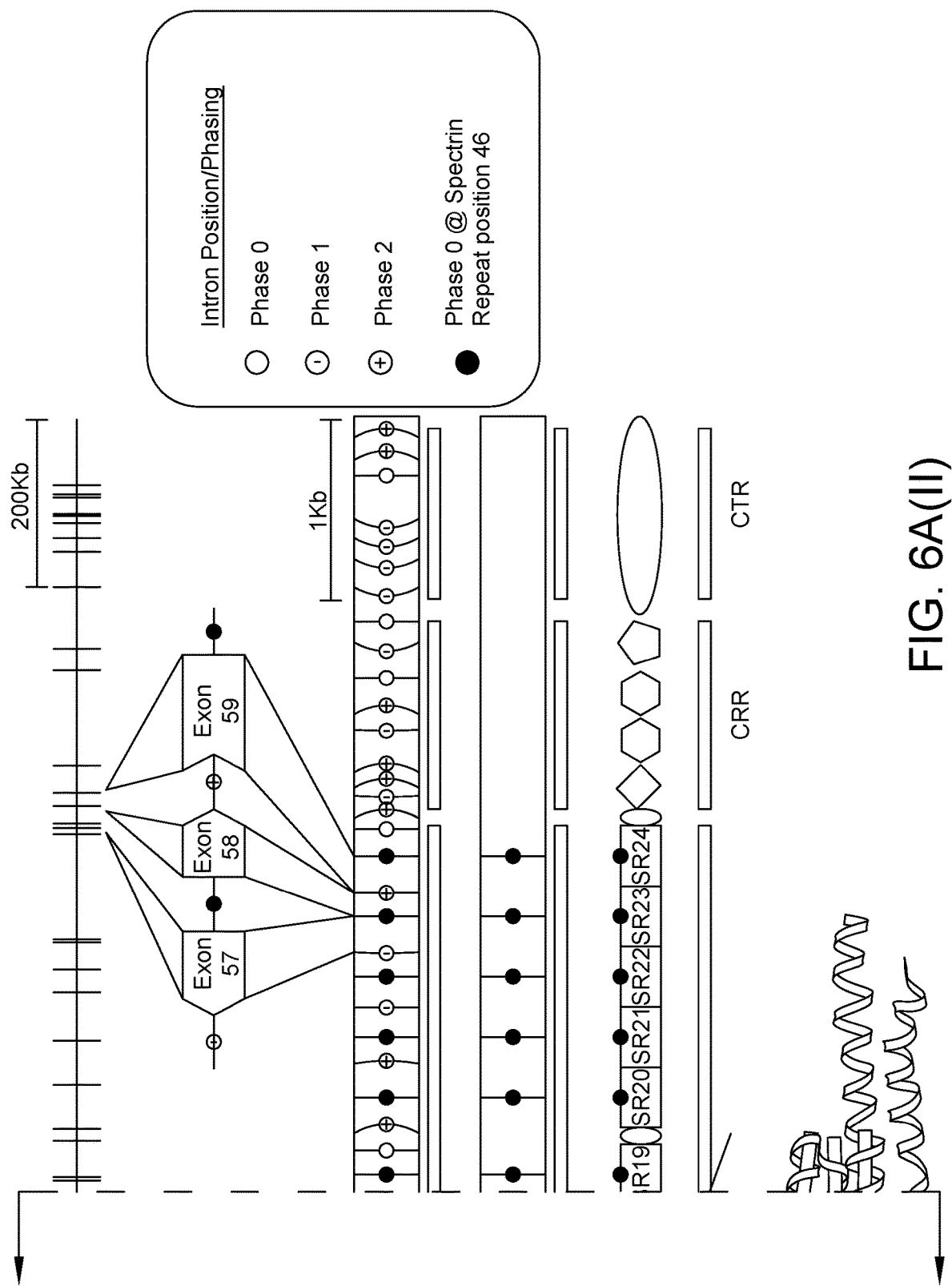
FIG. 6A(II)

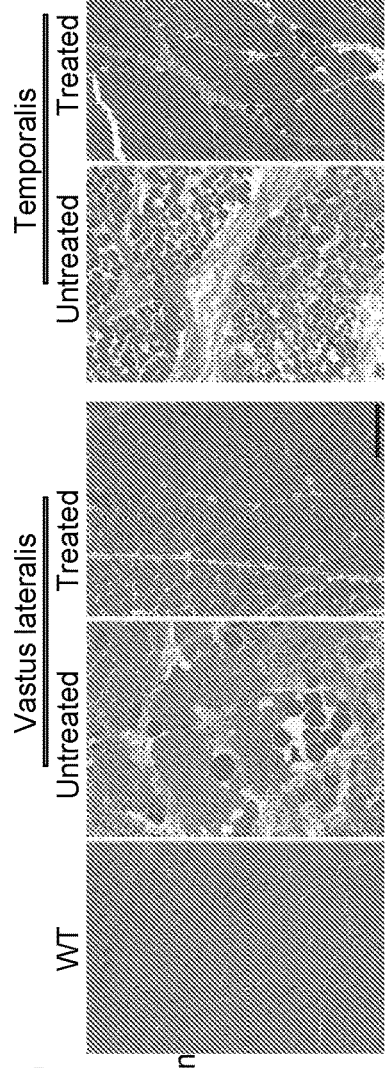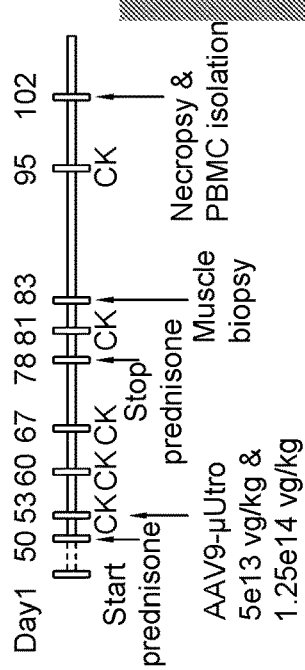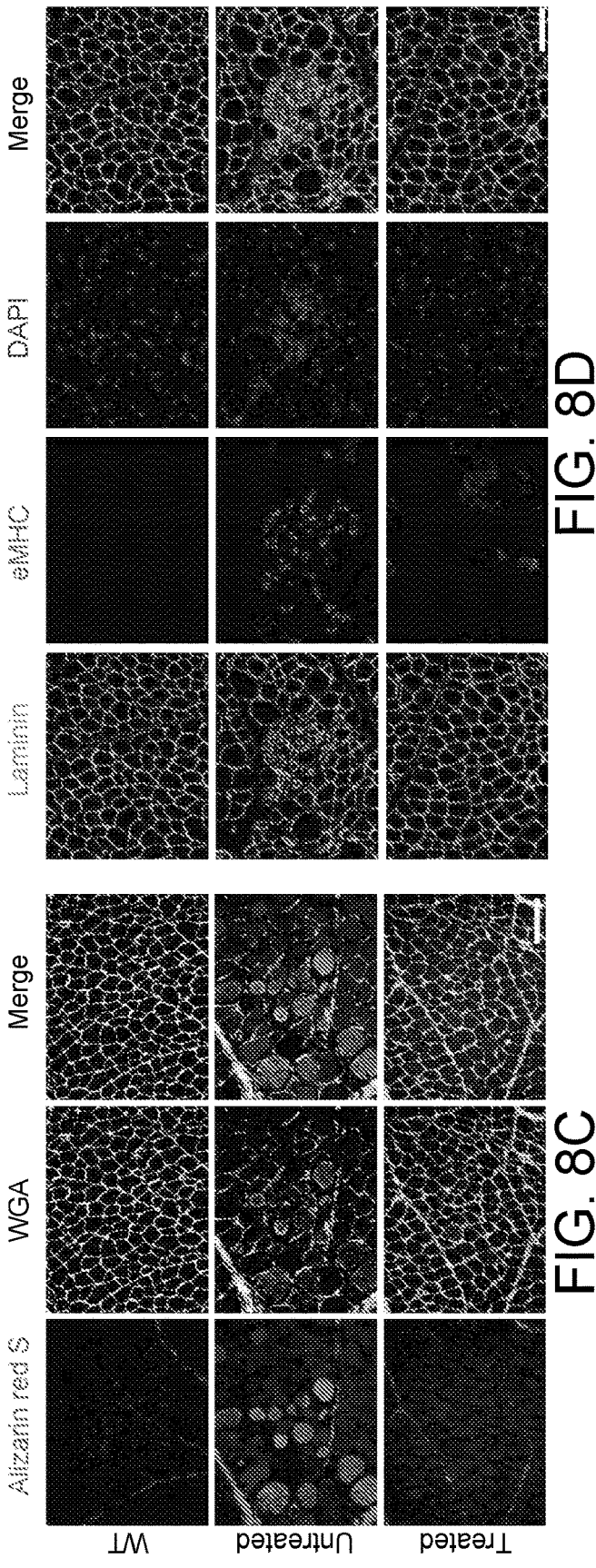
FIG. 8A
FIG. 8B
FIG. 8C
FIG. 8D

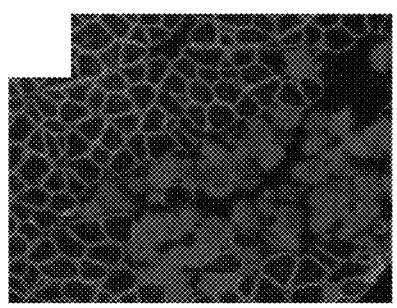
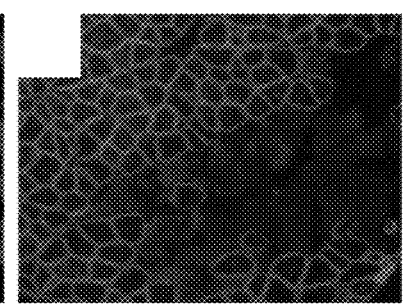
FIG. 14A      FIG. 14B
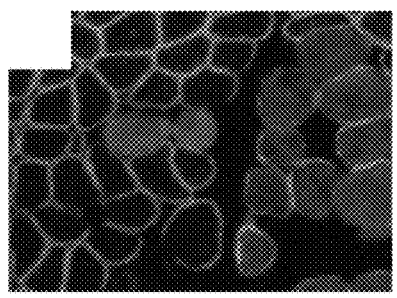
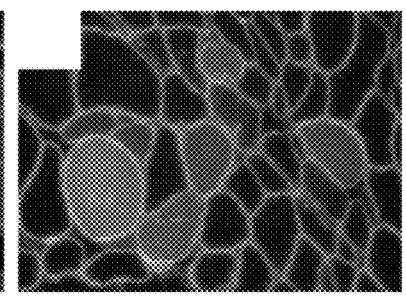
FIG. 14C      FIG. 14D
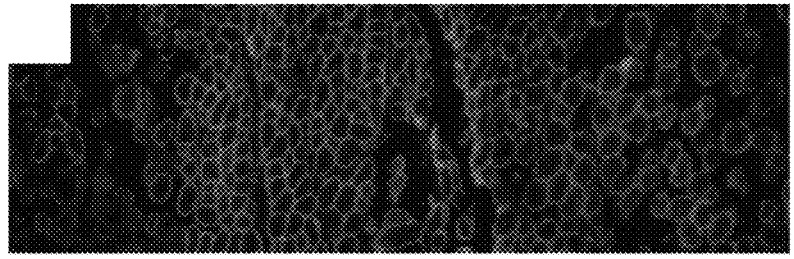
FIG. 14E
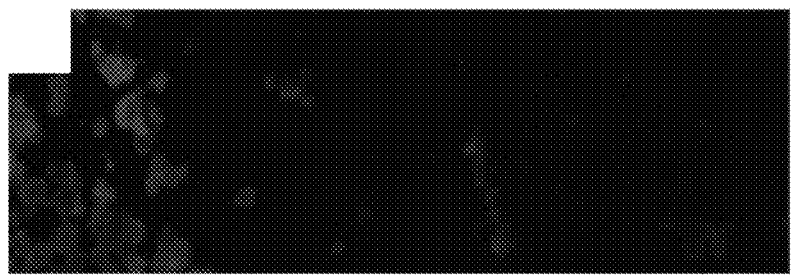
FIG. 14F
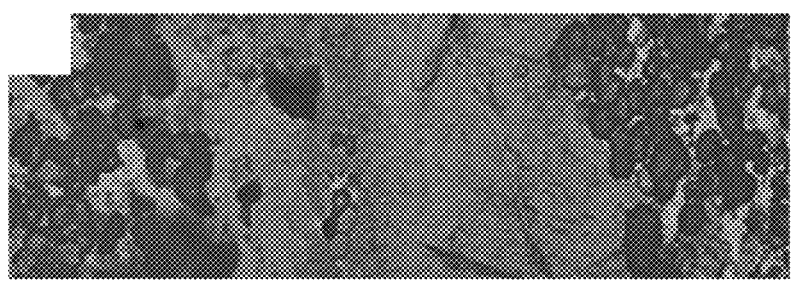
FIG. 14G

FIG. 15(I)

| | | | Protein | Species Common Name | Human H.sap | Lancelet B.fio | Fruit Fly D.mel |
|---|---|---|---|---|---|---|---|
| | | | | Species Module | | | |
| Dystrophin-Associated Protein Complex, Glycosylases, Ligands | Muscular Dystrophy in Homo sapiens | Primary Dystroglycanopathy | Dystroglycan | Cadh1 | ▨ | ▨ | ▨ |
| | | | Dystroglycan | Mucin (#aa) | ▨ | ▨ | ▨ |
| | | | Dystroglycan | SEA (#) | ▨ | ▨ | ▨ |
| | | | Dystroglycan | PPXY | ▨ | ▨ | ▨ |
| | | LGMD 2D | Sarcoglycan | alpha-like | ▨ | ▨ | ▨ |
| | | LGMD 2C,E,F | Sarcoglycan | beta-like | ▨ | ▨ | ▨ |
| | | MDDGA,B,C1 | POMT1 | | ▨ | ▨ | ▨ |
| | | MDDGA,B,C2 | POMT2 | | ▨ | ▨ | ▨ |
| | | MDDGA,B,C3 | POMGnt | | ▨ | ▨ | ▨ |
| | | MDDGA,B,C4 LGMD2H | Fukutin | | ▨ | ▨ | ▨ |
| | | MDDGA,B,C5 LGMD2I | FKRP | | ▨ | ▨ | ▨ |
| | | MDDGA,B,C6 MDC1D | LARGE | | ▨ | ▨ | ▨ |
| | | MDC1A (LAMA-2) | Laminin | Nta | ▨ | ▨ | ▨ |
| | | | Laminin | Ntb | ▨ | ▨ | ▨ |
| | | | Laminin | Ntc | ▨ | ▨ | ▨ |
| | | | Laminin | trimerization | ▨ | ▨ | ▨ |
| | | | Laminin | G module | ▨ | ▨ | ▨ |
| | | Bethlem, Ullrich MD | Collagen COL6A | VI-like | ▨ | ▨ | ▨ |
| Actinin Spectrin Superfamily | | DMD/BMD | Dystrophin | CH | ,24 | ,24 | ,23 |
| | | | Dystrophin | SR (#) | ▨ | ▨ | ▨ |
| | | | Dystrophin | WW,EF,ZZ | | | |
| | | | Alpha-Actinin | CH | | | |
| | | | Alpha-Actinin | SR1 | | | |

<--Sarcomeres

| | | | | | | |
|---|---|---|---|---|---|---|
| Actinin Spectrin Superfamily | Alpha-Actinin | SR2 | | | | |
| | Alpha-Actinin | SR3 | | | | |
| | Alpha-Actinin | SR4 | | | | |
| | Alpha-Actinin | EF | | | | |
| | Spectrin | CH(SR)EF combo | | | | |
| | Spectrin | CH(SR)EF beta | | | | |
| | Spectrin | CH(SR)EF alpha | | | | |
| | MACF | CH | | | | |
| | MACF | Plakin R&D | | | | |
| | MACF | SR (#) | 36 | 41 | 35 | |
| | MACF | GASP | | | | |
| Motor Proteins | Dynein (axonemal) | | | | | |
| | Myosin | motor (head) | | | | |
| | Myosin II | | | | | |
| | Myosin II (sarcomeric) | | | | | |
| Titin-Obscurin Superfamily (Sarcomeric Scaffolding) | TRIO | | | | | |
| | MyLK | PK | | | | |
| | MyLK | PK(Ig) (Fn3)PK | | | | |
| | Titin/Obscurin | TRIO/CRAL | | | | SESTD1 |
| | Titin/Obscurin | N-terminal SRs | | | | CCDC141 |
| | Titin/Obscurin | Poly (Ig) | | | | |
| | Titin/Obscurin | Poly (Ig<Fn3) | | | | |
| | Titin/Obscurin | RhoGEF-1 | | | | |
| | Titin/Obscurin | tandem PK+Rho | | | | |

FIG. 15(III)

| | Centrally Nucleated Myofibers (%) | MURF-1(+) Myofibers (%) | TUNEL (+) Myofibers (%) | Embryonic MyHC (+) Myofibers (%) |
|---|---|---|---|---|
| MDX+PBS | 53.6+/-13.1 | 6.8+/-12.4 | 3.1+/-3.6 | 11.7+/-6.0 |
| MDX+VEC | 0.99+/- 1.9 | 0 | 0 | 0 |
| MDX+VEC | 0.15+/- .49 | 0 | 0 | 0 |

SEQUENCE LISTING

```
<160> NUMBER OF SEQ ID NOS: 25

<210> SEQ ID NO 1
<211> LENGTH: 1131
<212> TYPE: PRT
<213> ORGANISM: Artificial Sequence
<220> FEATURE:
<223> OTHER INFORMATION: amino acid sequence of nano-dystrophin
<220> FEATURE:
<221> NAME/KEY: MISC_FEATURE
<222> LOCATION: (1)..(463)
<223> OTHER INFORMATION: amino acid sequence identical to N-terminal
      region of full-length human dystrophin.
<220> FEATURE:
<221> NAME/KEY: MISC_FEATURE
<222> LOCATION: (463)..(463)
<223> OTHER INFORMATION: tryptophan residue in the "A" helix at the core
      of the Hidden Markov Model (HMM) and all crystal structures for
      proteins in this superfamily.
<220> FEATURE:
<221> NAME/KEY: MISC_FEATURE
<222> LOCATION: (464)..(505)
<223> OTHER INFORMATION: amino acid sequence identical to C-terminal
```

-continued

```
      region of full-length human dystrophin.
<220> FEATURE:
<221> NAME/KEY: MISC_FEATURE
<222> LOCATION: (505)..(506)
<223> OTHER INFORMATION: positions within the superfamily HMM for the
      "B" helix that flank the hypothetical plane of transection as
      depicted in FIG 2F
<220> FEATURE:
<221> NAME/KEY: MISC_FEATURE
<222> LOCATION: (506)..(550)
<223> OTHER INFORMATION: amino acid sequence identical to N-terminal
      region of full-length human dystrophin.
<220> FEATURE:
<221> NAME/KEY: MISC_FEATURE
<222> LOCATION: (550)..(550)
<223> OTHER INFORMATION: tryptophan residue in the "C" helix at the core
      of the Hidden Markov Model (HMM) and all crystal structures for
      proteins in this superfamily.
<220> FEATURE:
<221> NAME/KEY: MISC_FEATURE
<222> LOCATION: (551)..(1131)
<223> OTHER INFORMATION: amino acid sequence identical to C-terminal
      region of full-length human dystrophin.

<400> SEQUENCE: 1

Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg
        35                  40                  45

Arg Leu Leu Asp Leu Leu Glu Gly Leu Thr Gly Gln Lys Leu Pro Lys
    50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
        115                 120                 125

Ala Gly Leu Gln Gln Thr Asn Ser Glu Lys Ile Leu Leu Ser Trp Val
    130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
            180                 185                 190

Thr Gln Arg Leu Glu His Ala Phe Asn Ile Ala Arg Tyr Gln Leu Gly
        195                 200                 205

Ile Glu Lys Leu Leu Asp Pro Glu Asp Val Asp Thr Thr Tyr Pro Asp
    210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
        275                 280                 285
```

```
Thr Ser Ser Pro Lys Pro Arg Phe Lys Ser Tyr Ala Tyr Thr Gln Ala
    290             295             300

Ala Tyr Val Thr Thr Ser Asp Pro Thr Arg Ser Pro Phe Pro Ser Gln
305             310             315             320

His Leu Glu Ala Pro Glu Asp Lys Ser Phe Gly Ser Ser Leu Met Glu
                325             330             335

Ser Glu Val Asn Leu Asp Arg Tyr Gln Thr Ala Leu Glu Glu Val Leu
            340             345             350

Ser Trp Leu Leu Ser Ala Glu Asp Thr Leu Gln Ala Gln Gly Glu Ile
        355             360             365

Ser Asn Asp Val Glu Val Val Lys Asp Gln Phe His Thr His Glu Gly
    370             375             380

Tyr Met Met Asp Leu Thr Ala His Gln Gly Arg Val Gly Asn Ile Leu
385             390             395             400

Gln Leu Gly Ser Lys Leu Ile Gly Thr Gly Lys Leu Ser Glu Asp Glu
                405             410             415

Glu Thr Glu Val Gln Glu Gln Met Asn Leu Leu Asn Ser Arg Trp Glu
            420             425             430

Cys Leu Arg Val Ala Ser Met Glu Lys Gln Ser Asn Leu His Arg Val
        435             440             445

Leu Met Asp Leu Gln Asn Gln Lys Leu Lys Glu Leu Asn Asp Trp Leu
    450             455             460

Thr Glu Ala Glu Thr Thr Ala Asn Val Leu Gln Asp Ala Thr Arg Lys
465             470             475             480

Glu Arg Leu Leu Glu Asp Ser Lys Gly Val Lys Glu Leu Met Lys Gln
                485             490             495

Trp Gln Asp Leu Gln Gly Glu Ile Glu Gln Glu Gln Val Arg Val Asn
            500             505             510

Ser Leu Thr His Met Val Val Val Asp Glu Ser Ser Gly Asp His
515             520             525

Ala Thr Ala Ala Leu Glu Glu Gln Leu Lys Val Leu Gly Asp Arg Trp
        530             535             540

Ala Asn Ile Cys Arg Trp Ser Glu Leu Arg Lys Lys Ser Leu Asn Ile
545             550             555             560

Arg Ser His Leu Glu Ala Ser Ser Asp Gln Trp Lys Arg Leu His Leu
                565             570             575

Ser Leu Gln Glu Leu Leu Val Trp Leu Gln Leu Lys Asp Asp Glu Leu
            580             585             590

Ser Arg Gln Ala Pro Ile Gly Gly Asp Phe Pro Ala Val Gln Lys Gln
        595             600             605

Asn Asp Val His Arg Ala Phe Lys Arg Glu Leu Lys Thr Lys Glu Pro
610             615             620

Val Ile Met Ser Thr Leu Glu Thr Val Arg Ile Phe Leu Thr Glu Gln
625             630             635             640

Pro Leu Glu Gly Leu Glu Lys Leu Tyr Gln Glu Pro Arg Glu Leu Pro
                645             650             655

Pro Glu Glu Arg Ala Gln Asn Val Thr Arg Leu Leu Arg Lys Gln Ala
            660             665             670

Glu Glu Val Asn Thr Glu Trp Glu Lys Leu Asn Leu His Ser Ala Asp
        675             680             685

Trp Gln Arg Lys Ile Asp Glu Thr Leu Glu Arg Leu Gln Glu Leu Gln
    690             695             700
```

-continued

```
Glu Ala Thr Asp Glu Leu Asp Leu Lys Leu Arg Gln Ala Glu Val Ile
705                 710                 715                 720

Lys Gly Ser Trp Gln Pro Val Gly Asp Leu Leu Ile Asp Ser Leu Gln
                725                 730                 735

Asp His Leu Glu Lys Val Lys Ala Leu Arg Gly Glu Ile Ala Pro Leu
            740                 745                 750

Lys Glu Asn Val Ser His Val Asn Asp Leu Ala Arg Gln Leu Thr Thr
        755                 760                 765

Leu Gly Ile Gln Leu Ser Pro Tyr Asn Leu Ser Thr Leu Glu Asp Leu
770                 775                 780

Asn Thr Arg Trp Lys Leu Leu Gln Val Ala Val Glu Asp Arg Val Arg
785                 790                 795                 800

Gln Leu His Glu Ala His Arg Asp Phe Gly Pro Ala Ser Gln His Phe
                805                 810                 815

Leu Ser Thr Ser Val Gln Gly Pro Trp Glu Arg Ala Ile Ser Pro Asn
            820                 825                 830

Lys Val Pro Tyr Tyr Ile Asn His Glu Thr Gln Thr Thr Cys Trp Asp
        835                 840                 845

His Pro Lys Met Thr Glu Leu Tyr Gln Ser Leu Ala Asp Leu Asn Asn
850                 855                 860

Val Arg Phe Ser Ala Tyr Arg Thr Ala Met Lys Leu Arg Arg Leu Gln
865                 870                 875                 880

Lys Ala Leu Cys Leu Asp Leu Leu Ser Leu Ser Ala Ala Cys Asp Ala
                885                 890                 895

Leu Asp Gln His Asn Leu Lys Gln Asn Asp Gln Pro Met Asp Ile Leu
            900                 905                 910

Gln Ile Ile Asn Cys Leu Thr Thr Ile Tyr Asp Arg Leu Glu Gln Glu
        915                 920                 925

His Asn Asn Leu Val Asn Val Pro Leu Cys Val Asp Met Cys Leu Asn
930                 935                 940

Trp Leu Leu Asn Val Tyr Asp Thr Gly Arg Thr Gly Arg Ile Arg Val
945                 950                 955                 960

Leu Ser Phe Lys Thr Gly Ile Ile Ser Leu Cys Lys Ala His Leu Glu
                965                 970                 975

Asp Lys Tyr Arg Tyr Leu Phe Lys Gln Val Ala Ser Ser Thr Gly Phe
            980                 985                 990

Cys Asp Gln Arg Arg Leu Gly Leu Leu Leu His Asp Ser Ile Gln Ile
        995                 1000                1005

Pro Arg Gln Leu Gly Glu Val Ala Ser Phe Gly Gly Ser Asn Ile
    1010                1015                1020

Glu Pro Ser Val Arg Ser Cys Phe Gln Phe Ala Asn Asn Lys Pro
    1025                1030                1035

Glu Ile Glu Ala Ala Leu Phe Leu Asp Trp Met Arg Leu Glu Pro
    1040                1045                1050

Gln Ser Met Val Trp Leu Pro Val Leu His Arg Val Ala Ala Ala
    1055                1060                1065

Glu Thr Ala Lys His Gln Ala Lys Cys Asn Ile Cys Lys Glu Cys
    1070                1075                1080

Pro Ile Ile Gly Phe Arg Tyr Arg Ser Leu Lys His Phe Asn Tyr
    1085                1090                1095

Asp Ile Cys Gln Ser Cys Phe Phe Ser Gly Arg Val Ala Lys Gly
    1100                1105                1110

His Lys Met His Tyr Pro Met Val Glu Tyr Cys Thr Pro Thr Thr
```

1115                1120                1125

Ser Gly Glu
    1130

<210> SEQ ID NO 2
<211> LENGTH: 3393
<212> TYPE: DNA
<213> ORGANISM: Artificial Sequence
<220> FEATURE:
<223> OTHER INFORMATION: a nucleic acid sequence encoding nano-
      dystrophin
<220> FEATURE:
<221> NAME/KEY: misc_feature
<222> LOCATION: (6)..(6)
<223> OTHER INFORMATION: n is a, c, g, or t
<220> FEATURE:
<221> NAME/KEY: misc_feature
<222> LOCATION: (21)..(21)
<223> OTHER INFORMATION: n is a, c, g, or t
<220> FEATURE:
<221> NAME/KEY: misc_feature
<222> LOCATION: (39)..(39)
<223> OTHER INFORMATION: n is a, c, g, or t
<220> FEATURE:
<221> NAME/KEY: misc_feature
<222> LOCATION: (48)..(48)
<223> OTHER INFORMATION: n is a, c, g, or t
<220> FEATURE:
<221> NAME/KEY: misc_feature
<222> LOCATION: (60)..(60)
<223> OTHER INFORMATION: n is a, c, g, or t
<220> FEATURE:
<221> NAME/KEY: misc_feature
<222> LOCATION: (66)..(66)
<223> OTHER INFORMATION: n is a, c, g, or t
<220> FEATURE:
<221> NAME/KEY: misc_feature
<222> LOCATION: (75)..(75)
<223> OTHER INFORMATION: n is a, c, g, or t
<220> FEATURE:
<221> NAME/KEY: misc_feature
<222> LOCATION: (81)..(81)
<223> OTHER INFORMATION: n is a, c, g, or t
<220> FEATURE:
<221> NAME/KEY: misc_feature
<222> LOCATION: (90)..(90)
<223> OTHER INFORMATION: n is a, c, g, or t
<220> FEATURE:
<221> NAME/KEY: misc_feature
<222> LOCATION: (99)..(99)
<223> OTHER INFORMATION: n is a, c, g, or t
<220> FEATURE:
<221> NAME/KEY: misc_feature
<222> LOCATION: (120)..(120)
<223> OTHER INFORMATION: n is a, c, g, or t
<220> FEATURE:
<221> NAME/KEY: misc_feature
<222> LOCATION: (126)..(126)
<223> OTHER INFORMATION: n is a, c, g, or t
<220> FEATURE:
<221> NAME/KEY: misc_feature
<222> LOCATION: (132)..(132)
<223> OTHER INFORMATION: n is a, c, g, or t
<220> FEATURE:
<221> NAME/KEY: misc_feature
<222> LOCATION: (141)..(141)
<223> OTHER INFORMATION: n is a, c, g, or t
<220> FEATURE:
<221> NAME/KEY: misc_feature
<222> LOCATION: (144)..(144)
<223> OTHER INFORMATION: n is a, c, g, or t
<220> FEATURE:
<221> NAME/KEY: misc_feature
<222> LOCATION: (147)..(147)
<223> OTHER INFORMATION: n is a, c, g, or t
<220> FEATURE:
<221> NAME/KEY: misc_feature -continued

```
<222> LOCATION: (150)..(150)
<223> OTHER INFORMATION: n is a, c, g, or t
<220> FEATURE:
<221> NAME/KEY: misc_feature
<222> LOCATION: (153)..(153)
<223> OTHER INFORMATION: n is a, c, g, or t
<220> FEATURE:
<221> NAME/KEY: misc_feature
<222> LOCATION: (159)..(159)
<223> OTHER INFORMATION: n is a, c, g, or t
<220> FEATURE:
<221> NAME/KEY: misc_feature
<222> LOCATION: (162)..(162)
<223> OTHER INFORMATION: n is a, c, g, or t
<220> FEATURE:
<221> NAME/KEY: misc_feature
<222> LOCATION: (168)..(168)
<223> OTHER INFORMATION: n is a, c, g, or t
<220> FEATURE:
<221> NAME/KEY: misc_feature
<222> LOCATION: (171)..(171)
<223> OTHER INFORMATION: n is a, c, g, or t
<220> FEATURE:
<221> NAME/KEY: misc_feature
<222> LOCATION: (174)..(174)
<223> OTHER INFORMATION: n is a, c, g, or t
<220> FEATURE:
<221> NAME/KEY: misc_feature
<222> LOCATION: (177)..(177)
<223> OTHER INFORMATION: n is a, c, g, or t
<220> FEATURE:
<221> NAME/KEY: misc_feature
<222> LOCATION: (186)..(186)
<223> OTHER INFORMATION: n is a, c, g, or t
<220> FEATURE:
<221> NAME/KEY: misc_feature
<222> LOCATION: (189)..(189)
<223> OTHER INFORMATION: n is a, c, g, or t
<220> FEATURE:
<221> NAME/KEY: misc_feature
<222> LOCATION: (201)..(201)
<223> OTHER INFORMATION: n is a, c, g, or t
<220> FEATURE:
<221> NAME/KEY: misc_feature
<222> LOCATION: (204)..(204)
<223> OTHER INFORMATION: n is a, c, g, or t
<220> FEATURE:
<221> NAME/KEY: misc_feature
<222> LOCATION: (207)..(207)
<223> OTHER INFORMATION: n is a, c, g, or t
<220> FEATURE:
<221> NAME/KEY: misc_feature
<222> LOCATION: (210)..(210)
<223> OTHER INFORMATION: n is a, c, g, or t
<220> FEATURE:
<221> NAME/KEY: misc_feature
<222> LOCATION: (213)..(213)
<223> OTHER INFORMATION: n is a, c, g, or t
<220> FEATURE:
<221> NAME/KEY: misc_feature
<222> LOCATION: (219)..(219)
<223> OTHER INFORMATION: n is a, c, g, or t
<220> FEATURE:
<221> NAME/KEY: misc_feature
<222> LOCATION: (222)..(222)
<223> OTHER INFORMATION: n is a, c, g, or t
<220> FEATURE:
<221> NAME/KEY: misc_feature
<222> LOCATION: (231)..(231)
<223> OTHER INFORMATION: n is a, c, g, or t
<220> FEATURE:
<221> NAME/KEY: misc_feature
<222> LOCATION: (240)..(240)
<223> OTHER INFORMATION: n is a, c, g, or t
<220> FEATURE:
<221> NAME/KEY: misc_feature
<222> LOCATION: (243)..(243)
<223> OTHER INFORMATION: n is a, c, g, or t
<220> FEATURE:
```

```
<221> NAME/KEY: misc_feature
<222> LOCATION: (246)..(246)
<223> OTHER INFORMATION: n is a, c, g, or t
<220> FEATURE:
<221> NAME/KEY: misc_feature
<222> LOCATION: (249)..(249)
<223> OTHER INFORMATION: n is a, c, g, or t
<220> FEATURE:
<221> NAME/KEY: misc_feature
<222> LOCATION: (252)..(252)
<223> OTHER INFORMATION: n is a, c, g, or t
<220> FEATURE:
<221> NAME/KEY: misc_feature
<222> LOCATION: (267)..(267)
<223> OTHER INFORMATION: n is a, c, g, or t
<220> FEATURE:
<221> NAME/KEY: misc_feature
<222> LOCATION: (273)..(273)
<223> OTHER INFORMATION: n is a, c, g, or t
<220> FEATURE:
<221> NAME/KEY: misc_feature
<222> LOCATION: (276)..(276)
<223> OTHER INFORMATION: n is a, c, g, or t
<220> FEATURE:
<221> NAME/KEY: misc_feature
<222> LOCATION: (285)..(285)
<223> OTHER INFORMATION: n is a, c, g, or t
<220> FEATURE:
<221> NAME/KEY: misc_feature
<222> LOCATION: (288)..(288)
<223> OTHER INFORMATION: n is a, c, g, or t
<220> FEATURE:
<221> NAME/KEY: misc_feature
<222> LOCATION: (291)..(291)
<223> OTHER INFORMATION: n is a, c, g, or t
<220> FEATURE:
<221> NAME/KEY: misc_feature
<222> LOCATION: (300)..(300)
<223> OTHER INFORMATION: n is a, c, g, or t
<220> FEATURE:
<221> NAME/KEY: misc_feature
<222> LOCATION: (306)..(306)
<223> OTHER INFORMATION: n is a, c, g, or t
<220> FEATURE:
<221> NAME/KEY: misc_feature
<222> LOCATION: (318)..(318)
<223> OTHER INFORMATION: n is a, c, g, or t
<220> FEATURE:
<221> NAME/KEY: misc_feature
<222> LOCATION: (321)..(321)
<223> OTHER INFORMATION: n is a, c, g, or t
<220> FEATURE:
<221> NAME/KEY: misc_feature
<222> LOCATION: (324)..(324)
<223> OTHER INFORMATION: n is a, c, g, or t
<220> FEATURE:
<221> NAME/KEY: misc_feature
<222> LOCATION: (327)..(327)
<223> OTHER INFORMATION: n is a, c, g, or t
<220> FEATURE:
<221> NAME/KEY: misc_feature
<222> LOCATION: (330)..(330)
<223> OTHER INFORMATION: n is a, c, g, or t
<220> FEATURE:
<221> NAME/KEY: misc_feature
<222> LOCATION: (348)..(348)
<223> OTHER INFORMATION: n is a, c, g, or t
<220> FEATURE:
<221> NAME/KEY: misc_feature
<222> LOCATION: (360)..(360)
<223> OTHER INFORMATION: n is a, c, g, or t
<220> FEATURE:
<221> NAME/KEY: misc_feature
<222> LOCATION: (369)..(369)
<223> OTHER INFORMATION: n is a, c, g, or t
<220> FEATURE:
<221> NAME/KEY: misc_feature
<222> LOCATION: (387)..(387)
<223> OTHER INFORMATION: n is a, c, g, or t
```

```
<220> FEATURE:
<221> NAME/KEY: misc_feature
<222> LOCATION: (390)..(390)
<223> OTHER INFORMATION: n is a, c, g, or t
<220> FEATURE:
<221> NAME/KEY: misc_feature
<222> LOCATION: (393)..(393)
<223> OTHER INFORMATION: n is a, c, g, or t
<220> FEATURE:
<221> NAME/KEY: misc_feature
<222> LOCATION: (402)..(402)
<223> OTHER INFORMATION: n is a, c, g, or t
<220> FEATURE:
<221> NAME/KEY: misc_feature
<222> LOCATION: (408)..(408)
<223> OTHER INFORMATION: n is a, c, g, or t
<220> FEATURE:
<221> NAME/KEY: misc_feature
<222> LOCATION: (420)..(420)
<223> OTHER INFORMATION: n is a, c, g, or t
<220> FEATURE:
<221> NAME/KEY: misc_feature
<222> LOCATION: (423)..(423)
<223> OTHER INFORMATION: n is a, c, g, or t
<220> FEATURE:
<221> NAME/KEY: misc_feature
<222> LOCATION: (426)..(426)
<223> OTHER INFORMATION: n is a, c, g, or t
<220> FEATURE:
<221> NAME/KEY: misc_feature
<222> LOCATION: (432)..(432)
<223> OTHER INFORMATION: n is a, c, g, or t
<220> FEATURE:
<221> NAME/KEY: misc_feature
<222> LOCATION: (435)..(435)
<223> OTHER INFORMATION: n is a, c, g, or t
<220> FEATURE:
<221> NAME/KEY: misc_feature
<222> LOCATION: (441)..(441)
<223> OTHER INFORMATION: n is a, c, g, or t
<220> FEATURE:
<221> NAME/KEY: misc_feature
<222> LOCATION: (444)..(444)
<223> OTHER INFORMATION: n is a, c, g, or t
<220> FEATURE:
<221> NAME/KEY: misc_feature
<222> LOCATION: (447)..(447)
<223> OTHER INFORMATION: n is a, c, g, or t
<220> FEATURE:
<221> NAME/KEY: misc_feature
<222> LOCATION: (456)..(456)
<223> OTHER INFORMATION: n is a, c, g, or t
<220> FEATURE:
<221> NAME/KEY: misc_feature
<222> LOCATION: (462)..(462)
<223> OTHER INFORMATION: n is a, c, g, or t
<220> FEATURE:
<221> NAME/KEY: misc_feature
<222> LOCATION: (468)..(468)
<223> OTHER INFORMATION: n is a, c, g, or t
<220> FEATURE:
<221> NAME/KEY: misc_feature
<222> LOCATION: (480)..(480)
<223> OTHER INFORMATION: n is a, c, g, or t
<220> FEATURE:
<221> NAME/KEY: misc_feature
<222> LOCATION: (483)..(483)
<223> OTHER INFORMATION: n is a, c, g, or t
<220> FEATURE:
<221> NAME/KEY: misc_feature
<222> LOCATION: (486)..(486)
<223> OTHER INFORMATION: n is a, c, g, or t
<220> FEATURE:
<221> NAME/KEY: misc_feature
<222> LOCATION: (492)..(492)
<223> OTHER INFORMATION: n is a, c, g, or t
<220> FEATURE:
<221> NAME/KEY: misc_feature
<222> LOCATION: (498)..(498)
```

```
<223> OTHER INFORMATION: n is a, c, g, or t
<220> FEATURE:
<221> NAME/KEY: misc_feature
<222> LOCATION: (501)..(501)
<223> OTHER INFORMATION: n is a, c, g, or t
<220> FEATURE:
<221> NAME/KEY: misc_feature
<222> LOCATION: (504)..(504)
<223> OTHER INFORMATION: n is a, c, g, or t
<220> FEATURE:
<221> NAME/KEY: misc_feature
<222> LOCATION: (507)..(507)
<223> OTHER INFORMATION: n is a, c, g, or t
<220> FEATURE:
<221> NAME/KEY: misc_feature
<222> LOCATION: (513)..(513)
<223> OTHER INFORMATION: n is a, c, g, or t
<220> FEATURE:
<221> NAME/KEY: misc_feature
<222> LOCATION: (516)..(516)
<223> OTHER INFORMATION: n is a, c, g, or t
<220> FEATURE:
<221> NAME/KEY: misc_feature
<222> LOCATION: (525)..(525)
<223> OTHER INFORMATION: n is a, c, g, or t
<220> FEATURE:
<221> NAME/KEY: misc_feature
<222> LOCATION: (531)..(531)
<223> OTHER INFORMATION: n is a, c, g, or t
<220> FEATURE:
<221> NAME/KEY: misc_feature
<222> LOCATION: (534)..(534)
<223> OTHER INFORMATION: n is a, c, g, or t
<220> FEATURE:
<221> NAME/KEY: misc_feature
<222> LOCATION: (540)..(540)
<223> OTHER INFORMATION: n is a, c, g, or t
<220> FEATURE:
<221> NAME/KEY: misc_feature
<222> LOCATION: (555)..(555)
<223> OTHER INFORMATION: n is a, c, g, or t
<220> FEATURE:
<221> NAME/KEY: misc_feature
<222> LOCATION: (558)..(558)
<223> OTHER INFORMATION: n is a, c, g, or t
<220> FEATURE:
<221> NAME/KEY: misc_feature
<222> LOCATION: (561)..(561)
<223> OTHER INFORMATION: n is a, c, g, or t
<220> FEATURE:
<221> NAME/KEY: misc_feature
<222> LOCATION: (573)..(573)
<223> OTHER INFORMATION: n is a, c, g, or t
<220> FEATURE:
<221> NAME/KEY: misc_feature
<222> LOCATION: (576)..(576)
<223> OTHER INFORMATION: n is a, c, g, or t
<220> FEATURE:
<221> NAME/KEY: misc_feature
<222> LOCATION: (579)..(579)
<223> OTHER INFORMATION: n is a, c, g, or t
<220> FEATURE:
<221> NAME/KEY: misc_feature
<222> LOCATION: (585)..(585)
<223> OTHER INFORMATION: n is a, c, g, or t
<220> FEATURE:
<221> NAME/KEY: misc_feature
<222> LOCATION: (588)..(588)
<223> OTHER INFORMATION: n is a, c, g, or t
<220> FEATURE:
<221> NAME/KEY: misc_feature
<222> LOCATION: (597)..(597)
<223> OTHER INFORMATION: n is a, c, g, or t
<220> FEATURE:
<221> NAME/KEY: misc_feature
<222> LOCATION: (609)..(609)
<223> OTHER INFORMATION: n is a, c, g, or t
<220> FEATURE:
<221> NAME/KEY: misc_feature
```

-continued

```
<222> LOCATION: (612)..(612)
<223> OTHER INFORMATION: n is a, c, g, or t
<220> FEATURE:
<221> NAME/KEY: misc_feature
<222> LOCATION: (621)..(621)
<223> OTHER INFORMATION: n is a, c, g, or t
<220> FEATURE:
<221> NAME/KEY: misc_feature
<222> LOCATION: (624)..(624)
<223> OTHER INFORMATION: n is a, c, g, or t
<220> FEATURE:
<221> NAME/KEY: misc_feature
<222> LOCATION: (636)..(636)
<223> OTHER INFORMATION: n is a, c, g, or t
<220> FEATURE:
<221> NAME/KEY: misc_feature
<222> LOCATION: (639)..(639)
<223> OTHER INFORMATION: n is a, c, g, or t
<220> FEATURE:
<221> NAME/KEY: misc_feature
<222> LOCATION: (645)..(645)
<223> OTHER INFORMATION: n is a, c, g, or t
<220> FEATURE:
<221> NAME/KEY: misc_feature
<222> LOCATION: (654)..(654)
<223> OTHER INFORMATION: n is a, c, g, or t
<220> FEATURE:
<221> NAME/KEY: misc_feature
<222> LOCATION: (660)..(660)
<223> OTHER INFORMATION: n is a, c, g, or t
<220> FEATURE:
<221> NAME/KEY: misc_feature
<222> LOCATION: (663)..(663)
<223> OTHER INFORMATION: n is a, c, g, or t
<220> FEATURE:
<221> NAME/KEY: misc_feature
<222> LOCATION: (669)..(669)
<223> OTHER INFORMATION: n is a, c, g, or t
<220> FEATURE:
<221> NAME/KEY: misc_feature
<222> LOCATION: (681)..(681)
<223> OTHER INFORMATION: n is a, c, g, or t
<220> FEATURE:
<221> NAME/KEY: misc_feature
<222> LOCATION: (687)..(687)
<223> OTHER INFORMATION: n is a, c, g, or t
<220> FEATURE:
<221> NAME/KEY: misc_feature
<222> LOCATION: (699)..(699)
<223> OTHER INFORMATION: n is a, c, g, or t
<220> FEATURE:
<221> NAME/KEY: misc_feature
<222> LOCATION: (702)..(702)
<223> OTHER INFORMATION: n is a, c, g, or t
<220> FEATURE:
<221> NAME/KEY: misc_feature
<222> LOCATION: (705)..(705)
<223> OTHER INFORMATION: n is a, c, g, or t
<220> FEATURE:
<221> NAME/KEY: misc_feature
<222> LOCATION: (714)..(714)
<223> OTHER INFORMATION: n is a, c, g, or t
<220> FEATURE:
<221> NAME/KEY: misc_feature
<222> LOCATION: (717)..(717)
<223> OTHER INFORMATION: n is a, c, g, or t
<220> FEATURE:
<221> NAME/KEY: misc_feature
<222> LOCATION: (720)..(720)
<223> OTHER INFORMATION: n is a, c, g, or t
<220> FEATURE:
<221> NAME/KEY: misc_feature
<222> LOCATION: (729)..(729)
<223> OTHER INFORMATION: n is a, c, g, or t
<220> FEATURE:
<221> NAME/KEY: misc_feature
<222> LOCATION: (732)..(732)
<223> OTHER INFORMATION: n is a, c, g, or t
<220> FEATURE:
```

```
<221> NAME/KEY: misc_feature
<222> LOCATION: (741)..(741)
<223> OTHER INFORMATION: n is a, c, g, or t
<220> FEATURE:
<221> NAME/KEY: misc_feature
<222> LOCATION: (753)..(753)
<223> OTHER INFORMATION: n is a, c, g, or t
<220> FEATURE:
<221> NAME/KEY: misc_feature
<222> LOCATION: (762)..(762)
<223> OTHER INFORMATION: n is a, c, g, or t
<220> FEATURE:
<221> NAME/KEY: misc_feature
<222> LOCATION: (765)..(765)
<223> OTHER INFORMATION: n is a, c, g, or t
<220> FEATURE:
<221> NAME/KEY: misc_feature
<222> LOCATION: (768)..(768)
<223> OTHER INFORMATION: n is a, c, g, or t
<220> FEATURE:
<221> NAME/KEY: misc_feature
<222> LOCATION: (771)..(771)
<223> OTHER INFORMATION: n is a, c, g, or t
<220> FEATURE:
<221> NAME/KEY: misc_feature
<222> LOCATION: (774)..(774)
<223> OTHER INFORMATION: n is a, c, g, or t
<220> FEATURE:
<221> NAME/KEY: misc_feature
<222> LOCATION: (780)..(780)
<223> OTHER INFORMATION: n is a, c, g, or t
<220> FEATURE:
<221> NAME/KEY: misc_feature
<222> LOCATION: (783)..(783)
<223> OTHER INFORMATION: n is a, c, g, or t
<220> FEATURE:
<221> NAME/KEY: misc_feature
<222> LOCATION: (804)..(804)
<223> OTHER INFORMATION: n is a, c, g, or t
<220> FEATURE:
<221> NAME/KEY: misc_feature
<222> LOCATION: (825)..(825)
<223> OTHER INFORMATION: n is a, c, g, or t
<220> FEATURE:
<221> NAME/KEY: misc_feature
<222> LOCATION: (837)..(837)
<223> OTHER INFORMATION: n is a, c, g, or t
<220> FEATURE:
<221> NAME/KEY: misc_feature
<222> LOCATION: (840)..(840)
<223> OTHER INFORMATION: n is a, c, g, or t
<220> FEATURE:
<221> NAME/KEY: misc_feature
<222> LOCATION: (843)..(843)
<223> OTHER INFORMATION: n is a, c, g, or t
<220> FEATURE:
<221> NAME/KEY: misc_feature
<222> LOCATION: (846)..(846)
<223> OTHER INFORMATION: n is a, c, g, or t
<220> FEATURE:
<221> NAME/KEY: misc_feature
<222> LOCATION: (849)..(849)
<223> OTHER INFORMATION: n is a, c, g, or t
<220> FEATURE:
<221> NAME/KEY: misc_feature
<222> LOCATION: (855)..(855)
<223> OTHER INFORMATION: n is a, c, g, or t
<220> FEATURE:
<221> NAME/KEY: misc_feature
<222> LOCATION: (864)..(864)
<223> OTHER INFORMATION: n is a, c, g, or t
<220> FEATURE:
<221> NAME/KEY: misc_feature
<222> LOCATION: (867)..(867)
<223> OTHER INFORMATION: n is a, c, g, or t
<220> FEATURE:
<221> NAME/KEY: misc_feature
<222> LOCATION: (870)..(870)
<223> OTHER INFORMATION: n is a, c, g, or t
```

-continued

```
<220> FEATURE:
<221> NAME/KEY: misc_feature
<222> LOCATION: (873)..(873)
<223> OTHER INFORMATION: n is a, c, g, or t
<220> FEATURE:
<221> NAME/KEY: misc_feature
<222> LOCATION: (876)..(876)
<223> OTHER INFORMATION: n is a, c, g, or t
<220> FEATURE:
<221> NAME/KEY: misc_feature
<222> LOCATION: (882)..(882)
<223> OTHER INFORMATION: n is a, c, g, or t
<220> FEATURE:
<221> NAME/KEY: misc_feature
<222> LOCATION: (885)..(885)
<223> OTHER INFORMATION: n is a, c, g, or t
<220> FEATURE:
<221> NAME/KEY: misc_feature
<222> LOCATION: (894)..(894)
<223> OTHER INFORMATION: n is a, c, g, or t
<220> FEATURE:
<221> NAME/KEY: misc_feature
<222> LOCATION: (900)..(900)
<223> OTHER INFORMATION: n is a, c, g, or t
<220> FEATURE:
<221> NAME/KEY: misc_feature
<222> LOCATION: (906)..(906)
<223> OTHER INFORMATION: n is a, c, g, or t
<220> FEATURE:
<221> NAME/KEY: misc_feature
<222> LOCATION: (912)..(912)
<223> OTHER INFORMATION: n is a, c, g, or t
<220> FEATURE:
<221> NAME/KEY: misc_feature
<222> LOCATION: (915)..(915)
<223> OTHER INFORMATION: n is a, c, g, or t
<220> FEATURE:
<221> NAME/KEY: misc_feature
<222> LOCATION: (921)..(921)
<223> OTHER INFORMATION: n is a, c, g, or t
<220> FEATURE:
<221> NAME/KEY: misc_feature
<222> LOCATION: (924)..(924)
<223> OTHER INFORMATION: n is a, c, g, or t
<220> FEATURE:
<221> NAME/KEY: misc_feature
<222> LOCATION: (927)..(927)
<223> OTHER INFORMATION: n is a, c, g, or t
<220> FEATURE:
<221> NAME/KEY: misc_feature
<222> LOCATION: (930)..(930)
<223> OTHER INFORMATION: n is a, c, g, or t
<220> FEATURE:
<221> NAME/KEY: misc_feature
<222> LOCATION: (936)..(936)
<223> OTHER INFORMATION: n is a, c, g, or t
<220> FEATURE:
<221> NAME/KEY: misc_feature
<222> LOCATION: (939)..(939)
<223> OTHER INFORMATION: n is a, c, g, or t
<220> FEATURE:
<221> NAME/KEY: misc_feature
<222> LOCATION: (942)..(942)
<223> OTHER INFORMATION: n is a, c, g, or t
<220> FEATURE:
<221> NAME/KEY: misc_feature
<222> LOCATION: (945)..(945)
<223> OTHER INFORMATION: n is a, c, g, or t
<220> FEATURE:
<221> NAME/KEY: misc_feature
<222> LOCATION: (948)..(948)
<223> OTHER INFORMATION: n is a, c, g, or t
<220> FEATURE:
<221> NAME/KEY: misc_feature
<222> LOCATION: (954)..(954)
<223> OTHER INFORMATION: n is a, c, g, or t
<220> FEATURE:
<221> NAME/KEY: misc_feature
<222> LOCATION: (957)..(957)
```

-continued

```
<223> OTHER INFORMATION: n is a, c, g, or t
<220> FEATURE:
<221> NAME/KEY: misc_feature
<222> LOCATION: (966)..(966)
<223> OTHER INFORMATION: n is a, c, g, or t
<220> FEATURE:
<221> NAME/KEY: misc_feature
<222> LOCATION: (972)..(972)
<223> OTHER INFORMATION: n is a, c, g, or t
<220> FEATURE:
<221> NAME/KEY: misc_feature
<222> LOCATION: (975)..(975)
<223> OTHER INFORMATION: n is a, c, g, or t
<220> FEATURE:
<221> NAME/KEY: misc_feature
<222> LOCATION: (987)..(987)
<223> OTHER INFORMATION: n is a, c, g, or t
<220> FEATURE:
<221> NAME/KEY: misc_feature
<222> LOCATION: (993)..(993)
<223> OTHER INFORMATION: n is a, c, g, or t
<220> FEATURE:
<221> NAME/KEY: misc_feature
<222> LOCATION: (996)..(996)
<223> OTHER INFORMATION: n is a, c, g, or t
<220> FEATURE:
<221> NAME/KEY: misc_feature
<222> LOCATION: (999)..(999)
<223> OTHER INFORMATION: n is a, c, g, or t
<220> FEATURE:
<221> NAME/KEY: misc_feature
<222> LOCATION: (1002)..(1002)
<223> OTHER INFORMATION: n is a, c, g, or t
<220> FEATURE:
<221> NAME/KEY: misc_feature
<222> LOCATION: (1011)..(1011)
<223> OTHER INFORMATION: n is a, c, g, or t
<220> FEATURE:
<221> NAME/KEY: misc_feature
<222> LOCATION: (1017)..(1017)
<223> OTHER INFORMATION: n is a, c, g, or t
<220> FEATURE:
<221> NAME/KEY: misc_feature
<222> LOCATION: (1023)..(1023)
<223> OTHER INFORMATION: n is a, c, g, or t
<220> FEATURE:
<221> NAME/KEY: misc_feature
<222> LOCATION: (1029)..(1029)
<223> OTHER INFORMATION: n is a, c, g, or t
<220> FEATURE:
<221> NAME/KEY: misc_feature
<222> LOCATION: (1038)..(1038)
<223> OTHER INFORMATION: n is a, c, g, or t
<220> FEATURE:
<221> NAME/KEY: misc_feature
<222> LOCATION: (1041)..(1041)
<223> OTHER INFORMATION: n is a, c, g, or t
<220> FEATURE:
<221> NAME/KEY: misc_feature
<222> LOCATION: (1044)..(1044)
<223> OTHER INFORMATION: n is a, c, g, or t
<220> FEATURE:
<221> NAME/KEY: misc_feature
<222> LOCATION: (1053)..(1053)
<223> OTHER INFORMATION: n is a, c, g, or t
<220> FEATURE:
<221> NAME/KEY: misc_feature
<222> LOCATION: (1056)..(1056)
<223> OTHER INFORMATION: n is a, c, g, or t
<220> FEATURE:
<221> NAME/KEY: misc_feature
<222> LOCATION: (1059)..(1059)
<223> OTHER INFORMATION: n is a, c, g, or t
<220> FEATURE:
<221> NAME/KEY: misc_feature
<222> LOCATION: (1065)..(1065)
<223> OTHER INFORMATION: n is a, c, g, or t
<220> FEATURE:
<221> NAME/KEY: misc_feature
```

```
      <222> LOCATION: (1068)..(1068)
      <223> OTHER INFORMATION: n is a, c, g, or t
      <220> FEATURE:
      <221> NAME/KEY: misc_feature
      <222> LOCATION: (1071)..(1071)
      <223> OTHER INFORMATION: n is a, c, g, or t
      <220> FEATURE:
      <221> NAME/KEY: misc_feature
      <222> LOCATION: (1074)..(1074)
      <223> OTHER INFORMATION: n is a, c, g, or t
      <220> FEATURE:
      <221> NAME/KEY: misc_feature
      <222> LOCATION: (1083)..(1083)
      <223> OTHER INFORMATION: n is a, c, g, or t
      <220> FEATURE:
      <221> NAME/KEY: misc_feature
      <222> LOCATION: (1086)..(1086)
      <223> OTHER INFORMATION: n is a, c, g, or t
      <220> FEATURE:
      <221> NAME/KEY: misc_feature
      <222> LOCATION: (1092)..(1092)
      <223> OTHER INFORMATION: n is a, c, g, or t
      <220> FEATURE:
      <221> NAME/KEY: misc_feature
      <222> LOCATION: (1098)..(1098)
      <223> OTHER INFORMATION: n is a, c, g, or t
      <220> FEATURE:
      <221> NAME/KEY: misc_feature
      <222> LOCATION: (1107)..(1107)
      <223> OTHER INFORMATION: n is a, c, g, or t
      <220> FEATURE:
      <221> NAME/KEY: misc_feature
      <222> LOCATION: (1116)..(1116)
      <223> OTHER INFORMATION: n is a, c, g, or t
      <220> FEATURE:
      <221> NAME/KEY: misc_feature
      <222> LOCATION: (1122)..(1122)
      <223> OTHER INFORMATION: n is a, c, g, or t
      <220> FEATURE:
      <221> NAME/KEY: misc_feature
      <222> LOCATION: (1125)..(1125)
      <223> OTHER INFORMATION: n is a, c, g, or t
      <220> FEATURE:
      <221> NAME/KEY: misc_feature
      <222> LOCATION: (1143)..(1143)
      <223> OTHER INFORMATION: n is a, c, g, or t
      <220> FEATURE:
      <221> NAME/KEY: misc_feature
      <222> LOCATION: (1152)..(1152)
      <223> OTHER INFORMATION: n is a, c, g, or t
      <220> FEATURE:
      <221> NAME/KEY: misc_feature
      <222> LOCATION: (1167)..(1167)
      <223> OTHER INFORMATION: n is a, c, g, or t
      <220> FEATURE:
      <221> NAME/KEY: misc_feature
      <222> LOCATION: (1170)..(1170)
      <223> OTHER INFORMATION: n is a, c, g, or t
      <220> FEATURE:
      <221> NAME/KEY: misc_feature
      <222> LOCATION: (1173)..(1173)
      <223> OTHER INFORMATION: n is a, c, g, or t
      <220> FEATURE:
      <221> NAME/KEY: misc_feature
      <222> LOCATION: (1182)..(1182)
      <223> OTHER INFORMATION: n is a, c, g, or t
      <220> FEATURE:
      <221> NAME/KEY: misc_feature
      <222> LOCATION: (1185)..(1185)
      <223> OTHER INFORMATION: n is a, c, g, or t
      <220> FEATURE:
      <221> NAME/KEY: misc_feature
      <222> LOCATION: (1188)..(1188)
      <223> OTHER INFORMATION: n is a, c, g, or t
      <220> FEATURE:
      <221> NAME/KEY: misc_feature
      <222> LOCATION: (1191)..(1191)
      <223> OTHER INFORMATION: n is a, c, g, or t
      <220> FEATURE:
```

```
<221> NAME/KEY: misc_feature
<222> LOCATION: (1200)..(1200)
<223> OTHER INFORMATION: n is a, c, g, or t
<220> FEATURE:
<221> NAME/KEY: misc_feature
<222> LOCATION: (1206)..(1206)
<223> OTHER INFORMATION: n is a, c, g, or t
<220> FEATURE:
<221> NAME/KEY: misc_feature
<222> LOCATION: (1209)..(1209)
<223> OTHER INFORMATION: n is a, c, g, or t
<220> FEATURE:
<221> NAME/KEY: misc_feature
<222> LOCATION: (1212)..(1212)
<223> OTHER INFORMATION: n is a, c, g, or t
<220> FEATURE:
<221> NAME/KEY: misc_feature
<222> LOCATION: (1218)..(1218)
<223> OTHER INFORMATION: n is a, c, g, or t
<220> FEATURE:
<221> NAME/KEY: misc_feature
<222> LOCATION: (1224)..(1224)
<223> OTHER INFORMATION: n is a, c, g, or t
<220> FEATURE:
<221> NAME/KEY: misc_feature
<222> LOCATION: (1227)..(1227)
<223> OTHER INFORMATION: n is a, c, g, or t
<220> FEATURE:
<221> NAME/KEY: misc_feature
<222> LOCATION: (1230)..(1230)
<223> OTHER INFORMATION: n is a, c, g, or t
<220> FEATURE:
<221> NAME/KEY: misc_feature
<222> LOCATION: (1236)..(1236)
<223> OTHER INFORMATION: n is a, c, g, or t
<220> FEATURE:
<221> NAME/KEY: misc_feature
<222> LOCATION: (1239)..(1239)
<223> OTHER INFORMATION: n is a, c, g, or t
<220> FEATURE:
<221> NAME/KEY: misc_feature
<222> LOCATION: (1254)..(1254)
<223> OTHER INFORMATION: n is a, c, g, or t
<220> FEATURE:
<221> NAME/KEY: misc_feature
<222> LOCATION: (1260)..(1260)
<223> OTHER INFORMATION: n is a, c, g, or t
<220> FEATURE:
<221> NAME/KEY: misc_feature
<222> LOCATION: (1278)..(1278)
<223> OTHER INFORMATION: n is a, c, g, or t
<220> FEATURE:
<221> NAME/KEY: misc_feature
<222> LOCATION: (1281)..(1281)
<223> OTHER INFORMATION: n is a, c, g, or t
<220> FEATURE:
<221> NAME/KEY: misc_feature
<222> LOCATION: (1287)..(1287)
<223> OTHER INFORMATION: n is a, c, g, or t
<220> FEATURE:
<221> NAME/KEY: misc_feature
<222> LOCATION: (1290)..(1290)
<223> OTHER INFORMATION: n is a, c, g, or t
<220> FEATURE:
<221> NAME/KEY: misc_feature
<222> LOCATION: (1302)..(1302)
<223> OTHER INFORMATION: n is a, c, g, or t
<220> FEATURE:
<221> NAME/KEY: misc_feature
<222> LOCATION: (1305)..(1305)
<223> OTHER INFORMATION: n is a, c, g, or t
<220> FEATURE:
<221> NAME/KEY: misc_feature
<222> LOCATION: (1308)..(1308)
<223> OTHER INFORMATION: n is a, c, g, or t
<220> FEATURE:
<221> NAME/KEY: misc_feature
<222> LOCATION: (1311)..(1311)
<223> OTHER INFORMATION: n is a, c, g, or t
```

-continued

```
<220> FEATURE:
<221> NAME/KEY: misc_feature
<222> LOCATION: (1314)..(1314)
<223> OTHER INFORMATION: n is a, c, g, or t
<220> FEATURE:
<221> NAME/KEY: misc_feature
<222> LOCATION: (1329)..(1329)
<223> OTHER INFORMATION: n is a, c, g, or t
<220> FEATURE:
<221> NAME/KEY: misc_feature
<222> LOCATION: (1335)..(1335)
<223> OTHER INFORMATION: n is a, c, g, or t
<220> FEATURE:
<221> NAME/KEY: misc_feature
<222> LOCATION: (1341)..(1341)
<223> OTHER INFORMATION: n is a, c, g, or t
<220> FEATURE:
<221> NAME/KEY: misc_feature
<222> LOCATION: (1344)..(1344)
<223> OTHER INFORMATION: n is a, c, g, or t
<220> FEATURE:
<221> NAME/KEY: misc_feature
<222> LOCATION: (1347)..(1347)
<223> OTHER INFORMATION: n is a, c, g, or t
<220> FEATURE:
<221> NAME/KEY: misc_feature
<222> LOCATION: (1356)..(1356)
<223> OTHER INFORMATION: n is a, c, g, or t
<220> FEATURE:
<221> NAME/KEY: misc_feature
<222> LOCATION: (1371)..(1371)
<223> OTHER INFORMATION: n is a, c, g, or t
<220> FEATURE:
<221> NAME/KEY: misc_feature
<222> LOCATION: (1380)..(1380)
<223> OTHER INFORMATION: n is a, c, g, or t
<220> FEATURE:
<221> NAME/KEY: misc_feature
<222> LOCATION: (1392)..(1392)
<223> OTHER INFORMATION: n is a, c, g, or t
<220> FEATURE:
<221> NAME/KEY: misc_feature
<222> LOCATION: (1395)..(1395)
<223> OTHER INFORMATION: n is a, c, g, or t
<220> FEATURE:
<221> NAME/KEY: misc_feature
<222> LOCATION: (1401)..(1401)
<223> OTHER INFORMATION: n is a, c, g, or t
<220> FEATURE:
<221> NAME/KEY: misc_feature
<222> LOCATION: (1407)..(1407)
<223> OTHER INFORMATION: n is a, c, g, or t
<220> FEATURE:
<221> NAME/KEY: misc_feature
<222> LOCATION: (1410)..(1410)
<223> OTHER INFORMATION: n is a, c, g, or t
<220> FEATURE:
<221> NAME/KEY: misc_feature
<222> LOCATION: (1413)..(1413)
<223> OTHER INFORMATION: n is a, c, g, or t
<220> FEATURE:
<221> NAME/KEY: misc_feature
<222> LOCATION: (1419)..(1419)
<223> OTHER INFORMATION: n is a, c, g, or t
<220> FEATURE:
<221> NAME/KEY: misc_feature
<222> LOCATION: (1422)..(1422)
<223> OTHER INFORMATION: n is a, c, g, or t
<220> FEATURE:
<221> NAME/KEY: misc_feature
<222> LOCATION: (1431)..(1431)
<223> OTHER INFORMATION: n is a, c, g, or t
<220> FEATURE:
<221> NAME/KEY: misc_feature
<222> LOCATION: (1434)..(1434)
<223> OTHER INFORMATION: n is a, c, g, or t
<220> FEATURE:
<221> NAME/KEY: misc_feature
<222> LOCATION: (1437)..(1437)
```

```
<223> OTHER INFORMATION: n is a, c, g, or t
<220> FEATURE:
<221> NAME/KEY: misc_feature
<222> LOCATION: (1446)..(1446)
<223> OTHER INFORMATION: n is a, c, g, or t
<220> FEATURE:
<221> NAME/KEY: misc_feature
<222> LOCATION: (1449)..(1449)
<223> OTHER INFORMATION: n is a, c, g, or t
<220> FEATURE:
<221> NAME/KEY: misc_feature
<222> LOCATION: (1452)..(1452)
<223> OTHER INFORMATION: n is a, c, g, or t
<220> FEATURE:
<221> NAME/KEY: misc_feature
<222> LOCATION: (1461)..(1461)
<223> OTHER INFORMATION: n is a, c, g, or t
<220> FEATURE:
<221> NAME/KEY: misc_feature
<222> LOCATION: (1467)..(1467)
<223> OTHER INFORMATION: n is a, c, g, or t
<220> FEATURE:
<221> NAME/KEY: misc_feature
<222> LOCATION: (1470)..(1470)
<223> OTHER INFORMATION: n is a, c, g, or t
<220> FEATURE:
<221> NAME/KEY: misc_feature
<222> LOCATION: (1479)..(1479)
<223> OTHER INFORMATION: n is a, c, g, or t
<220> FEATURE:
<221> NAME/KEY: misc_feature
<222> LOCATION: (1500)..(1500)
<223> OTHER INFORMATION: n is a, c, g, or t
<220> FEATURE:
<221> NAME/KEY: misc_feature
<222> LOCATION: (1506)..(1506)
<223> OTHER INFORMATION: n is a, c, g, or t
<220> FEATURE:
<221> NAME/KEY: misc_feature
<222> LOCATION: (1527)..(1527)
<223> OTHER INFORMATION: n is a, c, g, or t
<220> FEATURE:
<221> NAME/KEY: misc_feature
<222> LOCATION: (1530)..(1530)
<223> OTHER INFORMATION: n is a, c, g, or t
<220> FEATURE:
<221> NAME/KEY: misc_feature
<222> LOCATION: (1533)..(1533)
<223> OTHER INFORMATION: n is a, c, g, or t
<220> FEATURE:
<221> NAME/KEY: misc_feature
<222> LOCATION: (1539)..(1539)
<223> OTHER INFORMATION: n is a, c, g, or t
<220> FEATURE:
<221> NAME/KEY: misc_feature
<222> LOCATION: (1542)..(1542)
<223> OTHER INFORMATION: n is a, c, g, or t
<220> FEATURE:
<221> NAME/KEY: misc_feature
<222> LOCATION: (1545)..(1545)
<223> OTHER INFORMATION: n is a, c, g, or t
<220> FEATURE:
<221> NAME/KEY: misc_feature
<222> LOCATION: (1554)..(1554)
<223> OTHER INFORMATION: n is a, c, g, or t
<220> FEATURE:
<221> NAME/KEY: misc_feature
<222> LOCATION: (1557)..(1557)
<223> OTHER INFORMATION: n is a, c, g, or t
<220> FEATURE:
<221> NAME/KEY: misc_feature
<222> LOCATION: (1560)..(1560)
<223> OTHER INFORMATION: n is a, c, g, or t
<220> FEATURE:
<221> NAME/KEY: misc_feature
<222> LOCATION: (1563)..(1563)
<223> OTHER INFORMATION: n is a, c, g, or t
<220> FEATURE:
<221> NAME/KEY: misc_feature
```

```
<222> LOCATION: (1572)..(1572)
<223> OTHER INFORMATION: n is a, c, g, or t
<220> FEATURE:
<221> NAME/KEY: misc_feature
<222> LOCATION: (1575)..(1575)
<223> OTHER INFORMATION: n is a, c, g, or t
<220> FEATURE:
<221> NAME/KEY: misc_feature
<222> LOCATION: (1578)..(1578)
<223> OTHER INFORMATION: n is a, c, g, or t
<220> FEATURE:
<221> NAME/KEY: misc_feature
<222> LOCATION: (1587)..(1587)
<223> OTHER INFORMATION: n is a, c, g, or t
<220> FEATURE:
<221> NAME/KEY: misc_feature
<222> LOCATION: (1590)..(1590)
<223> OTHER INFORMATION: n is a, c, g, or t
<220> FEATURE:
<221> NAME/KEY: misc_feature
<222> LOCATION: (1593)..(1593)
<223> OTHER INFORMATION: n is a, c, g, or t
<220> FEATURE:
<221> NAME/KEY: misc_feature
<222> LOCATION: (1596)..(1596)
<223> OTHER INFORMATION: n is a, c, g, or t
<220> FEATURE:
<221> NAME/KEY: misc_feature
<222> LOCATION: (1599)..(1599)
<223> OTHER INFORMATION: n is a, c, g, or t
<220> FEATURE:
<221> NAME/KEY: misc_feature
<222> LOCATION: (1611)..(1611)
<223> OTHER INFORMATION: n is a, c, g, or t
<220> FEATURE:
<221> NAME/KEY: misc_feature
<222> LOCATION: (1617)..(1617)
<223> OTHER INFORMATION: n is a, c, g, or t
<220> FEATURE:
<221> NAME/KEY: misc_feature
<222> LOCATION: (1620)..(1620)
<223> OTHER INFORMATION: n is a, c, g, or t
<220> FEATURE:
<221> NAME/KEY: misc_feature
<222> LOCATION: (1623)..(1623)
<223> OTHER INFORMATION: n is a, c, g, or t
<220> FEATURE:
<221> NAME/KEY: misc_feature
<222> LOCATION: (1629)..(1629)
<223> OTHER INFORMATION: n is a, c, g, or t
<220> FEATURE:
<221> NAME/KEY: misc_feature
<222> LOCATION: (1635)..(1635)
<223> OTHER INFORMATION: n is a, c, g, or t
<220> FEATURE:
<221> NAME/KEY: misc_feature
<222> LOCATION: (1647)..(1647)
<223> OTHER INFORMATION: n is a, c, g, or t
<220> FEATURE:
<221> NAME/KEY: misc_feature
<222> LOCATION: (1653)..(1653)
<223> OTHER INFORMATION: n is a, c, g, or t
<220> FEATURE:
<221> NAME/KEY: misc_feature
<222> LOCATION: (1659)..(1659)
<223> OTHER INFORMATION: n is a, c, g, or t
<220> FEATURE:
<221> NAME/KEY: misc_feature
<222> LOCATION: (1662)..(1662)
<223> OTHER INFORMATION: n is a, c, g, or t
<220> FEATURE:
<221> NAME/KEY: misc_feature
<222> LOCATION: (1671)..(1671)
<223> OTHER INFORMATION: n is a, c, g, or t
<220> FEATURE:
<221> NAME/KEY: misc_feature
<222> LOCATION: (1674)..(1674)
<223> OTHER INFORMATION: n is a, c, g, or t
<220> FEATURE:
```

```
<221> NAME/KEY: misc_feature
<222> LOCATION: (1683)..(1683)
<223> OTHER INFORMATION: n is a, c, g, or t
<220> FEATURE:
<221> NAME/KEY: misc_feature
<222> LOCATION: (1686)..(1686)
<223> OTHER INFORMATION: n is a, c, g, or t
<220> FEATURE:
<221> NAME/KEY: misc_feature
<222> LOCATION: (1692)..(1692)
<223> OTHER INFORMATION: n is a, c, g, or t
<220> FEATURE:
<221> NAME/KEY: misc_feature
<222> LOCATION: (1698)..(1698)
<223> OTHER INFORMATION: n is a, c, g, or t
<220> FEATURE:
<221> NAME/KEY: misc_feature
<222> LOCATION: (1701)..(1701)
<223> OTHER INFORMATION: n is a, c, g, or t
<220> FEATURE:
<221> NAME/KEY: misc_feature
<222> LOCATION: (1704)..(1704)
<223> OTHER INFORMATION: n is a, c, g, or t
<220> FEATURE:
<221> NAME/KEY: misc_feature
<222> LOCATION: (1719)..(1719)
<223> OTHER INFORMATION: n is a, c, g, or t
<220> FEATURE:
<221> NAME/KEY: misc_feature
<222> LOCATION: (1722)..(1722)
<223> OTHER INFORMATION: n is a, c, g, or t
<220> FEATURE:
<221> NAME/KEY: misc_feature
<222> LOCATION: (1728)..(1728)
<223> OTHER INFORMATION: n is a, c, g, or t
<220> FEATURE:
<221> NAME/KEY: misc_feature
<222> LOCATION: (1731)..(1731)
<223> OTHER INFORMATION: n is a, c, g, or t
<220> FEATURE:
<221> NAME/KEY: misc_feature
<222> LOCATION: (1734)..(1734)
<223> OTHER INFORMATION: n is a, c, g, or t
<220> FEATURE:
<221> NAME/KEY: misc_feature
<222> LOCATION: (1743)..(1743)
<223> OTHER INFORMATION: n is a, c, g, or t
<220> FEATURE:
<221> NAME/KEY: misc_feature
<222> LOCATION: (1746)..(1746)
<223> OTHER INFORMATION: n is a, c, g, or t
<220> FEATURE:
<221> NAME/KEY: misc_feature
<222> LOCATION: (1749)..(1749)
<223> OTHER INFORMATION: n is a, c, g, or t
<220> FEATURE:
<221> NAME/KEY: misc_feature
<222> LOCATION: (1755)..(1755)
<223> OTHER INFORMATION: n is a, c, g, or t
<220> FEATURE:
<221> NAME/KEY: misc_feature
<222> LOCATION: (1761)..(1761)
<223> OTHER INFORMATION: n is a, c, g, or t
<220> FEATURE:
<221> NAME/KEY: misc_feature
<222> LOCATION: (1776)..(1776)
<223> OTHER INFORMATION: n is a, c, g, or t
<220> FEATURE:
<221> NAME/KEY: misc_feature
<222> LOCATION: (1779)..(1779)
<223> OTHER INFORMATION: n is a, c, g, or t
<220> FEATURE:
<221> NAME/KEY: misc_feature
<222> LOCATION: (1782)..(1782)
<223> OTHER INFORMATION: n is a, c, g, or t
<220> FEATURE:
<221> NAME/KEY: misc_feature
<222> LOCATION: (1788)..(1788)
<223> OTHER INFORMATION: n is a, c, g, or t
```

-continued

```
<220> FEATURE:
<221> NAME/KEY: misc_feature
<222> LOCATION: (1791)..(1791)
<223> OTHER INFORMATION: n is a, c, g, or t
<220> FEATURE:
<221> NAME/KEY: misc_feature
<222> LOCATION: (1797)..(1797)
<223> OTHER INFORMATION: n is a, c, g, or t
<220> FEATURE:
<221> NAME/KEY: misc_feature
<222> LOCATION: (1800)..(1800)
<223> OTHER INFORMATION: n is a, c, g, or t
<220> FEATURE:
<221> NAME/KEY: misc_feature
<222> LOCATION: (1809)..(1809)
<223> OTHER INFORMATION: n is a, c, g, or t
<220> FEATURE:
<221> NAME/KEY: misc_feature
<222> LOCATION: (1812)..(1812)
<223> OTHER INFORMATION: n is a, c, g, or t
<220> FEATURE:
<221> NAME/KEY: misc_feature
<222> LOCATION: (1815)..(1815)
<223> OTHER INFORMATION: n is a, c, g, or t
<220> FEATURE:
<221> NAME/KEY: misc_feature
<222> LOCATION: (1833)..(1833)
<223> OTHER INFORMATION: n is a, c, g, or t
<220> FEATURE:
<221> NAME/KEY: misc_feature
<222> LOCATION: (1839)..(1839)
<223> OTHER INFORMATION: n is a, c, g, or t
<220> FEATURE:
<221> NAME/KEY: misc_feature
<222> LOCATION: (1842)..(1842)
<223> OTHER INFORMATION: n is a, c, g, or t
<220> FEATURE:
<221> NAME/KEY: misc_feature
<222> LOCATION: (1851)..(1851)
<223> OTHER INFORMATION: n is a, c, g, or t
<220> FEATURE:
<221> NAME/KEY: misc_feature
<222> LOCATION: (1857)..(1857)
<223> OTHER INFORMATION: n is a, c, g, or t
<220> FEATURE:
<221> NAME/KEY: misc_feature
<222> LOCATION: (1863)..(1863)
<223> OTHER INFORMATION: n is a, c, g, or t
<220> FEATURE:
<221> NAME/KEY: misc_feature
<222> LOCATION: (1872)..(1872)
<223> OTHER INFORMATION: n is a, c, g, or t
<220> FEATURE:
<221> NAME/KEY: misc_feature
<222> LOCATION: (1875)..(1875)
<223> OTHER INFORMATION: n is a, c, g, or t
<220> FEATURE:
<221> NAME/KEY: misc_feature
<222> LOCATION: (1884)..(1884)
<223> OTHER INFORMATION: n is a, c, g, or t
<220> FEATURE:
<221> NAME/KEY: misc_feature
<222> LOCATION: (1887)..(1887)
<223> OTHER INFORMATION: n is a, c, g, or t
<220> FEATURE:
<221> NAME/KEY: misc_feature
<222> LOCATION: (1890)..(1890)
<223> OTHER INFORMATION: n is a, c, g, or t
<220> FEATURE:
<221> NAME/KEY: misc_feature
<222> LOCATION: (1896)..(1896)
<223> OTHER INFORMATION: n is a, c, g, or t
<220> FEATURE:
<221> NAME/KEY: misc_feature
<222> LOCATION: (1899)..(1899)
<223> OTHER INFORMATION: n is a, c, g, or t
<220> FEATURE:
<221> NAME/KEY: misc_feature
<222> LOCATION: (1902)..(1902)
```

```
<223> OTHER INFORMATION: n is a, c, g, or t
<220> FEATURE:
<221> NAME/KEY: misc_feature
<222> LOCATION: (1911)..(1911)
<223> OTHER INFORMATION: n is a, c, g, or t
<220> FEATURE:
<221> NAME/KEY: misc_feature
<222> LOCATION: (1914)..(1914)
<223> OTHER INFORMATION: n is a, c, g, or t
<220> FEATURE:
<221> NAME/KEY: misc_feature
<222> LOCATION: (1923)..(1923)
<223> OTHER INFORMATION: n is a, c, g, or t
<220> FEATURE:
<221> NAME/KEY: misc_feature
<222> LOCATION: (1926)..(1926)
<223> OTHER INFORMATION: n is a, c, g, or t
<220> FEATURE:
<221> NAME/KEY: misc_feature
<222> LOCATION: (1932)..(1932)
<223> OTHER INFORMATION: n is a, c, g, or t
<220> FEATURE:
<221> NAME/KEY: misc_feature
<222> LOCATION: (1935)..(1935)
<223> OTHER INFORMATION: n is a, c, g, or t
<220> FEATURE:
<221> NAME/KEY: misc_feature
<222> LOCATION: (1944)..(1944)
<223> OTHER INFORMATION: n is a, c, g, or t
<220> FEATURE:
<221> NAME/KEY: misc_feature
<222> LOCATION: (1956)..(1956)
<223> OTHER INFORMATION: n is a, c, g, or t
<220> FEATURE:
<221> NAME/KEY: misc_feature
<222> LOCATION: (1959)..(1959)
<223> OTHER INFORMATION: n is a, c, g, or t
<220> FEATURE:
<221> NAME/KEY: misc_feature
<222> LOCATION: (1965)..(1965)
<223> OTHER INFORMATION: n is a, c, g, or t
<220> FEATURE:
<221> NAME/KEY: misc_feature
<222> LOCATION: (1968)..(1968)
<223> OTHER INFORMATION: n is a, c, g, or t
<220> FEATURE:
<221> NAME/KEY: misc_feature
<222> LOCATION: (1971)..(1971)
<223> OTHER INFORMATION: n is a, c, g, or t
<220> FEATURE:
<221> NAME/KEY: misc_feature
<222> LOCATION: (1980)..(1980)
<223> OTHER INFORMATION: n is a, c, g, or t
<220> FEATURE:
<221> NAME/KEY: misc_feature
<222> LOCATION: (1983)..(1983)
<223> OTHER INFORMATION: n is a, c, g, or t
<220> FEATURE:
<221> NAME/KEY: misc_feature
<222> LOCATION: (1992)..(1992)
<223> OTHER INFORMATION: n is a, c, g, or t
<220> FEATURE:
<221> NAME/KEY: misc_feature
<222> LOCATION: (1995)..(1995)
<223> OTHER INFORMATION: n is a, c, g, or t
<220> FEATURE:
<221> NAME/KEY: misc_feature
<222> LOCATION: (1998)..(1998)
<223> OTHER INFORMATION: n is a, c, g, or t
<220> FEATURE:
<221> NAME/KEY: misc_feature
<222> LOCATION: (2001)..(2001)
<223> OTHER INFORMATION: n is a, c, g, or t
<220> FEATURE:
<221> NAME/KEY: misc_feature
<222> LOCATION: (2004)..(2004)
<223> OTHER INFORMATION: n is a, c, g, or t
<220> FEATURE:
<221> NAME/KEY: misc_feature
```

```
<222> LOCATION: (2007)..(2007)
<223> OTHER INFORMATION: n is a, c, g, or t
<220> FEATURE:
<221> NAME/KEY: misc_feature
<222> LOCATION: (2016)..(2016)
<223> OTHER INFORMATION: n is a, c, g, or t
<220> FEATURE:
<221> NAME/KEY: misc_feature
<222> LOCATION: (2025)..(2025)
<223> OTHER INFORMATION: n is a, c, g, or t
<220> FEATURE:
<221> NAME/KEY: misc_feature
<222> LOCATION: (2031)..(2031)
<223> OTHER INFORMATION: n is a, c, g, or t
<220> FEATURE:
<221> NAME/KEY: misc_feature
<222> LOCATION: (2046)..(2046)
<223> OTHER INFORMATION: n is a, c, g, or t
<220> FEATURE:
<221> NAME/KEY: misc_feature
<222> LOCATION: (2052)..(2052)
<223> OTHER INFORMATION: n is a, c, g, or t
<220> FEATURE:
<221> NAME/KEY: misc_feature
<222> LOCATION: (2058)..(2058)
<223> OTHER INFORMATION: n is a, c, g, or t
<220> FEATURE:
<221> NAME/KEY: misc_feature
<222> LOCATION: (2061)..(2061)
<223> OTHER INFORMATION: n is a, c, g, or t
<220> FEATURE:
<221> NAME/KEY: misc_feature
<222> LOCATION: (2073)..(2073)
<223> OTHER INFORMATION: n is a, c, g, or t
<220> FEATURE:
<221> NAME/KEY: misc_feature
<222> LOCATION: (2088)..(2088)
<223> OTHER INFORMATION: n is a, c, g, or t
<220> FEATURE:
<221> NAME/KEY: misc_feature
<222> LOCATION: (2091)..(2091)
<223> OTHER INFORMATION: n is a, c, g, or t
<220> FEATURE:
<221> NAME/KEY: misc_feature
<222> LOCATION: (2097)..(2097)
<223> OTHER INFORMATION: n is a, c, g, or t
<220> FEATURE:
<221> NAME/KEY: misc_feature
<222> LOCATION: (2100)..(2100)
<223> OTHER INFORMATION: n is a, c, g, or t
<220> FEATURE:
<221> NAME/KEY: misc_feature
<222> LOCATION: (2109)..(2109)
<223> OTHER INFORMATION: n is a, c, g, or t
<220> FEATURE:
<221> NAME/KEY: misc_feature
<222> LOCATION: (2118)..(2118)
<223> OTHER INFORMATION: n is a, c, g, or t
<220> FEATURE:
<221> NAME/KEY: misc_feature
<222> LOCATION: (2121)..(2121)
<223> OTHER INFORMATION: n is a, c, g, or t
<220> FEATURE:
<221> NAME/KEY: misc_feature
<222> LOCATION: (2130)..(2130)
<223> OTHER INFORMATION: n is a, c, g, or t
<220> FEATURE:
<221> NAME/KEY: misc_feature
<222> LOCATION: (2136)..(2136)
<223> OTHER INFORMATION: n is a, c, g, or t
<220> FEATURE:
<221> NAME/KEY: misc_feature
<222> LOCATION: (2142)..(2142)
<223> OTHER INFORMATION: n is a, c, g, or t
<220> FEATURE:
<221> NAME/KEY: misc_feature
<222> LOCATION: (2145)..(2145)
<223> OTHER INFORMATION: n is a, c, g, or t
<220> FEATURE:
```

-continued

```
<221> NAME/KEY: misc_feature
<222> LOCATION: (2151)..(2151)
<223> OTHER INFORMATION: n is a, c, g, or t
<220> FEATURE:
<221> NAME/KEY: misc_feature
<222> LOCATION: (2157)..(2157)
<223> OTHER INFORMATION: n is a, c, g, or t
<220> FEATURE:
<221> NAME/KEY: misc_feature
<222> LOCATION: (2166)..(2166)
<223> OTHER INFORMATION: n is a, c, g, or t
<220> FEATURE:
<221> NAME/KEY: misc_feature
<222> LOCATION: (2169)..(2169)
<223> OTHER INFORMATION: n is a, c, g, or t
<220> FEATURE:
<221> NAME/KEY: misc_feature
<222> LOCATION: (2178)..(2178)
<223> OTHER INFORMATION: n is a, c, g, or t
<220> FEATURE:
<221> NAME/KEY: misc_feature
<222> LOCATION: (2181)..(2181)
<223> OTHER INFORMATION: n is a, c, g, or t
<220> FEATURE:
<221> NAME/KEY: misc_feature
<222> LOCATION: (2184)..(2184)
<223> OTHER INFORMATION: n is a, c, g, or t
<220> FEATURE:
<221> NAME/KEY: misc_feature
<222> LOCATION: (2190)..(2190)
<223> OTHER INFORMATION: n is a, c, g, or t
<220> FEATURE:
<221> NAME/KEY: misc_feature
<222> LOCATION: (2193)..(2193)
<223> OTHER INFORMATION: n is a, c, g, or t
<220> FEATURE:
<221> NAME/KEY: misc_feature
<222> LOCATION: (2202)..(2202)
<223> OTHER INFORMATION: n is a, c, g, or t
<220> FEATURE:
<221> NAME/KEY: misc_feature
<222> LOCATION: (2205)..(2205)
<223> OTHER INFORMATION: n is a, c, g, or t
<220> FEATURE:
<221> NAME/KEY: misc_feature
<222> LOCATION: (2217)..(2217)
<223> OTHER INFORMATION: n is a, c, g, or t
<220> FEATURE:
<221> NAME/KEY: misc_feature
<222> LOCATION: (2226)..(2226)
<223> OTHER INFORMATION: n is a, c, g, or t
<220> FEATURE:
<221> NAME/KEY: misc_feature
<222> LOCATION: (2232)..(2232)
<223> OTHER INFORMATION: n is a, c, g, or t
<220> FEATURE:
<221> NAME/KEY: misc_feature
<222> LOCATION: (2235)..(2235)
<223> OTHER INFORMATION: n is a, c, g, or t
<220> FEATURE:
<221> NAME/KEY: misc_feature
<222> LOCATION: (2238)..(2238)
<223> OTHER INFORMATION: n is a, c, g, or t
<220> FEATURE:
<221> NAME/KEY: misc_feature
<222> LOCATION: (2241)..(2241)
<223> OTHER INFORMATION: n is a, c, g, or t
<220> FEATURE:
<221> NAME/KEY: misc_feature
<222> LOCATION: (2250)..(2250)
<223> OTHER INFORMATION: n is a, c, g, or t
<220> FEATURE:
<221> NAME/KEY: misc_feature
<222> LOCATION: (2253)..(2253)
<223> OTHER INFORMATION: n is a, c, g, or t
<220> FEATURE:
<221> NAME/KEY: misc_feature
<222> LOCATION: (2256)..(2256)
<223> OTHER INFORMATION: n is a, c, g, or t
```

-continued

```
<220> FEATURE:
<221> NAME/KEY: misc_feature
<222> LOCATION: (2268)..(2268)
<223> OTHER INFORMATION: n is a, c, g, or t
<220> FEATURE:
<221> NAME/KEY: misc_feature
<222> LOCATION: (2271)..(2271)
<223> OTHER INFORMATION: n is a, c, g, or t
<220> FEATURE:
<221> NAME/KEY: misc_feature
<222> LOCATION: (2277)..(2277)
<223> OTHER INFORMATION: n is a, c, g, or t
<220> FEATURE:
<221> NAME/KEY: misc_feature
<222> LOCATION: (2286)..(2286)
<223> OTHER INFORMATION: n is a, c, g, or t
<220> FEATURE:
<221> NAME/KEY: misc_feature
<222> LOCATION: (2289)..(2289)
<223> OTHER INFORMATION: n is a, c, g, or t
<220> FEATURE:
<221> NAME/KEY: misc_feature
<222> LOCATION: (2292)..(2292)
<223> OTHER INFORMATION: n is a, c, g, or t
<220> FEATURE:
<221> NAME/KEY: misc_feature
<222> LOCATION: (2298)..(2298)
<223> OTHER INFORMATION: n is a, c, g, or t
<220> FEATURE:
<221> NAME/KEY: misc_feature
<222> LOCATION: (2301)..(2301)
<223> OTHER INFORMATION: n is a, c, g, or t
<220> FEATURE:
<221> NAME/KEY: misc_feature
<222> LOCATION: (2304)..(2304)
<223> OTHER INFORMATION: n is a, c, g, or t
<220> FEATURE:
<221> NAME/KEY: misc_feature
<222> LOCATION: (2307)..(2307)
<223> OTHER INFORMATION: n is a, c, g, or t
<220> FEATURE:
<221> NAME/KEY: misc_feature
<222> LOCATION: (2310)..(2310)
<223> OTHER INFORMATION: n is a, c, g, or t
<220> FEATURE:
<221> NAME/KEY: misc_feature
<222> LOCATION: (2319)..(2319)
<223> OTHER INFORMATION: n is a, c, g, or t
<220> FEATURE:
<221> NAME/KEY: misc_feature
<222> LOCATION: (2322)..(2322)
<223> OTHER INFORMATION: n is a, c, g, or t
<220> FEATURE:
<221> NAME/KEY: misc_feature
<222> LOCATION: (2325)..(2325)
<223> OTHER INFORMATION: n is a, c, g, or t
<220> FEATURE:
<221> NAME/KEY: misc_feature
<222> LOCATION: (2334)..(2334)
<223> OTHER INFORMATION: n is a, c, g, or t
<220> FEATURE:
<221> NAME/KEY: misc_feature
<222> LOCATION: (2337)..(2337)
<223> OTHER INFORMATION: n is a, c, g, or t
<220> FEATURE:
<221> NAME/KEY: misc_feature
<222> LOCATION: (2340)..(2340)
<223> OTHER INFORMATION: n is a, c, g, or t
<220> FEATURE:
<221> NAME/KEY: misc_feature
<222> LOCATION: (2343)..(2343)
<223> OTHER INFORMATION: n is a, c, g, or t
<220> FEATURE:
<221> NAME/KEY: misc_feature
<222> LOCATION: (2352)..(2352)
<223> OTHER INFORMATION: n is a, c, g, or t
<220> FEATURE:
<221> NAME/KEY: misc_feature
<222> LOCATION: (2358)..(2358)
```

```
<223> OTHER INFORMATION: n is a, c, g, or t
<220> FEATURE:
<221> NAME/KEY: misc_feature
<222> LOCATION: (2361)..(2361)
<223> OTHER INFORMATION: n is a, c, g, or t
<220> FEATURE:
<221> NAME/KEY: misc_feature
<222> LOCATION: (2370)..(2370)
<223> OTHER INFORMATION: n is a, c, g, or t
<220> FEATURE:
<221> NAME/KEY: misc_feature
<222> LOCATION: (2373)..(2373)
<223> OTHER INFORMATION: n is a, c, g, or t
<220> FEATURE:
<221> NAME/KEY: misc_feature
<222> LOCATION: (2379)..(2379)
<223> OTHER INFORMATION: n is a, c, g, or t
<220> FEATURE:
<221> NAME/KEY: misc_feature
<222> LOCATION: (2382)..(2382)
<223> OTHER INFORMATION: n is a, c, g, or t
<220> FEATURE:
<221> NAME/KEY: misc_feature
<222> LOCATION: (2385)..(2385)
<223> OTHER INFORMATION: n is a, c, g, or t
<220> FEATURE:
<221> NAME/KEY: misc_feature
<222> LOCATION: (2394)..(2394)
<223> OTHER INFORMATION: n is a, c, g, or t
<220> FEATURE:
<221> NAME/KEY: misc_feature
<222> LOCATION: (2397)..(2397)
<223> OTHER INFORMATION: n is a, c, g, or t
<220> FEATURE:
<221> NAME/KEY: misc_feature
<222> LOCATION: (2400)..(2400)
<223> OTHER INFORMATION: n is a, c, g, or t
<220> FEATURE:
<221> NAME/KEY: misc_feature
<222> LOCATION: (2406)..(2406)
<223> OTHER INFORMATION: n is a, c, g, or t
<220> FEATURE:
<221> NAME/KEY: misc_feature
<222> LOCATION: (2415)..(2415)
<223> OTHER INFORMATION: n is a, c, g, or t
<220> FEATURE:
<221> NAME/KEY: misc_feature
<222> LOCATION: (2421)..(2421)
<223> OTHER INFORMATION: n is a, c, g, or t
<220> FEATURE:
<221> NAME/KEY: misc_feature
<222> LOCATION: (2430)..(2430)
<223> OTHER INFORMATION: n is a, c, g, or t
<220> FEATURE:
<221> NAME/KEY: misc_feature
<222> LOCATION: (2433)..(2433)
<223> OTHER INFORMATION: n is a, c, g, or t
<220> FEATURE:
<221> NAME/KEY: misc_feature
<222> LOCATION: (2436)..(2436)
<223> OTHER INFORMATION: n is a, c, g, or t
<220> FEATURE:
<221> NAME/KEY: misc_feature
<222> LOCATION: (2439)..(2439)
<223> OTHER INFORMATION: n is a, c, g, or t
<220> FEATURE:
<221> NAME/KEY: misc_feature
<222> LOCATION: (2451)..(2451)
<223> OTHER INFORMATION: n is a, c, g, or t
<220> FEATURE:
<221> NAME/KEY: misc_feature
<222> LOCATION: (2454)..(2454)
<223> OTHER INFORMATION: n is a, c, g, or t
<220> FEATURE:
<221> NAME/KEY: misc_feature
<222> LOCATION: (2457)..(2457)
<223> OTHER INFORMATION: n is a, c, g, or t
<220> FEATURE:
<221> NAME/KEY: misc_feature
```

```
<222> LOCATION: (2460)..(2460)
<223> OTHER INFORMATION: n is a, c, g, or t
<220> FEATURE:
<221> NAME/KEY: misc_feature
<222> LOCATION: (2463)..(2463)
<223> OTHER INFORMATION: n is a, c, g, or t
<220> FEATURE:
<221> NAME/KEY: misc_feature
<222> LOCATION: (2469)..(2469)
<223> OTHER INFORMATION: n is a, c, g, or t
<220> FEATURE:
<221> NAME/KEY: misc_feature
<222> LOCATION: (2472)..(2472)
<223> OTHER INFORMATION: n is a, c, g, or t
<220> FEATURE:
<221> NAME/KEY: misc_feature
<222> LOCATION: (2481)..(2481)
<223> OTHER INFORMATION: n is a, c, g, or t
<220> FEATURE:
<221> NAME/KEY: misc_feature
<222> LOCATION: (2484)..(2484)
<223> OTHER INFORMATION: n is a, c, g, or t
<220> FEATURE:
<221> NAME/KEY: misc_feature
<222> LOCATION: (2490)..(2490)
<223> OTHER INFORMATION: n is a, c, g, or t
<220> FEATURE:
<221> NAME/KEY: misc_feature
<222> LOCATION: (2493)..(2493)
<223> OTHER INFORMATION: n is a, c, g, or t
<220> FEATURE:
<221> NAME/KEY: misc_feature
<222> LOCATION: (2502)..(2502)
<223> OTHER INFORMATION: n is a, c, g, or t
<220> FEATURE:
<221> NAME/KEY: misc_feature
<222> LOCATION: (2505)..(2505)
<223> OTHER INFORMATION: n is a, c, g, or t
<220> FEATURE:
<221> NAME/KEY: misc_feature
<222> LOCATION: (2526)..(2526)
<223> OTHER INFORMATION: n is a, c, g, or t
<220> FEATURE:
<221> NAME/KEY: misc_feature
<222> LOCATION: (2532)..(2532)
<223> OTHER INFORMATION: n is a, c, g, or t
<220> FEATURE:
<221> NAME/KEY: misc_feature
<222> LOCATION: (2535)..(2535)
<223> OTHER INFORMATION: n is a, c, g, or t
<220> FEATURE:
<221> NAME/KEY: misc_feature
<222> LOCATION: (2550)..(2550)
<223> OTHER INFORMATION: n is a, c, g, or t
<220> FEATURE:
<221> NAME/KEY: misc_feature
<222> LOCATION: (2559)..(2559)
<223> OTHER INFORMATION: n is a, c, g, or t
<220> FEATURE:
<221> NAME/KEY: misc_feature
<222> LOCATION: (2565)..(2565)
<223> OTHER INFORMATION: n is a, c, g, or t
<220> FEATURE:
<221> NAME/KEY: misc_feature
<222> LOCATION: (2574)..(2574)
<223> OTHER INFORMATION: n is a, c, g, or t
<220> FEATURE:
<221> NAME/KEY: misc_feature
<222> LOCATION: (2577)..(2577)
<223> OTHER INFORMATION: n is a, c, g, or t
<220> FEATURE:
<221> NAME/KEY: misc_feature
<222> LOCATION: (2580)..(2580)
<223> OTHER INFORMATION: n is a, c, g, or t
<220> FEATURE:
<221> NAME/KEY: misc_feature
<222> LOCATION: (2586)..(2586)
<223> OTHER INFORMATION: n is a, c, g, or t
<220> FEATURE:
```

```
<221> NAME/KEY: misc_feature
<222> LOCATION: (2595)..(2595)
<223> OTHER INFORMATION: n is a, c, g, or t
<220> FEATURE:
<221> NAME/KEY: misc_feature
<222> LOCATION: (2598)..(2598)
<223> OTHER INFORMATION: n is a, c, g, or t
<220> FEATURE:
<221> NAME/KEY: misc_feature
<222> LOCATION: (2604)..(2604)
<223> OTHER INFORMATION: n is a, c, g, or t
<220> FEATURE:
<221> NAME/KEY: misc_feature
<222> LOCATION: (2607)..(2607)
<223> OTHER INFORMATION: n is a, c, g, or t
<220> FEATURE:
<221> NAME/KEY: misc_feature
<222> LOCATION: (2613)..(2613)
<223> OTHER INFORMATION: n is a, c, g, or t
<220> FEATURE:
<221> NAME/KEY: misc_feature
<222> LOCATION: (2616)..(2616)
<223> OTHER INFORMATION: n is a, c, g, or t
<220> FEATURE:
<221> NAME/KEY: misc_feature
<222> LOCATION: (2619)..(2619)
<223> OTHER INFORMATION: n is a, c, g, or t
<220> FEATURE:
<221> NAME/KEY: misc_feature
<222> LOCATION: (2628)..(2628)
<223> OTHER INFORMATION: n is a, c, g, or t
<220> FEATURE:
<221> NAME/KEY: misc_feature
<222> LOCATION: (2631)..(2631)
<223> OTHER INFORMATION: n is a, c, g, or t
<220> FEATURE:
<221> NAME/KEY: misc_feature
<222> LOCATION: (2634)..(2634)
<223> OTHER INFORMATION: n is a, c, g, or t
<220> FEATURE:
<221> NAME/KEY: misc_feature
<222> LOCATION: (2637)..(2637)
<223> OTHER INFORMATION: n is a, c, g, or t
<220> FEATURE:
<221> NAME/KEY: misc_feature
<222> LOCATION: (2646)..(2646)
<223> OTHER INFORMATION: n is a, c, g, or t
<220> FEATURE:
<221> NAME/KEY: misc_feature
<222> LOCATION: (2649)..(2649)
<223> OTHER INFORMATION: n is a, c, g, or t
<220> FEATURE:
<221> NAME/KEY: misc_feature
<222> LOCATION: (2655)..(2655)
<223> OTHER INFORMATION: n is a, c, g, or t
<220> FEATURE:
<221> NAME/KEY: misc_feature
<222> LOCATION: (2661)..(2661)
<223> OTHER INFORMATION: n is a, c, g, or t
<220> FEATURE:
<221> NAME/KEY: misc_feature
<222> LOCATION: (2664)..(2664)
<223> OTHER INFORMATION: n is a, c, g, or t
<220> FEATURE:
<221> NAME/KEY: misc_feature
<222> LOCATION: (2667)..(2667)
<223> OTHER INFORMATION: n is a, c, g, or t
<220> FEATURE:
<221> NAME/KEY: misc_feature
<222> LOCATION: (2670)..(2670)
<223> OTHER INFORMATION: n is a, c, g, or t
<220> FEATURE:
<221> NAME/KEY: misc_feature
<222> LOCATION: (2673)..(2673)
<223> OTHER INFORMATION: n is a, c, g, or t
<220> FEATURE:
<221> NAME/KEY: misc_feature
<222> LOCATION: (2676)..(2676)
<223> OTHER INFORMATION: n is a, c, g, or t
```

-continued

```
<220> FEATURE:
<221> NAME/KEY: misc_feature
<222> LOCATION: (2679)..(2679)
<223> OTHER INFORMATION: n is a, c, g, or t
<220> FEATURE:
<221> NAME/KEY: misc_feature
<222> LOCATION: (2688)..(2688)
<223> OTHER INFORMATION: n is a, c, g, or t
<220> FEATURE:
<221> NAME/KEY: misc_feature
<222> LOCATION: (2691)..(2691)
<223> OTHER INFORMATION: n is a, c, g, or t
<220> FEATURE:
<221> NAME/KEY: misc_feature
<222> LOCATION: (2706)..(2706)
<223> OTHER INFORMATION: n is a, c, g, or t
<220> FEATURE:
<221> NAME/KEY: misc_feature
<222> LOCATION: (2724)..(2724)
<223> OTHER INFORMATION: n is a, c, g, or t
<220> FEATURE:
<221> NAME/KEY: misc_feature
<222> LOCATION: (2736)..(2736)
<223> OTHER INFORMATION: n is a, c, g, or t
<220> FEATURE:
<221> NAME/KEY: misc_feature
<222> LOCATION: (2754)..(2754)
<223> OTHER INFORMATION: n is a, c, g, or t
<220> FEATURE:
<221> NAME/KEY: misc_feature
<222> LOCATION: (2757)..(2757)
<223> OTHER INFORMATION: n is a, c, g, or t
<220> FEATURE:
<221> NAME/KEY: misc_feature
<222> LOCATION: (2760)..(2760)
<223> OTHER INFORMATION: n is a, c, g, or t
<220> FEATURE:
<221> NAME/KEY: misc_feature
<222> LOCATION: (2772)..(2772)
<223> OTHER INFORMATION: n is a, c, g, or t
<220> FEATURE:
<221> NAME/KEY: misc_feature
<222> LOCATION: (2775)..(2775)
<223> OTHER INFORMATION: n is a, c, g, or t
<220> FEATURE:
<221> NAME/KEY: misc_feature
<222> LOCATION: (2796)..(2796)
<223> OTHER INFORMATION: n is a, c, g, or t
<220> FEATURE:
<221> NAME/KEY: misc_feature
<222> LOCATION: (2799)..(2799)
<223> OTHER INFORMATION: n is a, c, g, or t
<220> FEATURE:
<221> NAME/KEY: misc_feature
<222> LOCATION: (2805)..(2805)
<223> OTHER INFORMATION: n is a, c, g, or t
<220> FEATURE:
<221> NAME/KEY: misc_feature
<222> LOCATION: (2808)..(2808)
<223> OTHER INFORMATION: n is a, c, g, or t
<220> FEATURE:
<221> NAME/KEY: misc_feature
<222> LOCATION: (2811)..(2811)
<223> OTHER INFORMATION: n is a, c, g, or t
<220> FEATURE:
<221> NAME/KEY: misc_feature
<222> LOCATION: (2817)..(2817)
<223> OTHER INFORMATION: n is a, c, g, or t
<220> FEATURE:
<221> NAME/KEY: misc_feature
<222> LOCATION: (2829)..(2829)
<223> OTHER INFORMATION: n is a, c, g, or t
<220> FEATURE:
<221> NAME/KEY: misc_feature
<222> LOCATION: (2838)..(2838)
<223> OTHER INFORMATION: n is a, c, g, or t
<220> FEATURE:
<221> NAME/KEY: misc_feature
<222> LOCATION: (2841)..(2841)
```

```
<223> OTHER INFORMATION: n is a, c, g, or t
<220> FEATURE:
<221> NAME/KEY: misc_feature
<222> LOCATION: (2847)..(2847)
<223> OTHER INFORMATION: n is a, c, g, or t
<220> FEATURE:
<221> NAME/KEY: misc_feature
<222> LOCATION: (2856)..(2856)
<223> OTHER INFORMATION: n is a, c, g, or t
<220> FEATURE:
<221> NAME/KEY: misc_feature
<222> LOCATION: (2859)..(2859)
<223> OTHER INFORMATION: n is a, c, g, or t
<220> FEATURE:
<221> NAME/KEY: misc_feature
<222> LOCATION: (2862)..(2862)
<223> OTHER INFORMATION: n is a, c, g, or t
<220> FEATURE:
<221> NAME/KEY: misc_feature
<222> LOCATION: (2865)..(2865)
<223> OTHER INFORMATION: n is a, c, g, or t
<220> FEATURE:
<221> NAME/KEY: misc_feature
<222> LOCATION: (2868)..(2868)
<223> OTHER INFORMATION: n is a, c, g, or t
<220> FEATURE:
<221> NAME/KEY: misc_feature
<222> LOCATION: (2871)..(2871)
<223> OTHER INFORMATION: n is a, c, g, or t
<220> FEATURE:
<221> NAME/KEY: misc_feature
<222> LOCATION: (2877)..(2877)
<223> OTHER INFORMATION: n is a, c, g, or t
<220> FEATURE:
<221> NAME/KEY: misc_feature
<222> LOCATION: (2880)..(2880)
<223> OTHER INFORMATION: n is a, c, g, or t
<220> FEATURE:
<221> NAME/KEY: misc_feature
<222> LOCATION: (2883)..(2883)
<223> OTHER INFORMATION: n is a, c, g, or t
<220> FEATURE:
<221> NAME/KEY: misc_feature
<222> LOCATION: (2886)..(2886)
<223> OTHER INFORMATION: n is a, c, g, or t
<220> FEATURE:
<221> NAME/KEY: misc_feature
<222> LOCATION: (2895)..(2895)
<223> OTHER INFORMATION: n is a, c, g, or t
<220> FEATURE:
<221> NAME/KEY: misc_feature
<222> LOCATION: (2898)..(2898)
<223> OTHER INFORMATION: n is a, c, g, or t
<220> FEATURE:
<221> NAME/KEY: misc_feature
<222> LOCATION: (2907)..(2907)
<223> OTHER INFORMATION: n is a, c, g, or t
<220> FEATURE:
<221> NAME/KEY: misc_feature
<222> LOCATION: (2910)..(2910)
<223> OTHER INFORMATION: n is a, c, g, or t
<220> FEATURE:
<221> NAME/KEY: misc_feature
<222> LOCATION: (2919)..(2919)
<223> OTHER INFORMATION: n is a, c, g, or t
<220> FEATURE:
<221> NAME/KEY: misc_feature
<222> LOCATION: (2925)..(2925)
<223> OTHER INFORMATION: n is a, c, g, or t
<220> FEATURE:
<221> NAME/KEY: misc_feature
<222> LOCATION: (2940)..(2940)
<223> OTHER INFORMATION: n is a, c, g, or t
<220> FEATURE:
<221> NAME/KEY: misc_feature
<222> LOCATION: (2946)..(2946)
<223> OTHER INFORMATION: n is a, c, g, or t
<220> FEATURE:
<221> NAME/KEY: misc_feature
```

-continued

```
<222> LOCATION: (2958)..(2958)
<223> OTHER INFORMATION: n is a, c, g, or t
<220> FEATURE:
<221> NAME/KEY: misc_feature
<222> LOCATION: (2961)..(2961)
<223> OTHER INFORMATION: n is a, c, g, or t
<220> FEATURE:
<221> NAME/KEY: misc_feature
<222> LOCATION: (2964)..(2964)
<223> OTHER INFORMATION: n is a, c, g, or t
<220> FEATURE:
<221> NAME/KEY: misc_feature
<222> LOCATION: (2967)..(2967)
<223> OTHER INFORMATION: n is a, c, g, or t
<220> FEATURE:
<221> NAME/KEY: misc_feature
<222> LOCATION: (2970)..(2970)
<223> OTHER INFORMATION: n is a, c, g, or t
<220> FEATURE:
<221> NAME/KEY: misc_feature
<222> LOCATION: (2973)..(2973)
<223> OTHER INFORMATION: n is a, c, g, or t
<220> FEATURE:
<221> NAME/KEY: misc_feature
<222> LOCATION: (2988)..(2988)
<223> OTHER INFORMATION: n is a, c, g, or t
<220> FEATURE:
<221> NAME/KEY: misc_feature
<222> LOCATION: (2991)..(2991)
<223> OTHER INFORMATION: n is a, c, g, or t
<220> FEATURE:
<221> NAME/KEY: misc_feature
<222> LOCATION: (2994)..(2994)
<223> OTHER INFORMATION: n is a, c, g, or t
<220> FEATURE:
<221> NAME/KEY: misc_feature
<222> LOCATION: (2997)..(2997)
<223> OTHER INFORMATION: n is a, c, g, or t
<220> FEATURE:
<221> NAME/KEY: misc_feature
<222> LOCATION: (3000)..(3000)
<223> OTHER INFORMATION: n is a, c, g, or t
<220> FEATURE:
<221> NAME/KEY: misc_feature
<222> LOCATION: (3003)..(3003)
<223> OTHER INFORMATION: n is a, c, g, or t
<220> FEATURE:
<221> NAME/KEY: misc_feature
<222> LOCATION: (3006)..(3006)
<223> OTHER INFORMATION: n is a, c, g, or t
<220> FEATURE:
<221> NAME/KEY: misc_feature
<222> LOCATION: (3015)..(3015)
<223> OTHER INFORMATION: n is a, c, g, or t
<220> FEATURE:
<221> NAME/KEY: misc_feature
<222> LOCATION: (3027)..(3027)
<223> OTHER INFORMATION: n is a, c, g, or t
<220> FEATURE:
<221> NAME/KEY: misc_feature
<222> LOCATION: (3030)..(3030)
<223> OTHER INFORMATION: n is a, c, g, or t
<220> FEATURE:
<221> NAME/KEY: misc_feature
<222> LOCATION: (3036)..(3036)
<223> OTHER INFORMATION: n is a, c, g, or t
<220> FEATURE:
<221> NAME/KEY: misc_feature
<222> LOCATION: (3039)..(3039)
<223> OTHER INFORMATION: n is a, c, g, or t
<220> FEATURE:
<221> NAME/KEY: misc_feature
<222> LOCATION: (3045)..(3045)
<223> OTHER INFORMATION: n is a, c, g, or t
<220> FEATURE:
<221> NAME/KEY: misc_feature
<222> LOCATION: (3048)..(3048)
<223> OTHER INFORMATION: n is a, c, g, or t
<220> FEATURE:
```

-continued

```
<221> NAME/KEY: misc_feature
<222> LOCATION: (3051)..(3051)
<223> OTHER INFORMATION: n is a, c, g, or t
<220> FEATURE:
<221> NAME/KEY: misc_feature
<222> LOCATION: (3057)..(3057)
<223> OTHER INFORMATION: n is a, c, g, or t
<220> FEATURE:
<221> NAME/KEY: misc_feature
<222> LOCATION: (3060)..(3060)
<223> OTHER INFORMATION: n is a, c, g, or t
<220> FEATURE:
<221> NAME/KEY: misc_feature
<222> LOCATION: (3063)..(3063)
<223> OTHER INFORMATION: n is a, c, g, or t
<220> FEATURE:
<221> NAME/KEY: misc_feature
<222> LOCATION: (3075)..(3075)
<223> OTHER INFORMATION: n is a, c, g, or t
<220> FEATURE:
<221> NAME/KEY: misc_feature
<222> LOCATION: (3078)..(3078)
<223> OTHER INFORMATION: n is a, c, g, or t
<220> FEATURE:
<221> NAME/KEY: misc_feature
<222> LOCATION: (3081)..(3081)
<223> OTHER INFORMATION: n is a, c, g, or t
<220> FEATURE:
<221> NAME/KEY: misc_feature
<222> LOCATION: (3084)..(3084)
<223> OTHER INFORMATION: n is a, c, g, or t
<220> FEATURE:
<221> NAME/KEY: misc_feature
<222> LOCATION: (3087)..(3087)
<223> OTHER INFORMATION: n is a, c, g, or t
<220> FEATURE:
<221> NAME/KEY: misc_feature
<222> LOCATION: (3102)..(3102)
<223> OTHER INFORMATION: n is a, c, g, or t
<220> FEATURE:
<221> NAME/KEY: misc_feature
<222> LOCATION: (3114)..(3114)
<223> OTHER INFORMATION: n is a, c, g, or t
<220> FEATURE:
<221> NAME/KEY: misc_feature
<222> LOCATION: (3126)..(3126)
<223> OTHER INFORMATION: n is a, c, g, or t
<220> FEATURE:
<221> NAME/KEY: misc_feature
<222> LOCATION: (3129)..(3129)
<223> OTHER INFORMATION: n is a, c, g, or t
<220> FEATURE:
<221> NAME/KEY: misc_feature
<222> LOCATION: (3132)..(3132)
<223> OTHER INFORMATION: n is a, c, g, or t
<220> FEATURE:
<221> NAME/KEY: misc_feature
<222> LOCATION: (3138)..(3138)
<223> OTHER INFORMATION: n is a, c, g, or t
<220> FEATURE:
<221> NAME/KEY: misc_feature
<222> LOCATION: (3150)..(3150)
<223> OTHER INFORMATION: n is a, c, g, or t
<220> FEATURE:
<221> NAME/KEY: misc_feature
<222> LOCATION: (3153)..(3153)
<223> OTHER INFORMATION: n is a, c, g, or t
<220> FEATURE:
<221> NAME/KEY: misc_feature
<222> LOCATION: (3159)..(3159)
<223> OTHER INFORMATION: n is a, c, g, or t
<220> FEATURE:
<221> NAME/KEY: misc_feature
<222> LOCATION: (3165)..(3165)
<223> OTHER INFORMATION: n is a, c, g, or t
<220> FEATURE:
<221> NAME/KEY: misc_feature
<222> LOCATION: (3171)..(3171)
<223> OTHER INFORMATION: n is a, c, g, or t
```

-continued

```
<220> FEATURE:
<221> NAME/KEY: misc_feature
<222> LOCATION: (3177)..(3177)
<223> OTHER INFORMATION: n is a, c, g, or t
<220> FEATURE:
<221> NAME/KEY: misc_feature
<222> LOCATION: (3180)..(3180)
<223> OTHER INFORMATION: n is a, c, g, or t
<220> FEATURE:
<221> NAME/KEY: misc_feature
<222> LOCATION: (3183)..(3183)
<223> OTHER INFORMATION: n is a, c, g, or t
<220> FEATURE:
<221> NAME/KEY: misc_feature
<222> LOCATION: (3186)..(3186)
<223> OTHER INFORMATION: n is a, c, g, or t
<220> FEATURE:
<221> NAME/KEY: misc_feature
<222> LOCATION: (3192)..(3192)
<223> OTHER INFORMATION: n is a, c, g, or t
<220> FEATURE:
<221> NAME/KEY: misc_feature
<222> LOCATION: (3195)..(3195)
<223> OTHER INFORMATION: n is a, c, g, or t
<220> FEATURE:
<221> NAME/KEY: misc_feature
<222> LOCATION: (3198)..(3198)
<223> OTHER INFORMATION: n is a, c, g, or t
<220> FEATURE:
<221> NAME/KEY: misc_feature
<222> LOCATION: (3201)..(3201)
<223> OTHER INFORMATION: n is a, c, g, or t
<220> FEATURE:
<221> NAME/KEY: misc_feature
<222> LOCATION: (3204)..(3204)
<223> OTHER INFORMATION: n is a, c, g, or t
<220> FEATURE:
<221> NAME/KEY: misc_feature
<222> LOCATION: (3210)..(3210)
<223> OTHER INFORMATION: n is a, c, g, or t
<220> FEATURE:
<221> NAME/KEY: misc_feature
<222> LOCATION: (3213)..(3213)
<223> OTHER INFORMATION: n is a, c, g, or t
<220> FEATURE:
<221> NAME/KEY: misc_feature
<222> LOCATION: (3225)..(3225)
<223> OTHER INFORMATION: n is a, c, g, or t
<220> FEATURE:
<221> NAME/KEY: misc_feature
<222> LOCATION: (3252)..(3252)
<223> OTHER INFORMATION: n is a, c, g, or t
<220> FEATURE:
<221> NAME/KEY: misc_feature
<222> LOCATION: (3261)..(3261)
<223> OTHER INFORMATION: n is a, c, g, or t
<220> FEATURE:
<221> NAME/KEY: misc_feature
<222> LOCATION: (3267)..(3267)
<223> OTHER INFORMATION: n is a, c, g, or t
<220> FEATURE:
<221> NAME/KEY: misc_feature
<222> LOCATION: (3273)..(3273)
<223> OTHER INFORMATION: n is a, c, g, or t
<220> FEATURE:
<221> NAME/KEY: misc_feature
<222> LOCATION: (3276)..(3276)
<223> OTHER INFORMATION: n is a, c, g, or t
<220> FEATURE:
<221> NAME/KEY: misc_feature
<222> LOCATION: (3279)..(3279)
<223> OTHER INFORMATION: n is a, c, g, or t
<220> FEATURE:
<221> NAME/KEY: misc_feature
<222> LOCATION: (3309)..(3309)
<223> OTHER INFORMATION: n is a, c, g, or t
<220> FEATURE:
<221> NAME/KEY: misc_feature
<222> LOCATION: (3321)..(3321)
```

<223> OTHER INFORMATION: n is a, c, g, or t
<220> FEATURE:
<221> NAME/KEY: misc_feature
<222> LOCATION: (3324)..(3324)
<223> OTHER INFORMATION: n is a, c, g, or t
<220> FEATURE:
<221> NAME/KEY: misc_feature
<222> LOCATION: (3327)..(3327)
<223> OTHER INFORMATION: n is a, c, g, or t
<220> FEATURE:
<221> NAME/KEY: misc_feature
<222> LOCATION: (3330)..(3330)
<223> OTHER INFORMATION: n is a, c, g, or t
<220> FEATURE:
<221> NAME/KEY: misc_feature
<222> LOCATION: (3333)..(3333)
<223> OTHER INFORMATION: n is a, c, g, or t
<220> FEATURE:
<221> NAME/KEY: misc_feature
<222> LOCATION: (3339)..(3339)
<223> OTHER INFORMATION: n is a, c, g, or t
<220> FEATURE:
<221> NAME/KEY: misc_feature
<222> LOCATION: (3357)..(3357)
<223> OTHER INFORMATION: n is a, c, g, or t
<220> FEATURE:
<221> NAME/KEY: misc_feature
<222> LOCATION: (3363)..(3363)
<223> OTHER INFORMATION: n is a, c, g, or t
<220> FEATURE:
<221> NAME/KEY: misc_feature
<222> LOCATION: (3375)..(3375)
<223> OTHER INFORMATION: n is a, c, g, or t
<220> FEATURE:
<221> NAME/KEY: misc_feature
<222> LOCATION: (3378)..(3378)
<223> OTHER INFORMATION: n is a, c, g, or t
<220> FEATURE:
<221> NAME/KEY: misc_feature
<222> LOCATION: (3381)..(3381)
<223> OTHER INFORMATION: n is a, c, g, or t
<220> FEATURE:
<221> NAME/KEY: misc_feature
<222> LOCATION: (3384)..(3384)
<223> OTHER INFORMATION: n is a, c, g, or t
<220> FEATURE:
<221> NAME/KEY: misc_feature
<222> LOCATION: (3387)..(3387)
<223> OTHER INFORMATION: n is a, c, g, or t
<220> FEATURE:
<221> NAME/KEY: misc_feature
<222> LOCATION: (3390)..(3390)
<223> OTHER INFORMATION: n is a, c, g, or t

<400> SEQUENCE: 2
atgytntggt gggargargt ngargaytgy taygarmgng argaygtnca raaraaracn 60
ttyacnaart gggtnaaygc ncarttywsn aarttyggna arcarcayat hgaraayytn 120
ttywsngayy tncargaygg nmgnmgnytn ytngayytny tngarggnyt nacnggncar 180
aarytnccna argaraargg nwsnacnmgn gtncaygcny tnaayaaygt naayaargcn 240
ytnmgngtny tncaraayaa yaaygtngay ytngtnaaya thggnwsnac ngayathgtn 300
gayggnaayc ayaarytnac nytnggnytn athtggaaya thathytnca ytggcargtn 360
aaraaygtna tgaaraayat hatggcnggn ytncarcara cnaaywsnga raarathytn 420
ytnwsntggg tnmgncarws nacnmgnaay tayccncarg tnaaygtnat haayttyacn 480
acnwsntggw sngayggnyt ngcnytnaay gcnytnathc aywsncaymg nccngayytn 540
ttygaytgga aywsngtngt ntgycarcar wsngcnacnc armgnytnga rcaygcntty 600
aayathgcnm gntaycaryt nggnathgar aarytnytng ayccngarga ygtngayacn 660
acntayccng ayaaraarws nathytnatg tayathacnw snytnttyca rgtnytnccn 720
carcargtnw snathgargc nathcargar gtngaratgy tnccnmgncc nccnaargtn 780
acnaargarg arcayttyca rytncaycay caratgcayt aywsncarca rathacngtn 840
wsnytngcnc arggntayga rmgnacnwsn wsnccnaarc cnmgnttyaa rwsntaygcn 900
tayacncarg cngcntaygt nacnacnwsn gayccnacnm gnwsnccntt yccnwsncar 960
cayytngarg cnccngarga yaarwsntty ggnwsnwsny tnatggarws ngargtnaay 1020
ytngaymgnt aycaracngc nytngargar gtnytnwsnt ggytnytnws ngcngargay 1080
acnytncarg cncarggnga rathwsnaay gaygtngarg tngtnaarga ycarttycay 1140
acncaygarg gntayatgat ggayytnacn gcncaycarg gnmgngtngg naayathytn 1200
carytnggnw snaarytnat hggnacnggn aarytnwsng argaygarga racngargtn 1260
cargarcara tgaayytnyt naaywsnmgn tgggartgyy tnmgngtngc nwsnatggar 1320
aarcarwsna ayytncaymg ngtnytnatg gayytncara aycaraaryt naargarytn 1380
aaygaytggy tnacngargc ngaracnacn gcnaaygtny tncargaygc nacnmgnaar 1440
garmgnytny tngargayws naarggngtn aargarytna tgaarcartg gcargayytn 1500
carggngara thgarcarga rcargtnmgn gtnaaywsny tnacncayat ggtngtngtn 1560
gtngaygarw snwsnggnga ycaygcnacn gcngcnytng argarcaryt naargtnytn 1620
ggngaymgnt gggcnaayat htgymgntgg wsngarytnm gnaaraarws nytnaayath 1680
mgnwsncayy tngargcnws nwsngaycar tggaarmgny tncayytnws nytncargar 1740
ytnytngtnt ggytncaryt naargaygay garytnwsnm gncargcncc nathggnggn 1800
gayttyccng cngtncaraa rcaraaygay gtncaymgng cnttyaarmg ngarytnaar 1860
acnaargarc cngtnathat gwsnacnytn garacngtnm gnathttyyt nacngarcar 1920
ccnytngarg gnytngaraa rytntaycar garccnmgng arytnccncc ngargarmgn 1980
gcncaraayg tnacnmgnyt nytnmgnaar cargcngarg argtnaayac ngartgggar 2040
aarytnaayy tncaywsngc ngaytggcar mgnaarathg aygaracnyt ngarmgnytn 2100
cargarytnc argargcnac ngaygarytn gayytnaary tnmgncargc ngargtnath 2160
aarggnwsnt ggcarccngt nggngayytn ytnathgayw snytncarga ycayytngar 2220
aargtnaarg cnytnmgngg ngarathgcn ccnytnaarg araaygtnws ncaygtnaay 2280
gayytngcnm gncarytnac nacnytnggn athcarytnw snccntayaa yytnwsnacn 2340
ytngargayy tnaayacnmg ntggaarytn ytncargtng cngtngarga ymgngtnmgn 2400
carytncayg argcncaymg ngayttyggn ccngcnwsnc arcayttyyt nwsnacnwsn 2460
gtncarggnc cntgggarmg ngcnathwsn ccnaayaarg tnccntayta yathaaycay 2520
garacncara cnacntgytg ggaycayccn aaratgacng arytntayca rwsnytngcn 2580
gayytnaaya aygtnmgntt ywsngcntay mgnacngcna tgaarytnmg nmgnytncar 2640
aargcnytnt gyytngayyt nytnwsnytn wsngcngcnt gygaygcnyt ngaycarcay 2700
aayytnaarc araaygayca rccnatggay athytncara thathaaytg yytnacnacn 2760
athtaygaym gnytngarca rgarcayaay aayytngtna aygtnccnyt ntgygtngay 2820
atgtgyytna aytggytnyt naaygtntay gayacnggnm gnacnggnmg nathmgngtn 2880
ytnwsnttya aracnggnat hathwsnytn tgyaargcnc ayytngarga yaartaymgn 2940
tayytnttya arcargtngc nwsnwsnacn ggnttytgyg aycarmgnmg nytnggnytn 3000
ytnytncayg aywsnathca rathccnmgn carytnggng argtngcnws nttyggnggn 3060

```
wsnaayathg arccnwsngt nmgnwsntgy ttycarttyg cnaayaayaa rccngarath    3120
gargcngcny tnttyytnga ytggatgmgn ytngarccnc arwsnatggt ntggytnccn    3180
gtnytncaym gngtngcngc ngcngaracn gcnaarcayc argcnaartg yaayathtgy    3240
aargartgyc cnathathgg nttymgntay mgnwsnytna arcayttyaa ytaygayath    3300
tgycarwsnt gyttyttyws nggnmgngtn gcnaarggnc ayaaratgca ytayccnatg    3360
gtngartayt gyacnccnac nacnwsnggn gar                                3393
```

```
<210> SEQ ID NO 3
<211> LENGTH: 1098
<212> TYPE: PRT
<213> ORGANISM: Artificial Sequence
<220> FEATURE:
<223> OTHER INFORMATION: amino acid sequence of nano-utrophin 1
<220> FEATURE:
<221> NAME/KEY: MISC_FEATURE
<222> LOCATION: (1)..(433)
<223> OTHER INFORMATION: amino acid sequence identical to N-terminal
      region of full length human utrophin
<220> FEATURE:
<221> NAME/KEY: MISC_FEATURE
<222> LOCATION: (433)..(433)
<223> OTHER INFORMATION: tryptophan residue in the "A" helix at the core
      of the Hidden Markov Model (HMM) and all crystal structures for
      proteins in this superfamily
<220> FEATURE:
<221> NAME/KEY: MISC_FEATURE
<222> LOCATION: (434)..(477)
<223> OTHER INFORMATION: amino acid sequence identical to C-terminal
      region of full length human utrophin
<220> FEATURE:
<221> NAME/KEY: MISC_FEATURE
<222> LOCATION: (477)..(478)
<223> OTHER INFORMATION: positions within the superfamily HMM for the
      "B" helix that flank the hypothetical plane of transection as
      depicted in the FIG 2F
<220> FEATURE:
<221> NAME/KEY: MISC_FEATURE
<222> LOCATION: (478)..(514)
<223> OTHER INFORMATION: amino acid sequence identical to N-terminal
      region of full length human utrophin
<220> FEATURE:
<221> NAME/KEY: MISC_FEATURE
<222> LOCATION: (514)..(514)
<223> OTHER INFORMATION: tryptophan residue in the "C" helix at the core
      of the Hidden Markov Model (HMM) and all crystal structures for
      proteins in this superfamily
<220> FEATURE:
<221> NAME/KEY: MISC_FEATURE
<222> LOCATION: (515)..(1098)
<223> OTHER INFORMATION: amino acid sequence identical to C-terminal
      region of full length human utrophin

<400> SEQUENCE: 3

Met Ala Lys Tyr Gly Glu His Glu Ala Ser Pro Asp Asn Gly Gln Asn
1               5                   10                  15

Glu Phe Ser Asp Ile Ile Lys Ser Arg Ser Asp Glu His Asn Asp Val
            20                  25                  30

Gln Lys Lys Thr Phe Thr Lys Trp Ile Asn Ala Arg Phe Ser Lys Ser
        35                  40                  45

Gly Lys Pro Pro Ile Asn Asp Met Phe Thr Asp Leu Lys Asp Gly Arg
    50                  55                  60

Lys Leu Leu Asp Leu Leu Glu Gly Leu Thr Gly Thr Ser Leu Pro Lys
65                  70                  75                  80

Glu Arg Gly Ser Thr Arg Val His Ala Leu Asn Asn Val Asn Arg Val
                85                  90                  95

Leu Gln Val Leu His Gln Asn Asn Val Glu Leu Val Asn Ile Gly Gly
```

```
                100              105                  110
Thr Asp Ile Val Asp Gly Asn His Lys Leu Thr Leu Gly Leu Leu Trp
            115                  120                  125
Ser Ile Ile Leu His Trp Gln Val Lys Asp Val Met Lys Asp Val Met
            130                  135              140
Ser Asp Leu Gln Gln Thr Asn Ser Glu Lys Ile Leu Leu Ser Trp Val
145                      150                  155                  160
Arg Gln Thr Thr Arg Pro Tyr Ser Gln Val Asn Val Leu Asn Phe Thr
                    165                  170                  175
Thr Ser Trp Thr Asp Gly Leu Ala Phe Asn Ala Val Leu His Arg His
                180                  185                  190
Lys Pro Asp Leu Phe Ser Trp Asp Lys Val Val Lys Met Ser Pro Ile
            195                  200                  205
Glu Arg Leu Glu His Ala Phe Ser Lys Ala Gln Thr Tyr Leu Gly Ile
            210                  215                  220
Glu Lys Leu Leu Asp Pro Glu Asp Val Ala Val Gln Leu Pro Asp Lys
225                      230                  235                  240
Lys Ser Ile Ile Met Tyr Leu Thr Ser Leu Phe Glu Val Leu Pro Gln
                    245                  250                  255
Gln Val Thr Ile Asp Ala Ile Arg Glu Val Glu Thr Leu Pro Arg Lys
                260                  265                  270
Tyr Lys Lys Glu Cys Glu Glu Ala Ile Asn Ile Gln Ser Thr Ala
                275                  280                  285
Pro Glu Glu Glu His Glu Ser Pro Arg Ala Glu Thr Pro Ser Thr Val
            290                  295                  300
Thr Glu Val Asp Met Asp Leu Asp Ser Tyr Gln Ile Ala Leu Glu Glu
305                      310                  315                  320
Val Leu Thr Trp Leu Leu Ser Ala Glu Asp Thr Phe Gln Glu Gln Asp
                    325                  330                  335
Asp Ile Ser Asp Asp Val Glu Glu Val Lys Asp Gln Phe Ala Thr His
                340                  345                  350
Glu Ala Phe Met Met Glu Leu Thr Ala His Gln Ser Ser Val Gly Ser
            355                  360                  365
Val Leu Gln Ala Gly Asn Gln Leu Ile Thr Gln Gly Thr Leu Ser Asp
            370                  375                  380
Glu Glu Glu Phe Glu Ile Gln Glu Gln Met Thr Leu Leu Asn Ala Arg
385                      390                  395                  400
Trp Glu Ala Leu Arg Val Glu Ser Met Asp Arg Gln Ser Arg Leu His
                    405                  410                  415
Asp Val Leu Met Glu Leu Gln Lys Lys Gln Leu Gln Leu Ser Ala
                420                  425                  430
Trp Ile Gln Glu Ala Glu Thr Thr Val Asn Val Leu Val Asp Ala Ser
                435                  440                  445
His Arg Glu Asn Ala Leu Gln Asp Ser Ile Leu Ala Arg Glu Leu Lys
            450                  455                  460
Gln Gln Met Gln Asp Ile Gln Ala Glu Ile Asp Ala His Gln Val Lys
465                      470                  475                  480
Val Asn Ser Leu Thr His Met Val Val Ile Val Asp Glu Asn Ser Gly
                    485                  490                  495
Glu Ser Ala Thr Ala Ile Leu Glu Asp Gln Leu Gln Lys Leu Gly Glu
            500                  505                  510
Arg Trp Asn Asp Leu Lys Ala Lys Ser Ala Ser Ile Arg Ala His Leu
            515                  520                  525
```

```
Glu Ala Ser Ala Glu Lys Trp Asn Arg Leu Leu Met Ser Leu Glu Glu
            530                 535                 540

Leu Ile Lys Trp Leu Asn Met Lys Asp Glu Glu Leu Lys Lys Gln Met
545                 550                 555                 560

Pro Ile Gly Gly Asp Val Pro Ala Leu Gln Leu Gln Tyr Asp His Cys
            565                 570                 575

Lys Ala Leu Arg Arg Glu Leu Lys Glu Lys Glu Tyr Ser Val Leu Asn
            580                 585                 590

Ala Val Asp Gln Ala Arg Val Phe Leu Ala Asp Gln Pro Ile Glu Ala
            595                 600                 605

Pro Glu Glu Pro Arg Arg Asn Leu Gln Ser Lys Thr Glu Leu Thr Pro
            610                 615                 620

Glu Glu Arg Ala Gln Lys Ile Ala Lys Ala Met Arg Lys Gln Ser Ser
625                 630                 635                 640

Glu Val Lys Glu Lys Trp Glu Ser Leu Asn Ala Val Thr Ser Asn Trp
            645                 650                 655

Gln Lys Gln Val Asp Lys Ala Leu Glu Lys Leu Arg Asp Leu Gln Gly
            660                 665                 670

Ala Met Asp Asp Leu Asp Ala Asp Met Lys Glu Ala Glu Ser Val Arg
            675                 680                 685

Asn Gly Trp Lys Pro Val Gly Asp Leu Leu Ile Asp Ser Leu Gln Asp
            690                 695                 700

His Ile Glu Lys Ile Met Ala Phe Arg Glu Glu Ile Ala Pro Ile Asn
705                 710                 715                 720

Phe Lys Val Lys Thr Val Asn Asp Leu Ser Gln Leu Ser Pro Leu
            725                 730                 735

Asp Leu His Pro Ser Leu Lys Met Ser Arg Gln Leu Asp Leu Asn
            740                 745                 750

Met Arg Trp Lys Leu Leu Gln Val Ser Val Asp Asp Arg Leu Lys Gln
            755                 760                 765

Leu Gln Glu Ala His Arg Asp Phe Gly Pro Ser Ser Gln His Phe Leu
            770                 775                 780

Ser Thr Ser Val Gln Leu Pro Trp Gln Arg Ser Ile Ser His Asn Lys
785                 790                 795                 800

Val Pro Tyr Tyr Ile Asn His Gln Thr Gln Thr Thr Cys Trp Asp His
            805                 810                 815

Pro Lys Met Thr Glu Leu Phe Gln Ser Leu Ala Asp Leu Asn Asn Val
            820                 825                 830

Arg Phe Ser Ala Tyr Arg Thr Ala Ile Lys Ile Arg Arg Leu Gln Lys
            835                 840                 845

Ala Leu Cys Leu Asp Leu Leu Glu Leu Ser Thr Thr Asn Glu Ile Phe
850                 855                 860

Lys Gln His Lys Leu Asn Gln Asn Asp Gln Leu Leu Ser Val Pro Asp
865                 870                 875                 880

Val Ile Asn Cys Leu Thr Thr Thr Tyr Asp Gly Leu Glu Gln Met His
            885                 890                 895

Lys Asp Leu Val Asn Val Pro Leu Cys Val Asp Met Cys Leu Asn Trp
            900                 905                 910

Leu Leu Asn Val Tyr Asp Thr Gly Arg Thr Gly Lys Ile Arg Val Gln
            915                 920                 925

Ser Leu Lys Ile Gly Leu Met Ser Leu Ser Lys Gly Leu Leu Glu Glu
            930                 935                 940
```

Lys Tyr Arg Tyr Leu Phe Lys Glu Val Ala Gly Pro Thr Glu Met Cys
945                 950                 955                 960

Asp Gln Arg Gln Leu Gly Leu Leu His Asp Ala Ile Gln Ile Pro
            965                 970                 975

Arg Gln Leu Gly Glu Val Ala Ala Phe Gly Gly Ser Asn Ile Glu Pro
            980                 985                 990

Ser Val Arg Ser Cys Phe Gln Gln Asn Asn Asn Lys Pro Glu Ile Ser
        995                 1000                1005

Val Lys Glu Phe Ile Asp Trp Met His Leu Glu Pro Gln Ser Met
    1010                1015                1020

Val Trp Leu Pro Val Leu His Arg Val Ala Ala Glu Thr Ala
    1025                1030                1035

Lys His Gln Ala Lys Cys Asn Ile Cys Lys Glu Cys Pro Ile Val
    1040                1045                1050

Gly Phe Arg Tyr Arg Ser Leu Lys His Phe Asn Tyr Asp Val Cys
    1055                1060                1065

Gln Ser Cys Phe Phe Ser Gly Arg Thr Ala Lys Gly His Lys Leu
    1070                1075                1080

His Tyr Pro Met Val Glu Tyr Cys Ile Pro Thr Thr Ser Gly Glu
    1085                1090                1095

<210> SEQ ID NO 4
<211> LENGTH: 3294
<212> TYPE: DNA
<213> ORGANISM: Artificial Sequence
<220> FEATURE:
<223> OTHER INFORMATION: nucleic acid sequence encoding nano-utrophin-1
      protein
<220> FEATURE:
<221> NAME/KEY: misc_feature
<222> LOCATION: (6)..(6)
<223> OTHER INFORMATION: n is a, c, g, or t
<220> FEATURE:
<221> NAME/KEY: misc_feature
<222> LOCATION: (15)..(15)
<223> OTHER INFORMATION: n is a, c, g, or t
<220> FEATURE:
<221> NAME/KEY: misc_feature
<222> LOCATION: (27)..(27)
<223> OTHER INFORMATION: n is a, c, g, or t
<220> FEATURE:
<221> NAME/KEY: misc_feature
<222> LOCATION: (30)..(30)
<223> OTHER INFORMATION: n is a, c, g, or t
<220> FEATURE:
<221> NAME/KEY: misc_feature
<222> LOCATION: (33)..(33)
<223> OTHER INFORMATION: n is a, c, g, or t
<220> FEATURE:
<221> NAME/KEY: misc_feature
<222> LOCATION: (42)..(42)
<223> OTHER INFORMATION: n is a, c, g, or t
<220> FEATURE:
<221> NAME/KEY: misc_feature
<222> LOCATION: (57)..(57)
<223> OTHER INFORMATION: n is a, c, g, or t
<220> FEATURE:
<221> NAME/KEY: misc_feature
<222> LOCATION: (72)..(72)
<223> OTHER INFORMATION: n is a, c, g, or t
<220> FEATURE:
<221> NAME/KEY: misc_feature
<222> LOCATION: (75)..(75)
<223> OTHER INFORMATION: n is a, c, g, or t
<220> FEATURE:
<221> NAME/KEY: misc_feature
<222> LOCATION: (78)..(78)
<223> OTHER INFORMATION: n is a, c, g, or t
<220> FEATURE:

-continued

```
<221> NAME/KEY: misc_feature
<222> LOCATION: (96)..(96)
<223> OTHER INFORMATION: n is a, c, g, or t
<220> FEATURE:
<221> NAME/KEY: misc_feature
<222> LOCATION: (108)..(108)
<223> OTHER INFORMATION: n is a, c, g, or t
<220> FEATURE:
<221> NAME/KEY: misc_feature
<222> LOCATION: (114)..(114)
<223> OTHER INFORMATION: n is a, c, g, or t
<220> FEATURE:
<221> NAME/KEY: misc_feature
<222> LOCATION: (129)..(129)
<223> OTHER INFORMATION: n is a, c, g, or t
<220> FEATURE:
<221> NAME/KEY: misc_feature
<222> LOCATION: (132)..(132)
<223> OTHER INFORMATION: n is a, c, g, or t
<220> FEATURE:
<221> NAME/KEY: misc_feature
<222> LOCATION: (138)..(138)
<223> OTHER INFORMATION: n is a, c, g, or t
<220> FEATURE:
<221> NAME/KEY: misc_feature
<222> LOCATION: (144)..(144)
<223> OTHER INFORMATION: n is a, c, g, or t
<220> FEATURE:
<221> NAME/KEY: misc_feature
<222> LOCATION: (147)..(147)
<223> OTHER INFORMATION: n is a, c, g, or t
<220> FEATURE:
<221> NAME/KEY: misc_feature
<222> LOCATION: (153)..(153)
<223> OTHER INFORMATION: n is a, c, g, or t
<220> FEATURE:
<221> NAME/KEY: misc_feature
<222> LOCATION: (156)..(156)
<223> OTHER INFORMATION: n is a, c, g, or t
<220> FEATURE:
<221> NAME/KEY: misc_feature
<222> LOCATION: (174)..(174)
<223> OTHER INFORMATION: n is a, c, g, or t
<220> FEATURE:
<221> NAME/KEY: misc_feature
<222> LOCATION: (180)..(180)
<223> OTHER INFORMATION: n is a, c, g, or t
<220> FEATURE:
<221> NAME/KEY: misc_feature
<222> LOCATION: (189)..(189)
<223> OTHER INFORMATION: n is a, c, g, or t
<220> FEATURE:
<221> NAME/KEY: misc_feature
<222> LOCATION: (192)..(192)
<223> OTHER INFORMATION: n is a, c, g, or t
<220> FEATURE:
<221> NAME/KEY: misc_feature
<222> LOCATION: (198)..(198)
<223> OTHER INFORMATION: n is a, c, g, or t
<220> FEATURE:
<221> NAME/KEY: misc_feature
<222> LOCATION: (201)..(201)
<223> OTHER INFORMATION: n is a, c, g, or t
<220> FEATURE:
<221> NAME/KEY: misc_feature
<222> LOCATION: (207)..(207)
<223> OTHER INFORMATION: n is a, c, g, or t
<220> FEATURE:
<221> NAME/KEY: misc_feature
<222> LOCATION: (210)..(210)
<223> OTHER INFORMATION: n is a, c, g, or t
<220> FEATURE:
<221> NAME/KEY: misc_feature
<222> LOCATION: (216)..(216)
<223> OTHER INFORMATION: n is a, c, g, or t
<220> FEATURE:
<221> NAME/KEY: misc_feature
<222> LOCATION: (219)..(219)
<223> OTHER INFORMATION: n is a, c, g, or t
```

-continued

```
<220> FEATURE:
<221> NAME/KEY: misc_feature
<222> LOCATION: (222)..(222)
<223> OTHER INFORMATION: n is a, c, g, or t
<220> FEATURE:
<221> NAME/KEY: misc_feature
<222> LOCATION: (225)..(225)
<223> OTHER INFORMATION: n is a, c, g, or t
<220> FEATURE:
<221> NAME/KEY: misc_feature
<222> LOCATION: (228)..(228)
<223> OTHER INFORMATION: n is a, c, g, or t
<220> FEATURE:
<221> NAME/KEY: misc_feature
<222> LOCATION: (231)..(231)
<223> OTHER INFORMATION: n is a, c, g, or t
<220> FEATURE:
<221> NAME/KEY: misc_feature
<222> LOCATION: (234)..(234)
<223> OTHER INFORMATION: n is a, c, g, or t
<220> FEATURE:
<221> NAME/KEY: misc_feature
<222> LOCATION: (237)..(237)
<223> OTHER INFORMATION: n is a, c, g, or t
<220> FEATURE:
<221> NAME/KEY: misc_feature
<222> LOCATION: (246)..(246)
<223> OTHER INFORMATION: n is a, c, g, or t
<220> FEATURE:
<221> NAME/KEY: misc_feature
<222> LOCATION: (249)..(249)
<223> OTHER INFORMATION: n is a, c, g, or t
<220> FEATURE:
<221> NAME/KEY: misc_feature
<222> LOCATION: (252)..(252)
<223> OTHER INFORMATION: n is a, c, g, or t
<220> FEATURE:
<221> NAME/KEY: misc_feature
<222> LOCATION: (255)..(255)
<223> OTHER INFORMATION: n is a, c, g, or t
<220> FEATURE:
<221> NAME/KEY: misc_feature
<222> LOCATION: (258)..(258)
<223> OTHER INFORMATION: n is a, c, g, or t
<220> FEATURE:
<221> NAME/KEY: misc_feature
<222> LOCATION: (261)..(261)
<223> OTHER INFORMATION: n is a, c, g, or t
<220> FEATURE:
<221> NAME/KEY: misc_feature
<222> LOCATION: (267)..(267)
<223> OTHER INFORMATION: n is a, c, g, or t
<220> FEATURE:
<221> NAME/KEY: misc_feature
<222> LOCATION: (270)..(270)
<223> OTHER INFORMATION: n is a, c, g, or t
<220> FEATURE:
<221> NAME/KEY: misc_feature
<222> LOCATION: (279)..(279)
<223> OTHER INFORMATION: n is a, c, g, or t
<220> FEATURE:
<221> NAME/KEY: misc_feature
<222> LOCATION: (285)..(285)
<223> OTHER INFORMATION: n is a, c, g, or t
<220> FEATURE:
<221> NAME/KEY: misc_feature
<222> LOCATION: (288)..(288)
<223> OTHER INFORMATION: n is a, c, g, or t
<220> FEATURE:
<221> NAME/KEY: misc_feature
<222> LOCATION: (291)..(291)
<223> OTHER INFORMATION: n is a, c, g, or t
<220> FEATURE:
<221> NAME/KEY: misc_feature
<222> LOCATION: (297)..(297)
<223> OTHER INFORMATION: n is a, c, g, or t
<220> FEATURE:
<221> NAME/KEY: misc_feature
<222> LOCATION: (300)..(300)
```

```
<223> OTHER INFORMATION: n is a, c, g, or t
<220> FEATURE:
<221> NAME/KEY: misc_feature
<222> LOCATION: (315)..(315)
<223> OTHER INFORMATION: n is a, c, g, or t
<220> FEATURE:
<221> NAME/KEY: misc_feature
<222> LOCATION: (321)..(321)
<223> OTHER INFORMATION: n is a, c, g, or t
<220> FEATURE:
<221> NAME/KEY: misc_feature
<222> LOCATION: (324)..(324)
<223> OTHER INFORMATION: n is a, c, g, or t
<220> FEATURE:
<221> NAME/KEY: misc_feature
<222> LOCATION: (333)..(333)
<223> OTHER INFORMATION: n is a, c, g, or t
<220> FEATURE:
<221> NAME/KEY: misc_feature
<222> LOCATION: (336)..(336)
<223> OTHER INFORMATION: n is a, c, g, or t
<220> FEATURE:
<221> NAME/KEY: misc_feature
<222> LOCATION: (339)..(339)
<223> OTHER INFORMATION: n is a, c, g, or t
<220> FEATURE:
<221> NAME/KEY: misc_feature
<222> LOCATION: (348)..(348)
<223> OTHER INFORMATION: n is a, c, g, or t
<220> FEATURE:
<221> NAME/KEY: misc_feature
<222> LOCATION: (354)..(354)
<223> OTHER INFORMATION: n is a, c, g, or t
<220> FEATURE:
<221> NAME/KEY: misc_feature
<222> LOCATION: (366)..(366)
<223> OTHER INFORMATION: n is a, c, g, or t
<220> FEATURE:
<221> NAME/KEY: misc_feature
<222> LOCATION: (369)..(369)
<223> OTHER INFORMATION: n is a, c, g, or t
<220> FEATURE:
<221> NAME/KEY: misc_feature
<222> LOCATION: (372)..(372)
<223> OTHER INFORMATION: n is a, c, g, or t
<220> FEATURE:
<221> NAME/KEY: misc_feature
<222> LOCATION: (375)..(375)
<223> OTHER INFORMATION: n is a, c, g, or t
<220> FEATURE:
<221> NAME/KEY: misc_feature
<222> LOCATION: (378)..(378)
<223> OTHER INFORMATION: n is a, c, g, or t
<220> FEATURE:
<221> NAME/KEY: misc_feature
<222> LOCATION: (381)..(381)
<223> OTHER INFORMATION: n is a, c, g, or t
<220> FEATURE:
<221> NAME/KEY: misc_feature
<222> LOCATION: (387)..(387)
<223> OTHER INFORMATION: n is a, c, g, or t
<220> FEATURE:
<221> NAME/KEY: misc_feature
<222> LOCATION: (396)..(396)
<223> OTHER INFORMATION: n is a, c, g, or t
<220> FEATURE:
<221> NAME/KEY: misc_feature
<222> LOCATION: (408)..(408)
<223> OTHER INFORMATION: n is a, c, g, or t
<220> FEATURE:
<221> NAME/KEY: misc_feature
<222> LOCATION: (417)..(417)
<223> OTHER INFORMATION: n is a, c, g, or t
<220> FEATURE:
<221> NAME/KEY: misc_feature
<222> LOCATION: (429)..(429)
<223> OTHER INFORMATION: n is a, c, g, or t
<220> FEATURE:
<221> NAME/KEY: misc_feature
```

```
<222> LOCATION: (435)..(435)
<223> OTHER INFORMATION: n is a, c, g, or t
<220> FEATURE:
<221> NAME/KEY: misc_feature
<222> LOCATION: (441)..(441)
<223> OTHER INFORMATION: n is a, c, g, or t
<220> FEATURE:
<221> NAME/KEY: misc_feature
<222> LOCATION: (450)..(450)
<223> OTHER INFORMATION: n is a, c, g, or t
<220> FEATURE:
<221> NAME/KEY: misc_feature
<222> LOCATION: (456)..(456)
<223> OTHER INFORMATION: n is a, c, g, or t
<220> FEATURE:
<221> NAME/KEY: misc_feature
<222> LOCATION: (468)..(468)
<223> OTHER INFORMATION: n is a, c, g, or t
<220> FEATURE:
<221> NAME/KEY: misc_feature
<222> LOCATION: (471)..(471)
<223> OTHER INFORMATION: n is a, c, g, or t
<220> FEATURE:
<221> NAME/KEY: misc_feature
<222> LOCATION: (474)..(474)
<223> OTHER INFORMATION: n is a, c, g, or t
<220> FEATURE:
<221> NAME/KEY: misc_feature
<222> LOCATION: (480)..(480)
<223> OTHER INFORMATION: n is a, c, g, or t
<220> FEATURE:
<221> NAME/KEY: misc_feature
<222> LOCATION: (483)..(483)
<223> OTHER INFORMATION: n is a, c, g, or t
<220> FEATURE:
<221> NAME/KEY: misc_feature
<222> LOCATION: (489)..(489)
<223> OTHER INFORMATION: n is a, c, g, or t
<220> FEATURE:
<221> NAME/KEY: misc_feature
<222> LOCATION: (492)..(492)
<223> OTHER INFORMATION: n is a, c, g, or t
<220> FEATURE:
<221> NAME/KEY: misc_feature
<222> LOCATION: (495)..(495)
<223> OTHER INFORMATION: n is a, c, g, or t
<220> FEATURE:
<221> NAME/KEY: misc_feature
<222> LOCATION: (498)..(498)
<223> OTHER INFORMATION: n is a, c, g, or t
<220> FEATURE:
<221> NAME/KEY: misc_feature
<222> LOCATION: (504)..(504)
<223> OTHER INFORMATION: n is a, c, g, or t
<220> FEATURE:
<221> NAME/KEY: misc_feature
<222> LOCATION: (510)..(510)
<223> OTHER INFORMATION: n is a, c, g, or t
<220> FEATURE:
<221> NAME/KEY: misc_feature
<222> LOCATION: (516)..(516)
<223> OTHER INFORMATION: n is a, c, g, or t
<220> FEATURE:
<221> NAME/KEY: misc_feature
<222> LOCATION: (519)..(519)
<223> OTHER INFORMATION: n is a, c, g, or t
<220> FEATURE:
<221> NAME/KEY: misc_feature
<222> LOCATION: (528)..(528)
<223> OTHER INFORMATION: n is a, c, g, or t
<220> FEATURE:
<221> NAME/KEY: misc_feature
<222> LOCATION: (531)..(531)
<223> OTHER INFORMATION: n is a, c, g, or t
<220> FEATURE:
<221> NAME/KEY: misc_feature
<222> LOCATION: (534)..(534)
<223> OTHER INFORMATION: n is a, c, g, or t
<220> FEATURE:
```

```
<221> NAME/KEY: misc_feature
<222> LOCATION: (540)..(540)
<223> OTHER INFORMATION: n is a, c, g, or t
<220> FEATURE:
<221> NAME/KEY: misc_feature
<222> LOCATION: (546)..(546)
<223> OTHER INFORMATION: n is a, c, g, or t
<220> FEATURE:
<221> NAME/KEY: misc_feature
<222> LOCATION: (549)..(549)
<223> OTHER INFORMATION: n is a, c, g, or t
<220> FEATURE:
<221> NAME/KEY: misc_feature
<222> LOCATION: (552)..(552)
<223> OTHER INFORMATION: n is a, c, g, or t
<220> FEATURE:
<221> NAME/KEY: misc_feature
<222> LOCATION: (561)..(561)
<223> OTHER INFORMATION: n is a, c, g, or t
<220> FEATURE:
<221> NAME/KEY: misc_feature
<222> LOCATION: (564)..(564)
<223> OTHER INFORMATION: n is a, c, g, or t
<220> FEATURE:
<221> NAME/KEY: misc_feature
<222> LOCATION: (567)..(567)
<223> OTHER INFORMATION: n is a, c, g, or t
<220> FEATURE:
<221> NAME/KEY: misc_feature
<222> LOCATION: (573)..(573)
<223> OTHER INFORMATION: n is a, c, g, or t
<220> FEATURE:
<221> NAME/KEY: misc_feature
<222> LOCATION: (582)..(582)
<223> OTHER INFORMATION: n is a, c, g, or t
<220> FEATURE:
<221> NAME/KEY: misc_feature
<222> LOCATION: (588)..(588)
<223> OTHER INFORMATION: n is a, c, g, or t
<220> FEATURE:
<221> NAME/KEY: misc_feature
<222> LOCATION: (594)..(594)
<223> OTHER INFORMATION: n is a, c, g, or t
<220> FEATURE:
<221> NAME/KEY: misc_feature
<222> LOCATION: (606)..(606)
<223> OTHER INFORMATION: n is a, c, g, or t
<220> FEATURE:
<221> NAME/KEY: misc_feature
<222> LOCATION: (609)..(609)
<223> OTHER INFORMATION: n is a, c, g, or t
<220> FEATURE:
<221> NAME/KEY: misc_feature
<222> LOCATION: (618)..(618)
<223> OTHER INFORMATION: n is a, c, g, or t
<220> FEATURE:
<221> NAME/KEY: misc_feature
<222> LOCATION: (621)..(621)
<223> OTHER INFORMATION: n is a, c, g, or t
<220> FEATURE:
<221> NAME/KEY: misc_feature
<222> LOCATION: (630)..(630)
<223> OTHER INFORMATION: n is a, c, g, or t
<220> FEATURE:
<221> NAME/KEY: misc_feature
<222> LOCATION: (633)..(633)
<223> OTHER INFORMATION: n is a, c, g, or t
<220> FEATURE:
<221> NAME/KEY: misc_feature
<222> LOCATION: (642)..(642)
<223> OTHER INFORMATION: n is a, c, g, or t
<220> FEATURE:
<221> NAME/KEY: misc_feature
<222> LOCATION: (648)..(648)
<223> OTHER INFORMATION: n is a, c, g, or t
<220> FEATURE:
<221> NAME/KEY: misc_feature
<222> LOCATION: (654)..(654)
<223> OTHER INFORMATION: n is a, c, g, or t
```

```
-continued

<220> FEATURE:
<221> NAME/KEY: misc_feature
<222> LOCATION: (660)..(660)
<223> OTHER INFORMATION: n is a, c, g, or t
<220> FEATURE:
<221> NAME/KEY: misc_feature
<222> LOCATION: (666)..(666)
<223> OTHER INFORMATION: n is a, c, g, or t
<220> FEATURE:
<221> NAME/KEY: misc_feature
<222> LOCATION: (669)..(669)
<223> OTHER INFORMATION: n is a, c, g, or t
<220> FEATURE:
<221> NAME/KEY: misc_feature
<222> LOCATION: (681)..(681)
<223> OTHER INFORMATION: n is a, c, g, or t
<220> FEATURE:
<221> NAME/KEY: misc_feature
<222> LOCATION: (684)..(684)
<223> OTHER INFORMATION: n is a, c, g, or t
<220> FEATURE:
<221> NAME/KEY: misc_feature
<222> LOCATION: (690)..(690)
<223> OTHER INFORMATION: n is a, c, g, or t
<220> FEATURE:
<221> NAME/KEY: misc_feature
<222> LOCATION: (699)..(699)
<223> OTHER INFORMATION: n is a, c, g, or t
<220> FEATURE:
<221> NAME/KEY: misc_feature
<222> LOCATION: (702)..(702)
<223> OTHER INFORMATION: n is a, c, g, or t
<220> FEATURE:
<221> NAME/KEY: misc_feature
<222> LOCATION: (705)..(705)
<223> OTHER INFORMATION: n is a, c, g, or t
<220> FEATURE:
<221> NAME/KEY: misc_feature
<222> LOCATION: (711)..(711)
<223> OTHER INFORMATION: n is a, c, g, or t
<220> FEATURE:
<221> NAME/KEY: misc_feature
<222> LOCATION: (714)..(714)
<223> OTHER INFORMATION: n is a, c, g, or t
<220> FEATURE:
<221> NAME/KEY: misc_feature
<222> LOCATION: (726)..(726)
<223> OTHER INFORMATION: n is a, c, g, or t
<220> FEATURE:
<221> NAME/KEY: misc_feature
<222> LOCATION: (741)..(741)
<223> OTHER INFORMATION: n is a, c, g, or t
<220> FEATURE:
<221> NAME/KEY: misc_feature
<222> LOCATION: (744)..(744)
<223> OTHER INFORMATION: n is a, c, g, or t
<220> FEATURE:
<221> NAME/KEY: misc_feature
<222> LOCATION: (747)..(747)
<223> OTHER INFORMATION: n is a, c, g, or t
<220> FEATURE:
<221> NAME/KEY: misc_feature
<222> LOCATION: (750)..(750)
<223> OTHER INFORMATION: n is a, c, g, or t
<220> FEATURE:
<221> NAME/KEY: misc_feature
<222> LOCATION: (759)..(759)
<223> OTHER INFORMATION: n is a, c, g, or t
<220> FEATURE:
<221> NAME/KEY: misc_feature
<222> LOCATION: (762)..(762)
<223> OTHER INFORMATION: n is a, c, g, or t
<220> FEATURE:
<221> NAME/KEY: misc_feature
<222> LOCATION: (765)..(765)
<223> OTHER INFORMATION: n is a, c, g, or t
<220> FEATURE:
<221> NAME/KEY: misc_feature
<222> LOCATION: (774)..(774)
```

-continued

```
<223> OTHER INFORMATION: n is a, c, g, or t
<220> FEATURE:
<221> NAME/KEY: misc_feature
<222> LOCATION: (777)..(777)
<223> OTHER INFORMATION: n is a, c, g, or t
<220> FEATURE:
<221> NAME/KEY: misc_feature
<222> LOCATION: (786)..(786)
<223> OTHER INFORMATION: n is a, c, g, or t
<220> FEATURE:
<221> NAME/KEY: misc_feature
<222> LOCATION: (792)..(792)
<223> OTHER INFORMATION: n is a, c, g, or t
<220> FEATURE:
<221> NAME/KEY: misc_feature
<222> LOCATION: (798)..(798)
<223> OTHER INFORMATION: n is a, c, g, or t
<220> FEATURE:
<221> NAME/KEY: misc_feature
<222> LOCATION: (804)..(804)
<223> OTHER INFORMATION: n is a, c, g, or t
<220> FEATURE:
<221> NAME/KEY: misc_feature
<222> LOCATION: (807)..(807)
<223> OTHER INFORMATION: n is a, c, g, or t
<220> FEATURE:
<221> NAME/KEY: misc_feature
<222> LOCATION: (810)..(810)
<223> OTHER INFORMATION: n is a, c, g, or t
<220> FEATURE:
<221> NAME/KEY: misc_feature
<222> LOCATION: (813)..(813)
<223> OTHER INFORMATION: n is a, c, g, or t
<220> FEATURE:
<221> NAME/KEY: misc_feature
<222> LOCATION: (843)..(843)
<223> OTHER INFORMATION: n is a, c, g, or t
<220> FEATURE:
<221> NAME/KEY: misc_feature
<222> LOCATION: (858)..(858)
<223> OTHER INFORMATION: n is a, c, g, or t
<220> FEATURE:
<221> NAME/KEY: misc_feature
<222> LOCATION: (861)..(861)
<223> OTHER INFORMATION: n is a, c, g, or t
<220> FEATURE:
<221> NAME/KEY: misc_feature
<222> LOCATION: (864)..(864)
<223> OTHER INFORMATION: n is a, c, g, or t
<220> FEATURE:
<221> NAME/KEY: misc_feature
<222> LOCATION: (867)..(867)
<223> OTHER INFORMATION: n is a, c, g, or t
<220> FEATURE:
<221> NAME/KEY: misc_feature
<222> LOCATION: (885)..(885)
<223> OTHER INFORMATION: n is a, c, g, or t
<220> FEATURE:
<221> NAME/KEY: misc_feature
<222> LOCATION: (888)..(888)
<223> OTHER INFORMATION: n is a, c, g, or t
<220> FEATURE:
<221> NAME/KEY: misc_feature
<222> LOCATION: (891)..(891)
<223> OTHER INFORMATION: n is a, c, g, or t
<220> FEATURE:
<221> NAME/KEY: misc_feature
<222> LOCATION: (894)..(894)
<223> OTHER INFORMATION: n is a, c, g, or t
<220> FEATURE:
<221> NAME/KEY: misc_feature
<222> LOCATION: (900)..(900)
<223> OTHER INFORMATION: n is a, c, g, or t
<220> FEATURE:
<221> NAME/KEY: misc_feature
<222> LOCATION: (903)..(903)
<223> OTHER INFORMATION: n is a, c, g, or t
<220> FEATURE:
<221> NAME/KEY: misc_feature
```

```
<222> LOCATION: (906)..(906)
<223> OTHER INFORMATION: n is a, c, g, or t
<220> FEATURE:
<221> NAME/KEY: misc_feature
<222> LOCATION: (909)..(909)
<223> OTHER INFORMATION: n is a, c, g, or t
<220> FEATURE:
<221> NAME/KEY: misc_feature
<222> LOCATION: (912)..(912)
<223> OTHER INFORMATION: n is a, c, g, or t
<220> FEATURE:
<221> NAME/KEY: misc_feature
<222> LOCATION: (915)..(915)
<223> OTHER INFORMATION: n is a, c, g, or t
<220> FEATURE:
<221> NAME/KEY: misc_feature
<222> LOCATION: (921)..(921)
<223> OTHER INFORMATION: n is a, c, g, or t
<220> FEATURE:
<221> NAME/KEY: misc_feature
<222> LOCATION: (933)..(933)
<223> OTHER INFORMATION: n is a, c, g, or t
<220> FEATURE:
<221> NAME/KEY: misc_feature
<222> LOCATION: (939)..(939)
<223> OTHER INFORMATION: n is a, c, g, or t
<220> FEATURE:
<221> NAME/KEY: misc_feature
<222> LOCATION: (951)..(951)
<223> OTHER INFORMATION: n is a, c, g, or t
<220> FEATURE:
<221> NAME/KEY: misc_feature
<222> LOCATION: (954)..(954)
<223> OTHER INFORMATION: n is a, c, g, or t
<220> FEATURE:
<221> NAME/KEY: misc_feature
<222> LOCATION: (963)..(963)
<223> OTHER INFORMATION: n is a, c, g, or t
<220> FEATURE:
<221> NAME/KEY: misc_feature
<222> LOCATION: (966)..(966)
<223> OTHER INFORMATION: n is a, c, g, or t
<220> FEATURE:
<221> NAME/KEY: misc_feature
<222> LOCATION: (969)..(969)
<223> OTHER INFORMATION: n is a, c, g, or t
<220> FEATURE:
<221> NAME/KEY: misc_feature
<222> LOCATION: (975)..(975)
<223> OTHER INFORMATION: n is a, c, g, or t
<220> FEATURE:
<221> NAME/KEY: misc_feature
<222> LOCATION: (978)..(978)
<223> OTHER INFORMATION: n is a, c, g, or t
<220> FEATURE:
<221> NAME/KEY: misc_feature
<222> LOCATION: (981)..(981)
<223> OTHER INFORMATION: n is a, c, g, or t
<220> FEATURE:
<221> NAME/KEY: misc_feature
<222> LOCATION: (984)..(984)
<223> OTHER INFORMATION: n is a, c, g, or t
<220> FEATURE:
<221> NAME/KEY: misc_feature
<222> LOCATION: (993)..(993)
<223> OTHER INFORMATION: n is a, c, g, or t
<220> FEATURE:
<221> NAME/KEY: misc_feature
<222> LOCATION: (1017)..(1017)
<223> OTHER INFORMATION: n is a, c, g, or t
<220> FEATURE:
<221> NAME/KEY: misc_feature
<222> LOCATION: (1026)..(1026)
<223> OTHER INFORMATION: n is a, c, g, or t
<220> FEATURE:
<221> NAME/KEY: misc_feature
<222> LOCATION: (1035)..(1035)
<223> OTHER INFORMATION: n is a, c, g, or t
<220> FEATURE:
```

```
<221> NAME/KEY: misc_feature
<222> LOCATION: (1050)..(1050)
<223> OTHER INFORMATION: n is a, c, g, or t
<220> FEATURE:
<221> NAME/KEY: misc_feature
<222> LOCATION: (1053)..(1053)
<223> OTHER INFORMATION: n is a, c, g, or t
<220> FEATURE:
<221> NAME/KEY: misc_feature
<222> LOCATION: (1062)..(1062)
<223> OTHER INFORMATION: n is a, c, g, or t
<220> FEATURE:
<221> NAME/KEY: misc_feature
<222> LOCATION: (1077)..(1077)
<223> OTHER INFORMATION: n is a, c, g, or t
<220> FEATURE:
<221> NAME/KEY: misc_feature
<222> LOCATION: (1080)..(1080)
<223> OTHER INFORMATION: n is a, c, g, or t
<220> FEATURE:
<221> NAME/KEY: misc_feature
<222> LOCATION: (1083)..(1083)
<223> OTHER INFORMATION: n is a, c, g, or t
<220> FEATURE:
<221> NAME/KEY: misc_feature
<222> LOCATION: (1092)..(1092)
<223> OTHER INFORMATION: n is a, c, g, or t
<220> FEATURE:
<221> NAME/KEY: misc_feature
<222> LOCATION: (1095)..(1095)
<223> OTHER INFORMATION: n is a, c, g, or t
<220> FEATURE:
<221> NAME/KEY: misc_feature
<222> LOCATION: (1098)..(1098)
<223> OTHER INFORMATION: n is a, c, g, or t
<220> FEATURE:
<221> NAME/KEY: misc_feature
<222> LOCATION: (1101)..(1101)
<223> OTHER INFORMATION: n is a, c, g, or t
<220> FEATURE:
<221> NAME/KEY: misc_feature
<222> LOCATION: (1104)..(1104)
<223> OTHER INFORMATION: n is a, c, g, or t
<220> FEATURE:
<221> NAME/KEY: misc_feature
<222> LOCATION: (1107)..(1107)
<223> OTHER INFORMATION: n is a, c, g, or t
<220> FEATURE:
<221> NAME/KEY: misc_feature
<222> LOCATION: (1110)..(1110)
<223> OTHER INFORMATION: n is a, c, g, or t
<220> FEATURE:
<221> NAME/KEY: misc_feature
<222> LOCATION: (1116)..(1116)
<223> OTHER INFORMATION: n is a, c, g, or t
<220> FEATURE:
<221> NAME/KEY: misc_feature
<222> LOCATION: (1119)..(1119)
<223> OTHER INFORMATION: n is a, c, g, or t
<220> FEATURE:
<221> NAME/KEY: misc_feature
<222> LOCATION: (1128)..(1128)
<223> OTHER INFORMATION: n is a, c, g, or t
<220> FEATURE:
<221> NAME/KEY: misc_feature
<222> LOCATION: (1134)..(1134)
<223> OTHER INFORMATION: n is a, c, g, or t
<220> FEATURE:
<221> NAME/KEY: misc_feature
<222> LOCATION: (1140)..(1140)
<223> OTHER INFORMATION: n is a, c, g, or t
<220> FEATURE:
<221> NAME/KEY: misc_feature
<222> LOCATION: (1143)..(1143)
<223> OTHER INFORMATION: n is a, c, g, or t
<220> FEATURE:
<221> NAME/KEY: misc_feature
<222> LOCATION: (1146)..(1146)
<223> OTHER INFORMATION: n is a, c, g, or t
```

-continued

```
<220> FEATURE:
<221> NAME/KEY: misc_feature
<222> LOCATION: (1149)..(1149)
<223> OTHER INFORMATION: n is a, c, g, or t
<220> FEATURE:
<221> NAME/KEY: misc_feature
<222> LOCATION: (1185)..(1185)
<223> OTHER INFORMATION: n is a, c, g, or t
<220> FEATURE:
<221> NAME/KEY: misc_feature
<222> LOCATION: (1188)..(1188)
<223> OTHER INFORMATION: n is a, c, g, or t
<220> FEATURE:
<221> NAME/KEY: misc_feature
<222> LOCATION: (1191)..(1191)
<223> OTHER INFORMATION: n is a, c, g, or t
<220> FEATURE:
<221> NAME/KEY: misc_feature
<222> LOCATION: (1197)..(1197)
<223> OTHER INFORMATION: n is a, c, g, or t
<220> FEATURE:
<221> NAME/KEY: misc_feature
<222> LOCATION: (1200)..(1200)
<223> OTHER INFORMATION: n is a, c, g, or t
<220> FEATURE:
<221> NAME/KEY: misc_feature
<222> LOCATION: (1209)..(1209)
<223> OTHER INFORMATION: n is a, c, g, or t
<220> FEATURE:
<221> NAME/KEY: misc_feature
<222> LOCATION: (1212)..(1212)
<223> OTHER INFORMATION: n is a, c, g, or t
<220> FEATURE:
<221> NAME/KEY: misc_feature
<222> LOCATION: (1215)..(1215)
<223> OTHER INFORMATION: n is a, c, g, or t
<220> FEATURE:
<221> NAME/KEY: misc_feature
<222> LOCATION: (1218)..(1218)
<223> OTHER INFORMATION: n is a, c, g, or t
<220> FEATURE:
<221> NAME/KEY: misc_feature
<222> LOCATION: (1224)..(1224)
<223> OTHER INFORMATION: n is a, c, g, or t
<220> FEATURE:
<221> NAME/KEY: misc_feature
<222> LOCATION: (1233)..(1233)
<223> OTHER INFORMATION: n is a, c, g, or t
<220> FEATURE:
<221> NAME/KEY: misc_feature
<222> LOCATION: (1239)..(1239)
<223> OTHER INFORMATION: n is a, c, g, or t
<220> FEATURE:
<221> NAME/KEY: misc_feature
<222> LOCATION: (1242)..(1242)
<223> OTHER INFORMATION: n is a, c, g, or t
<220> FEATURE:
<221> NAME/KEY: misc_feature
<222> LOCATION: (1245)..(1245)
<223> OTHER INFORMATION: n is a, c, g, or t
<220> FEATURE:
<221> NAME/KEY: misc_feature
<222> LOCATION: (1254)..(1254)
<223> OTHER INFORMATION: n is a, c, g, or t
<220> FEATURE:
<221> NAME/KEY: misc_feature
<222> LOCATION: (1257)..(1257)
<223> OTHER INFORMATION: n is a, c, g, or t
<220> FEATURE:
<221> NAME/KEY: misc_feature
<222> LOCATION: (1266)..(1266)
<223> OTHER INFORMATION: n is a, c, g, or t
<220> FEATURE:
<221> NAME/KEY: misc_feature
<222> LOCATION: (1281)..(1281)
<223> OTHER INFORMATION: n is a, c, g, or t
<220> FEATURE:
<221> NAME/KEY: misc_feature
<222> LOCATION: (1290)..(1290)
```

-continued

```
<223> OTHER INFORMATION: n is a, c, g, or t
<220> FEATURE:
<221> NAME/KEY: misc_feature
<222> LOCATION: (1293)..(1293)
<223> OTHER INFORMATION: n is a, c, g, or t
<220> FEATURE:
<221> NAME/KEY: misc_feature
<222> LOCATION: (1296)..(1296)
<223> OTHER INFORMATION: n is a, c, g, or t
<220> FEATURE:
<221> NAME/KEY: misc_feature
<222> LOCATION: (1311)..(1311)
<223> OTHER INFORMATION: n is a, c, g, or t
<220> FEATURE:
<221> NAME/KEY: misc_feature
<222> LOCATION: (1317)..(1317)
<223> OTHER INFORMATION: n is a, c, g, or t
<220> FEATURE:
<221> NAME/KEY: misc_feature
<222> LOCATION: (1320)..(1320)
<223> OTHER INFORMATION: n is a, c, g, or t
<220> FEATURE:
<221> NAME/KEY: misc_feature
<222> LOCATION: (1323)..(1323)
<223> OTHER INFORMATION: n is a, c, g, or t
<220> FEATURE:
<221> NAME/KEY: misc_feature
<222> LOCATION: (1329)..(1329)
<223> OTHER INFORMATION: n is a, c, g, or t
<220> FEATURE:
<221> NAME/KEY: misc_feature
<222> LOCATION: (1332)..(1332)
<223> OTHER INFORMATION: n is a, c, g, or t
<220> FEATURE:
<221> NAME/KEY: misc_feature
<222> LOCATION: (1335)..(1335)
<223> OTHER INFORMATION: n is a, c, g, or t
<220> FEATURE:
<221> NAME/KEY: misc_feature
<222> LOCATION: (1341)..(1341)
<223> OTHER INFORMATION: n is a, c, g, or t
<220> FEATURE:
<221> NAME/KEY: misc_feature
<222> LOCATION: (1344)..(1344)
<223> OTHER INFORMATION: n is a, c, g, or t
<220> FEATURE:
<221> NAME/KEY: misc_feature
<222> LOCATION: (1350)..(1350)
<223> OTHER INFORMATION: n is a, c, g, or t
<220> FEATURE:
<221> NAME/KEY: misc_feature
<222> LOCATION: (1359)..(1359)
<223> OTHER INFORMATION: n is a, c, g, or t
<220> FEATURE:
<221> NAME/KEY: misc_feature
<222> LOCATION: (1362)..(1362)
<223> OTHER INFORMATION: n is a, c, g, or t
<220> FEATURE:
<221> NAME/KEY: misc_feature
<222> LOCATION: (1371)..(1371)
<223> OTHER INFORMATION: n is a, c, g, or t
<220> FEATURE:
<221> NAME/KEY: misc_feature
<222> LOCATION: (1377)..(1377)
<223> OTHER INFORMATION: n is a, c, g, or t
<220> FEATURE:
<221> NAME/KEY: misc_feature
<222> LOCATION: (1380)..(1380)
<223> OTHER INFORMATION: n is a, c, g, or t
<220> FEATURE:
<221> NAME/KEY: misc_feature
<222> LOCATION: (1383)..(1383)
<223> OTHER INFORMATION: n is a, c, g, or t
<220> FEATURE:
<221> NAME/KEY: misc_feature
<222> LOCATION: (1389)..(1389)
<223> OTHER INFORMATION: n is a, c, g, or t
<220> FEATURE:
<221> NAME/KEY: misc_feature
```

-continued

```
<222> LOCATION: (1416)..(1416)
<223> OTHER INFORMATION: n is a, c, g, or t
<220> FEATURE:
<221> NAME/KEY: misc_feature
<222> LOCATION: (1428)..(1428)
<223> OTHER INFORMATION: n is a, c, g, or t
<220> FEATURE:
<221> NAME/KEY: misc_feature
<222> LOCATION: (1437)..(1437)
<223> OTHER INFORMATION: n is a, c, g, or t
<220> FEATURE:
<221> NAME/KEY: misc_feature
<222> LOCATION: (1443)..(1443)
<223> OTHER INFORMATION: n is a, c, g, or t
<220> FEATURE:
<221> NAME/KEY: misc_feature
<222> LOCATION: (1449)..(1449)
<223> OTHER INFORMATION: n is a, c, g, or t
<220> FEATURE:
<221> NAME/KEY: misc_feature
<222> LOCATION: (1452)..(1452)
<223> OTHER INFORMATION: n is a, c, g, or t
<220> FEATURE:
<221> NAME/KEY: misc_feature
<222> LOCATION: (1455)..(1455)
<223> OTHER INFORMATION: n is a, c, g, or t
<220> FEATURE:
<221> NAME/KEY: misc_feature
<222> LOCATION: (1464)..(1464)
<223> OTHER INFORMATION: n is a, c, g, or t
<220> FEATURE:
<221> NAME/KEY: misc_feature
<222> LOCATION: (1467)..(1467)
<223> OTHER INFORMATION: n is a, c, g, or t
<220> FEATURE:
<221> NAME/KEY: misc_feature
<222> LOCATION: (1473)..(1473)
<223> OTHER INFORMATION: n is a, c, g, or t
<220> FEATURE:
<221> NAME/KEY: misc_feature
<222> LOCATION: (1485)..(1485)
<223> OTHER INFORMATION: n is a, c, g, or t
<220> FEATURE:
<221> NAME/KEY: misc_feature
<222> LOCATION: (1488)..(1488)
<223> OTHER INFORMATION: n is a, c, g, or t
<220> FEATURE:
<221> NAME/KEY: misc_feature
<222> LOCATION: (1494)..(1494)
<223> OTHER INFORMATION: n is a, c, g, or t
<220> FEATURE:
<221> NAME/KEY: misc_feature
<222> LOCATION: (1497)..(1497)
<223> OTHER INFORMATION: n is a, c, g, or t
<220> FEATURE:
<221> NAME/KEY: misc_feature
<222> LOCATION: (1500)..(1500)
<223> OTHER INFORMATION: n is a, c, g, or t
<220> FEATURE:
<221> NAME/KEY: misc_feature
<222> LOCATION: (1503)..(1503)
<223> OTHER INFORMATION: n is a, c, g, or t
<220> FEATURE:
<221> NAME/KEY: misc_feature
<222> LOCATION: (1509)..(1509)
<223> OTHER INFORMATION: n is a, c, g, or t
<220> FEATURE:
<221> NAME/KEY: misc_feature
<222> LOCATION: (1521)..(1521)
<223> OTHER INFORMATION: n is a, c, g, or t
<220> FEATURE:
<221> NAME/KEY: misc_feature
<222> LOCATION: (1530)..(1530)
<223> OTHER INFORMATION: n is a, c, g, or t
<220> FEATURE:
<221> NAME/KEY: misc_feature
<222> LOCATION: (1533)..(1533)
<223> OTHER INFORMATION: n is a, c, g, or t
<220> FEATURE:
```

```
<221> NAME/KEY: misc_feature
<222> LOCATION: (1539)..(1539)
<223> OTHER INFORMATION: n is a, c, g, or t
<220> FEATURE:
<221> NAME/KEY: misc_feature
<222> LOCATION: (1551)..(1551)
<223> OTHER INFORMATION: n is a, c, g, or t
<220> FEATURE:
<221> NAME/KEY: misc_feature
<222> LOCATION: (1557)..(1557)
<223> OTHER INFORMATION: n is a, c, g, or t
<220> FEATURE:
<221> NAME/KEY: misc_feature
<222> LOCATION: (1563)..(1563)
<223> OTHER INFORMATION: n is a, c, g, or t
<220> FEATURE:
<221> NAME/KEY: misc_feature
<222> LOCATION: (1566)..(1566)
<223> OTHER INFORMATION: n is a, c, g, or t
<220> FEATURE:
<221> NAME/KEY: misc_feature
<222> LOCATION: (1569)..(1569)
<223> OTHER INFORMATION: n is a, c, g, or t
<220> FEATURE:
<221> NAME/KEY: misc_feature
<222> LOCATION: (1575)..(1575)
<223> OTHER INFORMATION: n is a, c, g, or t
<220> FEATURE:
<221> NAME/KEY: misc_feature
<222> LOCATION: (1578)..(1578)
<223> OTHER INFORMATION: n is a, c, g, or t
<220> FEATURE:
<221> NAME/KEY: misc_feature
<222> LOCATION: (1584)..(1584)
<223> OTHER INFORMATION: n is a, c, g, or t
<220> FEATURE:
<221> NAME/KEY: misc_feature
<222> LOCATION: (1590)..(1590)
<223> OTHER INFORMATION: n is a, c, g, or t
<220> FEATURE:
<221> NAME/KEY: misc_feature
<222> LOCATION: (1593)..(1593)
<223> OTHER INFORMATION: n is a, c, g, or t
<220> FEATURE:
<221> NAME/KEY: misc_feature
<222> LOCATION: (1596)..(1596)
<223> OTHER INFORMATION: n is a, c, g, or t
<220> FEATURE:
<221> NAME/KEY: misc_feature
<222> LOCATION: (1611)..(1611)
<223> OTHER INFORMATION: n is a, c, g, or t
<220> FEATURE:
<221> NAME/KEY: misc_feature
<222> LOCATION: (1614)..(1614)
<223> OTHER INFORMATION: n is a, c, g, or t
<220> FEATURE:
<221> NAME/KEY: misc_feature
<222> LOCATION: (1617)..(1617)
<223> OTHER INFORMATION: n is a, c, g, or t
<220> FEATURE:
<221> NAME/KEY: misc_feature
<222> LOCATION: (1623)..(1623)
<223> OTHER INFORMATION: n is a, c, g, or t
<220> FEATURE:
<221> NAME/KEY: misc_feature
<222> LOCATION: (1626)..(1626)
<223> OTHER INFORMATION: n is a, c, g, or t
<220> FEATURE:
<221> NAME/KEY: misc_feature
<222> LOCATION: (1635)..(1635)
<223> OTHER INFORMATION: n is a, c, g, or t
<220> FEATURE:
<221> NAME/KEY: misc_feature
<222> LOCATION: (1647)..(1647)
<223> OTHER INFORMATION: n is a, c, g, or t
<220> FEATURE:
<221> NAME/KEY: misc_feature
<222> LOCATION: (1668)..(1668)
<223> OTHER INFORMATION: n is a, c, g, or t
```

-continued

```
<220> FEATURE:
<221> NAME/KEY: misc_feature
<222> LOCATION: (1683)..(1683)
<223> OTHER INFORMATION: n is a, c, g, or t
<220> FEATURE:
<221> NAME/KEY: misc_feature
<222> LOCATION: (1689)..(1689)
<223> OTHER INFORMATION: n is a, c, g, or t
<220> FEATURE:
<221> NAME/KEY: misc_feature
<222> LOCATION: (1692)..(1692)
<223> OTHER INFORMATION: n is a, c, g, or t
<220> FEATURE:
<221> NAME/KEY: misc_feature
<222> LOCATION: (1698)..(1698)
<223> OTHER INFORMATION: n is a, c, g, or t
<220> FEATURE:
<221> NAME/KEY: misc_feature
<222> LOCATION: (1701)..(1701)
<223> OTHER INFORMATION: n is a, c, g, or t
<220> FEATURE:
<221> NAME/KEY: misc_feature
<222> LOCATION: (1704)..(1704)
<223> OTHER INFORMATION: n is a, c, g, or t
<220> FEATURE:
<221> NAME/KEY: misc_feature
<222> LOCATION: (1707)..(1707)
<223> OTHER INFORMATION: n is a, c, g, or t
<220> FEATURE:
<221> NAME/KEY: misc_feature
<222> LOCATION: (1713)..(1713)
<223> OTHER INFORMATION: n is a, c, g, or t
<220> FEATURE:
<221> NAME/KEY: misc_feature
<222> LOCATION: (1734)..(1734)
<223> OTHER INFORMATION: n is a, c, g, or t
<220> FEATURE:
<221> NAME/KEY: misc_feature
<222> LOCATION: (1737)..(1737)
<223> OTHER INFORMATION: n is a, c, g, or t
<220> FEATURE:
<221> NAME/KEY: misc_feature
<222> LOCATION: (1740)..(1740)
<223> OTHER INFORMATION: n is a, c, g, or t
<220> FEATURE:
<221> NAME/KEY: misc_feature
<222> LOCATION: (1743)..(1743)
<223> OTHER INFORMATION: n is a, c, g, or t
<220> FEATURE:
<221> NAME/KEY: misc_feature
<222> LOCATION: (1749)..(1749)
<223> OTHER INFORMATION: n is a, c, g, or t
<220> FEATURE:
<221> NAME/KEY: misc_feature
<222> LOCATION: (1767)..(1767)
<223> OTHER INFORMATION: n is a, c, g, or t
<220> FEATURE:
<221> NAME/KEY: misc_feature
<222> LOCATION: (1770)..(1770)
<223> OTHER INFORMATION: n is a, c, g, or t
<220> FEATURE:
<221> NAME/KEY: misc_feature
<222> LOCATION: (1773)..(1773)
<223> OTHER INFORMATION: n is a, c, g, or t
<220> FEATURE:
<221> NAME/KEY: misc_feature
<222> LOCATION: (1779)..(1779)
<223> OTHER INFORMATION: n is a, c, g, or t
<220> FEATURE:
<221> NAME/KEY: misc_feature
<222> LOCATION: (1782)..(1782)
<223> OTHER INFORMATION: n is a, c, g, or t
<220> FEATURE:
<221> NAME/KEY: misc_feature
<222> LOCATION: (1791)..(1791)
<223> OTHER INFORMATION: n is a, c, g, or t
<220> FEATURE:
<221> NAME/KEY: misc_feature
<222> LOCATION: (1794)..(1794)
```

-continued

```
<223> OTHER INFORMATION: n is a, c, g, or t
<220> FEATURE:
<221> NAME/KEY: misc_feature
<222> LOCATION: (1797)..(1797)
<223> OTHER INFORMATION: n is a, c, g, or t
<220> FEATURE:
<221> NAME/KEY: misc_feature
<222> LOCATION: (1803)..(1803)
<223> OTHER INFORMATION: n is a, c, g, or t
<220> FEATURE:
<221> NAME/KEY: misc_feature
<222> LOCATION: (1806)..(1806)
<223> OTHER INFORMATION: n is a, c, g, or t
<220> FEATURE:
<221> NAME/KEY: misc_feature
<222> LOCATION: (1815)..(1815)
<223> OTHER INFORMATION: n is a, c, g, or t
<220> FEATURE:
<221> NAME/KEY: misc_feature
<222> LOCATION: (1824)..(1824)
<223> OTHER INFORMATION: n is a, c, g, or t
<220> FEATURE:
<221> NAME/KEY: misc_feature
<222> LOCATION: (1827)..(1827)
<223> OTHER INFORMATION: n is a, c, g, or t
<220> FEATURE:
<221> NAME/KEY: misc_feature
<222> LOCATION: (1836)..(1836)
<223> OTHER INFORMATION: n is a, c, g, or t
<220> FEATURE:
<221> NAME/KEY: misc_feature
<222> LOCATION: (1839)..(1839)
<223> OTHER INFORMATION: n is a, c, g, or t
<220> FEATURE:
<221> NAME/KEY: misc_feature
<222> LOCATION: (1842)..(1842)
<223> OTHER INFORMATION: n is a, c, g, or t
<220> FEATURE:
<221> NAME/KEY: misc_feature
<222> LOCATION: (1848)..(1848)
<223> OTHER INFORMATION: n is a, c, g, or t
<220> FEATURE:
<221> NAME/KEY: misc_feature
<222> LOCATION: (1854)..(1854)
<223> OTHER INFORMATION: n is a, c, g, or t
<220> FEATURE:
<221> NAME/KEY: misc_feature
<222> LOCATION: (1860)..(1860)
<223> OTHER INFORMATION: n is a, c, g, or t
<220> FEATURE:
<221> NAME/KEY: misc_feature
<222> LOCATION: (1866)..(1866)
<223> OTHER INFORMATION: n is a, c, g, or t
<220> FEATURE:
<221> NAME/KEY: misc_feature
<222> LOCATION: (1869)..(1869)
<223> OTHER INFORMATION: n is a, c, g, or t
<220> FEATURE:
<221> NAME/KEY: misc_feature
<222> LOCATION: (1872)..(1872)
<223> OTHER INFORMATION: n is a, c, g, or t
<220> FEATURE:
<221> NAME/KEY: misc_feature
<222> LOCATION: (1881)..(1881)
<223> OTHER INFORMATION: n is a, c, g, or t
<220> FEATURE:
<221> NAME/KEY: misc_feature
<222> LOCATION: (1884)..(1884)
<223> OTHER INFORMATION: n is a, c, g, or t
<220> FEATURE:
<221> NAME/KEY: misc_feature
<222> LOCATION: (1896)..(1896)
<223> OTHER INFORMATION: n is a, c, g, or t
<220> FEATURE:
<221> NAME/KEY: misc_feature
<222> LOCATION: (1902)..(1902)
<223> OTHER INFORMATION: n is a, c, g, or t
<220> FEATURE:
<221> NAME/KEY: misc_feature
```

-continued

```
<222> LOCATION: (1908)..(1908)
<223> OTHER INFORMATION: n is a, c, g, or t
<220> FEATURE:
<221> NAME/KEY: misc_feature
<222> LOCATION: (1917)..(1917)
<223> OTHER INFORMATION: n is a, c, g, or t
<220> FEATURE:
<221> NAME/KEY: misc_feature
<222> LOCATION: (1920)..(1920)
<223> OTHER INFORMATION: n is a, c, g, or t
<220> FEATURE:
<221> NAME/KEY: misc_feature
<222> LOCATION: (1926)..(1926)
<223> OTHER INFORMATION: n is a, c, g, or t
<220> FEATURE:
<221> NAME/KEY: misc_feature
<222> LOCATION: (1944)..(1944)
<223> OTHER INFORMATION: n is a, c, g, or t
<220> FEATURE:
<221> NAME/KEY: misc_feature
<222> LOCATION: (1947)..(1947)
<223> OTHER INFORMATION: n is a, c, g, or t
<220> FEATURE:
<221> NAME/KEY: misc_feature
<222> LOCATION: (1953)..(1953)
<223> OTHER INFORMATION: n is a, c, g, or t
<220> FEATURE:
<221> NAME/KEY: misc_feature
<222> LOCATION: (1956)..(1956)
<223> OTHER INFORMATION: n is a, c, g, or t
<220> FEATURE:
<221> NAME/KEY: misc_feature
<222> LOCATION: (1959)..(1959)
<223> OTHER INFORMATION: n is a, c, g, or t
<220> FEATURE:
<221> NAME/KEY: misc_feature
<222> LOCATION: (1962)..(1962)
<223> OTHER INFORMATION: n is a, c, g, or t
<220> FEATURE:
<221> NAME/KEY: misc_feature
<222> LOCATION: (1980)..(1980)
<223> OTHER INFORMATION: n is a, c, g, or t
<220> FEATURE:
<221> NAME/KEY: misc_feature
<222> LOCATION: (1989)..(1989)
<223> OTHER INFORMATION: n is a, c, g, or t
<220> FEATURE:
<221> NAME/KEY: misc_feature
<222> LOCATION: (1992)..(1992)
<223> OTHER INFORMATION: n is a, c, g, or t
<220> FEATURE:
<221> NAME/KEY: misc_feature
<222> LOCATION: (2001)..(2001)
<223> OTHER INFORMATION: n is a, c, g, or t
<220> FEATURE:
<221> NAME/KEY: misc_feature
<222> LOCATION: (2004)..(2004)
<223> OTHER INFORMATION: n is a, c, g, or t
<220> FEATURE:
<221> NAME/KEY: misc_feature
<222> LOCATION: (2010)..(2010)
<223> OTHER INFORMATION: n is a, c, g, or t
<220> FEATURE:
<221> NAME/KEY: misc_feature
<222> LOCATION: (2016)..(2016)
<223> OTHER INFORMATION: n is a, c, g, or t
<220> FEATURE:
<221> NAME/KEY: misc_feature
<222> LOCATION: (2019)..(2019)
<223> OTHER INFORMATION: n is a, c, g, or t
<220> FEATURE:
<221> NAME/KEY: misc_feature
<222> LOCATION: (2031)..(2031)
<223> OTHER INFORMATION: n is a, c, g, or t
<220> FEATURE:
<221> NAME/KEY: misc_feature
<222> LOCATION: (2037)..(2037)
<223> OTHER INFORMATION: n is a, c, g, or t
<220> FEATURE:
```

```
<221> NAME/KEY: misc_feature
<222> LOCATION: (2052)..(2052)
<223> OTHER INFORMATION: n is a, c, g, or t
<220> FEATURE:
<221> NAME/KEY: misc_feature
<222> LOCATION: (2058)..(2058)
<223> OTHER INFORMATION: n is a, c, g, or t
<220> FEATURE:
<221> NAME/KEY: misc_feature
<222> LOCATION: (2061)..(2061)
<223> OTHER INFORMATION: n is a, c, g, or t
<220> FEATURE:
<221> NAME/KEY: misc_feature
<222> LOCATION: (2064)..(2064)
<223> OTHER INFORMATION: n is a, c, g, or t
<220> FEATURE:
<221> NAME/KEY: misc_feature
<222> LOCATION: (2070)..(2070)
<223> OTHER INFORMATION: n is a, c, g, or t
<220> FEATURE:
<221> NAME/KEY: misc_feature
<222> LOCATION: (2079)..(2079)
<223> OTHER INFORMATION: n is a, c, g, or t
<220> FEATURE:
<221> NAME/KEY: misc_feature
<222> LOCATION: (2082)..(2082)
<223> OTHER INFORMATION: n is a, c, g, or t
<220> FEATURE:
<221> NAME/KEY: misc_feature
<222> LOCATION: (2085)..(2085)
<223> OTHER INFORMATION: n is a, c, g, or t
<220> FEATURE:
<221> NAME/KEY: misc_feature
<222> LOCATION: (2091)..(2091)
<223> OTHER INFORMATION: n is a, c, g, or t
<220> FEATURE:
<221> NAME/KEY: misc_feature
<222> LOCATION: (2094)..(2094)
<223> OTHER INFORMATION: n is a, c, g, or t
<220> FEATURE:
<221> NAME/KEY: misc_feature
<222> LOCATION: (2103)..(2103)
<223> OTHER INFORMATION: n is a, c, g, or t
<220> FEATURE:
<221> NAME/KEY: misc_feature
<222> LOCATION: (2106)..(2106)
<223> OTHER INFORMATION: n is a, c, g, or t
<220> FEATURE:
<221> NAME/KEY: misc_feature
<222> LOCATION: (2133)..(2133)
<223> OTHER INFORMATION: n is a, c, g, or t
<220> FEATURE:
<221> NAME/KEY: misc_feature
<222> LOCATION: (2139)..(2139)
<223> OTHER INFORMATION: n is a, c, g, or t
<220> FEATURE:
<221> NAME/KEY: misc_feature
<222> LOCATION: (2151)..(2151)
<223> OTHER INFORMATION: n is a, c, g, or t
<220> FEATURE:
<221> NAME/KEY: misc_feature
<222> LOCATION: (2154)..(2154)
<223> OTHER INFORMATION: n is a, c, g, or t
<220> FEATURE:
<221> NAME/KEY: misc_feature
<222> LOCATION: (2169)..(2169)
<223> OTHER INFORMATION: n is a, c, g, or t
<220> FEATURE:
<221> NAME/KEY: misc_feature
<222> LOCATION: (2175)..(2175)
<223> OTHER INFORMATION: n is a, c, g, or t
<220> FEATURE:
<221> NAME/KEY: misc_feature
<222> LOCATION: (2178)..(2178)
<223> OTHER INFORMATION: n is a, c, g, or t
<220> FEATURE:
<221> NAME/KEY: misc_feature
<222> LOCATION: (2187)..(2187)
<223> OTHER INFORMATION: n is a, c, g, or t
```

-continued

```
<220> FEATURE:
<221> NAME/KEY: misc_feature
<222> LOCATION: (2190)..(2190)
<223> OTHER INFORMATION: n is a, c, g, or t
<220> FEATURE:
<221> NAME/KEY: misc_feature
<222> LOCATION: (2193)..(2193)
<223> OTHER INFORMATION: n is a, c, g, or t
<220> FEATURE:
<221> NAME/KEY: misc_feature
<222> LOCATION: (2199)..(2199)
<223> OTHER INFORMATION: n is a, c, g, or t
<220> FEATURE:
<221> NAME/KEY: misc_feature
<222> LOCATION: (2202)..(2202)
<223> OTHER INFORMATION: n is a, c, g, or t
<220> FEATURE:
<221> NAME/KEY: misc_feature
<222> LOCATION: (2205)..(2205)
<223> OTHER INFORMATION: n is a, c, g, or t
<220> FEATURE:
<221> NAME/KEY: misc_feature
<222> LOCATION: (2208)..(2208)
<223> OTHER INFORMATION: n is a, c, g, or t
<220> FEATURE:
<221> NAME/KEY: misc_feature
<222> LOCATION: (2214)..(2214)
<223> OTHER INFORMATION: n is a, c, g, or t
<220> FEATURE:
<221> NAME/KEY: misc_feature
<222> LOCATION: (2220)..(2220)
<223> OTHER INFORMATION: n is a, c, g, or t
<220> FEATURE:
<221> NAME/KEY: misc_feature
<222> LOCATION: (2223)..(2223)
<223> OTHER INFORMATION: n is a, c, g, or t
<220> FEATURE:
<221> NAME/KEY: misc_feature
<222> LOCATION: (2226)..(2226)
<223> OTHER INFORMATION: n is a, c, g, or t
<220> FEATURE:
<221> NAME/KEY: misc_feature
<222> LOCATION: (2235)..(2235)
<223> OTHER INFORMATION: n is a, c, g, or t
<220> FEATURE:
<221> NAME/KEY: misc_feature
<222> LOCATION: (2238)..(2238)
<223> OTHER INFORMATION: n is a, c, g, or t
<220> FEATURE:
<221> NAME/KEY: misc_feature
<222> LOCATION: (2244)..(2244)
<223> OTHER INFORMATION: n is a, c, g, or t
<220> FEATURE:
<221> NAME/KEY: misc_feature
<222> LOCATION: (2253)..(2253)
<223> OTHER INFORMATION: n is a, c, g, or t
<220> FEATURE:
<221> NAME/KEY: misc_feature
<222> LOCATION: (2262)..(2262)
<223> OTHER INFORMATION: n is a, c, g, or t
<220> FEATURE:
<221> NAME/KEY: misc_feature
<222> LOCATION: (2271)..(2271)
<223> OTHER INFORMATION: n is a, c, g, or t
<220> FEATURE:
<221> NAME/KEY: misc_feature
<222> LOCATION: (2274)..(2274)
<223> OTHER INFORMATION: n is a, c, g, or t
<220> FEATURE:
<221> NAME/KEY: misc_feature
<222> LOCATION: (2280)..(2280)
<223> OTHER INFORMATION: n is a, c, g, or t
<220> FEATURE:
<221> NAME/KEY: misc_feature
<222> LOCATION: (2283)..(2283)
<223> OTHER INFORMATION: n is a, c, g, or t
<220> FEATURE:
<221> NAME/KEY: misc_feature
<222> LOCATION: (2286)..(2286)
```

```
<223> OTHER INFORMATION: n is a, c, g, or t
<220> FEATURE:
<221> NAME/KEY: misc_feature
<222> LOCATION: (2295)..(2295)
<223> OTHER INFORMATION: n is a, c, g, or t
<220> FEATURE:
<221> NAME/KEY: misc_feature
<222> LOCATION: (2298)..(2298)
<223> OTHER INFORMATION: n is a, c, g, or t
<220> FEATURE:
<221> NAME/KEY: misc_feature
<222> LOCATION: (2307)..(2307)
<223> OTHER INFORMATION: n is a, c, g, or t
<220> FEATURE:
<221> NAME/KEY: misc_feature
<222> LOCATION: (2316)..(2316)
<223> OTHER INFORMATION: n is a, c, g, or t
<220> FEATURE:
<221> NAME/KEY: misc_feature
<222> LOCATION: (2322)..(2322)
<223> OTHER INFORMATION: n is a, c, g, or t
<220> FEATURE:
<221> NAME/KEY: misc_feature
<222> LOCATION: (2331)..(2331)
<223> OTHER INFORMATION: n is a, c, g, or t
<220> FEATURE:
<221> NAME/KEY: misc_feature
<222> LOCATION: (2334)..(2334)
<223> OTHER INFORMATION: n is a, c, g, or t
<220> FEATURE:
<221> NAME/KEY: misc_feature
<222> LOCATION: (2337)..(2337)
<223> OTHER INFORMATION: n is a, c, g, or t
<220> FEATURE:
<221> NAME/KEY: misc_feature
<222> LOCATION: (2340)..(2340)
<223> OTHER INFORMATION: n is a, c, g, or t
<220> FEATURE:
<221> NAME/KEY: misc_feature
<222> LOCATION: (2352)..(2352)
<223> OTHER INFORMATION: n is a, c, g, or t
<220> FEATURE:
<221> NAME/KEY: misc_feature
<222> LOCATION: (2355)..(2355)
<223> OTHER INFORMATION: n is a, c, g, or t
<220> FEATURE:
<221> NAME/KEY: misc_feature
<222> LOCATION: (2358)..(2358)
<223> OTHER INFORMATION: n is a, c, g, or t
<220> FEATURE:
<221> NAME/KEY: misc_feature
<222> LOCATION: (2361)..(2361)
<223> OTHER INFORMATION: n is a, c, g, or t
<220> FEATURE:
<221> NAME/KEY: misc_feature
<222> LOCATION: (2364)..(2364)
<223> OTHER INFORMATION: n is a, c, g, or t
<220> FEATURE:
<221> NAME/KEY: misc_feature
<222> LOCATION: (2370)..(2370)
<223> OTHER INFORMATION: n is a, c, g, or t
<220> FEATURE:
<221> NAME/KEY: misc_feature
<222> LOCATION: (2373)..(2373)
<223> OTHER INFORMATION: n is a, c, g, or t
<220> FEATURE:
<221> NAME/KEY: misc_feature
<222> LOCATION: (2382)..(2382)
<223> OTHER INFORMATION: n is a, c, g, or t
<220> FEATURE:
<221> NAME/KEY: misc_feature
<222> LOCATION: (2385)..(2385)
<223> OTHER INFORMATION: n is a, c, g, or t
<220> FEATURE:
<221> NAME/KEY: misc_feature
<222> LOCATION: (2391)..(2391)
<223> OTHER INFORMATION: n is a, c, g, or t
<220> FEATURE:
<221> NAME/KEY: misc_feature
```

```
<222> LOCATION: (2403)..(2403)
<223> OTHER INFORMATION: n is a, c, g, or t
<220> FEATURE:
<221> NAME/KEY: misc_feature
<222> LOCATION: (2406)..(2406)
<223> OTHER INFORMATION: n is a, c, g, or t
<220> FEATURE:
<221> NAME/KEY: misc_feature
<222> LOCATION: (2427)..(2427)
<223> OTHER INFORMATION: n is a, c, g, or t
<220> FEATURE:
<221> NAME/KEY: misc_feature
<222> LOCATION: (2433)..(2433)
<223> OTHER INFORMATION: n is a, c, g, or t
<220> FEATURE:
<221> NAME/KEY: misc_feature
<222> LOCATION: (2436)..(2436)
<223> OTHER INFORMATION: n is a, c, g, or t
<220> FEATURE:
<221> NAME/KEY: misc_feature
<222> LOCATION: (2451)..(2451)
<223> OTHER INFORMATION: n is a, c, g, or t
<220> FEATURE:
<221> NAME/KEY: misc_feature
<222> LOCATION: (2460)..(2460)
<223> OTHER INFORMATION: n is a, c, g, or t
<220> FEATURE:
<221> NAME/KEY: misc_feature
<222> LOCATION: (2466)..(2466)
<223> OTHER INFORMATION: n is a, c, g, or t
<220> FEATURE:
<221> NAME/KEY: misc_feature
<222> LOCATION: (2475)..(2475)
<223> OTHER INFORMATION: n is a, c, g, or t
<220> FEATURE:
<221> NAME/KEY: misc_feature
<222> LOCATION: (2478)..(2478)
<223> OTHER INFORMATION: n is a, c, g, or t
<220> FEATURE:
<221> NAME/KEY: misc_feature
<222> LOCATION: (2481)..(2481)
<223> OTHER INFORMATION: n is a, c, g, or t
<220> FEATURE:
<221> NAME/KEY: misc_feature
<222> LOCATION: (2487)..(2487)
<223> OTHER INFORMATION: n is a, c, g, or t
<220> FEATURE:
<221> NAME/KEY: misc_feature
<222> LOCATION: (2496)..(2496)
<223> OTHER INFORMATION: n is a, c, g, or t
<220> FEATURE:
<221> NAME/KEY: misc_feature
<222> LOCATION: (2499)..(2499)
<223> OTHER INFORMATION: n is a, c, g, or t
<220> FEATURE:
<221> NAME/KEY: misc_feature
<222> LOCATION: (2505)..(2505)
<223> OTHER INFORMATION: n is a, c, g, or t
<220> FEATURE:
<221> NAME/KEY: misc_feature
<222> LOCATION: (2508)..(2508)
<223> OTHER INFORMATION: n is a, c, g, or t
<220> FEATURE:
<221> NAME/KEY: misc_feature
<222> LOCATION: (2514)..(2514)
<223> OTHER INFORMATION: n is a, c, g, or t
<220> FEATURE:
<221> NAME/KEY: misc_feature
<222> LOCATION: (2517)..(2517)
<223> OTHER INFORMATION: n is a, c, g, or t
<220> FEATURE:
<221> NAME/KEY: misc_feature
<222> LOCATION: (2520)..(2520)
<223> OTHER INFORMATION: n is a, c, g, or t
<220> FEATURE:
<221> NAME/KEY: misc_feature
<222> LOCATION: (2532)..(2532)
<223> OTHER INFORMATION: n is a, c, g, or t
<220> FEATURE:
```

```
<221> NAME/KEY: misc_feature
<222> LOCATION: (2535)..(2535)
<223> OTHER INFORMATION: n is a, c, g, or t
<220> FEATURE:
<221> NAME/KEY: misc_feature
<222> LOCATION: (2538)..(2538)
<223> OTHER INFORMATION: n is a, c, g, or t
<220> FEATURE:
<221> NAME/KEY: misc_feature
<222> LOCATION: (2547)..(2547)
<223> OTHER INFORMATION: n is a, c, g, or t
<220> FEATURE:
<221> NAME/KEY: misc_feature
<222> LOCATION: (2550)..(2550)
<223> OTHER INFORMATION: n is a, c, g, or t
<220> FEATURE:
<221> NAME/KEY: misc_feature
<222> LOCATION: (2556)..(2556)
<223> OTHER INFORMATION: n is a, c, g, or t
<220> FEATURE:
<221> NAME/KEY: misc_feature
<222> LOCATION: (2562)..(2562)
<223> OTHER INFORMATION: n is a, c, g, or t
<220> FEATURE:
<221> NAME/KEY: misc_feature
<222> LOCATION: (2565)..(2565)
<223> OTHER INFORMATION: n is a, c, g, or t
<220> FEATURE:
<221> NAME/KEY: misc_feature
<222> LOCATION: (2571)..(2571)
<223> OTHER INFORMATION: n is a, c, g, or t
<220> FEATURE:
<221> NAME/KEY: misc_feature
<222> LOCATION: (2574)..(2574)
<223> OTHER INFORMATION: n is a, c, g, or t
<220> FEATURE:
<221> NAME/KEY: misc_feature
<222> LOCATION: (2577)..(2577)
<223> OTHER INFORMATION: n is a, c, g, or t
<220> FEATURE:
<221> NAME/KEY: misc_feature
<222> LOCATION: (2580)..(2580)
<223> OTHER INFORMATION: n is a, c, g, or t
<220> FEATURE:
<221> NAME/KEY: misc_feature
<222> LOCATION: (2607)..(2607)
<223> OTHER INFORMATION: n is a, c, g, or t
<220> FEATURE:
<221> NAME/KEY: misc_feature
<222> LOCATION: (2625)..(2625)
<223> OTHER INFORMATION: n is a, c, g, or t
<220> FEATURE:
<221> NAME/KEY: misc_feature
<222> LOCATION: (2628)..(2628)
<223> OTHER INFORMATION: n is a, c, g, or t
<220> FEATURE:
<221> NAME/KEY: misc_feature
<222> LOCATION: (2631)..(2631)
<223> OTHER INFORMATION: n is a, c, g, or t
<220> FEATURE:
<221> NAME/KEY: misc_feature
<222> LOCATION: (2634)..(2634)
<223> OTHER INFORMATION: n is a, c, g, or t
<220> FEATURE:
<221> NAME/KEY: misc_feature
<222> LOCATION: (2637)..(2637)
<223> OTHER INFORMATION: n is a, c, g, or t
<220> FEATURE:
<221> NAME/KEY: misc_feature
<222> LOCATION: (2643)..(2643)
<223> OTHER INFORMATION: n is a, c, g, or t
<220> FEATURE:
<221> NAME/KEY: misc_feature
<222> LOCATION: (2655)..(2655)
<223> OTHER INFORMATION: n is a, c, g, or t
<220> FEATURE:
<221> NAME/KEY: misc_feature
<222> LOCATION: (2658)..(2658)
<223> OTHER INFORMATION: n is a, c, g, or t
```

-continued

```
<220> FEATURE:
<221> NAME/KEY: misc_feature
<222> LOCATION: (2661)..(2661)
<223> OTHER INFORMATION: n is a, c, g, or t
<220> FEATURE:
<221> NAME/KEY: misc_feature
<222> LOCATION: (2664)..(2664)
<223> OTHER INFORMATION: n is a, c, g, or t
<220> FEATURE:
<221> NAME/KEY: misc_feature
<222> LOCATION: (2673)..(2673)
<223> OTHER INFORMATION: n is a, c, g, or t
<220> FEATURE:
<221> NAME/KEY: misc_feature
<222> LOCATION: (2676)..(2676)
<223> OTHER INFORMATION: n is a, c, g, or t
<220> FEATURE:
<221> NAME/KEY: misc_feature
<222> LOCATION: (2697)..(2697)
<223> OTHER INFORMATION: n is a, c, g, or t
<220> FEATURE:
<221> NAME/KEY: misc_feature
<222> LOCATION: (2700)..(2700)
<223> OTHER INFORMATION: n is a, c, g, or t
<220> FEATURE:
<221> NAME/KEY: misc_feature
<222> LOCATION: (2706)..(2706)
<223> OTHER INFORMATION: n is a, c, g, or t
<220> FEATURE:
<221> NAME/KEY: misc_feature
<222> LOCATION: (2709)..(2709)
<223> OTHER INFORMATION: n is a, c, g, or t
<220> FEATURE:
<221> NAME/KEY: misc_feature
<222> LOCATION: (2712)..(2712)
<223> OTHER INFORMATION: n is a, c, g, or t
<220> FEATURE:
<221> NAME/KEY: misc_feature
<222> LOCATION: (2718)..(2718)
<223> OTHER INFORMATION: n is a, c, g, or t
<220> FEATURE:
<221> NAME/KEY: misc_feature
<222> LOCATION: (2730)..(2730)
<223> OTHER INFORMATION: n is a, c, g, or t
<220> FEATURE:
<221> NAME/KEY: misc_feature
<222> LOCATION: (2739)..(2739)
<223> OTHER INFORMATION: n is a, c, g, or t
<220> FEATURE:
<221> NAME/KEY: misc_feature
<222> LOCATION: (2742)..(2742)
<223> OTHER INFORMATION: n is a, c, g, or t
<220> FEATURE:
<221> NAME/KEY: misc_feature
<222> LOCATION: (2748)..(2748)
<223> OTHER INFORMATION: n is a, c, g, or t
<220> FEATURE:
<221> NAME/KEY: misc_feature
<222> LOCATION: (2757)..(2757)
<223> OTHER INFORMATION: n is a, c, g, or t
<220> FEATURE:
<221> NAME/KEY: misc_feature
<222> LOCATION: (2760)..(2760)
<223> OTHER INFORMATION: n is a, c, g, or t
<220> FEATURE:
<221> NAME/KEY: misc_feature
<222> LOCATION: (2763)..(2763)
<223> OTHER INFORMATION: n is a, c, g, or t
<220> FEATURE:
<221> NAME/KEY: misc_feature
<222> LOCATION: (2766)..(2766)
<223> OTHER INFORMATION: n is a, c, g, or t
<220> FEATURE:
<221> NAME/KEY: misc_feature
<222> LOCATION: (2769)..(2769)
<223> OTHER INFORMATION: n is a, c, g, or t
<220> FEATURE:
<221> NAME/KEY: misc_feature
<222> LOCATION: (2778)..(2778)
```

```
<223> OTHER INFORMATION: n is a, c, g, or t
<220> FEATURE:
<221> NAME/KEY: misc_feature
<222> LOCATION: (2781)..(2781)
<223> OTHER INFORMATION: n is a, c, g, or t
<220> FEATURE:
<221> NAME/KEY: misc_feature
<222> LOCATION: (2787)..(2787)
<223> OTHER INFORMATION: n is a, c, g, or t
<220> FEATURE:
<221> NAME/KEY: misc_feature
<222> LOCATION: (2790)..(2790)
<223> OTHER INFORMATION: n is a, c, g, or t
<220> FEATURE:
<221> NAME/KEY: misc_feature
<222> LOCATION: (2799)..(2799)
<223> OTHER INFORMATION: n is a, c, g, or t
<220> FEATURE:
<221> NAME/KEY: misc_feature
<222> LOCATION: (2802)..(2802)
<223> OTHER INFORMATION: n is a, c, g, or t
<220> FEATURE:
<221> NAME/KEY: misc_feature
<222> LOCATION: (2808)..(2808)
<223> OTHER INFORMATION: n is a, c, g, or t
<220> FEATURE:
<221> NAME/KEY: misc_feature
<222> LOCATION: (2811)..(2811)
<223> OTHER INFORMATION: n is a, c, g, or t
<220> FEATURE:
<221> NAME/KEY: misc_feature
<222> LOCATION: (2814)..(2814)
<223> OTHER INFORMATION: n is a, c, g, or t
<220> FEATURE:
<221> NAME/KEY: misc_feature
<222> LOCATION: (2820)..(2820)
<223> OTHER INFORMATION: n is a, c, g, or t
<220> FEATURE:
<221> NAME/KEY: misc_feature
<222> LOCATION: (2823)..(2823)
<223> OTHER INFORMATION: n is a, c, g, or t
<220> FEATURE:
<221> NAME/KEY: misc_feature
<222> LOCATION: (2826)..(2826)
<223> OTHER INFORMATION: n is a, c, g, or t
<220> FEATURE:
<221> NAME/KEY: misc_feature
<222> LOCATION: (2841)..(2841)
<223> OTHER INFORMATION: n is a, c, g, or t
<220> FEATURE:
<221> NAME/KEY: misc_feature
<222> LOCATION: (2847)..(2847)
<223> OTHER INFORMATION: n is a, c, g, or t
<220> FEATURE:
<221> NAME/KEY: misc_feature
<222> LOCATION: (2859)..(2859)
<223> OTHER INFORMATION: n is a, c, g, or t
<220> FEATURE:
<221> NAME/KEY: misc_feature
<222> LOCATION: (2862)..(2862)
<223> OTHER INFORMATION: n is a, c, g, or t
<220> FEATURE:
<221> NAME/KEY: misc_feature
<222> LOCATION: (2865)..(2865)
<223> OTHER INFORMATION: n is a, c, g, or t
<220> FEATURE:
<221> NAME/KEY: misc_feature
<222> LOCATION: (2868)..(2868)
<223> OTHER INFORMATION: n is a, c, g, or t
<220> FEATURE:
<221> NAME/KEY: misc_feature
<222> LOCATION: (2871)..(2871)
<223> OTHER INFORMATION: n is a, c, g, or t
<220> FEATURE:
<221> NAME/KEY: misc_feature
<222> LOCATION: (2889)..(2889)
<223> OTHER INFORMATION: n is a, c, g, or t
<220> FEATURE:
<221> NAME/KEY: misc_feature
```

-continued

```
<222> LOCATION: (2895)..(2895)
<223> OTHER INFORMATION: n is a, c, g, or t
<220> FEATURE:
<221> NAME/KEY: misc_feature
<222> LOCATION: (2898)..(2898)
<223> OTHER INFORMATION: n is a, c, g, or t
<220> FEATURE:
<221> NAME/KEY: misc_feature
<222> LOCATION: (2901)..(2901)
<223> OTHER INFORMATION: n is a, c, g, or t
<220> FEATURE:
<221> NAME/KEY: misc_feature
<222> LOCATION: (2904)..(2904)
<223> OTHER INFORMATION: n is a, c, g, or t
<220> FEATURE:
<221> NAME/KEY: misc_feature
<222> LOCATION: (2907)..(2907)
<223> OTHER INFORMATION: n is a, c, g, or t
<220> FEATURE:
<221> NAME/KEY: misc_feature
<222> LOCATION: (2916)..(2916)
<223> OTHER INFORMATION: n is a, c, g, or t
<220> FEATURE:
<221> NAME/KEY: misc_feature
<222> LOCATION: (2928)..(2928)
<223> OTHER INFORMATION: n is a, c, g, or t
<220> FEATURE:
<221> NAME/KEY: misc_feature
<222> LOCATION: (2931)..(2931)
<223> OTHER INFORMATION: n is a, c, g, or t
<220> FEATURE:
<221> NAME/KEY: misc_feature
<222> LOCATION: (2937)..(2937)
<223> OTHER INFORMATION: n is a, c, g, or t
<220> FEATURE:
<221> NAME/KEY: misc_feature
<222> LOCATION: (2940)..(2940)
<223> OTHER INFORMATION: n is a, c, g, or t
<220> FEATURE:
<221> NAME/KEY: misc_feature
<222> LOCATION: (2946)..(2946)
<223> OTHER INFORMATION: n is a, c, g, or t
<220> FEATURE:
<221> NAME/KEY: misc_feature
<222> LOCATION: (2949)..(2949)
<223> OTHER INFORMATION: n is a, c, g, or t
<220> FEATURE:
<221> NAME/KEY: misc_feature
<222> LOCATION: (2952)..(2952)
<223> OTHER INFORMATION: n is a, c, g, or t
<220> FEATURE:
<221> NAME/KEY: misc_feature
<222> LOCATION: (2958)..(2958)
<223> OTHER INFORMATION: n is a, c, g, or t
<220> FEATURE:
<221> NAME/KEY: misc_feature
<222> LOCATION: (2961)..(2961)
<223> OTHER INFORMATION: n is a, c, g, or t
<220> FEATURE:
<221> NAME/KEY: misc_feature
<222> LOCATION: (2964)..(2964)
<223> OTHER INFORMATION: n is a, c, g, or t
<220> FEATURE:
<221> NAME/KEY: misc_feature
<222> LOCATION: (2976)..(2976)
<223> OTHER INFORMATION: n is a, c, g, or t
<220> FEATURE:
<221> NAME/KEY: misc_feature
<222> LOCATION: (2979)..(2979)
<223> OTHER INFORMATION: n is a, c, g, or t
<220> FEATURE:
<221> NAME/KEY: misc_feature
<222> LOCATION: (2982)..(2982)
<223> OTHER INFORMATION: n is a, c, g, or t
<220> FEATURE:
<221> NAME/KEY: misc_feature
<222> LOCATION: (2985)..(2985)
<223> OTHER INFORMATION: n is a, c, g, or t
<220> FEATURE:
```

```
<221> NAME/KEY: misc_feature
<222> LOCATION: (2988)..(2988)
<223> OTHER INFORMATION: n is a, c, g, or t
<220> FEATURE:
<221> NAME/KEY: misc_feature
<222> LOCATION: (3015)..(3015)
<223> OTHER INFORMATION: n is a, c, g, or t
<220> FEATURE:
<221> NAME/KEY: misc_feature
<222> LOCATION: (3024)..(3024)
<223> OTHER INFORMATION: n is a, c, g, or t
<220> FEATURE:
<221> NAME/KEY: misc_feature
<222> LOCATION: (3027)..(3027)
<223> OTHER INFORMATION: n is a, c, g, or t
<220> FEATURE:
<221> NAME/KEY: misc_feature
<222> LOCATION: (3054)..(3054)
<223> OTHER INFORMATION: n is a, c, g, or t
<220> FEATURE:
<221> NAME/KEY: misc_feature
<222> LOCATION: (3060)..(3060)
<223> OTHER INFORMATION: n is a, c, g, or t
<220> FEATURE:
<221> NAME/KEY: misc_feature
<222> LOCATION: (3066)..(3066)
<223> OTHER INFORMATION: n is a, c, g, or t
<220> FEATURE:
<221> NAME/KEY: misc_feature
<222> LOCATION: (3072)..(3072)
<223> OTHER INFORMATION: n is a, c, g, or t
<220> FEATURE:
<221> NAME/KEY: misc_feature
<222> LOCATION: (3078)..(3078)
<223> OTHER INFORMATION: n is a, c, g, or t
<220> FEATURE:
<221> NAME/KEY: misc_feature
<222> LOCATION: (3081)..(3081)
<223> OTHER INFORMATION: n is a, c, g, or t
<220> FEATURE:
<221> NAME/KEY: misc_feature
<222> LOCATION: (3084)..(3084)
<223> OTHER INFORMATION: n is a, c, g, or t
<220> FEATURE:
<221> NAME/KEY: misc_feature
<222> LOCATION: (3087)..(3087)
<223> OTHER INFORMATION: n is a, c, g, or t
<220> FEATURE:
<221> NAME/KEY: misc_feature
<222> LOCATION: (3093)..(3093)
<223> OTHER INFORMATION: n is a, c, g, or t
<220> FEATURE:
<221> NAME/KEY: misc_feature
<222> LOCATION: (3096)..(3096)
<223> OTHER INFORMATION: n is a, c, g, or t
<220> FEATURE:
<221> NAME/KEY: misc_feature
<222> LOCATION: (3099)..(3099)
<223> OTHER INFORMATION: n is a, c, g, or t
<220> FEATURE:
<221> NAME/KEY: misc_feature
<222> LOCATION: (3102)..(3102)
<223> OTHER INFORMATION: n is a, c, g, or t
<220> FEATURE:
<221> NAME/KEY: misc_feature
<222> LOCATION: (3105)..(3105)
<223> OTHER INFORMATION: n is a, c, g, or t
<220> FEATURE:
<221> NAME/KEY: misc_feature
<222> LOCATION: (3111)..(3111)
<223> OTHER INFORMATION: n is a, c, g, or t
<220> FEATURE:
<221> NAME/KEY: misc_feature
<222> LOCATION: (3114)..(3114)
<223> OTHER INFORMATION: n is a, c, g, or t
<220> FEATURE:
<221> NAME/KEY: misc_feature
<222> LOCATION: (3126)..(3126)
<223> OTHER INFORMATION: n is a, c, g, or t
```

```
<220> FEATURE:
<221> NAME/KEY: misc_feature
<222> LOCATION: (3153)..(3153)
<223> OTHER INFORMATION: n is a, c, g, or t
<220> FEATURE:
<221> NAME/KEY: misc_feature
<222> LOCATION: (3159)..(3159)
<223> OTHER INFORMATION: n is a, c, g, or t
<220> FEATURE:
<221> NAME/KEY: misc_feature
<222> LOCATION: (3162)..(3162)
<223> OTHER INFORMATION: n is a, c, g, or t
<220> FEATURE:
<221> NAME/KEY: misc_feature
<222> LOCATION: (3168)..(3168)
<223> OTHER INFORMATION: n is a, c, g, or t
<220> FEATURE:
<221> NAME/KEY: misc_feature
<222> LOCATION: (3174)..(3174)
<223> OTHER INFORMATION: n is a, c, g, or t
<220> FEATURE:
<221> NAME/KEY: misc_feature
<222> LOCATION: (3177)..(3177)
<223> OTHER INFORMATION: n is a, c, g, or t
<220> FEATURE:
<221> NAME/KEY: misc_feature
<222> LOCATION: (3180)..(3180)
<223> OTHER INFORMATION: n is a, c, g, or t
<220> FEATURE:
<221> NAME/KEY: misc_feature
<222> LOCATION: (3201)..(3201)
<223> OTHER INFORMATION: n is a, c, g, or t
<220> FEATURE:
<221> NAME/KEY: misc_feature
<222> LOCATION: (3210)..(3210)
<223> OTHER INFORMATION: n is a, c, g, or t
<220> FEATURE:
<221> NAME/KEY: misc_feature
<222> LOCATION: (3222)..(3222)
<223> OTHER INFORMATION: n is a, c, g, or t
<220> FEATURE:
<221> NAME/KEY: misc_feature
<222> LOCATION: (3225)..(3225)
<223> OTHER INFORMATION: n is a, c, g, or t
<220> FEATURE:
<221> NAME/KEY: misc_feature
<222> LOCATION: (3228)..(3228)
<223> OTHER INFORMATION: n is a, c, g, or t
<220> FEATURE:
<221> NAME/KEY: misc_feature
<222> LOCATION: (3231)..(3231)
<223> OTHER INFORMATION: n is a, c, g, or t
<220> FEATURE:
<221> NAME/KEY: misc_feature
<222> LOCATION: (3234)..(3234)
<223> OTHER INFORMATION: n is a, c, g, or t
<220> FEATURE:
<221> NAME/KEY: misc_feature
<222> LOCATION: (3240)..(3240)
<223> OTHER INFORMATION: n is a, c, g, or t
<220> FEATURE:
<221> NAME/KEY: misc_feature
<222> LOCATION: (3249)..(3249)
<223> OTHER INFORMATION: n is a, c, g, or t
<220> FEATURE:
<221> NAME/KEY: misc_feature
<222> LOCATION: (3258)..(3258)
<223> OTHER INFORMATION: n is a, c, g, or t
<220> FEATURE:
<221> NAME/KEY: misc_feature
<222> LOCATION: (3264)..(3264)
<223> OTHER INFORMATION: n is a, c, g, or t
<220> FEATURE:
<221> NAME/KEY: misc_feature
<222> LOCATION: (3279)..(3279)
<223> OTHER INFORMATION: n is a, c, g, or t
<220> FEATURE:
<221> NAME/KEY: misc_feature
<222> LOCATION: (3282)..(3282)
```

<223> OTHER INFORMATION: n is a, c, g, or t
<220> FEATURE:
<221> NAME/KEY: misc_feature
<222> LOCATION: (3285)..(3285)
<223> OTHER INFORMATION: n is a, c, g, or t
<220> FEATURE:
<221> NAME/KEY: misc_feature
<222> LOCATION: (3288)..(3288)
<223> OTHER INFORMATION: n is a, c, g, or t
<220> FEATURE:
<221> NAME/KEY: misc_feature
<222> LOCATION: (3291)..(3291)
<223> OTHER INFORMATION: n is a, c, g, or t

<400> SEQUENCE: 4
atggcnaart ayggngarca ygargcnwsn ccngayaayg gncaraayga rttywsngay 60
athathaarw snmgnwsnga ygarcayaay gaygtncara araaracntt yacnaartgg 120
athaaygcnm gnttywsnaa rwsnggnaar ccnccnatha aygayatgtt yacngayytn 180
aargayggnm gnaarytnyt ngayytnytn gargggnytna cnggnacnws nytnccnaar 240
garmgnggnw snacnmgngt ncaygcnytn aayaaygtna aymgngtnyt ncargtnytn 300
caycaraaya aygtngaryt ngtnaayath ggnggnacng ayathgtnga yggnaaycay 360
aarytnacny tnggnytnyt ntggwsnath athytncayt ggcargtnaa rgaygtnatg 420
aargaygtna tgwsngayyt ncarcaracn aaywsngara arathytnyt nwsntgggtn 480
mgncaracna cnmgnccnta ywsncargtn aaygtnytna ayttyacnac nwsntggacn 540
gayggnytng cnttyaaygc ngtnytncay mgncayaarc cngayytntt ywsntgggay 600
aargtngtna aratgwsncc nathgarmgn ytngarcayg cnttywsnaa rgcncaracn 660
tayytnggna thgaraaryt nytngayccn gargaygtng cngtncaryt nccngayaar 720
aarwsnatha thatgtayyt nacnwsnytn ttygargtny tnccncarca rgtnacnath 780
gaygcnathm gngargtnga racnytnccn mgnaartaya araargartg ygargargar 840
gcnathaaya thcarwsnac ngcnccngar gargarcayg arwsnccnmg ngcngaracn 900
ccnwsnacng tnacngargt ngayatggay ytngaywsnt aycarathgc nytngargar 960
gtnytnacnt ggytnytnws ngcngargay acnttycarg arcargayga yathwsngay 1020
gaygtngarg argtnaarga ycarttygcn acncaygarg cnttyatgat ggarytnacn 1080
gcncaycarw snwsngtngg nwsngtnytn cargcnggna aycarytnat hacncarggn 1140
acnytnwsng aygargarga rttygarath cargarcara tgacnytnyt naaygcnmgn 1200
tgggargcny tnmgngtnga rwsnatggay mgncarwsnm gnytncayga ygtnytnatg 1260
garytncara araarcaryt ncarcarytn wsngcntgga thcargargc ngaracnacn 1320
gtnaaygtny tngtngaygc nwsncaymgn garaaygcny tncargayws nathytngcn 1380
mgngarytna arcarcarat gcargayath cargcngara thgaygcnca ycargtnaar 1440
gtnaaywsny tnacncayat ggtngtnath gtngaygara aywsnggnga rwsngcnacn 1500
gcnathytng argaycaryt ncaraarytn ggngarmgnt ggaaygayyt naargcnaar 1560
wsngcnwsna thmgngcnca yytngargcn wsngcngara artggaaymg nytnytnatg 1620
wsnytngarg arytnathaa rtggytnaay atgaargayg argarytnaa raarcaratg 1680
ccnathggng gngaygtncc ngcnytncar ytncartayg aycaytgyaa rgcnytnmgn 1740
mgngarytna argaraarga rtaywsngtn ytnaaygcng tngaycargc nmgngtntty 1800
ytngcngayc arccnathga rgcnccngar garccnmgnm gnaayytnca rwsnaaracn 1860
garytnacnc cngargarmg ngcncaraar athgcnaarg cnatgmgnaa rcarwsnwsn 1920

```
gargtnaarg araartggga rwsnytnaay gcngtnacnw snaaytggca raarcargtn    1980
gayaargcny tngaraaryt nmgngayytn carggngcna tggaygayyt ngaygcngay    2040
atgaargarg cngarwsngt nmgnaayggn tggaarccng tggngayyt nytnathgay     2100 wsnytncarg aycayathga raarathatg gcnttymgng argarathgc nccnathaay    2160
ttyaargtna aracngtnaa ygayytnwsn wsncarytnw snccnytnga yytncayccn    2220
wsnytnaara tgwsnmgnca rytngaygay ytnaayatgm gntggaaryt nytncargtn    2280
wsngtngayg aymgnytnaa rcarytncar gargcncaym gngayttygg ccnwsnwsn     2340 carcayttyy tnwsnacnws ngtncarytn ccntggcarm gnwsnathws ncayaayaar    2400
gtnccntayt ayathaayca ycaracncar acnacntgyt gggaycaycc naaratgacn    2460
garytnttyc arwsnytngc ngayytnaay aaygtnmgnt tywsngcnta ymgnacngcn    2520
athaarathm gnmgnytnca raargcnytn tgyytngayy tnytngaryt nwsnacnacn    2580
aaygaratht tyaarcarca yaarytnaay caraaygayc arytnytnws ngtnccngay    2640
gtnathaayt gyytnacnac nacntaygay ggnytngarc aratgcayaa rgayytngtn    2700
aaygtnccny tntgygtnga yatgtgyytn aaytggytny tnaaygtnta ygaycacnggn   2760 mgnacnggna arathmgngt ncarwsnytn aarathggny tnatgwsnyt nwsnaarggn    2820
ytnytngarg araartaymg ntayytntty aargargtng cnggnccnac ngaratgtgy    2880
gaycarmgnc arytnggnyt nytnytncay gaygcnathc arathccnmg ncarytnggn    2940
gargtngcng cnttyggngg nwsnaayath garccnwsng tnmgnwsntg yttycarcar    3000
aayaayaaya arccngarat hwsngtnaar garttyathg aytggatgca yytngarccn    3060
carwsnatgg tntggytncc ngtnytncay mgngtngcng cngcngarac ngcnaarcay    3120
cargcnaart gyaayathtg yaargartgy ccnathgtng gnttymgnta ymgnwsnytn    3180
aarcayttya aytaygaygt ntgycarwsn tgyttyttyw snggnmgnac ngcnaarggn    3240
cayaarytnc aytayccnat ggtngartay tgyathccna cnacnwsngg ngar          3294
```

<210> SEQ ID NO 5
<211> LENGTH: 1108
<212> TYPE: PRT
<213> ORGANISM: Artificial Sequence
<220> FEATURE:
<223> OTHER INFORMATION: amino acid sequence of nano-utrophin-2

<400> SEQUENCE: 5

```
Met Ala Lys Tyr Gly Glu His Glu Ala Ser Pro Asp Asn Gly Gln Asn
1               5                   10                  15

Glu Phe Ser Asp Ile Ile Lys Ser Arg Ser Asp Glu His Asn Asp Val
            20                  25                  30

Gln Lys Lys Thr Phe Thr Lys Trp Ile Asn Ala Arg Phe Ser Lys Ser
        35                  40                  45

Gly Lys Pro Pro Ile Asn Asp Met Phe Thr Asp Leu Lys Asp Gly Arg
    50                  55                  60

Lys Leu Leu Asp Leu Leu Glu Gly Leu Thr Gly Thr Ser Leu Pro Lys
65                  70                  75                  80

Glu Arg Gly Ser Thr Arg Val His Ala Leu Asn Val Asn Arg Val
                85                  90                  95

Leu Gln Val Leu His Gln Asn Asn Val Glu Leu Val Asn Ile Gly Gly
            100                 105                 110

Thr Asp Ile Val Asp Gly Asn His Lys Leu Thr Leu Gly Leu Leu Trp
```

```
            115                 120                 125
Ser Ile Ile Leu His Trp Gln Val Lys Asp Val Met Lys Asp Val Met
    130                 135                 140

Ser Asp Leu Gln Gln Thr Asn Ser Glu Lys Ile Leu Leu Ser Trp Val
145                 150                 155                 160

Arg Gln Thr Thr Arg Pro Tyr Ser Gln Val Asn Val Leu Asn Phe Thr
                165                 170                 175

Thr Ser Trp Thr Asp Gly Leu Ala Phe Asn Ala Val Leu His Arg His
            180                 185                 190

Lys Pro Asp Leu Phe Ser Trp Asp Lys Val Val Lys Met Ser Pro Ile
        195                 200                 205

Glu Arg Leu Glu His Ala Phe Ser Lys Ala Gln Thr Tyr Leu Gly Ile
    210                 215                 220

Glu Lys Leu Leu Asp Pro Glu Asp Val Ala Val Gln Leu Pro Asp Lys
225                 230                 235                 240

Lys Ser Ile Ile Met Tyr Leu Thr Ser Leu Phe Glu Val Leu Pro Gln
                245                 250                 255

Gln Val Thr Ile Asp Ala Ile Arg Glu Val Glu Thr Leu Pro Arg Lys
            260                 265                 270

Tyr Lys Lys Glu Cys Glu Glu Ala Ile Asn Ile Gln Ser Thr Ala
        275                 280                 285

Pro Glu Glu His Glu Ser Pro Arg Ala Glu Thr Pro Ser Thr Val
    290                 295                 300

Thr Glu Val Asp Met Asp Leu Asp Ser Tyr Gln Ile Ala Leu Glu Glu
305                 310                 315                 320

Val Leu Thr Trp Leu Leu Ser Ala Glu Asp Thr Phe Gln Glu Gln Asp
                325                 330                 335

Asp Ile Ser Asp Asp Val Glu Glu Val Lys Asp Gln Phe Ala Thr His
            340                 345                 350

Glu Ala Phe Met Met Glu Leu Thr Ala His Gln Ser Ser Val Gly Ser
        355                 360                 365

Val Leu Gln Ala Gly Asn Gln Leu Ile Thr Gln Gly Thr Leu Ser Asp
    370                 375                 380

Glu Glu Glu Phe Glu Ile Gln Glu Gln Met Thr Leu Leu Asn Ala Arg
385                 390                 395                 400

Trp Glu Ala Leu Arg Val Glu Ser Met Asp Arg Gln Ser Arg Leu His
                405                 410                 415

Asp Val Leu Met Glu Leu Gln Lys Lys Gln Leu Gln Gln Leu Ser Ala
            420                 425                 430

Trp Ile Gln Glu Ala Glu Thr Thr Val Asn Val Leu Val Asp Ala Ser
        435                 440                 445

His Arg Glu Asn Ala Leu Gln Asp Ser Ile Leu Ala Arg Glu Leu Lys
    450                 455                 460

Gln Gln Met Gln Asp Ile Gln Ala Glu Ile Asp Ala His Gln Val Lys
465                 470                 475                 480

Val Asn Ser Leu Thr His Met Val Val Ile Val Asp Glu Asn Ser Gly
                485                 490                 495

Glu Ser Ala Thr Ala Ile Leu Glu Asp Gln Leu Gln Lys Leu Gly Glu
            500                 505                 510

Arg Trp Asn Asp Leu Lys Ala Lys Ser Ala Ser Ile Arg Ala His Leu
        515                 520                 525

Glu Ala Ser Ala Glu Lys Trp Asn Arg Leu Leu Met Ser Leu Glu Glu
    530                 535                 540
```

```
Leu Ile Lys Trp Leu Asn Met Lys Asp Glu Glu Leu Lys Lys Gln Met
545                 550                 555                 560

Pro Ile Gly Gly Asp Val Pro Ala Leu Gln Leu Gln Tyr Asp His Cys
                565                 570                 575

Lys Ala Leu Arg Arg Glu Leu Lys Glu Lys Glu Tyr Ser Val Leu Asn
            580                 585                 590

Ala Val Asp Gln Ala Arg Val Phe Leu Ala Asp Gln Pro Ile Glu Ala
        595                 600                 605

Pro Glu Glu Pro Arg Arg Asn Leu Gln Ser Lys Thr Glu Leu Thr Pro
    610                 615                 620

Glu Glu Arg Ala Gln Lys Ile Ala Lys Ala Met Arg Lys Gln Ser Ser
625                 630                 635                 640

Glu Val Lys Glu Lys Trp Glu Ser Leu Asn Ala Val Thr Ser Asn Trp
                645                 650                 655

Gln Lys Gln Val Asp Lys Ala Leu Glu Lys Leu Arg Asp Leu Gln Gly
                660                 665                 670

Ala Met Asp Asp Leu Asp Ala Asp Met Lys Glu Ala Glu Ser Val Arg
            675                 680                 685

Asn Gly Trp Lys Pro Val Gly Asp Leu Leu Ile Asp Ser Leu Gln Asp
690                 695                 700

His Ile Glu Lys Ile Met Ala Phe Arg Glu Glu Ile Ala Pro Ile Asn
705                 710                 715                 720

Phe Lys Val Lys Thr Val Asn Asp Leu Ser Ser Gln Leu Ser Pro Leu
                725                 730                 735

Asp Leu His Pro Ser Leu Lys Met Ser Arg Gln Leu Asp Asp Leu Asn
                740                 745                 750

Met Arg Trp Lys Leu Leu Gln Val Ser Val Asp Asp Arg Leu Lys Gln
            755                 760                 765

Leu Gln Glu Ala His Arg Asp Phe Gly Pro Ser Ser Gln His Phe Leu
    770                 775                 780

Ser Thr Ser Val Gln Leu Pro Trp Gln Arg Ser Ile Ser His Asn Lys
785                 790                 795                 800

Val Pro Tyr Tyr Ile Asn His Gln Thr Gln Thr Thr Cys Trp Asp His
                805                 810                 815

Pro Lys Met Thr Glu Leu Phe Gln Ser Leu Ala Asp Leu Asn Asn Val
                820                 825                 830

Arg Phe Ser Ala Tyr Arg Thr Ala Ile Lys Ile Arg Arg Leu Gln Lys
            835                 840                 845

Ala Leu Cys Leu Asp Leu Leu Glu Leu Ser Thr Thr Asn Glu Ile Phe
850                 855                 860

Lys Gln His Lys Leu Asn Gln Asn Asp Gln Leu Leu Ser Val Pro Asp
865                 870                 875                 880

Val Ile Asn Cys Leu Thr Thr Thr Tyr Asp Gly Leu Glu Gln Met His
                885                 890                 895

Lys Asp Leu Val Asn Val Pro Leu Cys Val Asp Met Cys Leu Asn Trp
            900                 905                 910

Leu Leu Asn Val Tyr Asp Thr Gly Arg Thr Gly Lys Ile Arg Val Gln
        915                 920                 925

Ser Leu Lys Ile Gly Leu Met Ser Leu Ser Lys Gly Leu Leu Glu Glu
    930                 935                 940

Lys Tyr Arg Tyr Leu Phe Lys Glu Val Ala Gly Pro Thr Glu Met Cys
945                 950                 955                 960
```

```
Asp Gln Arg Gln Leu Gly Leu Leu Leu His Asp Ala Ile Gln Ile Pro
                965                 970                 975

Arg Gln Leu Gly Glu Val Ala Ala Phe Gly Gly Ser Asn Ile Glu Pro
            980                 985                 990

Ser Val Arg Ser Cys Phe Gln Gln Asn Asn Asn Lys Pro Glu Ile Ser
        995                 1000                1005

Val Lys Glu Phe Ile Asp Trp Met His Leu Glu Pro Gln Ser Met
    1010                1015                1020

Val Trp Leu Pro Val Leu His Arg Val Ala Ala Ala Glu Thr Ala
    1025                1030                1035

Lys His Gln Ala Lys Cys Asn Ile Cys Lys Glu Cys Pro Ile Val
    1040                1045                1050

Gly Phe Arg Tyr Arg Ser Leu Lys His Phe Asn Tyr Asp Val Cys
    1055                1060                1065

Gln Ser Cys Phe Phe Ser Gly Arg Thr Ala Lys Gly His Lys Leu
    1070                1075                1080

His Tyr Pro Met Val Glu Tyr Cys Ile Pro Thr Thr Ser Gly Glu
    1085                1090                1095

Asp Val Arg Asp Phe Thr Lys Val Leu Lys
    1100                1105
```

<210> SEQ ID NO 6
<211> LENGTH: 3327
<212> TYPE: DNA
<213> ORGANISM: Artificial Sequence
<220> FEATURE:
<223> OTHER INFORMATION: nucleic acid sequence encoding nano-utrophin-2 protein

<400> SEQUENCE: 6

```
atggctaagt atggcgagca tgaggcttct cccgacaacg ccagaacga gttctccgac      60 atcatcaagt cccgctccga cgagcacaac gacgtgcaga agaaaacctt caccaagtgg    120
atcaacgcca ggttctccaa gtccggcaag cctcctatca cgacatgtt caccgacctg     180 aaggacggcc gcaaactgct ggatctgctg gaaggactga ccggcacctc tctgcctaaa    240
gaaaggggct ctactagggt gcacgccctg aacaatgtga caggggtgct ccaggtgctg    300
caccagaaca cgtcgagct ggtcaatatc ggcggcaccg acatcgtgga tggcaaccat     360
aagctgaccc tgggcctgct gtggtccatc attctgcact ggcaggtcaa agacgtgatg    420
aaggacgtga tgtccgacct ccagcagacc aactccgaga gatcctgct gtcttgggtc     480 cgccagacca ctaggcccta ttctcaggtc aacgtgctga cttcaccac ctcttggacc     540 gacggactgg ccttcaatgc tgtgctgcac aggcacaagc ccgacctgtt ctcttgggac    600
aaagtggtca gatgagccc catcgagagg ctggaacacg ccttctctaa ggcccagacc    660
tacctgggaa tcgagaagct gctggaccct gaggatgtgg cagtgcagct gcccgacaag    720
aaatccatca tcatgtacct gaccagcctg ttcgaggtgc tgcctcagca ggtcacaatt    780
gatgccatcc gcgaggtgga aaccctgcct cgcaagtaca agaaagagtg cgaggaagag    840
gccatcaaca tccagtccac tgctcccgag gaagaacacg agtctccaag ggccgagact    900
ccttccaccg tgactgaagt ggacatggac ctggactcct accagatcgc tctggaagag    960
gtgctgactt ggctgctgtc cgccgaggat actttccagg aacaggacga catctccgac   1020
gacgtcgagg aagtgaagga ccagttcgcc actcacgagg ctttcatgat ggaactgact   1080
gcccaccagt cctccgtggg aagtgtcctc caggctggaa accagctgat cacccaggga   1140
```

```
accctgtccg atgaggaaga gttcgagatt caggaacaga tgaccctgct gaacgccaga    1200
tgggaagctc tgagggtcga gtccatggat aggcagtcta ggctgcacga cgtgctcatg    1260
gaactccaga agaagcagct ccagcagctg tccgcttgga tccaggaagc cgagactacc    1320
gtcaatgtgc tggtggacgc ctctcacaga gagaacgccc tccaggattc catcctggct    1380
agggaactga agcagcagat gcaggacatc caggccgaga tcgacgctca ccaggtcaaa    1440
gtgaactccc tgactcacat ggtggtcatc gtggacgaga attccggcga gtctgccacc    1500
gctatcctgg aagatcagct ccagaaactg ggcgagcgct ggaacgatct gaaggctaag    1560
tccgcctcta tcagggccca tctggaagcc tctgccgaga gtggaatag ctgctgatg     1620
tccctggaag aactgatcaa gtggctgaac atgaaggatg aggaactcaa gaaacagatg    1680
cccatcggag cgacgtgcc agctctccag ctccagtatg atcattgcaa ggctctgagg     1740
cgcgagctga agagaaaga gtactccgtc ctgaacgccg tggatcaggc tagggtgttc     1800
ctggccgatc agcctattga ggctcctgag gaacctaggc ggaacctcca gtccaagacc    1860
gagctgactc tgaagagag ggcccagaaa atcgccaagg ctatgcgcaa gcagtccagc     1920
gaagtcaaag agaagtggga gtccctgaat gccgtgacct ccaactggca gaaacaggtg    1980
gacaaggccc tggaaaagct gagggatctc cagggcgcta tggacgacct ggacgccgat    2040
atgaaggaag ctgagtccgt cagaaacggc tggaagccag tgggagatct gctgattgat    2100
agcctccagg accacattga agatcatg gccttcaggg aagagatcgc ccctatcaac      2160
ttcaaagtca agaccgtgaa cgacctgtcc agccagctga gccctctgga tctccatcca    2220
agcctgaaga tgagcaggca gctggatgac ctgaacatgc gctggaaact cctccaggtg    2280
tccgtggacg ataggctgaa acagctccag gaagctcaca gagacttcgg ccctagctct    2340
cagcacttcc tgtctacctc tgtgcagctc ccttggcagc gctccatctc tcacaacaag    2400
gtgccctact acatcaacca ccagactcag accacctgtt gggatcaccc caagatgact    2460
gagctgttcc agagcctggc cgacctcaac aatgtgcgct tctccgccta taggaccgcc    2520
atcaaaatca ggcgcctcca gaaagccctg tgcctggacc tgctcgaact gtccaccacc    2580
aacgagatct tcaagcagca aagctgaac cagaacgacc agctgctgtc tgtgcccgac      2640
gtgatcaatt gcctgaccac cacctacgac gggctcgaac agatgcacaa ggatctcgtg    2700
aatgtgcctc tgtgcgtgga catgtgcctg aactggctgc tgaatgtgta cgataccggc    2760
aggaccggca agatcagggt gcagtctctg aagatcggcc tgatgagcct gagcaagggg    2820
ctgctcgaag agaagtaccg ctacctgttc aaagaggtgg caggccctac cgagatgtgc    2880
gatcagagac agctgggact gctgctgcac gatgccattc agattcctcg ccagctggga    2940
gaagtggccg ccttcggagg atctaatatc gagccttccg tgcgctcctg ctttcagcag    3000
aacaacaaca agcctgagat ctccgtgaaa gaattcatcg actggatgca cctggaacct    3060
cagagcatgg tctggctgcc agtcctgcat agagtggctg ctgctgagac tgccaagcac    3120
caggccaagt gcaacatctg caaagagtgc cctatcgtcg gcttccgcta tcgctccctg    3180
aagcacttca actacgacgt gtgccagagt tgcttctttt ccggacgcac cgccaagggc    3240
cacaagctgc attaccctat ggtcgagtac tgcatcccta ccacatccgg cgaggatgtg    3300
cgcgatttca ccaaggtgct gaagtga                                        3327
```

<210> SEQ ID NO 7
<211> LENGTH: 1142
<212> TYPE: PRT
<213> ORGANISM: Artificial Sequence
<220> FEATURE:
<223> OTHER INFORMATION: amino acid sequence of nano-utrophin-3

<400> SEQUENCE: 7

```
Met Ala Lys Tyr Gly Glu His Glu Ala Ser Pro Asp Asn Gly Gln Asn
1               5                   10                  15

Glu Phe Ser Asp Ile Ile Lys Ser Arg Ser Asp Glu His Asn Asp Val
            20                  25                  30

Gln Lys Lys Thr Phe Thr Lys Trp Ile Asn Ala Arg Phe Ser Lys Ser
        35                  40                  45

Gly Lys Pro Pro Ile Asn Asp Met Phe Thr Asp Leu Lys Asp Gly Arg
    50                  55                  60

Lys Leu Leu Asp Leu Leu Glu Gly Leu Thr Gly Thr Ser Leu Pro Lys
65                  70                  75                  80

Glu Arg Gly Ser Thr Arg Val His Ala Leu Asn Asn Val Asn Arg Val
                85                  90                  95

Leu Gln Val Leu His Gln Asn Asn Val Glu Leu Val Asn Ile Gly Gly
            100                 105                 110

Thr Asp Ile Val Asp Gly Asn His Lys Leu Thr Leu Gly Leu Leu Trp
        115                 120                 125

Ser Ile Ile Leu His Trp Gln Val Lys Asp Val Met Lys Asp Val Met
130                 135                 140

Ser Asp Leu Gln Gln Thr Asn Ser Glu Lys Ile Leu Leu Ser Trp Val
145                 150                 155                 160

Arg Gln Thr Thr Arg Pro Tyr Ser Gln Val Asn Val Leu Asn Phe Thr
                165                 170                 175

Thr Ser Trp Thr Asp Gly Leu Ala Phe Asn Ala Val Leu His Arg His
            180                 185                 190

Lys Pro Asp Leu Phe Ser Trp Asp Lys Val Val Lys Met Ser Pro Ile
        195                 200                 205

Glu Arg Leu Glu His Ala Phe Ser Lys Ala Gln Thr Tyr Leu Gly Ile
210                 215                 220

Glu Lys Leu Leu Asp Pro Glu Asp Val Ala Val Gln Leu Pro Asp Lys
225                 230                 235                 240

Lys Ser Ile Ile Met Tyr Leu Thr Ser Leu Phe Glu Val Leu Pro Gln
                245                 250                 255

Gln Val Thr Ile Asp Ala Ile Arg Glu Val Glu Thr Leu Pro Arg Lys
            260                 265                 270

Tyr Lys Lys Glu Cys Glu Glu Ala Ile Asn Ile Gln Ser Thr Ala
        275                 280                 285

Pro Glu Glu Glu His Glu Ser Pro Arg Ala Glu Thr Pro Ser Thr Val
290                 295                 300

Thr Glu Val Asp Met Asp Leu Asp Ser Tyr Gln Ile Ala Leu Glu Glu
305                 310                 315                 320

Val Leu Thr Trp Leu Leu Ser Ala Glu Asp Thr Phe Gln Glu Gln Asp
                325                 330                 335

Asp Ile Ser Asp Asp Val Glu Val Lys Asp Gln Phe Ala Thr His
            340                 345                 350

Glu Ala Phe Met Met Glu Leu Thr Ala His Gln Ser Ser Val Gly Ser
        355                 360                 365

Val Leu Gln Ala Gly Asn Gln Leu Ile Thr Gln Gly Thr Leu Ser Asp
370                 375                 380

Glu Glu Glu Phe Glu Ile Gln Glu Gln Met Thr Leu Leu Asn Ala Arg
385                 390                 395                 400
```

```
Trp Glu Ala Leu Arg Val Ser Met Asp Arg Gln Ser Arg Leu His
            405                 410                 415

Asp Val Leu Met Glu Leu Gln Lys Lys Gln Leu Gln Gln Leu Ser Ala
            420                 425                 430

Trp Ile Gln Glu Ala Glu Thr Thr Val Asn Val Leu Val Asp Ala Ser
            435                 440                 445

His Arg Glu Asn Ala Leu Gln Asp Ser Ile Leu Ala Arg Glu Leu Lys
            450                 455                 460

Gln Gln Met Gln Asp Ile Gln Ala Glu Ile Asp Ala His Gln Val Lys
465                 470                 475                 480

Val Asn Ser Leu Thr His Met Val Val Ile Val Asp Glu Asn Ser Gly
                485                 490                 495

Glu Ser Ala Thr Ala Ile Leu Glu Asp Gln Leu Gln Lys Leu Gly Glu
                500                 505                 510

Arg Trp Asn Asp Leu Lys Ala Lys Ser Ala Ser Ile Arg Ala His Leu
            515                 520                 525

Glu Ala Ser Ala Glu Lys Trp Asn Arg Leu Leu Met Ser Leu Glu Glu
            530                 535                 540

Leu Ile Lys Trp Leu Asn Met Lys Asp Glu Glu Leu Lys Lys Gln Met
545                 550                 555                 560

Pro Ile Gly Gly Asp Val Pro Ala Leu Gln Leu Gln Tyr Asp His Cys
                565                 570                 575

Lys Ala Leu Arg Arg Glu Leu Lys Glu Lys Glu Tyr Ser Val Leu Asn
                580                 585                 590

Ala Val Asp Gln Ala Arg Val Phe Leu Ala Asp Gln Pro Ile Glu Ala
            595                 600                 605

Pro Glu Glu Pro Arg Arg Asn Leu Gln Ser Lys Thr Glu Leu Thr Pro
            610                 615                 620

Glu Glu Arg Ala Gln Lys Ile Ala Lys Ala Met Arg Lys Gln Ser Ser
625                 630                 635                 640

Glu Val Lys Glu Lys Trp Glu Ser Leu Asn Ala Val Thr Ser Asn Trp
                645                 650                 655

Gln Lys Gln Val Asp Lys Ala Leu Glu Lys Leu Arg Asp Leu Gln Gly
                660                 665                 670

Ala Met Asp Asp Leu Asp Ala Asp Met Lys Glu Ala Glu Ser Val Arg
            675                 680                 685

Asn Gly Trp Lys Pro Val Gly Asp Leu Leu Ile Asp Ser Leu Gln Asp
            690                 695                 700

His Ile Glu Lys Ile Met Ala Phe Arg Glu Glu Ile Ala Pro Ile Asn
705                 710                 715                 720

Phe Lys Val Lys Thr Val Asn Asp Leu Ser Ser Gln Leu Ser Pro Leu
                725                 730                 735

Asp Leu His Pro Ser Leu Lys Met Ser Arg Gln Leu Asp Asp Leu Asn
                740                 745                 750

Met Arg Trp Lys Leu Leu Gln Val Ser Val Asp Asp Arg Leu Lys Gln
            755                 760                 765

Leu Gln Glu Ala His Arg Asp Phe Gly Pro Ser Ser Gln His Phe Leu
            770                 775                 780

Ser Thr Ser Val Gln Leu Pro Trp Gln Arg Ser Ile Ser His Asn Lys
785                 790                 795                 800

Val Pro Tyr Tyr Ile Asn His Gln Thr Gln Thr Thr Cys Trp Asp His
                805                 810                 815
```

```
Pro Lys Met Thr Glu Leu Phe Gln Ser Leu Ala Asp Leu Asn Asn Val
            820                 825                 830

Arg Phe Ser Ala Tyr Arg Thr Ala Ile Lys Ile Arg Arg Leu Gln Lys
        835                 840                 845

Ala Leu Cys Leu Asp Leu Leu Glu Leu Ser Thr Thr Asn Glu Ile Phe
    850                 855                 860

Lys Gln His Lys Leu Asn Gln Asn Asp Gln Leu Leu Ser Val Pro Asp
865                 870                 875                 880

Val Ile Asn Cys Leu Thr Thr Thr Tyr Asp Gly Leu Glu Gln Met His
                885                 890                 895

Lys Asp Leu Val Asn Val Pro Leu Cys Val Asp Met Cys Leu Asn Trp
            900                 905                 910

Leu Leu Asn Val Tyr Asp Thr Gly Arg Thr Gly Lys Ile Arg Val Gln
        915                 920                 925

Ser Leu Lys Ile Gly Leu Met Ser Leu Ser Lys Gly Leu Leu Glu Glu
    930                 935                 940

Lys Tyr Arg Tyr Leu Phe Lys Glu Val Ala Gly Pro Thr Glu Met Cys
945                 950                 955                 960

Asp Gln Arg Gln Leu Gly Leu Leu His Asp Ala Ile Gln Ile Pro
                965                 970                 975

Arg Gln Leu Gly Glu Val Ala Ala Phe Gly Gly Ser Asn Ile Glu Pro
            980                 985                 990

Ser Val Arg Ser Cys Phe Gln Gln Asn Asn Asn Lys Pro Glu Ile Ser
        995                 1000                1005

Val Lys Glu Phe Ile Asp Trp Met His Leu Glu Pro Gln Ser Met
    1010                1015                1020

Val Trp Leu Pro Val Leu His Arg Val Ala Ala Ala Glu Thr Ala
    1025                1030                1035

Lys His Gln Ala Lys Cys Asn Ile Cys Lys Glu Cys Pro Ile Val
    1040                1045                1050

Gly Phe Arg Tyr Arg Ser Leu Lys His Phe Asn Tyr Asp Val Cys
    1055                1060                1065

Gln Ser Cys Phe Phe Ser Gly Arg Thr Ala Lys Gly His Lys Leu
    1070                1075                1080

His Tyr Pro Met Val Glu Tyr Cys Ile Pro Thr Thr Ser Gly Glu
    1085                1090                1095

Asp Val Arg Asp Phe Thr Lys Val Leu Lys Asn Lys Phe Arg Ser
    1100                1105                1110

Lys Lys Tyr Phe Ala Lys His Pro Arg Leu Gly Tyr Leu Pro Val
    1115                1120                1125

Gln Thr Val Leu Glu Gly Asp Asn Leu Glu Thr Pro Ile Thr
    1130                1135                1140

<210> SEQ ID NO 8
<211> LENGTH: 3429
<212> TYPE: DNA
<213> ORGANISM: Artificial Sequence
<220> FEATURE:
<223> OTHER INFORMATION: nucleic acid sequence encoding nano-utrophin-3
      protein

<400> SEQUENCE: 8
atggctaagt atggcgagca tgaggcttct cccgacaacg gccagaacga gttctccgac      60
atcatcaagt cccgctccga cgagcacaac gacgtgcaga agaaaacctt caccaagtgg     120
atcaacgcca ggttctccaa gtccggcaag cctcctatca cgacatgtt caccgacctg     180
```

-continued

```
aaggacggcc gcaaactgct ggatctgctg gaaggactga ccggcacctc tctgcctaaa      240
gaaaggggct ctactagggt gcacgccctg aacaatgtga acagggtgct ccaggtgctg      300
caccagaaca acgtcgagct ggtcaatatc ggcggcaccg acatcgtgga tggcaaccat      360
aagctgaccc tgggcctgct gtggtccatc attctgcact gcaggtcaa agacgtgatg       420 aaggacgtga tgtccgacct ccagcagacc aactccgaga gatcctgct gtcttgggtc       480 cgccagacca ctaggcccta ttctcaggtc aacgtgctga acttcaccac ctcttggacc      540
gacggactgg ccttcaatgc tgtgctgcac aggcacaagc ccgacctgtt ctcttgggac      600
aaagtggtca agatgagccc catcgagagg ctgaacacg ccttctctaa ggcccagacc       660
tacctgggaa tcgagaagct gctggaccct gaggatgtgg cagtgcagct gcccgacaag      720
aaatccatca tcatgtacct gaccagcctg ttcgaggtgc tgcctcagca ggtcacaatt      780
gatgccatcc gcgaggtgga aaccctgcct cgcaagtaca agaaagagtg cgaggaagag      840
gccatcaaca tccagtccac tgctcccgag gaagaacacg agtctccaag ggccgagact      900
ccttccaccg tgactgaagt ggacatggac ctggactcct accagatcgc tctggaagag      960
gtgctgactt ggctgctgtc cgccaggat actttccagg aacaggacga catctccgac      1020
gacgtcgagg aagtgaagga ccagttcgcc actcacgagg ctttcatgat ggaactgact     1080
gcccaccagt cctccgtggg aagtgtcctc caggctggaa accagctgat cacccaggga     1140
accctgtccg atgaggaaga gttcgagatt caggaacaga tgaccctgct gaacgccaga     1200
tgggaagctc tgagggtcga gtccatggat aggcagtcta ggctgcacga cgtgctcatg     1260
gaactccaga agaagcagct ccagcagctg tccgcttgga tccaggaagc cgagactacc     1320
gtcaatgtgc tggtggacgc ctctcacaga gagaacgccc tccaggattc catcctggct     1380
agggaactga agcagcagat gcaggacatc caggccgaga tcgacgctca ccaggtcaaa     1440
gtgaactccc tgactcacat ggtggtcatc gtggacgaga attccggcga gtctgccacc     1500
gctatcctgg aagatcagct ccagaaactg ggcgagcgct ggaacgatct gaaggctaag     1560
tccgcctcta tcagggccca tctggaagcc tctgccgaga agtggaatag gctgctgatg     1620
tccctggaag aactgatcaa gtggctgaac atgaaggatg aggaactcaa gaaacagatg     1680
cccatcggag gcgacgtgcc agctctccag ctccagtatg atcattgcaa ggctctgagg     1740
cgcgagctga aagagaaaga gtactccgtc ctgaacgccg tggatcaggc tagggtgttc     1800
ctggccgatc agcctattga ggctcctgag gaacctaggc ggaacctcca gtccaagacc     1860
gagctgactc ctgaagagag ggcccagaaa atcgccaagg ctatgcgcaa gcagtccagc     1920
gaagtcaaag agaagtggga gtccctgaat gccgtgacct ccaactggca gaaacaggtg     1980
gacaaggccc tggaaaagct gagggatctc agggcgcta tggacgacct ggacgccgat      2040
atgaaggaag ctgagtccgt cagaaacggc tggaagccag tgggagatct gctgattgat     2100
agcctccagg accacattga aagatcatg gccttcaggg aagagatcgc ccctatcaac      2160
ttcaaagtca agaccgtgaa cgacctgtcc agccagctga gccctctgga tctccatcca     2220
agcctgaaga tgagcaggca gctggatgac ctgaacatgc gctggaaact cctccaggtg     2280
tccgtggacg ataggctgaa acagctccag gaagctcaca gagacttcgg ccctagctct     2340
cagcacttcc tgtctacctc tgtgcagctc ccttggcagc gctccatctc tcacaacaag     2400
gtgccctact acatcaacca ccagactcag accacctgtt gggatcaccc caagatgact     2460
gagctgttcc agagcctggc cgacctcaac aatgtgcgct tctccgccta taggaccgcc     2520
```

```
atcaaaatca ggcgcctcca gaaagccctg tgcctggacc tgctcgaact gtccaccacc   2580
aacgagatct tcaagcagca caagctgaac cagaacgacc agctgctgtc tgtgcccgac   2640
gtgatcaatt gcctgaccac cacctacgac gggctcgaac agatgcacaa ggatctcgtg   2700
aatgtgcctc tgtgcgtgga catgtgcctg aactggctgc tgaatgtgta cgataccggc   2760
aggaccggca agatcagggt gcagtctctg aagatcggcc tgatgagcct gagcaagggg   2820
ctgctcgaag agaagtaccg ctacctgttc aaagaggtgg caggccctac cgagatgtgc   2880
gatcagagac agctgggact gctgctgcac gatgccattc agattcctcg ccagctggga   2940
gaagtggccg ccttcggagg atctaatatc gagccttccg tgcgctcctg ctttcagcag   3000
aacaacaaca agcctgagat ctccgtgaaa gaattcatcg actggatgca cctggaacct   3060
cagagcatgg tctggctgcc agtcctgcat agagtggctg ctgctgagac tgccaagcac   3120
caggccaagt gcaacatctg caaagagtgc cctatcgtcg gcttccgcta tcgctccctg   3180
aagcacttca actacgacgt gtgccagagt tgcttctttt ccggacgcac cgccaagggc   3240
cacaagctgc attaccctat ggtcgagtac tgcatcccta ccacatccgg cgaggatgtg   3300
cgcgatttca ccaaggtgct gaagaacaag ttccgctcca gaagtatttt cgctaagcac   3360
cccaggctgg gctatctgcc tgtccagact gtcctggaag gcgacaacct ggaaccccct   3420
atcacctga                                                          3429
```

<210> SEQ ID NO 9
<211> LENGTH: 736
<212> TYPE: PRT
<213> ORGANISM: Artificial Sequence
<220> FEATURE:
<223> OTHER INFORMATION: amino acid sequence with GenBank accession: AAS99264

<400> SEQUENCE: 9

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160

Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190
```

```
Ala Ala Pro Ser Gly Val Gly Ser Leu Thr Met Ala Ser Gly Gly
            195                 200                 205
Ala Pro Val Ala Asp Asn Asn Glu Gly Ala Asp Gly Val Gly Ser Ser
210                 215                 220
Ser Gly Asn Trp His Cys Asp Ser Gln Trp Leu Gly Asp Arg Val Ile
225                 230                 235                 240
Thr Thr Ser Thr Arg Thr Trp Ala Leu Pro Thr Tyr Asn Asn His Leu
                245                 250                 255
Tyr Lys Gln Ile Ser Asn Ser Thr Ser Gly Gly Ser Ser Asn Asp Asn
            260                 265                 270
Ala Tyr Phe Gly Tyr Ser Thr Pro Trp Gly Tyr Phe Asp Phe Asn Arg
        275                 280                 285
Phe His Cys His Phe Ser Pro Arg Asp Trp Gln Arg Leu Ile Asn Asn
    290                 295                 300
Asn Trp Gly Phe Arg Pro Lys Arg Leu Asn Phe Lys Leu Phe Asn Ile
305                 310                 315                 320
Gln Val Lys Glu Val Thr Asp Asn Asn Gly Val Lys Thr Ile Ala Asn
                325                 330                 335
Asn Leu Thr Ser Thr Val Gln Val Phe Thr Asp Ser Asp Tyr Gln Leu
            340                 345                 350
Pro Tyr Val Leu Gly Ser Ala His Glu Gly Cys Leu Pro Pro Phe Pro
        355                 360                 365
Ala Asp Val Phe Met Ile Pro Gln Tyr Gly Tyr Leu Thr Leu Asn Asp
    370                 375                 380
Gly Ser Gln Ala Val Gly Arg Ser Ser Phe Tyr Cys Leu Glu Tyr Phe
385                 390                 395                 400
Pro Ser Gln Met Leu Arg Thr Gly Asn Asn Phe Gln Phe Ser Tyr Glu
                405                 410                 415
Phe Glu Asn Val Pro Phe His Ser Ser Tyr Ala His Ser Gln Ser Leu
            420                 425                 430
Asp Arg Leu Met Asn Pro Leu Ile Asp Gln Tyr Leu Tyr Tyr Leu Ser
        435                 440                 445
Lys Thr Ile Asn Gly Ser Gly Gln Asn Gln Gln Thr Leu Lys Phe Ser
    450                 455                 460
Val Ala Gly Pro Ser Asn Met Ala Val Gln Gly Arg Asn Tyr Ile Pro
465                 470                 475                 480
Gly Pro Ser Tyr Arg Gln Gln Arg Val Ser Thr Val Thr Gln Asn
                485                 490                 495
Asn Asn Ser Glu Phe Ala Trp Pro Gly Ala Ser Ser Trp Ala Leu Asn
            500                 505                 510
Gly Arg Asn Ser Leu Met Asn Pro Gly Pro Ala Met Ala Ser His Lys
        515                 520                 525
Glu Gly Glu Asp Arg Phe Phe Pro Leu Ser Gly Ser Leu Ile Phe Gly
    530                 535                 540
Lys Gln Gly Thr Gly Arg Asp Asn Val Asp Ala Asp Lys Val Met Ile
545                 550                 555                 560
Thr Asn Glu Glu Glu Ile Lys Thr Thr Asn Pro Val Ala Thr Glu Ser
                565                 570                 575
Tyr Gly Gln Val Ala Thr Asn His Gln Ser Ala Gln Ala Gln Ala Gln
            580                 585                 590
Thr Gly Trp Val Gln Asn Gln Gly Ile Leu Pro Gly Met Val Trp Gln
        595                 600                 605
Asp Arg Asp Val Tyr Leu Gln Gly Pro Ile Trp Ala Lys Ile Pro His
```

```
                    610                 615                 620
Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                    645                 650                 655

Asp Pro Pro Thr Ala Phe Asn Lys Asp Lys Leu Asn Ser Phe Ile Thr
                660                 665                 670

Gln Tyr Ser Thr Gly Gln Val Ser Val Glu Ile Glu Trp Glu Leu Gln
                675                 680                 685

Lys Glu Asn Ser Lys Arg Trp Asn Pro Glu Ile Gln Tyr Thr Ser Asn
                690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735

<210> SEQ ID NO 10
<211> LENGTH: 2211
<212> TYPE: DNA
<213> ORGANISM: Artificial Sequence
<220> FEATURE:
<223> OTHER INFORMATION: coding sequence for AAV9 capsid vp1

<400> SEQUENCE: 10
atggctgccg atggttatct tccagattgg ctcgaggaca accttagtga aggaattcgc      60
gagtggtggg cttttgaaacc tggagccccct caacccaagg caaatcaaca acatcaagac     120
aacgctcgag gtcttgtgct tccgggttac aaataccttg acccggcaa cggactcgac     180 aaggggagc cggtcaacgc agcagacgcg gcggccctcg agcacgacaa ggcctacgac     240
cagcagctca aggccggaga caacccgtac ctcaagtaca ccacgccga cgccgagttc     300 caggagcggc tcaaagaaga tacgtctttt gggggcaacc tcgggcgagc agtcttccag     360
gccaaaaaga ggcttcttga acctcttggt ctggttgagg aagcggctaa gacggctcct     420
ggaaagaaga ggcctgtaga gcagtctcct caggaaccgg actcctccgc gggtattggc     480
aaatcgggtg cacagcccgc taaaaagaga ctcaatttcg gtcagactgg cgacacagag     540
tcagtcccag accctcaacc aatcggagaa cctcccgcag cccctcagg tgtgggatct     600 cttacaatgg cttcaggtgg tggcgcacca gtggcagaca taacgaagg tgccgatgga     660 gtgggtagtt cctcgggaaa ttggcattgc gattcccaat ggctggggga cagagtcatc     720
accaccagca cccgaacctg ggccctgccc acctacaaca tcacctcta caagcaaatc     780 tccaacagca catctggagg atcttcaaat gacaacgcct acttcggcta cagcaccccc     840 tggggggtatt ttgacttcaa cagattccac tgccacttct caccacgtga ctggcagcga     900
ctcatcaaca caactgggg attccggcct aagcgactca acttcaagct cttcaacatt     960
caggtcaaag aggttacgga caacaatgga gtcaagacca cgccaataa ccttaccagc    1020 acggtccagg tcttcacgga ctcagactat cagctcccgt acgtgctcgg tcggctcac    1080 gagggctgcc tcccgccgtt cccagcggac gttttcatga ttcctcagta cgggtatctg    1140
acgcttaatg atggaagcca ggccgtgggt cgttcgtcct tttactgcct ggaatatttc    1200
ccgtcgcaaa tgctaagaac gggtaacaac ttccagttca gctacgagtt tgagaacgta    1260
cctttccata gcagctacgc tcacagccaa agcctggacc gactaatgaa tccactcatc    1320
gaccaatact tgtactatct ctcaaagact attaacggtt ctggacagaa tcaacaaacg    1380
```

```
ctaaaattca gtgtggccgg acccagcaac atggctgtcc agggaagaaa ctacatacct    1440
ggacccagct accgacaaca acgtgtctca accactgtga ctcaaaacaa caacagcgaa    1500
tttgcttggc ctggagcttc ttcttgggct ctcaatggac gtaatagctt gatgaatcct    1560
ggacctgcta tggccagcca caaagaagga gaggaccgtt tctttccttt gtctggatct    1620
ttaattttg gcaaacaagg aactggaaga dacaacgtgg atgcggacaa agtcatgata    1680
accaacgaag aagaaattaa aactactaac ccggtagcaa cggagtccta tggacaagtg    1740
gccacaaacc accagagtgc ccaagcacag gcgcagaccg gctgggttca aaaccaagga    1800
atacttccgg gtatggtttg gcaggacaga gatgtgtacc tgcaaggacc catttgggcc    1860
aaaattcctc acacggacgg caactttcac ccttctccgc tgatgggagg gtttggaatg    1920
aagcacccgc ctcctcagat cctcatcaaa acacacctg tacctgcgga tcctccaacg    1980
gccttcaaca aggacaagct gaactctttc atcacccagt attctactgg ccaagtcagc    2040
gtggagatcg agtgggagct gcagaaggaa acagcaagc gctggaaccc ggagatccag    2100
tacacttcca actattacaa gtctaataat gttgaatttg ctgttaatac tgaaggtgta    2160
tatagtgaac cccgccccat tggcaccaga tacctgactc gtaatctgta a            2211
```

<210> SEQ ID NO 11
<211> LENGTH: 2211
<212> TYPE: DNA
<213> ORGANISM: Artificial Sequence
<220> FEATURE:
<223> OTHER INFORMATION: coding sequence for hu31 vp1

<400> SEQUENCE: 11

```
atggctgccg atggttatct tccagattgg ctcgaggaca accttagtga aggaattcgc      60
gagtggtggg ctttgaaacc tggagcccct caacccaagg caaatcaaca acatcaagac     120
aacgctcgag gtcttgtgct tccgggttac aaataccttg acccggcaa cggactcgac      180
aagggggagc cggtcaacgc agcagacgcg gcggccctcg agcacgacaa ggcctacgac     240
cagcagctca aggccggaga caacccgtac ctcaagtaca ccacgccga cgccgagttc     300
caggagcggc tcaaagaaga tacgtctttt ggggcaacc tcgggcgagc agtcttccag     360
gccaaaaga ggcttcttga acctcttggt ctggttgagg aagcggctaa dacggctcct     420
ggaaagaaga ggcctgtaga gcagtctcct caggaaccgg actcctccgc gggtattggc     480
aaatcgggtg cacagcccgc taaaaagaga ctcaatttcg gtcagactgg cgacacagag    540
tcagtcccag accctcaacc aatcggagaa cctcccgcag cccctcagg tgtgggatct     600
cttacaatgg cttcaggtgg tggcgcacca gtggcagaca ataacgaagg tgccgatgga    660
gtgggtagtt cctcgggaaa ttggcattgc gattcccaat ggctggggga cagagtcatc   720
accaccagca cccgaacctg ggccctgccc acctacaaca tcacctcta caagcaaatc    780
tccaacagca catctggagg atcttcaaat gacaacgcct acttcggcta cagcaccccc    840
tggggggtatt ttgacttcaa cagattccac tgccacttct caccacgtga ctggcagcga    900
ctcatcaaca caactggggg attccggcct aagcgactca acttcaagct cttcaacatt     960
caggtcaaag aggttacgga caacaatgga gtcaagacca tcgccaataa ccttaccagc    1020
acggtccagg tcttcacgga ctcagactat cagctcccgt acgtgctcgg tcggctcac    1080
gagggctgcc tccgccgtt cccagcggac gttttcatga ttcctcagta cgggtatctg    1140
acgcttaatg atggaagcca ggccgtgggt cgttcgtcct tttactgcct ggaatatttc    1200
ccgtcgcaaa tgctaagaac gggtaacaac ttccagttca gctacgagtt tgagaacgta    1260
```

-continued

```
cctttccata gcagctacgc tcacagccaa agcctggacc gactaatgaa tccactcatc    1320
gaccaatact tgtactatct ctcaaagact attaacggtt ctggacagaa tcaacaaacg    1380
ctaaaattca gtgtggccgg acccagcaac atggctgtcc agggaagaaa ctacatacct    1440
ggacccagct accgacaaca acgtgtctca accactgtga ctcaaaacaa caacagcgaa    1500
tttgcttggc ctggagcttc ttcttgggct ctcaatggac gtaatagctt gatgaatcct    1560
ggacctgcta tggccagcca caagaagga gaggaccgtt tctttccttt gtctggatct    1620 ttaattttg gcaaacaagg aactggaaga gacaacgtgg atgcggacaa agtcatgata    1680
accaacgaag aagaaattaa aactactaac ccggtagcaa cggagtccta tggacaagtg    1740
gccacaaacc accagagtgc ccaagcacag gcgcagaccg gctgggttca aaaccaagga    1800
atacttccgg gtatggtttg gcaggacaga gatgtgtacc tgcaaggacc catttgggcc    1860
aaaattcctc acacggacgg caactttcac ccttctccgc tgatgggagg gtttggaatg    1920
aagcacccgc ctcctcagat cctcatcaaa aacacacctg tacctgcgga tcctccaacg    1980
gccttcaaca aggacaagct gaactctttc atcacccagt attctactgg ccaagtcagc    2040
gtggagatcg agtgggagct gcagaaggaa acagcaagc gctggaaccc ggagatccag    2100
tacacttcca actattacaa gtctaataat gttgaatttg ctgttaatac tgaaggtgta    2160
tatagtgaac cccgccccat tggcaccaga tacctgactc gtaatctgta a            2211
```

<210> SEQ ID NO 12
<211> LENGTH: 2211
<212> TYPE: DNA
<213> ORGANISM: Artificial Sequence
<220> FEATURE:
<223> OTHER INFORMATION: coding sequence for hu32 vp1

<400> SEQUENCE: 12

```
atggctgccg atggttatct tccagattgg ctcgaggaca ctctctctga aggaataaga     60
cagtggtgga agctcaaacc tggcccacca ccaccaaagc ccgcagagcg gcataaggac    120
gacagcaggg gtcttgtgct tcctgggtac aagtacctcg acccggcaa cggactcgac    180 aagggggagc cggtcaacgc agcagacgcg gcggccctcg agcacgacaa ggcctacgac    240
cagcagctca aggccggaga caacccgtac ctcaagtaca accacgccga cgccgagttc    300
caggagcggc tcaaagaaga tacgtctttt gggggcaacc tcgggcgagc agtcttccag    360
gccaaaaaga ggcttcttga acctcttggt ctggttgagg aagcggctaa gacggctcct    420
ggaaagaaga ggcctgtaga gcagtctcct caggaaccgg actcctccgc gggtattggc    480
aaatcgggtt cacagcccgc taaaaagaaa ctcaatttcg gtcagactgg cgacacagag    540
tcagtccccg accctcaacc aatcggagaa cctcccgcag ccccctcagg tgtgggatct    600
cttacaatgg cttcaggtgg tggcgcacca gtggcagaca taacgaagg tgccgatgga    660 gtgggtagtt cctcgggaaa ttggcattgc gattcccaat ggctggggga cagagtcatc    720
accaccagca cccgaacctg ggccctgccc acctacaaca tcacctcta caagcaaatc    780 tccaacagca catctggagg atcttcaaat gacaacgcct acttcggcta cagcaccccc    840
tgggggtatt ttgacttcaa cagattccac tgccacttct caccacgtga ctggcagcga    900
ctcatcaaca caactgggg attccggcct aagcgactca acttcaagct cttcaacatt    960
caggtcaaag aggttacgga caacaatgga gtcaagacca cgccaataa ccttaccagc   1020 acggtccagg tcttcacgga ctcagactat cagctcccgt acgtgctcgg gtcggctcac   1080
```

-continued

```
gagggctgcc tcccgccgtt cccagcggac gttttcatga ttcctcagta cgggtatctg    1140
acgcttaatg atgggagcca ggccgtgggt cgttcgtcct tttactgcct ggaatatttc    1200
ccgtcgcaaa tgctaagaac gggtaacaac ttccagttca gctacgagtt tgagaacgta    1260
cctttccata gcagctacgc tcacagccaa agcctggacc gactaatgaa tccactcatc    1320
gaccaatact tgtactatct ctcaaagact attaacggtt ctggacagaa tcaacaaacg    1380
ctaaaattca gcgtggccgg acccagcaac atggctgtcc agggaagaaa ctacatacct    1440
ggacccagct accgacaaca acgtgtctca accactgtga ctcaaaacaa caacagcgaa    1500
tttgcttggc ctggagcttc ttcttgggct ctcaatggac gtaatagctt gatgaatcct    1560
ggacctgcta tggccagcca caagaaggaa gaggaccgtt tctttccttt gtctggatct    1620
ttaattttg gcaaacaagg aactggaaga gacaacgtgg atgcggacaa agtcatgata    1680
accaacgaag aagaaattaa aactactaac ccggtagcaa cggagtccta tggacaagtg    1740
gccacaaacc accagagtgc ccaagcacag gcgcagaccg gctgggttca aaaccaagga    1800
atacttccgg gtatggtttg gcaggacaga gatgtgtacc tgcaaggacc catttgggcc    1860
aaaattcctc acacggacgg caactttcac ccttctccgc taatgggagg gtttggaatg    1920
aagcacccgc ctcctcagat cctcatcaaa aacacacctg tacctgcgga tcctccaacg    1980
gctttcaata aggacaagct gaactctttc atcacccagt attctactgg ccaagtcagc    2040
gtggagattg agtgggagct gcagaaggaa acagcaagc gctggaaccc ggagatccag    2100
tacacttcca actattacaa gtctaataat gttgaatttg ctgttaatac tgaaggtgta    2160
tatagtgaac cccgccccat tggcaccaga tacctgactc gtaatctgta a             2211
```

<210> SEQ ID NO 13
<211> LENGTH: 1131
<212> TYPE: PRT
<213> ORGANISM: Artificial Sequence
<220> FEATURE:
<223> OTHER INFORMATION: amino acid sequence for nano-dystrophin

<400> SEQUENCE: 13

```
Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg
        35                  40                  45

Arg Leu Leu Asp Leu Leu Glu Gly Leu Thr Gly Gln Lys Leu Pro Lys
    50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
        115                 120                 125

Ala Gly Leu Gln Gln Thr Asn Ser Glu Lys Ile Leu Leu Ser Trp Val
    130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
```

-continued

```
              165                 170                 175
Arg Pro Asp Leu Phe Asp Trp Asn Ser Val Cys Gln Gln Ser Ala
            180                 185                 190

Thr Gln Arg Leu Glu His Ala Phe Asn Ile Ala Arg Tyr Gln Leu Gly
            195                 200                 205

Ile Glu Lys Leu Leu Asp Pro Glu Asp Val Asp Thr Thr Tyr Pro Asp
210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
            275                 280                 285

Thr Ser Ser Pro Lys Pro Arg Phe Lys Ser Tyr Ala Tyr Thr Gln Ala
            290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                325                 330                 335

Ser Glu Val Asn Leu Asp Arg Tyr Gln Thr Ala Leu Glu Glu Val Leu
            340                 345                 350

Ser Trp Leu Leu Ser Ala Glu Asp Thr Leu Gln Ala Gln Gly Glu Ile
            355                 360                 365

Ser Asn Asp Val Glu Val Val Lys Asp Gln Phe His Thr His Glu Gly
370                 375                 380

Tyr Met Met Asp Leu Thr Ala His Gln Gly Arg Val Gly Asn Ile Leu
385                 390                 395                 400

Gln Leu Gly Ser Lys Leu Ile Gly Thr Gly Lys Leu Ser Glu Asp Glu
                405                 410                 415

Glu Thr Glu Val Gln Glu Gln Met Asn Leu Leu Asn Ser Arg Trp Glu
            420                 425                 430

Cys Leu Arg Val Ala Ser Met Glu Lys Gln Ser Asn Leu His Arg Val
            435                 440                 445

Leu Met Asp Leu Gln Asn Gln Lys Leu Lys Glu Leu Asn Asp Trp Leu
            450                 455                 460

Thr Glu Ala Glu Thr Thr Ala Asn Val Leu Gln Asp Ala Thr Arg Lys
465                 470                 475                 480

Glu Arg Leu Leu Glu Asp Ser Lys Gly Val Lys Glu Leu Met Lys Gln
                485                 490                 495

Trp Gln Asp Leu Gln Gly Asp Leu Glu Gln Glu Val Arg Val Asn
            500                 505                 510

Ser Leu Thr His Met Val Val Val Asp Glu Ser Ser Gly Asp His
            515                 520                 525

Ala Thr Ala Ala Leu Glu Glu Gln Leu Lys Val Leu Gly Asp Arg Trp
            530                 535                 540

Ala Asn Ile Cys Arg Trp Ser Glu Leu Arg Lys Lys Ser Leu Asn Ile
545                 550                 555                 560

Arg Ser His Leu Glu Ala Ser Ser Asp Gln Trp Lys Arg Leu His Leu
                565                 570                 575

Ser Leu Gln Glu Leu Leu Val Trp Leu Gln Leu Lys Asp Asp Glu Leu
            580                 585                 590
```

```
Ser Arg Gln Ala Pro Ile Gly Gly Asp Phe Pro Ala Val Gln Lys Gln
    595                 600                 605

Asn Asp Val His Arg Ala Phe Lys Arg Glu Leu Lys Thr Lys Glu Pro
    610                 615                 620

Val Ile Met Ser Thr Leu Glu Thr Val Arg Ile Phe Leu Thr Glu Gln
625                 630                 635                 640

Pro Leu Glu Gly Leu Glu Lys Leu Tyr Gln Glu Pro Arg Glu Leu Pro
                645                 650                 655

Pro Glu Glu Arg Ala Gln Asn Val Thr Arg Leu Leu Arg Lys Gln Ala
                660                 665                 670

Glu Glu Val Asn Thr Glu Trp Glu Lys Leu Asn Leu His Ser Ala Asp
    675                 680                 685

Trp Gln Arg Lys Ile Asp Glu Thr Leu Glu Arg Leu Gln Glu Leu Gln
    690                 695                 700

Glu Ala Thr Asp Glu Leu Asp Leu Lys Leu Arg Gln Ala Glu Val Ile
705                 710                 715                 720

Lys Gly Ser Trp Gln Pro Val Gly Asp Leu Leu Ile Asp Ser Leu Gln
                725                 730                 735

Asp His Leu Glu Lys Val Lys Ala Leu Arg Gly Glu Ile Ala Pro Leu
                740                 745                 750

Lys Glu Asn Val Ser His Val Asn Asp Leu Ala Arg Gln Leu Thr Thr
                755                 760                 765

Leu Gly Ile Gln Leu Ser Pro Tyr Asn Leu Ser Thr Leu Glu Asp Leu
                770                 775                 780

Asn Thr Arg Trp Lys Leu Leu Gln Val Ala Val Glu Asp Arg Val Arg
785                 790                 795                 800

Gln Leu His Glu Ala His Arg Asp Phe Gly Pro Ala Ser Gln His Phe
                805                 810                 815

Leu Ser Thr Ser Val Gln Gly Pro Trp Glu Arg Ala Ile Ser Pro Asn
                820                 825                 830

Lys Val Pro Tyr Tyr Ile Asn His Glu Thr Gln Thr Thr Cys Trp Asp
                835                 840                 845

His Pro Lys Met Thr Glu Leu Tyr Gln Ser Leu Ala Asp Leu Asn Asn
                850                 855                 860

Val Arg Phe Ser Ala Tyr Arg Thr Ala Met Lys Leu Arg Arg Leu Gln
865                 870                 875                 880

Lys Ala Leu Cys Leu Asp Leu Leu Ser Leu Ser Ala Ala Cys Asp Ala
                885                 890                 895

Leu Asp Gln His Asn Leu Lys Gln Asn Asp Gln Pro Met Asp Ile Leu
                900                 905                 910

Gln Ile Ile Asn Cys Leu Thr Thr Ile Tyr Asp Arg Leu Glu Gln Glu
                915                 920                 925

His Asn Asn Leu Val Asn Val Pro Leu Cys Val Asp Met Cys Leu Asn
    930                 935                 940

Trp Leu Leu Asn Val Tyr Asp Thr Gly Arg Thr Gly Arg Ile Arg Val
945                 950                 955                 960

Leu Ser Phe Lys Thr Gly Ile Ile Ser Leu Cys Lys Ala His Leu Glu
                965                 970                 975

Asp Lys Tyr Arg Tyr Leu Phe Lys Gln Val Ala Ser Ser Thr Gly Phe
                980                 985                 990

Cys Asp Gln Arg Arg Leu Gly Leu  Leu Leu His Asp Ser  Ile Gln Ile
                995                 1000                1005
```

```
Pro Arg Gln Leu Gly Glu Val Ala Ser Phe Gly Gly Ser Asn Ile
    1010            1015                1020

Glu Pro Ser Val Arg Ser Cys Phe Gln Phe Ala Asn Asn Lys Pro
    1025            1030                1035

Glu Ile Glu Ala Ala Leu Phe Leu Asp Trp Met Arg Leu Glu Pro
    1040            1045                1050

Gln Ser Met Val Trp Leu Pro Val Leu His Arg Val Ala Ala Ala
    1055            1060                1065

Glu Thr Ala Lys His Gln Ala Lys Cys Asn Ile Cys Lys Glu Cys
    1070            1075                1080

Pro Ile Ile Gly Phe Arg Tyr Arg Ser Leu Lys His Phe Asn Tyr
    1085            1090                1095

Asp Ile Cys Gln Ser Cys Phe Phe Ser Gly Arg Val Ala Lys Gly
    1100            1105                1110

His Lys Met His Tyr Pro Met Val Glu Tyr Cys Thr Pro Thr Thr
    1115            1120                1125

Ser Gly Glu
    1130

<210> SEQ ID NO 14
<211> LENGTH: 1131
<212> TYPE: PRT
<213> ORGANISM: Artificial Sequence
<220> FEATURE:
<223> OTHER INFORMATION: amino acid sequence for nano-dystrophin

<400> SEQUENCE: 14

Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg
        35                  40                  45

Arg Leu Leu Asp Leu Leu Glu Gly Leu Thr Gly Gln Lys Leu Pro Lys
    50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
        115                 120                 125

Ala Gly Leu Gln Gln Thr Asn Ser Glu Lys Ile Leu Leu Ser Trp Val
    130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
            180                 185                 190

Thr Gln Arg Leu Glu His Ala Phe Asn Ile Ala Arg Tyr Gln Leu Gly
        195                 200                 205

Ile Glu Lys Leu Leu Asp Pro Glu Asp Val Asp Thr Thr Tyr Pro Asp
    210                 215                 220
```

-continued

```
Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
            245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
            275                 280                 285

Thr Ser Ser Pro Lys Pro Arg Phe Lys Ser Tyr Ala Tyr Thr Gln Ala
        290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                325                 330                 335

Ser Glu Val Asn Leu Asp Arg Tyr Gln Thr Ala Leu Glu Glu Val Leu
                340                 345                 350

Ser Trp Leu Leu Ser Ala Glu Asp Thr Leu Gln Ala Gln Gly Glu Ile
        355                 360                 365

Ser Asn Asp Val Glu Val Val Lys Asp Gln Phe His Thr His Glu Gly
370                 375                 380

Tyr Met Met Asp Leu Thr Ala His Gln Gly Arg Val Gly Asn Ile Leu
385                 390                 395                 400

Gln Leu Gly Ser Lys Leu Ile Gly Thr Gly Lys Leu Ser Glu Asp Glu
                405                 410                 415

Glu Thr Glu Val Gln Glu Gln Met Asn Leu Leu Asn Ser Arg Trp Glu
            420                 425                 430

Cys Leu Arg Val Ala Ser Met Glu Lys Gln Ser Asn Leu His Arg Val
        435                 440                 445

Leu Met Asp Leu Gln Asn Gln Lys Leu Lys Glu Leu Asn Asp Trp Leu
450                 455                 460

Thr Glu Ala Glu Thr Thr Ala Asn Val Leu Gln Asp Ala Thr Arg Lys
465                 470                 475                 480

Glu Arg Leu Leu Glu Asp Ser Lys Gly Val Lys Glu Leu Met Lys Gln
                485                 490                 495

Trp Gln Asp Leu Gln Gly Glu Leu Glu Gln Glu Gln Val Arg Val Asn
            500                 505                 510

Ser Leu Thr His Met Val Val Val Asp Glu Ser Ser Gly Asp His
        515                 520                 525

Ala Thr Ala Ala Leu Glu Glu Gln Leu Lys Val Leu Gly Asp Arg Trp
530                 535                 540

Ala Asn Ile Cys Arg Trp Ser Glu Leu Arg Lys Lys Ser Leu Asn Ile
545                 550                 555                 560

Arg Ser His Leu Glu Ala Ser Ser Asp Gln Trp Lys Arg Leu His Leu
                565                 570                 575

Ser Leu Gln Glu Leu Leu Val Trp Leu Gln Leu Lys Asp Asp Glu Leu
            580                 585                 590

Ser Arg Gln Ala Pro Ile Gly Gly Asp Phe Pro Ala Val Gln Lys Gln
        595                 600                 605

Asn Asp Val His Arg Ala Phe Lys Arg Glu Leu Lys Thr Lys Glu Pro
            610                 615                 620

Val Ile Met Ser Thr Leu Glu Thr Val Arg Ile Phe Leu Thr Glu Gln
625                 630                 635                 640

Pro Leu Glu Gly Leu Glu Lys Leu Tyr Gln Glu Pro Arg Glu Leu Pro
```

-continued

```
                645                 650                 655
Pro Glu Glu Arg Ala Gln Asn Val Thr Arg Leu Leu Arg Lys Gln Ala
            660                 665                 670
Glu Glu Val Asn Thr Glu Trp Glu Lys Leu Asn Leu His Ser Ala Asp
        675                 680                 685
Trp Gln Arg Lys Ile Asp Glu Thr Leu Glu Arg Leu Gln Glu Leu Gln
    690                 695                 700
Glu Ala Thr Asp Glu Leu Asp Leu Lys Leu Arg Gln Ala Glu Val Ile
705                 710                 715                 720
Lys Gly Ser Trp Gln Pro Val Gly Asp Leu Leu Ile Asp Ser Leu Gln
                725                 730                 735
Asp His Leu Glu Lys Val Lys Ala Leu Arg Gly Glu Ile Ala Pro Leu
            740                 745                 750
Lys Glu Asn Val Ser His Val Asn Asp Leu Ala Arg Gln Leu Thr Thr
        755                 760                 765
Leu Gly Ile Gln Leu Ser Pro Tyr Asn Leu Ser Thr Leu Glu Asp Leu
    770                 775                 780
Asn Thr Arg Trp Lys Leu Leu Gln Val Ala Val Glu Asp Arg Val Arg
785                 790                 795                 800
Gln Leu His Glu Ala His Arg Asp Phe Gly Pro Ala Ser Gln His Phe
                805                 810                 815
Leu Ser Thr Ser Val Gln Gly Pro Trp Glu Arg Ala Ile Ser Pro Asn
            820                 825                 830
Lys Val Pro Tyr Tyr Ile Asn His Glu Thr Gln Thr Thr Cys Trp Asp
        835                 840                 845
His Pro Lys Met Thr Glu Leu Tyr Gln Ser Leu Ala Asp Leu Asn Asn
    850                 855                 860
Val Arg Phe Ser Ala Tyr Arg Thr Ala Met Lys Leu Arg Arg Leu Gln
865                 870                 875                 880
Lys Ala Leu Cys Leu Asp Leu Leu Ser Leu Ser Ala Ala Cys Asp Ala
                885                 890                 895
Leu Asp Gln His Asn Leu Lys Gln Asn Asp Gln Pro Met Asp Ile Leu
            900                 905                 910
Gln Ile Ile Asn Cys Leu Thr Thr Ile Tyr Asp Arg Leu Glu Gln Glu
        915                 920                 925
His Asn Asn Leu Val Asn Val Pro Leu Cys Val Asp Met Cys Leu Asn
    930                 935                 940
Trp Leu Leu Asn Val Tyr Asp Thr Gly Arg Thr Gly Arg Ile Arg Val
945                 950                 955                 960
Leu Ser Phe Lys Thr Gly Ile Ile Ser Leu Cys Lys Ala His Leu Glu
                965                 970                 975
Asp Lys Tyr Arg Tyr Leu Phe Lys Gln Val Ala Ser Ser Thr Gly Phe
            980                 985                 990
Cys Asp Gln Arg Arg Leu Gly Leu  Leu Leu His Asp Ser  Ile Gln Ile
        995                 1000                 1005
Pro Arg  Gln Leu Gly Glu Val  Ala Ser Phe Gly Gly  Ser Asn Ile
    1010                 1015                 1020
Glu Pro  Ser Val Arg Ser Cys  Phe Gln Phe Ala Asn  Asn Lys Pro
    1025                 1030                 1035
Glu Ile  Glu Ala Ala Leu Phe  Leu Asp Trp Met Arg  Leu Glu Pro
    1040                 1045                 1050
Gln Ser  Met Val Trp Leu Pro  Val Leu His Arg Val  Ala Ala Ala
    1055                 1060                 1065
```

```
Glu Thr Ala Lys His Gln Ala Lys Cys Asn Ile Cys Lys Glu Cys
    1070            1075                1080

Pro Ile Ile Gly Phe Arg Tyr Arg Ser Leu Lys His Phe Asn Tyr
    1085            1090                1095

Asp Ile Cys Gln Ser Cys Phe Phe Ser Gly Arg Val Ala Lys Gly
    1100            1105                1110

His Lys Met His Tyr Pro Met Val Glu Tyr Cys Thr Pro Thr Thr
    1115            1120                1125

Ser Gly Glu
    1130

<210> SEQ ID NO 15
<211> LENGTH: 1131
<212> TYPE: PRT
<213> ORGANISM: Artificial Sequence
<220> FEATURE:
<223> OTHER INFORMATION: amino acid sequence for nano-dystrophin

<400> SEQUENCE: 15

Met Leu Trp Trp Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
                20                  25                  30

Gly Lys Gln His Ile Glu Asn Leu Phe Ser Asp Leu Gln Asp Gly Arg
            35                  40                  45

Arg Leu Leu Asp Leu Leu Glu Gly Leu Thr Gly Gln Lys Leu Pro Lys
50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
        115                 120                 125

Ala Gly Leu Gln Gln Thr Asn Ser Glu Lys Ile Leu Leu Ser Trp Val
    130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
            180                 185                 190

Thr Gln Arg Leu Glu His Ala Phe Asn Ile Ala Arg Tyr Gln Leu Gly
        195                 200                 205

Ile Glu Lys Leu Leu Asp Pro Glu Asp Val Asp Thr Thr Tyr Pro Asp
    210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
        275                 280                 285
```

```
Thr Ser Ser Pro Lys Pro Arg Phe Lys Ser Tyr Ala Tyr Thr Gln Ala
    290             295             300
Ala Tyr Val Thr Thr Ser Asp Pro Thr Arg Ser Pro Phe Pro Ser Gln
305             310             315             320
His Leu Glu Ala Pro Glu Asp Lys Ser Phe Gly Ser Ser Leu Met Glu
                325             330             335
Ser Glu Val Asn Leu Asp Arg Tyr Gln Thr Ala Leu Glu Glu Val Leu
            340             345             350
Ser Trp Leu Leu Ser Ala Glu Asp Thr Leu Gln Ala Gln Gly Glu Ile
        355             360             365
Ser Asn Asp Val Glu Val Val Lys Asp Gln Phe His Thr His Glu Gly
    370             375             380
Tyr Met Met Asp Leu Thr Ala His Gln Gly Arg Val Gly Asn Ile Leu
385             390             395             400
Gln Leu Gly Ser Lys Leu Ile Gly Thr Gly Lys Leu Ser Glu Asp Glu
                405             410             415
Glu Thr Glu Val Gln Glu Gln Met Asn Leu Leu Asn Ser Arg Trp Glu
            420             425             430
Cys Leu Arg Val Ala Ser Met Glu Lys Gln Ser Asn Leu His Arg Val
        435             440             445
Leu Met Asp Leu Gln Asn Gln Lys Leu Lys Glu Leu Asn Asp Trp Leu
    450             455             460
Thr Glu Ala Glu Thr Thr Ala Asn Val Leu Gln Asp Ala Thr Arg Lys
465             470             475             480
Glu Arg Leu Leu Glu Asp Ser Lys Gly Val Lys Glu Leu Met Lys Gln
                485             490             495
Trp Gln Asp Leu Gln Gly Glu Ile Glu Gln Glu Gln Val Arg Val Asn
            500             505             510
Ser Leu Thr His Met Val Val Val Asp Glu Ser Ser Gly Asp His
    515             520             525
Ala Thr Ala Ala Leu Glu Glu Gln Leu Lys Val Leu Gly Asp Arg Trp
530             535             540
Ala Asn Ile Cys Arg Trp Ser Glu Leu Arg Lys Ser Leu Asn Ile
545             550             555             560
Arg Ser His Leu Glu Ala Ser Ser Asp Gln Trp Lys Arg Leu His Leu
                565             570             575
Ser Leu Gln Glu Leu Leu Val Trp Leu Gln Leu Lys Asp Asp Glu Leu
            580             585             590
Ser Arg Gln Ala Pro Ile Gly Gly Asp Phe Pro Ala Val Gln Lys Gln
        595             600             605
Asn Asp Val His Arg Ala Phe Lys Arg Glu Leu Lys Thr Lys Glu Pro
    610             615             620
Val Ile Met Ser Thr Leu Glu Thr Val Arg Ile Phe Leu Thr Glu Gln
625             630             635             640
Pro Leu Glu Gly Leu Glu Lys Leu Tyr Gln Glu Pro Arg Glu Leu Pro
                645             650             655
Pro Glu Glu Arg Ala Gln Asn Val Thr Arg Leu Leu Arg Lys Gln Ala
            660             665             670
Glu Glu Val Asn Thr Glu Trp Glu Lys Leu Asn Leu His Ser Ala Asp
        675             680             685
Trp Gln Arg Lys Ile Asp Glu Thr Leu Glu Arg Leu Gln Glu Leu Gln
    690             695             700
```

```
Glu Ala Thr Asp Glu Leu Asp Leu Lys Leu Arg Gln Ala Glu Val Ile
705                 710                 715                 720

Lys Gly Ser Trp Gln Pro Val Gly Asp Leu Leu Ile Asp Ser Leu Gln
            725                 730                 735

Asp His Leu Glu Lys Val Lys Ala Leu Arg Gly Glu Ile Ala Pro Leu
            740                 745                 750

Lys Glu Asn Val Ser His Val Asn Asp Leu Ala Arg Gln Leu Thr Thr
            755                 760                 765

Leu Gly Ile Gln Leu Ser Pro Tyr Asn Leu Ser Thr Leu Glu Asp Leu
770                 775                 780

Asn Thr Arg Trp Lys Leu Leu Gln Val Ala Val Glu Asp Arg Val Arg
785                 790                 795                 800

Gln Leu His Glu Ala His Arg Asp Phe Gly Pro Ala Ser Gln His Phe
                805                 810                 815

Leu Ser Thr Ser Val Gln Gly Pro Trp Glu Arg Ala Ile Ser Pro Asn
                820                 825                 830

Lys Val Pro Tyr Tyr Ile Asn His Glu Thr Gln Thr Thr Cys Trp Asp
            835                 840                 845

His Pro Lys Met Thr Glu Leu Tyr Gln Ser Leu Ala Asp Leu Asn Asn
850                 855                 860

Val Arg Phe Ser Ala Tyr Arg Thr Ala Met Lys Leu Arg Arg Leu Gln
865                 870                 875                 880

Lys Ala Leu Cys Leu Asp Leu Leu Ser Leu Ser Ala Ala Cys Asp Ala
                885                 890                 895

Leu Asp Gln His Asn Leu Lys Gln Asn Asp Gln Pro Met Asp Ile Leu
            900                 905                 910

Gln Ile Ile Asn Cys Leu Thr Thr Ile Tyr Asp Arg Leu Glu Gln Glu
            915                 920                 925

His Asn Asn Leu Val Asn Val Pro Leu Cys Val Asp Met Cys Leu Asn
            930                 935                 940

Trp Leu Leu Asn Val Tyr Asp Thr Gly Arg Thr Gly Arg Ile Arg Val
945                 950                 955                 960

Leu Ser Phe Lys Thr Gly Ile Ile Ser Leu Cys Lys Ala His Leu Glu
                965                 970                 975

Asp Lys Tyr Arg Tyr Leu Phe Lys Gln Val Ala Ser Ser Thr Gly Phe
            980                 985                 990

Cys Asp Gln Arg Arg Leu Gly Leu Leu Leu His Asp Ser Ile Gln Ile
                995                1000                1005

Pro Arg Gln Leu Gly Glu Val Ala Ser Phe Gly Gly Ser Asn Ile
    1010                1015                1020

Glu Pro Ser Val Arg Ser Cys Phe Gln Phe Ala Asn Asn Lys Pro
    1025                1030                1035

Glu Ile Glu Ala Ala Leu Phe Leu Asp Trp Met Arg Leu Glu Pro
    1040                1045                1050

Gln Ser Met Val Trp Leu Pro Val Leu His Arg Val Ala Ala Ala
    1055                1060                1065

Glu Thr Ala Lys His Gln Ala Lys Cys Asn Ile Cys Lys Glu Cys
    1070                1075                1080

Pro Ile Ile Gly Phe Arg Tyr Arg Ser Leu Lys His Phe Asn Tyr
    1085                1090                1095

Asp Ile Cys Gln Ser Cys Phe Phe Ser Gly Arg Val Ala Lys Gly
    1100                1105                1110

His Lys Met His Tyr Pro Met Val Glu Tyr Cys Thr Pro Thr Thr
```

Ser Gly Glu
    1130

<210> SEQ ID NO 16
<211> LENGTH: 1131
<212> TYPE: PRT
<213> ORGANISM: Artificial Sequence
<220> FEATURE:
<223> OTHER INFORMATION: amino acid sequence for nano-dystrophin

<400> SEQUENCE: 16

Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg
        35                  40                  45

Arg Leu Leu Asp Leu Leu Glu Gly Leu Thr Gly Gln Lys Leu Pro Lys
50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
        115                 120                 125

Ala Gly Leu Gln Gln Thr Asn Ser Glu Lys Ile Leu Leu Ser Trp Val
130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
            180                 185                 190

Thr Gln Arg Leu Glu His Ala Phe Asn Ile Ala Arg Tyr Gln Leu Gly
        195                 200                 205

Ile Glu Lys Leu Leu Asp Pro Glu Asp Val Asp Thr Thr Tyr Pro Asp
210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
        275                 280                 285

Thr Ser Ser Pro Lys Pro Arg Phe Lys Ser Tyr Ala Tyr Thr Gln Ala
290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                325                 330                 335

Ser Glu Val Asn Leu Asp Arg Tyr Gln Thr Ala Leu Glu Glu Val Leu

```
                340                 345                 350
Ser Trp Leu Leu Ser Ala Glu Asp Thr Leu Gln Ala Gln Gly Glu Ile
            355                 360                 365

Ser Asn Asp Val Glu Val Val Lys Asp Gln Phe His Thr His Glu Gly
    370                 375                 380

Tyr Met Met Asp Leu Thr Ala His Gln Gly Arg Val Gly Asn Ile Leu
385                 390                 395                 400

Gln Leu Gly Ser Lys Leu Ile Gly Thr Gly Lys Leu Ser Glu Asp Glu
                405                 410                 415

Glu Thr Glu Val Gln Glu Gln Met Asn Leu Leu Asn Ser Arg Trp Glu
            420                 425                 430

Cys Leu Arg Val Ala Ser Met Glu Lys Gln Ser Asn Leu His Arg Val
            435                 440                 445

Leu Met Asp Leu Gln Asn Gln Lys Leu Lys Glu Leu Asn Asp Trp Leu
        450                 455                 460

Thr Glu Ala Glu Thr Thr Ala Asn Val Leu Gln Asp Ala Thr Arg Lys
465                 470                 475                 480

Glu Arg Leu Leu Glu Asp Ser Lys Gly Val Lys Glu Leu Met Lys Gln
                485                 490                 495

Trp Gln Asp Leu Gln Gly Glu Ile Glu Ala Glu Gln Val Arg Val Asn
            500                 505                 510

Ser Leu Thr His Met Val Val Val Asp Glu Ser Ser Gly Asp His
        515                 520                 525

Ala Thr Ala Ala Leu Glu Glu Gln Leu Lys Val Leu Gly Asp Arg Trp
        530                 535                 540

Ala Asn Ile Cys Arg Trp Ser Glu Leu Arg Lys Lys Ser Leu Asn Ile
545                 550                 555                 560

Arg Ser His Leu Glu Ala Ser Ser Asp Gln Trp Lys Arg Leu His Leu
                565                 570                 575

Ser Leu Gln Glu Leu Leu Val Trp Leu Gln Leu Lys Asp Asp Glu Leu
            580                 585                 590

Ser Arg Gln Ala Pro Ile Gly Gly Asp Phe Pro Ala Val Gln Lys Gln
            595                 600                 605

Asn Asp Val His Arg Ala Phe Lys Arg Glu Leu Lys Thr Lys Glu Pro
    610                 615                 620

Val Ile Met Ser Thr Leu Glu Thr Val Arg Ile Phe Leu Thr Glu Gln
625                 630                 635                 640

Pro Leu Glu Gly Leu Glu Lys Leu Tyr Gln Glu Pro Arg Glu Leu Pro
                645                 650                 655

Pro Glu Glu Arg Ala Gln Asn Val Thr Arg Leu Leu Arg Lys Gln Ala
            660                 665                 670

Glu Glu Val Asn Thr Glu Trp Glu Lys Leu Asn Leu His Ser Ala Asp
                675                 680                 685

Trp Gln Arg Lys Ile Asp Glu Thr Leu Glu Arg Leu Gln Glu Leu Gln
        690                 695                 700

Glu Ala Thr Asp Glu Leu Asp Leu Lys Leu Arg Gln Ala Glu Val Ile
705                 710                 715                 720

Lys Gly Ser Trp Gln Pro Val Gly Asp Leu Leu Ile Asp Ser Leu Gln
                725                 730                 735

Asp His Leu Glu Lys Val Lys Ala Leu Arg Gly Glu Ile Ala Pro Leu
            740                 745                 750

Lys Glu Asn Val Ser His Val Asn Asp Leu Ala Arg Gln Leu Thr Thr
        755                 760                 765
```

```
Leu Gly Ile Gln Leu Ser Pro Tyr Asn Leu Ser Thr Leu Glu Asp Leu
    770                 775                 780

Asn Thr Arg Trp Lys Leu Leu Gln Val Ala Val Glu Asp Arg Val Arg
785                 790                 795                 800

Gln Leu His Glu Ala His Arg Asp Phe Gly Pro Ala Ser Gln His Phe
                805                 810                 815

Leu Ser Thr Ser Val Gln Gly Pro Trp Glu Arg Ala Ile Ser Pro Asn
            820                 825                 830

Lys Val Pro Tyr Tyr Ile Asn His Glu Thr Gln Thr Cys Trp Asp
        835                 840                 845

His Pro Lys Met Thr Glu Leu Tyr Gln Ser Leu Ala Asp Leu Asn Asn
    850                 855                 860

Val Arg Phe Ser Ala Tyr Arg Thr Ala Met Lys Leu Arg Arg Leu Gln
865                 870                 875                 880

Lys Ala Leu Cys Leu Asp Leu Ser Leu Ser Ala Ala Cys Asp Ala
                885                 890                 895

Leu Asp Gln His Asn Leu Lys Gln Asn Asp Gln Pro Met Asp Ile Leu
            900                 905                 910

Gln Ile Ile Asn Cys Leu Thr Thr Ile Tyr Asp Arg Leu Glu Gln Glu
        915                 920                 925

His Asn Asn Leu Val Asn Val Pro Leu Cys Val Asp Met Cys Leu Asn
    930                 935                 940

Trp Leu Leu Asn Val Tyr Asp Thr Gly Arg Thr Gly Arg Ile Arg Val
945                 950                 955                 960

Leu Ser Phe Lys Thr Gly Ile Ile Ser Leu Cys Lys Ala His Leu Glu
                965                 970                 975

Asp Lys Tyr Arg Tyr Leu Phe Lys Gln Val Ala Ser Ser Thr Gly Phe
            980                 985                 990

Cys Asp Gln Arg Arg Leu Gly Leu  Leu Leu His Asp Ser  Ile Gln Ile
                995                 1000                1005

Pro Arg  Gln Leu Gly Glu Val  Ala Ser Phe Gly Gly  Ser Asn Ile
    1010                1015                1020

Glu Pro  Ser Val Arg Ser Cys  Phe Gln Phe Ala Asn  Asn Lys Pro
    1025                1030                1035

Glu Ile  Glu Ala Ala Leu Phe  Leu Asp Trp Met Arg  Leu Glu Pro
    1040                1045                1050

Gln Ser  Met Val Trp Leu Pro  Val Leu His Arg Val  Ala Ala Ala
    1055                1060                1065

Glu Thr  Ala Lys His Gln Ala  Lys Cys Asn Ile Cys  Lys Glu Cys
    1070                1075                1080

Pro Ile  Ile Gly Phe Arg Tyr  Arg Ser Leu Lys His  Phe Asn Tyr
    1085                1090                1095

Asp Ile  Cys Gln Ser Cys Phe  Phe Ser Gly Arg Val  Ala Lys Gly
    1100                1105                1110

His Lys  Met His Tyr Pro Met  Val Glu Tyr Cys Thr  Pro Thr Thr
    1115                1120                1125

Ser Gly  Glu
    1130

<210> SEQ ID NO 17
<211> LENGTH: 1131
<212> TYPE: PRT
<213> ORGANISM: Artificial Sequence
<220> FEATURE:
```

<223> OTHER INFORMATION: amino acid sequence for nano-dystrophin

<400> SEQUENCE: 17

```
Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg
        35                  40                  45

Arg Leu Leu Asp Leu Leu Glu Gly Leu Thr Gly Gln Lys Leu Pro Lys
50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
            115                 120                 125

Ala Gly Leu Gln Gln Thr Asn Ser Glu Lys Ile Leu Leu Ser Trp Val
130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
            165                 170                 175

Arg Pro Asp Leu Phe Asp Trp Asn Ser Val Val Cys Gln Gln Ser Ala
            180                 185                 190

Thr Gln Arg Leu Glu His Ala Phe Asn Ile Ala Arg Tyr Gln Leu Gly
            195                 200                 205

Ile Glu Lys Leu Leu Asp Pro Glu Asp Val Asp Thr Thr Tyr Pro Asp
210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
            245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
            275                 280                 285

Thr Ser Ser Pro Lys Pro Arg Phe Lys Ser Tyr Ala Tyr Thr Gln Ala
            290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
            325                 330                 335

Ser Glu Val Asn Leu Asp Arg Tyr Gln Thr Ala Leu Glu Glu Val Leu
            340                 345                 350

Ser Trp Leu Leu Ser Ala Glu Asp Thr Leu Gln Ala Gln Gly Glu Ile
            355                 360                 365

Ser Asn Asp Val Glu Val Val Lys Asp Gln Phe His Thr His Glu Gly
            370                 375                 380

Tyr Met Met Asp Leu Thr Ala His Gln Gly Arg Val Gly Asn Ile Leu
385                 390                 395                 400
```

```
Gln Leu Gly Ser Lys Leu Ile Gly Thr Gly Lys Leu Ser Glu Asp Glu
                405                 410                 415

Glu Thr Glu Val Gln Glu Gln Met Asn Leu Leu Asn Ser Arg Trp Glu
            420                 425                 430

Cys Leu Arg Val Ala Ser Met Glu Lys Gln Ser Asn Leu His Arg Val
        435                 440                 445

Leu Met Asp Leu Gln Asn Gln Lys Leu Lys Glu Leu Asn Asp Trp Leu
    450                 455                 460

Thr Glu Ala Glu Thr Thr Ala Asn Val Leu Gln Asp Ala Thr Arg Lys
465                 470                 475                 480

Glu Arg Leu Leu Glu Asp Ser Lys Gly Val Lys Glu Leu Met Lys Gln
                485                 490                 495

Trp Gln Asp Leu Gln Gly Glu Ile Glu Ala His Gln Val Arg Val Asn
            500                 505                 510

Ser Leu Thr His Met Val Val Val Asp Glu Ser Ser Gly Asp His
        515                 520                 525

Ala Thr Ala Ala Leu Glu Glu Gln Leu Lys Val Leu Gly Asp Arg Trp
    530                 535                 540

Ala Asn Ile Cys Arg Trp Ser Glu Leu Arg Lys Lys Ser Leu Asn Ile
545                 550                 555                 560

Arg Ser His Leu Glu Ala Ser Ser Asp Gln Trp Lys Arg Leu His Leu
                565                 570                 575

Ser Leu Gln Glu Leu Leu Val Trp Leu Gln Leu Lys Asp Asp Glu Leu
            580                 585                 590

Ser Arg Gln Ala Pro Ile Gly Gly Asp Phe Pro Ala Val Gln Lys Gln
        595                 600                 605

Asn Asp Val His Arg Ala Phe Lys Arg Glu Leu Lys Thr Lys Glu Pro
    610                 615                 620

Val Ile Met Ser Thr Leu Glu Thr Val Arg Ile Phe Leu Thr Glu Gln
625                 630                 635                 640

Pro Leu Glu Gly Leu Glu Lys Leu Tyr Gln Glu Pro Arg Glu Leu Pro
                645                 650                 655

Pro Glu Glu Arg Ala Gln Asn Val Thr Arg Leu Leu Arg Lys Gln Ala
            660                 665                 670

Glu Glu Val Asn Thr Glu Trp Glu Lys Leu Asn Leu His Ser Ala Asp
        675                 680                 685

Trp Gln Arg Lys Ile Asp Glu Thr Leu Glu Arg Leu Gln Glu Leu Gln
    690                 695                 700

Glu Ala Thr Asp Glu Leu Asp Leu Lys Leu Arg Gln Ala Glu Val Ile
705                 710                 715                 720

Lys Gly Ser Trp Gln Pro Val Gly Asp Leu Leu Ile Asp Ser Leu Gln
                725                 730                 735

Asp His Leu Glu Lys Val Lys Ala Leu Arg Gly Glu Ile Ala Pro Leu
            740                 745                 750

Lys Glu Asn Val Ser His Val Asn Asp Leu Ala Arg Gln Leu Thr Thr
        755                 760                 765

Leu Gly Ile Gln Leu Ser Pro Tyr Asn Leu Ser Thr Leu Glu Asp Leu
    770                 775                 780

Asn Thr Arg Trp Lys Leu Leu Gln Val Ala Val Glu Asp Arg Val Arg
785                 790                 795                 800

Gln Leu His Glu Ala His Arg Asp Phe Gly Pro Ala Ser Gln His Phe
                805                 810                 815

Leu Ser Thr Ser Val Gln Gly Pro Trp Glu Arg Ala Ile Ser Pro Asn
```

820                 825                 830
Lys Val Pro Tyr Tyr Ile Asn His Glu Thr Gln Thr Thr Cys Trp Asp
            835                 840                 845

His Pro Lys Met Thr Glu Leu Tyr Gln Ser Leu Ala Asp Leu Asn Asn
    850                 855                 860

Val Arg Phe Ser Ala Tyr Arg Thr Ala Met Lys Leu Arg Arg Leu Gln
865                 870                 875                 880

Lys Ala Leu Cys Leu Asp Leu Leu Ser Leu Ser Ala Ala Cys Asp Ala
            885                 890                 895

Leu Asp Gln His Asn Leu Lys Gln Asn Asp Gln Pro Met Asp Ile Leu
        900                 905                 910

Gln Ile Ile Asn Cys Leu Thr Thr Ile Tyr Asp Arg Leu Glu Gln Glu
            915                 920                 925

His Asn Asn Leu Val Asn Val Pro Leu Cys Val Asp Met Cys Leu Asn
    930                 935                 940

Trp Leu Leu Asn Val Tyr Asp Thr Gly Arg Thr Gly Arg Ile Arg Val
945                 950                 955                 960

Leu Ser Phe Lys Thr Gly Ile Ile Ser Leu Cys Lys Ala His Leu Glu
                965                 970                 975

Asp Lys Tyr Arg Tyr Leu Phe Lys Gln Val Ala Ser Ser Thr Gly Phe
            980                 985                 990

Cys Asp Gln Arg Arg Leu Gly Leu  Leu Leu His Asp Ser  Ile Gln Ile
            995                 1000                1005

Pro Arg  Gln Leu Gly Glu Val  Ala Ser Phe Gly Gly  Ser Asn Ile
    1010                1015                1020

Glu Pro  Ser Val Arg Ser Cys  Phe Gln Phe Ala Asn  Asn Lys Pro
    1025                1030                1035

Glu Ile  Glu Ala Ala Leu Phe  Leu Asp Trp Met Arg  Leu Glu Pro
    1040                1045                1050

Gln Ser  Met Val Trp Leu Pro  Val Leu His Arg Val  Ala Ala Ala
    1055                1060                1065

Glu Thr  Ala Lys His Gln Ala  Lys Cys Asn Ile Cys  Lys Glu Cys
    1070                1075                1080

Pro Ile  Ile Gly Phe Arg Tyr  Arg Ser Leu Lys His  Phe Asn Tyr
    1085                1090                1095

Asp Ile  Cys Gln Ser Cys Phe  Phe Ser Gly Arg Val  Ala Lys Gly
    1100                1105                1110

His Lys  Met His Tyr Pro Met  Val Glu Tyr Cys Thr  Pro Thr Thr
    1115                1120                1125

Ser Gly  Glu
    1130

<210> SEQ ID NO 18
<211> LENGTH: 1131
<212> TYPE: PRT
<213> ORGANISM: Artificial Sequence
<220> FEATURE:
<223> OTHER INFORMATION: amino acid sequence for nano-dystrophin

<400> SEQUENCE: 18

Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg

```
            35                  40                  45
Arg Leu Leu Asp Leu Leu Glu Gly Leu Thr Gly Gln Lys Leu Pro Lys
 50                  55                  60

Glu Lys Gly Ser Thr Arg Val His Ala Leu Asn Asn Val Asn Lys Ala
 65                  70                  75                  80

Leu Arg Val Leu Gln Asn Asn Val Asp Leu Val Asn Ile Gly Ser
                 85                  90                  95

Thr Asp Ile Val Asp Gly Asn His Lys Leu Thr Leu Gly Leu Ile Trp
                100                 105                 110

Asn Ile Ile Leu His Trp Gln Val Lys Asn Val Met Lys Asn Ile Met
            115                 120                 125

Ala Gly Leu Gln Gln Thr Asn Ser Glu Lys Ile Leu Leu Ser Trp Val
 130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
                180                 185                 190

Thr Gln Arg Leu Glu His Ala Phe Asn Ile Ala Arg Tyr Gln Leu Gly
            195                 200                 205

Ile Glu Lys Leu Leu Asp Pro Glu Asp Val Asp Thr Thr Tyr Pro Asp
210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                245                 250                 255

Pro Pro Lys Val Thr Lys Glu Glu His Phe Gln Leu His Gln Met
                260                 265                 270

His Tyr Ser Gln Gln Ile Thr Val Ser Leu Ala Gln Gly Tyr Glu Arg
            275                 280                 285

Thr Ser Ser Pro Lys Pro Arg Phe Lys Ser Tyr Ala Tyr Thr Gln Ala
290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                325                 330                 335

Ser Glu Val Asn Leu Asp Arg Tyr Gln Thr Ala Leu Glu Glu Val Leu
            340                 345                 350

Ser Trp Leu Leu Ser Ala Glu Asp Thr Leu Gln Ala Gln Gly Glu Ile
            355                 360                 365

Ser Asn Asp Val Glu Val Lys Asp Gln Phe His Thr His Glu Gly
            370                 375                 380

Tyr Met Met Asp Leu Thr Ala His Gln Gly Arg Val Gly Asn Ile Leu
385                 390                 395                 400

Gln Leu Gly Ser Lys Leu Ile Gly Thr Gly Lys Leu Ser Glu Asp Glu
                405                 410                 415

Glu Thr Glu Val Gln Glu Gln Met Asn Leu Leu Asn Ser Arg Trp Glu
            420                 425                 430

Cys Leu Arg Val Ala Ser Met Glu Lys Gln Ser Asn Leu His Arg Val
                435                 440                 445

Leu Met Asp Leu Gln Asn Gln Lys Leu Lys Glu Leu Asn Asp Trp Leu
            450                 455                 460
```

```
Thr Glu Ala Glu Thr Thr Ala Asn Val Leu Gln Asp Ala Thr Arg Lys
465                 470                 475                 480

Glu Arg Leu Leu Glu Asp Ser Lys Gly Val Lys Glu Leu Met Lys Gln
                485                 490                 495

Trp Gln Asp Leu Gln Gly Glu Ile Glu Ala His Thr Val Arg Val Asn
            500                 505                 510

Ser Leu Thr His Met Val Val Val Asp Glu Ser Ser Gly Asp His
            515                 520                 525

Ala Thr Ala Ala Leu Glu Gln Leu Lys Val Leu Gly Asp Arg Trp
530                 535                 540

Ala Asn Ile Cys Arg Trp Ser Glu Leu Arg Lys Lys Ser Leu Asn Ile
545                 550                 555                 560

Arg Ser His Leu Glu Ala Ser Ser Asp Gln Trp Lys Arg Leu His Leu
                565                 570                 575

Ser Leu Gln Glu Leu Leu Val Trp Leu Gln Leu Lys Asp Asp Glu Leu
            580                 585                 590

Ser Arg Gln Ala Pro Ile Gly Gly Asp Phe Pro Ala Val Gln Lys Gln
        595                 600                 605

Asn Asp Val His Arg Ala Phe Lys Arg Glu Leu Lys Thr Lys Glu Pro
610                 615                 620

Val Ile Met Ser Thr Leu Glu Thr Val Arg Ile Phe Leu Thr Glu Gln
625                 630                 635                 640

Pro Leu Glu Gly Leu Glu Lys Leu Tyr Gln Glu Pro Arg Glu Leu Pro
                645                 650                 655

Pro Glu Glu Arg Ala Gln Asn Val Thr Arg Leu Leu Arg Lys Gln Ala
            660                 665                 670

Glu Glu Val Asn Thr Glu Trp Glu Lys Leu Asn Leu His Ser Ala Asp
        675                 680                 685

Trp Gln Arg Lys Ile Asp Glu Thr Leu Glu Arg Leu Gln Glu Leu Gln
    690                 695                 700

Glu Ala Thr Asp Glu Leu Asp Leu Lys Leu Arg Gln Ala Glu Val Ile
705                 710                 715                 720

Lys Gly Ser Trp Gln Pro Val Gly Asp Leu Leu Ile Asp Ser Leu Gln
                725                 730                 735

Asp His Leu Glu Lys Val Lys Ala Leu Arg Gly Glu Ile Ala Pro Leu
            740                 745                 750

Lys Glu Asn Val Ser His Val Asn Asp Leu Ala Arg Gln Leu Thr Thr
        755                 760                 765

Leu Gly Ile Gln Leu Ser Pro Tyr Asn Leu Ser Thr Leu Glu Asp Leu
    770                 775                 780

Asn Thr Arg Trp Lys Leu Leu Gln Val Ala Val Glu Asp Arg Val Arg
785                 790                 795                 800

Gln Leu His Glu Ala His Arg Asp Phe Gly Pro Ala Ser Gln His Phe
                805                 810                 815

Leu Ser Thr Ser Val Gln Gly Pro Trp Glu Arg Ala Ile Ser Pro Asn
            820                 825                 830

Lys Val Pro Tyr Tyr Ile Asn His Glu Thr Gln Thr Thr Cys Trp Asp
        835                 840                 845

His Pro Lys Met Thr Glu Leu Tyr Gln Ser Leu Ala Asp Leu Asn Asn
    850                 855                 860

Val Arg Phe Ser Ala Tyr Arg Thr Ala Met Lys Leu Arg Arg Leu Gln
865                 870                 875                 880
```

```
Lys Ala Leu Cys Leu Asp Leu Leu Ser Leu Ser Ala Ala Cys Asp Ala
                885                 890                 895

Leu Asp Gln His Asn Leu Lys Gln Asn Asp Gln Pro Met Asp Ile Leu
        900                 905                 910

Gln Ile Ile Asn Cys Leu Thr Thr Ile Tyr Asp Arg Leu Glu Gln Glu
            915                 920                 925

His Asn Asn Leu Val Asn Val Pro Leu Cys Val Asp Met Cys Leu Asn
        930                 935                 940

Trp Leu Leu Asn Val Tyr Asp Thr Gly Arg Thr Gly Arg Ile Arg Val
945                 950                 955                 960

Leu Ser Phe Lys Thr Gly Ile Ile Ser Leu Cys Lys Ala His Leu Glu
                965                 970                 975

Asp Lys Tyr Arg Tyr Leu Phe Lys Gln Val Ala Ser Ser Thr Gly Phe
            980                 985                 990

Cys Asp Gln Arg Arg Leu Gly Leu Leu Leu His Asp Ser Ile Gln Ile
        995                 1000                1005

Pro Arg Gln Leu Gly Glu Val Ala Ser Phe Gly Gly Ser Asn Ile
    1010                1015                1020

Glu Pro Ser Val Arg Ser Cys Phe Gln Phe Ala Asn Asn Lys Pro
    1025                1030                1035

Glu Ile Glu Ala Ala Leu Phe Leu Asp Trp Met Arg Leu Glu Pro
    1040                1045                1050

Gln Ser Met Val Trp Leu Pro Val Leu His Arg Val Ala Ala Ala
    1055                1060                1065

Glu Thr Ala Lys His Gln Ala Lys Cys Asn Ile Cys Lys Glu Cys
    1070                1075                1080

Pro Ile Ile Gly Phe Arg Tyr Arg Ser Leu Lys His Phe Asn Tyr
    1085                1090                1095

Asp Ile Cys Gln Ser Cys Phe Phe Ser Gly Arg Val Ala Lys Gly
    1100                1105                1110

His Lys Met His Tyr Pro Met Val Glu Tyr Cys Thr Pro Thr Thr
    1115                1120                1125

Ser Gly Glu
    1130

<210> SEQ ID NO 19
<211> LENGTH: 3420
<212> TYPE: DNA
<213> ORGANISM: Artificial Sequence
<220> FEATURE:
<223> OTHER INFORMATION: engineered suquence encoding nano-utrophin
<220> FEATURE:
<221> NAME/KEY: CDS
<222> LOCATION: (1)..(3420)

<400> SEQUENCE: 19 atg gct aag tat ggc gag cat gag gct tct ccc gac aac ggc cag aac     48
Met Ala Lys Tyr Gly Glu His Glu Ala Ser Pro Asp Asn Gly Gln Asn
1               5                   10                  15 gag ttc tcc gac atc atc aag tcc cgc tcc gac gag cac aac gac gtg     96
Glu Phe Ser Asp Ile Ile Lys Ser Arg Ser Asp Glu His Asn Asp Val
                20                  25                  30 cag aag aaa acc ttc acc aag tgg atc aac gcc agg ttc tcc aag tcc    144
Gln Lys Lys Thr Phe Thr Lys Trp Ile Asn Ala Arg Phe Ser Lys Ser
            35                  40                  45 ggc aag cct cct atc aac gac atg ttc acc gac ctg aag gac ggc cgc    192
Gly Lys Pro Pro Ile Asn Asp Met Phe Thr Asp Leu Lys Asp Gly Arg
        50                  55                  60
```

```
aaa ctg ctg gat ctg ctg gaa gga ctg acc ggc acc tct ctg cct aaa        240
Lys Leu Leu Asp Leu Leu Glu Gly Leu Thr Gly Thr Ser Leu Pro Lys
 65                  70                  75                  80 gaa agg ggc tct act agg gtg cac gcc ctg aac aat gtg aac agg gtg        288
Glu Arg Gly Ser Thr Arg Val His Ala Leu Asn Asn Val Asn Arg Val
                 85                  90                  95 ctc cag gtg ctg cac cag aac aac gtc gag ctg gtc aat atc ggc ggc        336
Leu Gln Val Leu His Gln Asn Asn Val Glu Leu Val Asn Ile Gly Gly
             100                 105                 110 acc gac atc gtg gat ggc aac cat aag ctg acc ctg ggc ctg ctg tgg        384
Thr Asp Ile Val Asp Gly Asn His Lys Leu Thr Leu Gly Leu Leu Trp
         115                 120                 125 tcc atc att ctg cac tgg cag gtc aaa gac gtg atg aag gac gtg atg        432
Ser Ile Ile Leu His Trp Gln Val Lys Asp Val Met Lys Asp Val Met
130                 135                 140 tcc gac ctc cag cag acc aac tcc gag aag atc ctg ctg tct tgg gtc        480
Ser Asp Leu Gln Gln Thr Asn Ser Glu Lys Ile Leu Leu Ser Trp Val
145                 150                 155                 160 cgc cag acc act agg ccc tat tct cag gtc aac gtg ctg aac ttc acc        528
Arg Gln Thr Thr Arg Pro Tyr Ser Gln Val Asn Val Leu Asn Phe Thr
                165                 170                 175 acc tct tgg acc gac gga ctg gcc ttc aat gct gtg ctg cac agg cac        576
Thr Ser Trp Thr Asp Gly Leu Ala Phe Asn Ala Val Leu His Arg His
            180                 185                 190 aag ccc gac ctg ttc tct tgg gac aaa gtg gtc aag atg agc ccc atc        624
Lys Pro Asp Leu Phe Ser Trp Asp Lys Val Val Lys Met Ser Pro Ile
        195                 200                 205 gag agg ctg gaa cac gcc ttc tct aag gcc cag acc tac ctg gga atc        672
Glu Arg Leu Glu His Ala Phe Ser Lys Ala Gln Thr Tyr Leu Gly Ile
    210                 215                 220 gag aag ctg ctg gac cct gag gat gtg gca gtg cag ctg ccc gac aag        720
Glu Lys Leu Leu Asp Pro Glu Asp Val Ala Val Gln Leu Pro Asp Lys
225                 230                 235                 240 aaa tcc atc atc atg tac ctg acc agc ctg ttc gag gtg ctg cct cag        768
Lys Ser Ile Ile Met Tyr Leu Thr Ser Leu Phe Glu Val Leu Pro Gln
                245                 250                 255 cag gtc aca att gat gcc atc cgc gag gtg gaa acc ctg cct cgc aag        816
Gln Val Thr Ile Asp Ala Ile Arg Glu Val Glu Thr Leu Pro Arg Lys
            260                 265                 270 tac aag aaa gag tgc gag gaa gag gcc atc aac atc cag tcc act gct        864
Tyr Lys Lys Glu Cys Glu Glu Glu Ala Ile Asn Ile Gln Ser Thr Ala
        275                 280                 285 ccc gag gaa gaa cac gag tct cca agg gcc gag act cct tcc acc gtg        912
Pro Glu Glu Glu His Glu Ser Pro Arg Ala Glu Thr Pro Ser Thr Val
    290                 295                 300 act gaa gtg gac atg gac ctg gac tcc tac cag atc gct ctg gaa gag        960
Thr Glu Val Asp Met Asp Leu Asp Ser Tyr Gln Ile Ala Leu Glu Glu
305                 310                 315                 320 gtg ctg act tgg ctg ctg tcc gcc gag gat act ttc cag gaa cag gac       1008
Val Leu Thr Trp Leu Leu Ser Ala Glu Asp Thr Phe Gln Glu Gln Asp
                325                 330                 335 gac atc tcc gac gac gtc gag gaa gtg aag gac cag ttc gcc act cac       1056
Asp Ile Ser Asp Asp Val Glu Glu Val Lys Asp Gln Phe Ala Thr His
            340                 345                 350 gag gct ttc atg atg gaa ctg act gcc cac cag tcc tcc gtg gga agt       1104
Glu Ala Phe Met Met Glu Leu Thr Ala His Gln Ser Ser Val Gly Ser
        355                 360                 365 gtc ctc cag gct gga aac cag ctg atc acc cag gga acc ctg tcc gat       1152
Val Leu Gln Ala Gly Asn Gln Leu Ile Thr Gln Gly Thr Leu Ser Asp
```

```
                370               375                 380
gag gaa gag ttc gag att cag gaa cag atg acc ctg ctg aac gcc aga    1200
Glu Glu Glu Phe Glu Ile Gln Glu Gln Met Thr Leu Leu Asn Ala Arg
385                 390                 395                 400 tgg gaa gct ctg agg gtc gag tcc atg gat agg cag tct agg ctg cac    1248
Trp Glu Ala Leu Arg Val Glu Ser Met Asp Arg Gln Ser Arg Leu His
                405                 410                 415 gac gtg ctc atg gaa ctc cag aag aag cag ctc cag cag ctg tcc gct    1296
Asp Val Leu Met Glu Leu Gln Lys Lys Gln Leu Gln Gln Leu Ser Ala
            420                 425                 430 tgg atc cag gaa gcc gag act acc gtc aat gtg ctg gtg gac gcc tct    1344
Trp Ile Gln Glu Ala Glu Thr Thr Val Asn Val Leu Val Asp Ala Ser
        435                 440                 445 cac aga gag aac gcc ctc cag gat tcc atc ctg gct agg gaa ctg aag    1392
His Arg Glu Asn Ala Leu Gln Asp Ser Ile Leu Ala Arg Glu Leu Lys
    450                 455                 460 cag cag atg cag gac atc cag gcc gag atc gac gct cac cag gtc aaa    1440
Gln Gln Met Gln Asp Ile Gln Ala Glu Ile Asp Ala His Gln Val Lys
465                 470                 475                 480 gtg aac tcc ctg act cac atg gtg gtc atc gtg gac gag aat tcc ggc    1488
Val Asn Ser Leu Thr His Met Val Val Ile Val Asp Glu Asn Ser Gly
                485                 490                 495 gag tct gcc acc gct atc ctg gaa gat cag ctc cag aaa ctg ggc gag    1536
Glu Ser Ala Thr Ala Ile Leu Glu Asp Gln Leu Gln Lys Leu Gly Glu
                500                 505                 510 cgc tgg aac gat ctg aag gct aag tcc gcc tct atc agg gcc cat ctg    1584
Arg Trp Asn Asp Leu Lys Ala Lys Ser Ala Ser Ile Arg Ala His Leu
            515                 520                 525 gaa gcc tct gcc gag aag tgg aat agg ctg ctg atg tcc ctg gaa gaa    1632
Glu Ala Ser Ala Glu Lys Trp Asn Arg Leu Leu Met Ser Leu Glu Glu
        530                 535                 540 ctg atc aag tgg ctg aac atg aag gat gag gaa ctc aag aaa cag atg    1680
Leu Ile Lys Trp Leu Asn Met Lys Asp Glu Glu Leu Lys Lys Gln Met
545                 550                 555                 560 ccc atc gga ggc gac gtg cca gct ctc cag ctc cag tat gat cat tgc    1728
Pro Ile Gly Gly Asp Val Pro Ala Leu Gln Leu Gln Tyr Asp His Cys
                565                 570                 575 aag gct ctg agg cgc gag ctg aaa gag aaa gag tac tcc gtc ctg aac    1776
Lys Ala Leu Arg Arg Glu Leu Lys Glu Lys Glu Tyr Ser Val Leu Asn
                580                 585                 590 gcc gtg gat cag gct agg gtg ttc ctg gcc gat cag cct att gag gct    1824
Ala Val Asp Gln Ala Arg Val Phe Leu Ala Asp Gln Pro Ile Glu Ala
            595                 600                 605 cct gag gaa cct agg cgg aac ctc cag tcc aag acc gag ctg act cct    1872
Pro Glu Glu Pro Arg Arg Asn Leu Gln Ser Lys Thr Glu Leu Thr Pro
        610                 615                 620 gaa gag agg gcc cag aaa atc gcc aag gct atg cgc aag cag tcc agc    1920
Glu Glu Arg Ala Gln Lys Ile Ala Lys Ala Met Arg Lys Gln Ser Ser
625                 630                 635                 640 gaa gtc aaa gag aag tgg gag tcc ctg aat gcc gtg acc tcc aac tgg    1968
Glu Val Lys Glu Lys Trp Glu Ser Leu Asn Ala Val Thr Ser Asn Trp
                645                 650                 655 cag aaa cag gtg gac aag gcc ctg gaa aag ctg agg gat ctc cag ggc    2016
Gln Lys Gln Val Asp Lys Ala Leu Glu Lys Leu Arg Asp Leu Gln Gly
                660                 665                 670 gct atg gac gac ctg gac gcc gat atg aag gaa gct gag tcc gtc aga    2064
Ala Met Asp Asp Leu Asp Ala Asp Met Lys Glu Ala Glu Ser Val Arg
            675                 680                 685 aac ggc tgg aag cca gtg gga gat ctg ctg att gat agc ctc cag gac    2112
```

-continued

| | | | | | | | | | | | | | | |
|---|---|---|---|---|---|---|---|---|---|---|---|---|---|---|
| Asn | Gly 690 | Trp | Lys | Pro | Val 695 | Gly | Asp | Leu | Leu | Ile 700 | Asp | Ser | Leu | Gln | Asp |

```
cac att gag aag atc atg gcc ttc agg gaa gag atc gcc cct atc aac      2160
His Ile Glu Lys Ile Met Ala Phe Arg Glu Glu Ile Ala Pro Ile Asn
705             710                 715                 720 ttc aaa gtc aag acc gtg aac gac ctg tcc agc cag ctg agc cct ctg      2208
Phe Lys Val Lys Thr Val Asn Asp Leu Ser Ser Gln Leu Ser Pro Leu
                725                 730                 735 gat ctc cat cca agc ctg aag atg agc agg cag ctg gat gac ctg aac      2256
Asp Leu His Pro Ser Leu Lys Met Ser Arg Gln Leu Asp Asp Leu Asn
                740                 745                 750 atg cgc tgg aaa ctc ctc cag gtg tcc gtg gac gat agg ctg aaa cag      2304
Met Arg Trp Lys Leu Leu Gln Val Ser Val Asp Asp Arg Leu Lys Gln
            755                 760                 765 ctc cag gaa gct cac aga gac ttc ggc cct agc tct cag cac ttc ctg      2352
Leu Gln Glu Ala His Arg Asp Phe Gly Pro Ser Ser Gln His Phe Leu
770                 775                 780 tct acc tct gtg cag ctc cct tgg cag cgc tcc atc tct cac aac aag      2400
Ser Thr Ser Val Gln Leu Pro Trp Gln Arg Ser Ile Ser His Asn Lys
785                 790                 795                 800 gtg ccc tac tac atc aac cac cag act cag acc acc tgt tgg gat cac      2448
Val Pro Tyr Tyr Ile Asn His Gln Thr Gln Thr Thr Cys Trp Asp His
                805                 810                 815 ccc aag atg act gag ctg ttc cag agc ctg gcc gac ctc aac aat gtg      2496
Pro Lys Met Thr Glu Leu Phe Gln Ser Leu Ala Asp Leu Asn Asn Val
                820                 825                 830 cgc ttc tcc gcc tat agg acc gcc atc aaa atc agg cgc ctc cag aaa      2544
Arg Phe Ser Ala Tyr Arg Thr Ala Ile Lys Ile Arg Arg Leu Gln Lys
                835                 840                 845 gcc ctg tgc ctg gac ctg ctc gaa ctg tcc acc acc aac gag atc ttc      2592
Ala Leu Cys Leu Asp Leu Leu Glu Leu Ser Thr Thr Asn Glu Ile Phe
850                 855                 860 aag cag cac aag ctg aac cag aac gac cag ctg ctg tct gtg ccc gac      2640
Lys Gln His Lys Leu Asn Gln Asn Asp Gln Leu Leu Ser Val Pro Asp
865                 870                 875                 880 gtg atc aat tgc ctg acc acc acc tac gac ggg ctc gaa cag atg cac      2688
Val Ile Asn Cys Leu Thr Thr Thr Tyr Asp Gly Leu Glu Gln Met His
                885                 890                 895 aag gat ctc gtg aat gtg cct ctg tgc gtg gac atg tgc ctg aac tgg      2736
Lys Asp Leu Val Asn Val Pro Leu Cys Val Asp Met Cys Leu Asn Trp
                900                 905                 910 ctg ctg aat gtg tac gat acc ggc agg acc ggc aag atc agg gtg cag      2784
Leu Leu Asn Val Tyr Asp Thr Gly Arg Thr Gly Lys Ile Arg Val Gln
            915                 920                 925 tct ctg aag atc ggc ctg atg agc ctg agc aag ggg ctg ctc gaa gag      2832
Ser Leu Lys Ile Gly Leu Met Ser Leu Ser Lys Gly Leu Leu Glu Glu
930                 935                 940 aag tac cgc tac ctg ttc aaa gag gtg gca ggc cct acc gag atg tgc      2880
Lys Tyr Arg Tyr Leu Phe Lys Glu Val Ala Gly Pro Thr Glu Met Cys
945             950                 955                 960 gat cag aga cag ctg gga ctg ctg ctg cac gat gcc att cag att cct      2928
Asp Gln Arg Gln Leu Gly Leu Leu Leu His Asp Ala Ile Gln Ile Pro
                965                 970                 975 cgc cag ctg gga gaa gtg gcc gcc ttc gga gga tct aat atc gag cct      2976
Arg Gln Leu Gly Glu Val Ala Ala Phe Gly Gly Ser Asn Ile Glu Pro
                980                 985                 990 tcc gtg cgc tcc tgc ttt cag cag     aac aac aac aag cct gag atc tcc  3024
Ser Val Arg Ser Cys Phe Gln Gln     Asn Asn Asn Lys Pro Glu Ile Ser
                995                    1000             1005
```

```
gtg aaa gaa ttc atc gac tgg atg cac ctg gaa cct cag agc atg      3069
Val Lys Glu Phe Ile Asp Trp Met His Leu Glu Pro Gln Ser Met
1010                1015                1020 gtc tgg ctg cca gtc ctg cat aga gtg gct gct gct gag act gcc      3114
Val Trp Leu Pro Val Leu His Arg Val Ala Ala Ala Glu Thr Ala
1025                1030                1035 aag cac cag gcc aag tgc aac atc tgc aaa gag tgc cct atc gtc      3159
Lys His Gln Ala Lys Cys Asn Ile Cys Lys Glu Cys Pro Ile Val
1040                1045                1050 ggc ttc cgc tat cgc tcc ctg aag cac ttc aac tac gac gtg tgc      3204
Gly Phe Arg Tyr Arg Ser Leu Lys His Phe Asn Tyr Asp Val Cys
1055                1060                1065 cag agt tgc ttc ttt tcc gga cgc acc gcc aag ggc cac aag ctg      3249
Gln Ser Cys Phe Phe Ser Gly Arg Thr Ala Lys Gly His Lys Leu
1070                1075                1080 cat tac cct atg gtc gag tac tgc atc cct acc aca tcc ggc gag      3294
His Tyr Pro Met Val Glu Tyr Cys Ile Pro Thr Thr Ser Gly Glu
1085                1090                1095 gat gtg cgc gat ttc acc aag gtg ctg aag aac aag ttc cgc tcc      3339
Asp Val Arg Asp Phe Thr Lys Val Leu Lys Asn Lys Phe Arg Ser
1100                1105                1110 aag aag tat ttc gct aag cac ccc agg ctg ggc tat ctg cct gtc      3384
Lys Lys Tyr Phe Ala Lys His Pro Arg Leu Gly Tyr Leu Pro Val
1115                1120                1125 cag act gtc ctg gaa ggc gac aac ctg gaa acc tga                  3420
Gln Thr Val Leu Glu Gly Asp Asn Leu Glu Thr
1130                1135

<210> SEQ ID NO 20
<211> LENGTH: 1139
<212> TYPE: PRT
<213> ORGANISM: Artificial Sequence
<220> FEATURE:
<223> OTHER INFORMATION: Synthetic Construct

<400> SEQUENCE: 20

Met Ala Lys Tyr Gly Glu His Glu Ala Ser Pro Asp Asn Gly Gln Asn
1               5                   10                  15

Glu Phe Ser Asp Ile Ile Lys Ser Arg Ser Asp Glu His Asn Asp Val
            20                  25                  30

Gln Lys Lys Thr Phe Thr Lys Trp Ile Asn Ala Arg Phe Ser Lys Ser
        35                  40                  45

Gly Lys Pro Pro Ile Asn Asp Met Phe Thr Asp Leu Lys Asp Gly Arg
    50                  55                  60

Lys Leu Leu Asp Leu Leu Glu Gly Leu Thr Gly Thr Ser Leu Pro Lys
65                  70                  75                  80

Glu Arg Gly Ser Thr Arg Val His Ala Leu Asn Asn Val Asn Arg Val
                85                  90                  95

Leu Gln Val Leu His Gln Asn Asn Val Glu Leu Val Asn Ile Gly Gly
            100                 105                 110

Thr Asp Ile Val Asp Gly Asn His Lys Leu Thr Leu Gly Leu Leu Trp
        115                 120                 125

Ser Ile Ile Leu His Trp Gln Val Lys Asp Val Met Lys Asp Val Met
    130                 135                 140

Ser Asp Leu Gln Gln Thr Asn Ser Glu Lys Ile Leu Leu Ser Trp Val
145                 150                 155                 160

Arg Gln Thr Thr Arg Pro Tyr Ser Gln Val Asn Val Leu Asn Phe Thr
                165                 170                 175
```

Thr Ser Trp Thr Asp Gly Leu Ala Phe Asn Ala Val Leu His Arg His
            180                 185                 190
Lys Pro Asp Leu Phe Ser Trp Asp Lys Val Val Lys Met Ser Pro Ile
        195                 200                 205
Glu Arg Leu Glu His Ala Phe Ser Lys Ala Gln Thr Tyr Leu Gly Ile
    210                 215                 220
Glu Lys Leu Leu Asp Pro Glu Asp Val Ala Val Gln Leu Pro Asp Lys
225                 230                 235                 240
Lys Ser Ile Ile Met Tyr Leu Thr Ser Leu Phe Glu Val Leu Pro Gln
            245                 250                 255
Gln Val Thr Ile Asp Ala Ile Arg Glu Val Glu Thr Leu Pro Arg Lys
        260                 265                 270
Tyr Lys Lys Glu Cys Glu Glu Ala Ile Asn Ile Gln Ser Thr Ala
    275                 280                 285
Pro Glu Glu Glu His Glu Ser Pro Arg Ala Glu Thr Pro Ser Thr Val
    290                 295                 300
Thr Glu Val Asp Met Asp Leu Asp Ser Tyr Gln Ile Ala Leu Glu Glu
305                 310                 315                 320
Val Leu Thr Trp Leu Leu Ser Ala Glu Asp Thr Phe Gln Glu Gln Asp
            325                 330                 335
Asp Ile Ser Asp Asp Val Glu Val Lys Asp Gln Phe Ala Thr His
            340                 345                 350
Glu Ala Phe Met Met Glu Leu Thr Ala His Gln Ser Ser Val Gly Ser
            355                 360                 365
Val Leu Gln Ala Gly Asn Gln Leu Ile Thr Gln Gly Thr Leu Ser Asp
370                 375                 380
Glu Glu Glu Phe Glu Ile Gln Glu Gln Met Thr Leu Leu Asn Ala Arg
385                 390                 395                 400
Trp Glu Ala Leu Arg Val Glu Ser Met Asp Arg Gln Ser Arg Leu His
            405                 410                 415
Asp Val Leu Met Glu Leu Gln Lys Lys Gln Leu Gln Gln Leu Ser Ala
            420                 425                 430
Trp Ile Gln Glu Ala Glu Thr Thr Val Asn Val Leu Val Asp Ala Ser
            435                 440                 445
His Arg Glu Asn Ala Leu Gln Asp Ser Ile Leu Ala Arg Glu Leu Lys
    450                 455                 460
Gln Gln Met Gln Asp Ile Gln Ala Glu Ile Asp Ala His Gln Val Lys
465                 470                 475                 480
Val Asn Ser Leu Thr His Met Val Val Ile Val Asp Glu Asn Ser Gly
            485                 490                 495
Glu Ser Ala Thr Ala Ile Leu Glu Asp Gln Leu Gln Lys Leu Gly Glu
            500                 505                 510
Arg Trp Asn Asp Leu Lys Ala Lys Ser Ala Ser Ile Arg Ala His Leu
        515                 520                 525
Glu Ala Ser Ala Glu Lys Trp Asn Arg Leu Leu Met Ser Leu Glu Glu
    530                 535                 540
Leu Ile Lys Trp Leu Asn Met Lys Asp Glu Glu Leu Lys Lys Gln Met
545                 550                 555                 560
Pro Ile Gly Gly Asp Val Pro Ala Leu Gln Leu Gln Tyr Asp His Cys
            565                 570                 575
Lys Ala Leu Arg Arg Glu Leu Lys Glu Lys Glu Tyr Ser Val Leu Asn
            580                 585                 590
Ala Val Asp Gln Ala Arg Val Phe Leu Ala Asp Gln Pro Ile Glu Ala

-continued

```
                  595                 600                 605
Pro Glu Glu Pro Arg Arg Asn Leu Gln Ser Lys Thr Glu Leu Thr Pro
    610                 615                 620
Glu Glu Arg Ala Gln Lys Ile Ala Lys Ala Met Arg Lys Gln Ser Ser
625                 630                 635                 640
Glu Val Lys Glu Lys Trp Glu Ser Leu Asn Ala Val Thr Ser Asn Trp
                    645                 650                 655
Gln Lys Gln Val Asp Lys Ala Leu Glu Lys Leu Arg Asp Leu Gln Gly
                660                 665                 670
Ala Met Asp Asp Leu Asp Ala Asp Met Lys Glu Ala Glu Ser Val Arg
            675                 680                 685
Asn Gly Trp Lys Pro Val Gly Asp Leu Leu Ile Asp Ser Leu Gln Asp
        690                 695                 700
His Ile Glu Lys Ile Met Ala Phe Arg Glu Glu Ile Ala Pro Ile Asn
705                 710                 715                 720
Phe Lys Val Lys Thr Val Asn Asp Leu Ser Ser Gln Leu Ser Pro Leu
                    725                 730                 735
Asp Leu His Pro Ser Leu Lys Met Ser Arg Gln Leu Asp Asp Leu Asn
                740                 745                 750
Met Arg Trp Lys Leu Leu Gln Val Ser Val Asp Asp Arg Leu Lys Gln
            755                 760                 765
Leu Gln Glu Ala His Arg Asp Phe Gly Pro Ser Ser Gln His Phe Leu
        770                 775                 780
Ser Thr Ser Val Gln Leu Pro Trp Gln Arg Ser Ile Ser His Asn Lys
785                 790                 795                 800
Val Pro Tyr Tyr Ile Asn His Gln Thr Gln Thr Thr Cys Trp Asp His
                    805                 810                 815
Pro Lys Met Thr Glu Leu Phe Gln Ser Leu Ala Asp Leu Asn Asn Val
                820                 825                 830
Arg Phe Ser Ala Tyr Arg Thr Ala Ile Lys Ile Arg Arg Leu Gln Lys
            835                 840                 845
Ala Leu Cys Leu Asp Leu Leu Glu Leu Ser Thr Thr Asn Glu Ile Phe
        850                 855                 860
Lys Gln His Lys Leu Asn Gln Asn Asp Gln Leu Leu Ser Val Pro Asp
865                 870                 875                 880
Val Ile Asn Cys Leu Thr Thr Tyr Asp Gly Leu Glu Gln Met His
                    885                 890                 895
Lys Asp Leu Val Asn Val Pro Leu Cys Val Asp Met Cys Leu Asn Trp
                900                 905                 910
Leu Leu Asn Val Tyr Asp Thr Gly Arg Thr Gly Lys Ile Arg Val Gln
            915                 920                 925
Ser Leu Lys Ile Gly Leu Met Ser Leu Ser Lys Gly Leu Leu Glu Glu
        930                 935                 940
Lys Tyr Arg Tyr Leu Phe Lys Glu Val Ala Gly Pro Thr Glu Met Cys
945                 950                 955                 960
Asp Gln Arg Gln Leu Gly Leu Leu His Asp Ala Ile Gln Ile Pro
                    965                 970                 975
Arg Gln Leu Gly Glu Val Ala Ala Phe Gly Gly Ser Asn Ile Glu Pro
                980                 985                 990
Ser Val Arg Ser Cys Phe Gln Gln Asn Asn Asn Lys Pro Glu Ile Ser
            995                 1000                1005
Val Lys Glu Phe Ile Asp Trp Met His Leu Glu Pro Gln Ser Met
        1010                1015                1020
```

```
Val Trp Leu Pro Val Leu His Arg Val Ala Ala Ala Glu Thr Ala
    1025                1030                1035

Lys His Gln Ala Lys Cys Asn Ile Cys Lys Glu Cys Pro Ile Val
    1040                1045                1050

Gly Phe Arg Tyr Arg Ser Leu Lys His Phe Asn Tyr Asp Val Cys
    1055                1060                1065

Gln Ser Cys Phe Phe Ser Gly Arg Thr Ala Lys Gly His Lys Leu
    1070                1075                1080

His Tyr Pro Met Val Glu Tyr Cys Ile Pro Thr Thr Ser Gly Glu
    1085                1090                1095

Asp Val Arg Asp Phe Thr Lys Val Leu Lys Asn Lys Phe Arg Ser
    1100                1105                1110

Lys Lys Tyr Phe Ala Lys His Pro Arg Leu Gly Tyr Leu Pro Val
    1115                1120                1125

Gln Thr Val Leu Glu Gly Asp Asn Leu Glu Thr
    1130                1135

<210> SEQ ID NO 21
<211> LENGTH: 1208
<212> TYPE: PRT
<213> ORGANISM: Artificial Sequence
<220> FEATURE:
<223> OTHER INFORMATION: human utrophin mutant
<220> FEATURE:
<221> NAME/KEY: MISC_FEATURE
<222> LOCATION: (1)..(324)
<223> OTHER INFORMATION: amino acid sequence identical to N-terminal
      region of full length human utrophin
<220> FEATURE:
<221> NAME/KEY: MISC_FEATURE
<222> LOCATION: (311)..(417)
<223> OTHER INFORMATION: hybrid triple helix
<220> FEATURE:
<221> NAME/KEY: MISC_FEATURE
<222> LOCATION: (325)..(362)
<223> OTHER INFORMATION: amino acid sequence identical to C-terminal
      region of full length human utrophin
<220> FEATURE:
<221> NAME/KEY: MISC_FEATURE
<222> LOCATION: (363)..(401)
<223> OTHER INFORMATION: amino acid sequence identical to N-terminal
      region of full length human utrophin
<220> FEATURE:
<221> NAME/KEY: MISC_FEATURE
<222> LOCATION: (402)..(1208)
<223> OTHER INFORMATION: amino acid sequence identical to C-terminal
      region of full length human utrophin

<400> SEQUENCE: 21

Met Ala Lys Tyr Gly Glu His Glu Ala Ser Pro Asp Asn Gly Gln Asn
1               5                   10                  15

Glu Phe Ser Asp Ile Ile Lys Ser Arg Ser Asp Glu His Asn Asp Val
                20                  25                  30

Gln Lys Lys Thr Phe Thr Lys Trp Ile Asn Ala Arg Phe Ser Lys Ser
            35                  40                  45

Gly Lys Pro Pro Ile Asn Asp Met Phe Thr Asp Leu Lys Asp Gly Arg
        50                  55                  60

Lys Leu Leu Asp Leu Leu Glu Gly Leu Thr Gly Thr Ser Leu Pro Lys
65                  70                  75                  80

Glu Arg Gly Ser Thr Arg Val His Ala Leu Asn Asn Val Asn Arg Val
                85                  90                  95

Leu Gln Val Leu His Gln Asn Asn Val Glu Leu Val Asn Ile Gly Gly
                100                 105                 110
```

```
Thr Asp Ile Val Asp Gly Asn His Lys Leu Thr Leu Gly Leu Leu Trp
        115                 120                 125
Ser Ile Ile Leu His Trp Gln Val Lys Asp Val Met Lys Asp Val Met
        130                 135                 140
Ser Asp Leu Gln Gln Thr Asn Ser Glu Lys Ile Leu Leu Ser Trp Val
145                 150                 155                 160
Arg Gln Thr Thr Arg Pro Tyr Ser Gln Val Asn Val Leu Asn Phe Thr
                165                 170                 175
Thr Ser Trp Thr Asp Gly Leu Ala Phe Asn Ala Val Leu His Arg His
                180                 185                 190
Lys Pro Asp Leu Phe Ser Trp Asp Lys Val Val Lys Met Ser Pro Ile
                195                 200                 205
Glu Arg Leu Glu His Ala Phe Ser Lys Ala Gln Thr Tyr Leu Gly Ile
                210                 215                 220
Glu Lys Leu Leu Asp Pro Glu Asp Val Ala Val Gln Leu Pro Asp Lys
225                 230                 235                 240
Lys Ser Ile Ile Met Tyr Leu Thr Ser Leu Phe Glu Val Leu Pro Gln
                245                 250                 255
Gln Val Thr Ile Asp Ala Ile Arg Glu Val Glu Thr Leu Pro Arg Lys
                260                 265                 270
Tyr Lys Lys Glu Cys Glu Glu Ala Ile Asn Ile Gln Ser Thr Ala
                275                 280                 285
Pro Glu Glu Glu His Glu Ser Pro Arg Ala Glu Thr Pro Ser Thr Val
                290                 295                 300
Thr Glu Val Asp Met Asp Leu Asp Ser Tyr Gln Ile Ala Leu Glu Glu
305                 310                 315                 320
Val Leu Thr Trp Leu Val Leu Ile Asp Gln Met Leu Lys Ser Asn Ile
                325                 330                 335
Val Thr Val Gly Asp Val Glu Glu Ile Asn Lys Thr Val Ser Arg Met
                340                 345                 350
Lys Ile Thr Lys Ala Asp Leu Glu Gln Arg Gln Ser Ser Val Gly Ser
                355                 360                 365
Val Leu Gln Ala Gly Asn Gln Leu Ile Thr Gln Gly Thr Leu Ser Asp
                370                 375                 380
Glu Glu Glu Phe Glu Ile Gln Glu Gln Met Thr Leu Leu Asn Ala Arg
385                 390                 395                 400
Trp Asp Gly Thr Gln His Gly Val Glu Leu Arg Gln Gln Leu Glu
                405                 410                 415
Asp Met Ile Ile Asp Ser Leu Gln Trp Asp Asp His Arg Glu Glu Thr
                420                 425                 430
Glu Glu Leu Met Arg Lys Tyr Glu Ala Arg Leu Tyr Ile Leu Gln Gln
                435                 440                 445
Ala Arg Arg Asp Pro Leu Thr Lys Gln Ile Ser Asp Asn Gln Ile Leu
450                 455                 460
Leu Gln Glu Leu Gly Pro Gly Asp Gly Ile Val Met Ala Phe Asp Asn
465                 470                 475                 480
Val Leu Gln Lys Leu Leu Glu Glu Tyr Gly Ser Asp Asp Thr Arg Asn
                485                 490                 495
Val Lys Glu Thr Thr Glu Tyr Leu Lys Thr Ser Trp Ile Asn Leu Lys
                500                 505                 510
Gln Ser Ile Ala Asp Arg Gln Asn Ala Leu Glu Ala Glu Trp Arg Thr
                515                 520                 525
```

```
Val Gln Ala Ser Arg Arg Asp Leu Glu Asn Phe Leu Lys Trp Ile Gln
530                 535                 540

Glu Ala Glu Thr Thr Val Asn Val Leu Val Asp Ala Ser His Arg Glu
545                 550                 555                 560

Asn Ala Leu Gln Asp Ser Ile Leu Ala Arg Glu Leu Lys Gln Gln Met
                565                 570                 575

Gln Asp Ile Gln Ala Glu Ile Asp Ala His Asn Asp Ile Phe Lys Ser
            580                 585                 590

Ile Asp Gly Asn Arg Gln Lys Met Val Lys Ala Leu Gly Asn Ser Glu
        595                 600                 605

Glu Ala Thr Met Leu Gln His Arg Leu Asp Asp Met Asn Gln Arg Trp
610                 615                 620

Asn Asp Leu Lys Ala Lys Ser Ala Ser Ile Arg Ala His Leu Glu Ala
625                 630                 635                 640

Ser Ala Glu Lys Trp Asn Arg Leu Leu Met Ser Leu Glu Glu Leu Ile
                645                 650                 655

Lys Trp Leu Asn Met Lys Asp Glu Glu Leu Lys Lys Gln Met Pro Ile
            660                 665                 670

Gly Gly Asp Val Pro Ala Leu Gln Leu Gln Tyr Asp His Cys Lys Ala
        675                 680                 685

Leu Arg Arg Glu Leu Lys Glu Lys Glu Tyr Ser Val Leu Asn Ala Val
690                 695                 700

Asp Gln Ala Arg Val Phe Leu Ala Asp Gln Pro Ile Glu Ala Pro Glu
705                 710                 715                 720

Glu Pro Arg Arg Asn Leu Gln Ser Lys Thr Glu Leu Thr Pro Glu Glu
                725                 730                 735

Arg Ala Gln Lys Ile Ala Lys Ala Met Arg Lys Gln Ser Ser Glu Val
            740                 745                 750

Lys Glu Lys Trp Glu Ser Leu Asn Ala Val Thr Ser Asn Trp Gln Lys
        755                 760                 765

Gln Val Asp Lys Ala Leu Glu Lys Leu Arg Asp Leu Gln Gly Ala Met
770                 775                 780

Asp Asp Leu Asp Ala Asp Met Lys Glu Ala Glu Ser Val Arg Asn Gly
785                 790                 795                 800

Trp Lys Pro Val Gly Asp Leu Leu Ile Asp Ser Leu Gln Asp His Ile
                805                 810                 815

Glu Lys Ile Met Ala Phe Arg Glu Glu Ile Ala Pro Ile Asn Phe Lys
            820                 825                 830

Val Lys Thr Val Asn Asp Leu Ser Ser Gln Leu Ser Pro Leu Asp Leu
        835                 840                 845

His Pro Ser Leu Lys Met Ser Arg Gln Leu Asp Asp Leu Asn Met Arg
850                 855                 860

Trp Lys Leu Leu Gln Val Ser Val Asp Asp Arg Leu Lys Gln Leu Gln
865                 870                 875                 880

Glu Ala His Arg Asp Phe Gly Pro Ser Ser Gln His Phe Leu Ser Thr
                885                 890                 895

Ser Val Gln Leu Pro Trp Gln Arg Ser Ile Ser His Asn Lys Val Pro
            900                 905                 910

Tyr Tyr Ile Asn His Gln Thr Gln Thr Thr Cys Trp Asp His Pro Lys
        915                 920                 925

Met Thr Glu Leu Phe Gln Ser Leu Ala Asp Leu Asn Asn Val Arg Phe
930                 935                 940

Ser Ala Tyr Arg Thr Ala Ile Lys Ile Arg Arg Leu Gln Lys Ala Leu
```

-continued

```
                    945                 950                 955                 960
Cys Leu Asp Leu Leu Glu Leu Ser Thr Thr Asn Glu Ile Phe Lys Gln
                965                 970                 975

His Lys Leu Asn Gln Asn Asp Gln Leu Leu Ser Val Pro Asp Val Ile
            980                 985                 990

Asn Cys Leu Thr Thr Thr Tyr Asp Gly Leu Glu Gln Met His Lys Asp
        995                 1000                1005

Leu Val Asn Val Pro Leu Cys Val Asp Met Cys Leu Asn Trp Leu
    1010                1015                1020

Leu Asn Val Tyr Asp Thr Gly Arg Thr Gly Lys Ile Arg Val Gln
    1025                1030                1035

Ser Leu Lys Ile Gly Leu Met Ser Leu Ser Lys Gly Leu Leu Glu
    1040                1045                1050

Glu Lys Tyr Arg Tyr Leu Phe Lys Glu Val Ala Gly Pro Thr Glu
    1055                1060                1065

Met Cys Asp Gln Arg Gln Leu Gly Leu Leu Leu His Asp Ala Ile
    1070                1075                1080

Gln Ile Pro Arg Gln Leu Gly Glu Val Ala Ala Phe Gly Gly Ser
    1085                1090                1095

Asn Ile Glu Pro Ser Val Arg Ser Cys Phe Gln Gln Asn Asn Asn
    1100                1105                1110

Lys Pro Glu Ile Ser Val Lys Glu Phe Ile Asp Trp Met His Leu
    1115                1120                1125

Glu Pro Gln Ser Met Val Trp Leu Pro Val Leu His Arg Val Ala
    1130                1135                1140

Ala Ala Glu Thr Ala Lys His Gln Ala Lys Cys Asn Ile Cys Lys
    1145                1150                1155

Glu Cys Pro Ile Val Gly Phe Arg Tyr Arg Ser Leu Lys His Phe
    1160                1165                1170

Asn Tyr Asp Val Cys Gln Ser Cys Phe Phe Ser Gly Arg Thr Ala
    1175                1180                1185

Lys Gly His Lys Leu His Tyr Pro Met Val Glu Tyr Cys Ile Pro
    1190                1195                1200

Thr Thr Ser Gly Glu
    1205
```

```
<210> SEQ ID NO 22
<211> LENGTH: 1237
<212> TYPE: PRT
<213> ORGANISM: Artificial Sequence
<220> FEATURE:
<223> OTHER INFORMATION: mutant human dystrophin protein
<220> FEATURE:
<221> NAME/KEY: MISC_FEATURE
<222> LOCATION: (1)..(354)
<223> OTHER INFORMATION: amino acid sequence identical to N-terminal
      region of full length human dystrophin
<220> FEATURE:
<221> NAME/KEY: MISC_FEATURE
<222> LOCATION: (340)..(447)
<223> OTHER INFORMATION: hybrid triple helix
<220> FEATURE:
<221> NAME/KEY: MISC_FEATURE
<222> LOCATION: (355)..(392)
<223> OTHER INFORMATION: amino acid sequence identical to C-terminal
      region of full length human dystrophin
<220> FEATURE:
<221> NAME/KEY: MISC_FEATURE
<222> LOCATION: (393)..(431)
<223> OTHER INFORMATION: amino acid sequence identical to N-terminal
      region of full length human dystrophin
```

```
<220> FEATURE:
<221> NAME/KEY: MISC_FEATURE
<222> LOCATION: (432)..(1237)
<223> OTHER INFORMATION: amino acid sequence identical to C-terminal
      region of full length human dystrophin

<400> SEQUENCE: 22

Met Leu Trp Trp Glu Glu Val Glu Asp Cys Tyr Glu Arg Glu Asp Val
1               5                   10                  15

Gln Lys Lys Thr Phe Thr Lys Trp Val Asn Ala Gln Phe Ser Lys Phe
            20                  25                  30

Gly Lys Gln His Ile Glu Asn Leu Phe Ser Asp Leu Gln Asp Gly Arg
        35                  40                  45

Arg Leu Leu Asp Leu Leu Glu Gly Leu Thr Gly Gln Lys Leu Pro Lys
    50                  55                  60

Glu Lys Gly Ser Thr Arg Val His Ala Leu Asn Asn Val Asn Lys Ala
65                  70                  75                  80

Leu Arg Val Leu Gln Asn Asn Asn Val Asp Leu Val Asn Ile Gly Ser
                85                  90                  95

Thr Asp Ile Val Asp Gly Asn His Lys Leu Thr Leu Gly Leu Ile Trp
            100                 105                 110

Asn Ile Ile Leu His Trp Gln Val Lys Asn Val Met Lys Asn Ile Met
        115                 120                 125

Ala Gly Leu Gln Gln Thr Asn Ser Glu Lys Ile Leu Leu Ser Trp Val
    130                 135                 140

Arg Gln Ser Thr Arg Asn Tyr Pro Gln Val Asn Val Ile Asn Phe Thr
145                 150                 155                 160

Thr Ser Trp Ser Asp Gly Leu Ala Leu Asn Ala Leu Ile His Ser His
                165                 170                 175

Arg Pro Asp Leu Phe Asp Trp Asn Ser Val Val Cys Gln Gln Ser Ala
            180                 185                 190

Thr Gln Arg Leu Glu His Ala Phe Asn Ile Ala Arg Tyr Gln Leu Gly
        195                 200                 205

Ile Glu Lys Leu Leu Asp Pro Glu Asp Val Asp Thr Thr Tyr Pro Asp
    210                 215                 220

Lys Lys Ser Ile Leu Met Tyr Ile Thr Ser Leu Phe Gln Val Leu Pro
225                 230                 235                 240

Gln Gln Val Ser Ile Glu Ala Ile Gln Glu Val Glu Met Leu Pro Arg
                245                 250                 255

Pro Pro Lys Val Thr Lys Glu Glu His Phe Gln Leu His His Gln Met
            260                 265                 270

His Tyr Ser Gln Gln Ile Thr Val Ser Leu Ala Gln Gly Tyr Glu Arg
        275                 280                 285

Thr Ser Ser Pro Lys Pro Arg Phe Lys Ser Tyr Ala Tyr Thr Gln Ala
    290                 295                 300

Ala Tyr Val Thr Thr Ser Asp Pro Thr Arg Ser Pro Phe Pro Ser Gln
305                 310                 315                 320

His Leu Glu Ala Pro Glu Asp Lys Ser Phe Gly Ser Ser Leu Met Glu
                325                 330                 335

Ser Glu Val Asn Leu Asp Arg Tyr Gln Thr Ala Leu Glu Glu Val Leu
            340                 345                 350

Ser Trp Leu Ser Leu Leu Asp Gln Val Ile Lys Ser Gln Arg Val Met
        355                 360                 365

Val Gly Asp Leu Glu Asp Ile Asn Glu Met Ile Ile Lys Gln Lys Ala
    370                 375                 380
```

```
Thr Met Gln Asp Leu Glu Gln Arg Gln Gly Arg Val Gly Asn Ile Leu
385                 390                 395                 400

Gln Leu Gly Ser Lys Leu Ile Gly Thr Gly Lys Leu Ser Glu Asp Glu
            405                 410                 415

Glu Thr Glu Val Gln Glu Gln Met Asn Leu Leu Asn Ser Arg Trp Asp
        420                 425                 430

Glu Val Gln Glu His Leu Gln Asn Arg Arg Gln Gln Leu Asn Glu Met
            435                 440                 445

Leu Lys Asp Ser Thr Gln Trp Leu Glu Ala Lys Glu Glu Ala Glu Gln
    450                 455                 460

Val Leu Gly Gln Ala Arg Ala Lys Leu Glu Ser Trp Lys Glu Gly Pro
465                 470                 475                 480

Tyr Thr Val Asp Ala Ile Gln Lys Lys Ile Thr Glu Thr Lys Gln Leu
                485                 490                 495

Ala Lys Asp Leu Arg Gln Trp Gln Thr Asn Val Asp Val Ala Asn Asp
            500                 505                 510

Leu Ala Leu Lys Leu Leu Arg Asp Tyr Ser Ala Asp Asp Thr Arg Lys
            515                 520                 525

Val His Met Ile Thr Glu Asn Ile Asn Ala Ser Trp Arg Ser Ile His
    530                 535                 540

Lys Arg Val Ser Glu Arg Glu Ala Ala Leu Glu Glu Thr His Arg Leu
545                 550                 555                 560

Leu Gln Gln Phe Pro Leu Asp Leu Glu Lys Phe Leu Ala Trp Leu Thr
                565                 570                 575

Glu Ala Glu Thr Thr Ala Asn Val Leu Gln Asp Ala Thr Arg Lys Glu
            580                 585                 590

Arg Leu Leu Glu Asp Ser Lys Gly Val Lys Glu Leu Met Lys Gln Trp
            595                 600                 605

Gln Asp Leu Gln Gly Glu Ile Glu Ala His Thr Asp Val Tyr His Asn
    610                 615                 620

Leu Asp Glu Asn Ser Gln Lys Ile Leu Arg Ser Leu Glu Gly Ser Asp
625                 630                 635                 640

Asp Ala Val Leu Leu Gln Arg Arg Leu Asp Asn Met Asn Phe Lys Trp
                645                 650                 655

Ser Glu Leu Arg Lys Lys Ser Leu Asn Ile Arg Ser His Leu Glu Ala
            660                 665                 670

Ser Ser Asp Gln Trp Lys Arg Leu His Leu Ser Leu Gln Glu Leu Leu
    675                 680                 685

Val Trp Leu Gln Leu Lys Asp Asp Glu Leu Ser Arg Gln Ala Pro Ile
    690                 695                 700

Gly Gly Asp Phe Pro Ala Val Gln Lys Gln Asn Asp Val His Arg Ala
705                 710                 715                 720

Phe Lys Arg Glu Leu Lys Thr Lys Glu Pro Val Ile Met Ser Thr Leu
                725                 730                 735

Glu Thr Val Arg Ile Phe Leu Thr Glu Gln Pro Leu Glu Gly Leu Glu
            740                 745                 750

Lys Leu Tyr Gln Glu Pro Arg Glu Leu Pro Pro Glu Glu Arg Ala Gln
            755                 760                 765

Asn Val Thr Arg Leu Leu Arg Lys Gln Ala Glu Glu Val Asn Thr Glu
    770                 775                 780

Trp Glu Lys Leu Asn Leu His Ser Ala Asp Trp Gln Arg Lys Ile Asp
785                 790                 795                 800
```

```
Glu Thr Leu Glu Arg Leu Gln Glu Leu Gln Glu Ala Thr Asp Glu Leu
            805                 810                 815

Asp Leu Lys Leu Arg Gln Ala Glu Val Ile Lys Gly Ser Trp Gln Pro
            820                 825                 830

Val Gly Asp Leu Leu Ile Asp Ser Leu Gln Asp His Leu Glu Lys Val
            835                 840                 845

Lys Ala Leu Arg Gly Glu Ile Ala Pro Leu Lys Glu Asn Val Ser His
    850                 855                 860

Val Asn Asp Leu Ala Arg Gln Leu Thr Thr Leu Gly Ile Gln Leu Ser
865                 870                 875                 880

Pro Tyr Asn Leu Ser Thr Leu Glu Asp Leu Asn Thr Arg Trp Lys Leu
            885                 890                 895

Leu Gln Val Ala Val Glu Asp Arg Val Arg Gln Leu His Glu Ala His
            900                 905                 910

Arg Asp Phe Gly Pro Ala Ser Gln His Phe Leu Ser Thr Ser Val Gln
            915                 920                 925

Gly Pro Trp Glu Arg Ala Ile Ser Pro Asn Lys Val Pro Tyr Tyr Ile
    930                 935                 940

Asn His Glu Thr Gln Thr Thr Cys Trp Asp His Pro Lys Met Thr Glu
945                 950                 955                 960

Leu Tyr Gln Ser Leu Ala Asp Leu Asn Asn Val Arg Phe Ser Ala Tyr
            965                 970                 975

Arg Thr Ala Met Lys Leu Arg Arg Leu Gln Lys Ala Leu Cys Leu Asp
            980                 985                 990

Leu Leu Ser Leu Ser Ala Ala Cys Asp Ala Leu Asp Gln His Asn Leu
            995                 1000                1005

Lys Gln Asn Asp Gln Pro Met Asp Ile Leu Gln Ile Ile Asn Cys
    1010                1015                1020

Leu Thr Thr Ile Tyr Asp Arg Leu Glu Gln Glu His Asn Asn Leu
    1025                1030                1035

Val Asn Val Pro Leu Cys Val Asp Met Cys Leu Asn Trp Leu Leu
    1040                1045                1050

Asn Val Tyr Asp Thr Gly Arg Thr Gly Arg Ile Arg Val Leu Ser
    1055                1060                1065

Phe Lys Thr Gly Ile Ile Ser Leu Cys Lys Ala His Leu Glu Asp
    1070                1075                1080

Lys Tyr Arg Tyr Leu Phe Lys Gln Val Ala Ser Ser Thr Gly Phe
    1085                1090                1095

Cys Asp Gln Arg Arg Leu Gly Leu Leu Leu His Asp Ser Ile Gln
    1100                1105                1110

Ile Pro Arg Gln Leu Gly Glu Val Ala Ser Phe Gly Gly Ser Asn
    1115                1120                1125

Ile Glu Pro Ser Val Arg Ser Cys Phe Gln Phe Ala Asn Asn Lys
    1130                1135                1140

Pro Glu Ile Glu Ala Ala Leu Phe Leu Asp Trp Met Arg Leu Glu
    1145                1150                1155

Pro Gln Ser Met Val Trp Leu Pro Val Leu His Arg Val Ala Ala
    1160                1165                1170

Ala Glu Thr Ala Lys His Gln Ala Lys Cys Asn Ile Cys Lys Glu
    1175                1180                1185

Cys Pro Ile Ile Gly Phe Arg Tyr Arg Ser Leu Lys His Phe Asn
    1190                1195                1200

Tyr Asp Ile Cys Gln Ser Cys Phe Phe Ser Gly Arg Val Ala Lys
```

```
            1205                1210                1215
Gly His Lys Met His Tyr Pro Met Val Glu Tyr Cys Thr Pro Thr
    1220                1225                1230

Thr Ser Gly Glu
    1235
```

<210> SEQ ID NO 23
<211> LENGTH: 12
<212> TYPE: PRT
<213> ORGANISM: Artificial Sequence
<220> FEATURE:
<223> OTHER INFORMATION: synthetic construct

<400> SEQUENCE: 23

```
Leu Gln Gly Glu Ile Glu Ala His Thr Asp Val Tyr
1               5                   10
```

<210> SEQ ID NO 24
<211> LENGTH: 9
<212> TYPE: PRT
<213> ORGANISM: Artificial Sequence
<220> FEATURE:
<223> OTHER INFORMATION: synthetic construct

<400> SEQUENCE: 24

```
Gln Glu Asp Leu Glu Gln Glu Gln Val
1               5
```

<210> SEQ ID NO 25
<211> LENGTH: 1164
<212> TYPE: PRT
<213> ORGANISM: Artificial Sequence
<220> FEATURE:
<223> OTHER INFORMATION: synthetic construct

<400> SEQUENCE: 25

```
Met Ala Lys Tyr Gly Glu His Glu Ala Arg Pro Asp Asp Gly Gln Asn
1               5                   10                  15

Glu Phe Ser Asp Ile Ile Lys Ser Arg Ser Asp Glu His Asn Asp Val
                20                  25                  30

Gln Lys Lys Thr Phe Thr Lys Trp Ile Asn Ala Arg Phe Ser Lys Ser
            35                  40                  45

Gly Lys Pro Pro Ile Asn Asp Met Phe Thr Asp Leu Lys Asp Gly Arg
        50                  55                  60

Lys Leu Leu Asp Leu Leu Glu Gly Leu Thr Gly Thr Ser Leu Pro Lys
65                  70                  75                  80

Glu Arg Gly Ser Thr Arg Val His Ala Leu Asn Asn Val Asn Arg Val
                85                  90                  95

Leu Gln Val Leu His Gln Asn Asn Val Asp Leu Val Asn Ile Gly Gly
            100                 105                 110

Thr Asp Ile Val Asp Gly Asn His Lys Leu Thr Leu Gly Leu Leu Trp
        115                 120                 125

Ser Ile Ile Leu His Trp Gln Val Lys Asp Val Met Lys Asp Val Met
    130                 135                 140

Ser Asp Leu Gln Gln Thr Asn Ser Glu Lys Ile Leu Leu Ser Trp Val
145                 150                 155                 160

Arg Gln Ser Thr Arg Pro Tyr Ser Gln Val Asn Val Leu Asn Phe Thr
                165                 170                 175

Thr Ser Trp Thr Asp Gly Leu Ala Phe Asn Ala Val Leu His Arg His
            180                 185                 190
```

```
Lys Pro Asp Leu Phe Ser Trp Asp Arg Val Lys Met Ser Pro Ile
        195                 200                 205

Glu Arg Leu Glu His Ala Phe Ser Lys Ala Asp Thr Tyr Leu Gly Ile
    210                 215                 220

Glu Lys Leu Leu Asp Pro Glu Asp Val Ala Val Gln Leu Pro Asp Lys
225                 230                 235                 240

Lys Ser Ile Ile Met Tyr Leu Thr Ser Leu Phe Glu Val Leu Pro Gln
                245                 250                 255

Gln Val Thr Leu Asp Ala Ile Arg Glu Val Glu Thr Leu Pro Arg Lys
            260                 265                 270

Tyr Lys Lys Glu Cys Glu Glu Gly Glu Ile Ser Ile Gln Ser Ser Ala
        275                 280                 285

Pro Glu Glu Glu His Glu Cys Pro Gly Ala Glu Thr Pro Ser Thr Val
    290                 295                 300

Thr Glu Val Asp Thr Asp Leu Asp Ser Tyr Gln Ile Ala Leu Glu Glu
305                 310                 315                 320

Val Leu Thr Trp Leu Leu Ser Ala Glu Asp Thr Phe Gln Glu Gln Asp
                325                 330                 335

Asp Ile Ser Asp Asp Val Glu Glu Val Lys Glu Gln Phe Thr Thr His
            340                 345                 350

Glu Ala Phe Met Met Glu Leu Thr Ala His Gln Ser Ser Val Gly Ser
        355                 360                 365

Val Leu Gln Ala Gly Asn Gln Leu Ile Thr Gln Gly Thr Leu Ser Asp
    370                 375                 380

Glu Glu Glu Phe Glu Ile Gln Glu Gln Met Thr Leu Leu Asn Ala Arg
385                 390                 395                 400

Trp Glu Ala Leu Arg Asn Asp Ser Met Asn Arg Gln Ser Arg Leu Lys
                405                 410                 415

Asp Val Leu Met Glu Leu Gln Lys Lys Gln Leu Gln Gln Leu Ser Ala
            420                 425                 430

Trp Leu Thr Leu Thr Glu Glu Arg Ile Gln Lys Met Glu Thr Cys Pro
        435                 440                 445

Leu Asp Asp Asp Leu Lys Ser Leu Gln Lys Leu Leu Glu Asp His Lys
    450                 455                 460

Arg Leu Gln Asn Asp Leu Glu Ala Glu Gln Val Lys Val Asn Ser Leu
465                 470                 475                 480

Thr His Met Val Val Ile Val Asp Glu Asn Ser Gly Glu Ser Ala Thr
                485                 490                 495

Ala Val Leu Glu Asp Gln Leu Gln Lys Leu Gly Glu Arg Trp Thr Ala
            500                 505                 510

Val Cys Arg Trp Thr Glu Glu Arg Trp Ser Arg Leu Gln Glu Ile Asn
        515                 520                 525

Ile Leu Trp Gln Glu Leu Leu Glu Glu Gln Cys Leu Leu Lys Ala Trp
    530                 535                 540

Leu Thr Glu Lys Glu Glu Ala Leu Asn Lys Val Gln Thr Ser Asn Phe
545                 550                 555                 560

Lys Asp Gln Lys Glu Leu Ser Val Ser Ile Arg Arg Leu Ala Ile Leu
                565                 570                 575

Lys Glu Asp Met Glu Met Lys Arg Gln Ala Leu Asp Gln Leu Ser Glu
            580                 585                 590

Leu Gly Gln Asp Val Gly Gln Leu Val Asp Asn Pro Lys Ala Ser Lys
        595                 600                 605
```

```
Lys Ile Asn Ser Asp Ser Glu Glu Leu Thr Gln Arg Trp Asp Ser Leu
    610                 615                 620

Val Gln Arg Leu Glu Asp Ser Ser Asn Gln Val Thr Gln Ala Val Ala
625                 630                 635                 640

Lys Leu Gly Met Ser Gln Ile Pro Gln Lys Asp Leu Leu Glu Thr Val
                645                 650                 655

Arg Ile Arg Glu Gln Val Thr Thr Lys Arg Ser Lys Gln Glu Leu Pro
            660                 665                 670

Pro Pro Pro Pro Lys Lys Arg Gln Ile Pro Val Asp Leu Glu Lys
        675                 680                 685

Leu Arg Asp Leu Gln Gly Ala Met Asp Asp Leu Asp Val Asp Met Lys
690                 695                 700

Glu Ala Glu Ala Val Arg Asn Gly Trp Lys Pro Val Gly Asp Leu Leu
705                 710                 715                 720

Ile Asp Ser Leu Gln Asp His Ile Glu Lys Thr Met Ala Phe Arg Glu
                725                 730                 735

Glu Ile Ala Pro Ile Asn Leu Lys Val Lys Thr Val Asn Asp Leu Ser
            740                 745                 750

Ser Gln Leu Ser Pro Leu Asp Leu His Pro Ser Leu Lys Met Ser Arg
    755                 760                 765

Gln Leu Asp Asp Leu Asn Met Arg Trp Lys Leu Leu Gln Val Ser Val
770                 775                 780

Asp Asp Arg Leu Lys Gln Leu Gln Glu Ala His Arg Asp Phe Gly Pro
785                 790                 795                 800

Ser Ser Gln His Phe Leu Ser Thr Ser Val Gln Leu Pro Trp Gln Arg
                805                 810                 815

Ser Ile Ser His Asn Lys Val Pro Tyr Tyr Ile Asn His Gln Thr Gln
            820                 825                 830

Thr Thr Cys Trp Asp His Pro Lys Met Thr Glu Leu Phe Gln Ser Leu
    835                 840                 845

Ala Asp Leu Asn Asn Val Arg Phe Ser Ala Tyr Arg Thr Ala Ile Lys
850                 855                 860

Ile Arg Arg Leu Gln Lys Ala Leu Cys Leu Asp Leu Leu Glu Leu Asn
865                 870                 875                 880

Thr Thr Asn Glu Val Phe Lys Gln His Lys Leu Asn Gln Asn Asp Gln
                885                 890                 895

Leu Leu Ser Val Pro Asp Val Ile Asn Cys Leu Thr Thr Thr Tyr Asp
            900                 905                 910

Gly Leu Glu Gln Met His Lys Asp Leu Val Asn Val Pro Leu Cys Val
    915                 920                 925

Asp Met Cys Leu Asn Trp Leu Leu Asn Val Tyr Asp Thr Gly Arg Thr
930                 935                 940

Gly Lys Ile Arg Val Gln Ser Leu Lys Ile Gly Leu Met Ser Leu Ser
945                 950                 955                 960

Lys Gly Leu Leu Glu Glu Lys Tyr Arg Tyr Leu Phe Lys Glu Val Ala
                965                 970                 975

Gly Pro Thr Glu Met Cys Asp Gln Arg Gln Leu Gly Leu Leu Leu His
            980                 985                 990

Asp Ala Ile Gln Ile Pro Arg Gln  Leu Gly Glu Val Ala  Ala Phe Gly
    995                 1000                1005

Gly Ser  Asn Ile Glu Pro Ser  Val Arg Ser Cys Phe  Gln Gln Asn
    1010                1015                1020

Asn Asn  Lys Pro Glu Ile Ser  Val Lys Asp Phe Ile  Asp Trp Met
```

|  | 1025 |  |  |  | 1030 |  |  |  | 1035 |  |  |  |
|---|---|---|---|---|---|---|---|---|---|---|---|---|
| Arg | Leu 1040 | Glu | Pro | Gln | Ser 1045 | Met | Val | Trp | Leu | Pro 1050 | Val | Leu | His | Arg |
| Val | Ala 1055 | Ala | Ala | Glu | Thr 1060 | Ala | Lys | His | Gln | Ala 1065 | Lys | Cys | Asn | Ile |
| Cys | Lys 1070 | Glu | Cys | Pro | Ile 1075 | Val | Gly | Phe | Arg | Tyr 1080 | Arg | Ser | Leu | Lys |
| His | Phe 1085 | Asn | Tyr | Asp | Val 1090 | Cys | Gln | Ser | Cys | Phe 1095 | Phe | Ser | Gly | Arg |
| Thr | Ala 1100 | Lys | Gly | His | Lys 1105 | Leu | His | Tyr | Pro | Met 1110 | Val | Glu | Tyr | Cys |
| Ile | Pro 1115 | Thr | Thr | Ser | Gly 1120 | Glu | Asp | Val | Arg | Asp 1125 | Phe | Thr | Lys | Val |
| Leu | Lys 1130 | Asn | Lys | Phe | Arg 1135 | Ser | Lys | Lys | Tyr | Phe 1140 | Ala | Lys | His | Pro |
| Arg | Leu 1145 | Gly | Tyr | Leu | Pro 1150 | Val | Gln | Thr | Val | Leu 1155 | Glu | Gly | Asp | Asn |
| Leu | Glu 1160 | Thr | Gln | Ala | Met |  |  |  |  |  |  |  |  |  |

COMPOSITIONS AND METHODS FOR TREATING DUCHENNE MUSCULAR DYSTROPHY

CROSS-REFERENCE TO RELATED APPLICATIONS

This application is a National Stage Entry under 35 U.S.C. 371 of International Patent Application No. PCT/US2019/027675, filed Apr. 16, 2019, which claims priority to U.S. Provisional Patent Application No. 62/658,464, filed Apr. 16, 2018. These applications are incorporated herein by reference.

STATEMENT OF FEDERALLY SPONSORED RESEARCH

This invention was made with government support under NS094705 awarded by the National Institutes of Health. The government has certain rights in the invention.

INCORPORATION-BY-REFERENCE OF MATERIAL SUBMITTED IN ELECTRONIC FORM

Applicant hereby incorporates by reference the Sequence Listing material filed in electronic form herewith. The file is labelled "UPN-18-8438US_ST25.txt", created Sep. 27, 2024 and 280,398 bytes.

BACKGROUND OF THE INVENTION

Duchenne Muscular Dystrophy (DMD) is a severely disabling, systemic, childhood onset disease that progresses from early locomotive muscle weakness to end-stage respiratory and cardiomyopathy characterized by extraordinarily expensive caregiver and technology-dependence (Landfeldt, E., et al., The burden of Duchenne muscular dystrophy: an international, cross-sectional study. Neurology, 2014. 83(6): p. 529-36; and Schreiber-Katz, O., et al., Comparative cost of illness analysis and assessment of health care burden of Duchenne and Becker muscular dystrophies in Germany. Orphanet J Rare Dis, 2014. 9: p. 210.). DMD is among the most common single-gene lethal diseases of mankind, with a historical global incidence of approximately 1:4000 male births. The molecular basis is the deficiency of the 427 kd isoform of cytoskeletal protein dystrophin (Dp427), which in the majority of cases is caused by multi-exon, frameshifting deletions in the DMD gene. A milder disease, Becker Muscular Dystrophy (BMD), is allelic, and most cases are arise from internal deletions or duplications of the dystrophin gene that alter the length of the rod domain of the encoded protein.

Dystrophin was the first protein discovered by "positional cloning", and this discovery provided the initial proof of concept for the use of a disease's human genetic map position as the primary basis for elucidating its molecular basis. Many proteins discovered by this approach are of very low abundance in the affected cells, complicating the ascertainment of the proteins' physiological function. Dystrophin was discovered in 1987, and 30 years on the field is faced with major gaps in the understanding of the protein's precise function in the muscle cell. However, it has been provided that indirect evidence of dystrophin's role in protecting muscle cell membranes from forces developed during muscle contraction. The nature of the mechanical loading of dystrophin remains poorly characterized.

Carrier detection and prenatal counseling have somewhat lowered the incidence of DMD in the USA (Pegoraro, E., et al., SPP1 genotype is a determinant of disease severity in Duchenne muscular dystrophy. Neurology, 2011. 76(3): p. 219-26). Current therapy with the combination of glucocorticosteroids, ACE inhibitors, and mechanical ventilatory support may temporarily slow the rate of progression, but the ultimate clinical course is inexorable (McDonald, C. M., et al., The cooperative international neuromuscular research group duchenne natural history study—a longitudinal investigation in the era of glucocorticoid therapy: Design of protocol and the methods used. Muscle Nerve, 2013.).

In the era of gene therapy, various AAV vectors have emerged as the least toxic and most broadly disseminated platforms for systemic gene delivery. Those gene therapies hold great promise for systemic biodistribution, but limitations include (a) the cloning capacity limited to one third that required for full length Dp427, (b) unresolved issues of vector immunogenicity and toxicity at the doses potentially needed for durable therapy, and (c) the extraordinary cost of conventional manufacturing on a scale required for human therapy. AAV vectors are structurally related to the wild type members of the subfamily of parvovirus that encapsidate a single-stranded DNA genome of approximately 5 kilobases. The mRNA for full length dystrophin is 14 kilobases, with an open reading frame of approximately 12 kb.

The majority of mutations causing DMD are sporadic multi-exon, frameshifting deletions in the >2.5 megabase, X-linked gene (Kunkel, L. M., et al., Analysis of deletions in DNA from patients with Becker and Duchenne muscular dystrophy. Nature, 1986. 322(6074): p. 73-7; Monaco, A. P., et al., Isolation of candidate cDNAs for portions of the Duchenne muscular dystrophy gene. Nature, 1986. 323 (6089): p. 646-50; and Koenig, M., et al., The molecular basis for Duchenne versus Becker muscular dystrophy: correlation of severity with type of deletion. Am J Hum Genet, 1989. 45(4): p. 498-506.). In the absence of central (thymic) tolerance to the deficient full-length protein, recombinant dystrophin has the capacity to induce host immune responses to the foreign protein (Mendell, J. R., et al., Dystrophin immunity in Duchenne's muscular dystrophy. N Engl J Med, 2010. 363(15): p. 1429-37). Novel vectors and vascular delivery methods have achieved promising regional and systemic gene transfer in proof of—concept preclinical studies, suggesting rational approaches to gene therapy for DMD (Greelish, J. P., et al., Stable restoration of the sarcoglycan complex in dystrophic muscle perfused with histamine and a recombinant adeno-associated viral vector. Nat Med, 1999. 5(4): p. 439-43; Su, L. T., et al., Uniform scale-independent gene transfer to striated muscle after transvenular extravasation of vector. Circulation, 2005. 112(12): p. 1780-8; Gao, G., L. H. Vandenberghe, and J. M. Wilson, New recombinant serotypes of AAV vectors. Curr Gene Ther, 2005. 5(3): p. 285-97; and Katz, M. G., et al., Cardiac gene therapy: optimization of gene delivery techniques in vivo. Hum Gene Ther, 2010. 21(4): p. 371-80.). These developments also, however, highlight the major vector discovery challenges and patient safety concerns in this field (Mendell, J. R., et al., Dystrophin immunity in Duchenne's muscular dystrophy. N Engl J Med, 2010. 363(15): p. 1429-37; Mendell, J. R., et al., Myoblast transfer in the treatment of Duchenne's muscular dystrophy. N Engl J Med, 1995. 333(13): p. 832-8; Mouly, V., et al., Myoblast transfer therapy: is there any light at the end of the tunnel?Acta Myol, 2005. 24(2): p. 128-33; and Wang, Z., et al., Immunity to adeno-associated virus-mediated gene transfer in a random-bred canine model of Duchenne muscular dystrophy. Hum Gene Ther, 2007. 18(1): p. 18-26.). As another example of AAV vectors treating DMD, U.S. Pat. No. 7,771,993 provides for a "micro-utrophin" (also noted as "m-utrophin", "µ-utrophin" or "µ-U") having a functional portion of the "actinin-binding domain" of about 270 amino acids relative to the human utrophin which is located within the N-terminal utrophin region, at least functional portions of the proline-rich hinge regions 1 and 4 (H1) and (H4), and a portion of the C-terminal utrophin protein. The micro-utrophin contains internal deletions of the central rod repeat domains and a truncation in the C-terminal region downstream.

There remains a need for treatment of Duchenne Muscular Dystrophy and related diseases.

SUMMARY OF THE INVENTION

The present invention provides compositions and methods useful for treatment of Muscular Dystrophy (MD), including Duchenne Muscular Dystrophy (DMD) and Becker Muscular Dystrophy (BMD), and other diseases. Provided herein is a recombinant adeno-associated virus (rAAV) vector having an AAV capsid and a vector genome. The vector genome comprises a nucleic acid sequence encoding a dystrophin superfamily triple splice mutant protein under control of regulatory sequences which direct expression thereof.

In certain embodiments, the dystrophin superfamily triple splice mutant protein comprises a hybrid helical domain comprising a first helix comprising an N-terminal portion of a helix A fused to a C-terminal portion of a helix A', a second helix comprising an N-terminal portion of a helix B' fused to a C-terminal portion of a helix B, and, a third helix comprising an N-terminal portion of a helix C fused to a C-terminal portion of helix C', wherein helices A, B, and C are present in a first triple helical repeat that is non-adjacent to a second triple helical repeat having helices A', B', and C' in a native dystrophin superfamily protein. In certain embodiments, the dystrophin superfamily mutant protein is a triple splice mutant dystrophin or triple splice mutant utrophin.

In yet further embodiments, the dystrophin superfamily triple splice mutant protein comprises N-terminal helical repeat(s), a hybrid triple helical repeat, and C-terminal helical repeat(s), wherein total number of the helical repeats including the hybrid repeat in the triple splice mutant protein is selected from any integer of 1 to 1 less than the helical repeat number of the full-length dystrophin superfamily protein, and wherein the hybrid triple helical repeat are formed by two helical repeats spliced on the plane that bisects the helical repeat perpendicular to its long axis as depicted in FIG. 2F. In certain embodiments, the dystrophin superfamily mutant protein is a triple splice mutant dystrophin or triple splice mutant utrophin.

Novel recombinant mutant dystrophins having the amino acid sequence of SEQ ID NO: 1 or 22 are provided, and novel recombinant mutant utrophins having the amino acid sequence selected from the group consisting of SEQ ID NOs: 3, 7, and 20 are also provided. In certain embodiments, the triple splice mutant protein is utrophin and encoded by a nucleic acid comprising SEQ ID NO: 19, or a sequence about 95% to about 99% identical thereto.

In further embodiments, the triple splice mutant protein comprises a hybrid triple helical repeat and C-terminal helical repeats, wherein total number of the helical repeats including the hybrid repeat in the triple splice mutant protein is five, and wherein the hybrid triple helical repeat is formed by two helical repeats spliced on the plane that bisects the helical repeat perpendicular to its long axis as depicted in FIG. 2F. In certain embodiments, the C-terminal helical repeats of the mutant protein consist of helical repeats 21, 22, 23, and 24 in full-length dystrophin, wherein helical repeat 1 of the two repeats forming the hybrid triple helical repeat is helical repeat 1 in full-length dystrophin, and wherein helical repeat 2 of the two repeats forming the hybrid triple helical repeat is helical repeat 20 in full-length dystrophin. In yet another embodiment, the C-terminal helical repeats of the mutant protein consist of helical repeats 19, 20, 21, and 22 in full-length utrophin, wherein helical repeat 1 of the two repeats forming the hybrid triple helical repeat is helical repeat 1 in full-length utrophin, and wherein helical repeat 2 of the two repeats forming the hybrid triple helical repeat is helical repeat 18 in full-length utrophin.

In yet further embodiments, novel recombinant mutant dystrophin protein comprising an amino acid sequence of SEQ ID NO: 1, 13, 14, 15, 16, 17, 18, or 22 are provided. In certain embodiments, nucleic acids encoding mutant dystrophin superfamily proteins are provided. In a yet a further embodiment, plasmids comprising nucleic acids encoding a mutant dystrophin superfamily protein are provided.

In certain embodiments, pharmaceutical compositions comprising a rAAV comprising a vector genome comprising a nucleic acid sequence encoding a triple splice mutant dystrophin superfamily protein are provided.

In yet further embodiments, methods of treating a subject diagnosed with Duchenne muscular dystrophy comprising administering a pharmaceutical composition comprising a rAAV comprising a vector genome having a nucleic acid sequence encoding a triple splice mutant dystrophin superfamily protein are provided.

Other aspects and advantages of the present invention will be apparent from the following Detailed Description of the Invention.

BRIEF DESCRIPTION OF THE DRAWINGS

FIG. 1A shows components of an exemplified dystrophy superfamily protein. From the N-terminal (indicated as $NH_2$—) of the protein to the C-terminal (indicated as —COOH), the components are 1) two calponin homology domains (CH1 and CH2), 2) several triple helix domains (noted as TH followed by a number), 3) a modular, multi-domain globular region (WW-EF-ZZ) and 4) an extreme C-terminal region. In this illustration, there are 24 triple helix domains. Grey arrowheads indicate splice junction site utilized in previous formation of a shorten dystrophin superfamily protein (such as described in U.S. Pat. No. 7,771,993, which is incorporated by reference herein in its entirety), while black arrowheads indicate splice junction site used to form a hybrid triple helix domain. FIG. 1B provides a closer look at the triple helix domains, THn in white arrows and THn' in shaded arrows, which are spliced to form a hybrid triple helix as shown in FIG. 1C. Each white arrow or shaded arrow in FIG. 1B to FIG. 1D indicates a helix in a domain (Helix A, B, and C for THn; Helix A', B' and C' for THn'; and Helix A-A', B'-B and C-C' in the hybrid triple helix domain). The black arrow lines indicate the splice junction sites. FIG. 1D provides a linear display of the hybrid triple helix domain. The white section of the bars/arrows indicate that they are originally from THn while the shaded section indicated that they are originally from THn'. As shown in FIG. 1D, the first helix of the hybrid triple helix domain comprises Helix A in the N-terminal and Helix A' in the C-terminal; the second helix of the hybrid triple helix domain comprises Helix B' in the N-terminal and Helix B in the C-terminal; and the third helix of the hybrid triple helix domain comprises Helix C in the N-terminal and Helix C' in the C-terminal.

FIG. 2A illustrates a portion of the triple helical repeat domain (TH1) of α-actinin. FIG. 2B illustrates a TH2 portion of α-actinin. FIG. 2C illustrates a TH3 portion of α-actinin. FIG. 2D illustrates a TH4 portion of α-actinin. FIG. 2E illustrates a β- and α-spectrin tet site. FIG. 2F illustrates a triple splice across the plan of the tryptophan residues, by retaining the coupled amino acid left and right of the plane (to help with orientation, the tryptophans are shown twice).

FIG. 5 provides a grid showing possible splice junctions in Helix B of dystrophin. More detailed description regarding this drawing can be found in the first paragraph of the Detailed Description of the Invention, I. Dystrophin, utrophin and others, A. Splice junctions in the helices. The variants depicted correspond to the nano-dystophin amino acid sequences of SEQ ID NOs: 13-18. Row 1: SEQ ID NO: 23, Row 17: SEQ ID NO: 24.

FIG. 6A shows human dystrophin gene, mRNA, and protein domain structure aligned to demonstrate intron position and phasing. 22 of 24 spectrin repeats of human dystrophin contain a phase 0 intron at HMM position 46 (dots with black outline). Cnidarian dystrophin shares rod-domain phase 0 introns (for clarity only HMM position 46 phase 0 introns are depicted in the cnidarian mRNA). FIG. 6B provides human beta heavy spectrin, dystrophin, and MACF1 depicted with the rod domains vertically aligned to a consensus sequence for the triple helical domain HMM. Superimposed are the positions and phases of introns relative to the corresponding coding sequences, clearly showing the structural similarity of the dystrophin and MACF1 genes. For clarity, only introns shared with orthologous genes from the most distantly related species are shown, with the spectrin gene showing vestigial introns (arrow) from a remote partial gene duplication of 13 repeats (spectrin—*A. queenslandica*; dystrophin—*N. vectensis*; MACF1—*T. adhaerens*). FIG. 6C provides a phylogenomic distribution of alpha-actinin protein superfamily members in select eukaryotic lineages. The number of rod-domain spectrin repeats is specified in parenthesis. Members of the dystroplakin superfamily harbor phase 0 introns at HMM position 46, whereas alpha-actinin and spectrin family proteins lack conservation of a phase 0 intron at this position. HMM 46 intron-driven expansion of the ancestral MACF1 ortholog is observed between fungi and Placozoa. The Ancestral MACF1 ortholog underwent a partial gene duplication that donated an N-terminal actin binding domain and a full-length rod domain to an ancestral WW-EF-ZZ dystrophin ortholog.

As shown in FIG. 7A, Immunostaining of representative limb muscle for epitopes shared by native and recombinant Utrophin (Utro_N), for epitopes unique to native Utrophin (Utro_C), γ-sarcoglycan, embryonic myosin heavy chain (eMHC), and laminin; scale bar 25 m. FIG. 7B provides H&E of representative limb muscles showing suppression of myonecrosis and mononuclear cell infiltration; scale bar 100 m. FIG. 7C provides western blot analysis detecting expression of recombinant utrophin (AAV9-µUtro) and γ-sarcoglycan (γ-sarc). FIG. 7D provides percentage of centrally nucleated myofibers (CNF), statistical measures as defined in methods (Color=distinct animal, shape=distinct muscle, same color/shape=technical replicate). FIG. 9E provides measurement of serum CK levels in treated mice (n=5), untreated mice (n=12) (*$p<0.0001$), and N.S. from wild type (n=7). FIG. 7F provides quantification of vertical activity one hour post-grip strength in treated mice (n=8), untreated mdx mice (n=11), and wild type mice (n=6). Error bars represent SD, $p<0.001$; N.S indicates not significant; statistical significance was assessed by Kruskal-Wallis test with multiple group comparison.

FIG. 8A to FIG. 8G show that systemic delivery of AAV9-µUtrophin in GRMD dogs at 7 weeks of age prevents myonecrosis and results in rapid reduction of serum CK levels. FIG. 8A provides an experimental timeline. FIG. 8B provides representative H&E of vastus lateralis and temporalis muscle showing abundant myonecrotic fibers and mononuclear cell infiltration in untreated muscle, while treated muscles resemble WT. FIG. 8C provides Alizarin red S staining showing calcified fibers indicating muscle degeneration (left panel, red), with corresponding quantification (FIG. 8E). FIG. 10D provides immunofluorescent staining with f1.652 showing cluster of eMHC-positive fibers (right panel, red), with corresponding quantification (FIG. 8F). FIG. 8G provides serum creatine kinase (CK) levels at various time points pre/post systemic AAV9-µUtrophin infusion. Scale bar 100 m.

FIG. 9A and FIG. 9B provide immunofluorescent staining of representative limb muscle. FIG. 9A shows native and recombinant Utrophin (Utro_N), native Utrophin (Utro_C), laminin. FIG. 9B shows ß-dystroglycan (green), ß-sarcoglycan (green) and γ-sarcoglycan (red). Scale bar 100 m. FIG. 9C shows a western blot analysis showing widespread biodistribution of µUtrophin (~135 kD) in striated muscle at necropsy. FIG. 9D shows a western blot analysis showing expression of ß-dystroglycan in muscle biopsies of Vastus Lateralis (VL) and cranial sartorius (CS). Treated (H)/Treated (B) indicates tissue from treated dogs, Hann and Beetle.

FIG. 10A to FIG. 10D show that focal expression of μDystrophin, but not μUtrophin elicits a detectable peripheral and local immune response in a dystrophin deletional-null dog model. FIG. 10A provides an experimental timeline. Dystrophin deletional-null dogs (Grinch and Ned) each received IM injections of AAV9-μDystrophin (Right) and AAV9-μUtrophin (Left) at equivalent doses ($1\times10^{12}$ vg/kg) into their tibialis anterior compartment. As shown in FIG. 10B, PBMCs were collected pre-, 2, 4, 6, 8 weeks post-injection and cultured with synthetic peptides spanning the entire μDystrophin (Pool A-D) and μUtrophin (Pool E-J) peptide sequences, while vaccine peptides and PMA/Ion served as positive controls. A positive result was interpreted as ≥5 spot forming units (SFU)/1E5 PBMCs (dotted line). FIG. 10C shows immunofluorescent (green) staining of muscle biopsies collected 4 weeks post-injection against Utro_N (top row) and dystrophin (bottom row). Inset with red border—for reference, appearance of normal muscle stained green for dystrophin. FIG. 10D shows representative H&E of muscle biopsies collected 4 weeks post-injection FIG. 11 provides an overview of micro-utrophin. The site of deletion junction (splice junction) is indicated. Hinge 1, 2, and 4 are labelled as H1, H2, and H4. SR1, SR2, SR3 and SR22 correspond to TH1, TH3, TH3 and TH22 of a full-length utrophin.

FIG. 12A provides a schematic diagram showing that experimental timeline. FIG. 12B shows quantification of vertical activity in the open filed cage between c57 (n=11) and mdx mice (n=12) before the whole limb force test showed no significant difference between c57 and mdx mice (P>0.05 Mann-Whitney test). FIG. 12C shows that the whole limb force test was conducted over a series of seven pulls for both c57 (n=11) and mdx mice (n=17). C57 mice are indicated with a square and mdx mice are indicated with a circle. The distribution of whole limb force for each series of pulls is demonstrated. Equations are depicted (P<0.0001, 2-way ANOVA test). FIG. 12D provides an analysis of cumulative post-vertical activity for 1 h following the force test showed that there are significant differences between c57 and mdx mice (P<0.0001, 2-way ANOVA).

FIG. 14A to FIG. 14G show that acute sarcolemmal disruption in clustered myocytes of BIO 14.6 hamster skeletal muscle after forceful contraction. FIG. 14A provides simultaneous view of Evans blue dye and dystrophin counterstain in muscle fibers 72 h after i.v. injection of Evans blue dye. In FIG. 14B, as viewed through a FITC filter, complete absence of dystrophin staining is apparent in all Evans blue-positive fibers in section from FIG. 14A. FIG. 14C shows that myocyte injury leads to loss of dystrophin in most Evans blue-positive fibers within 8 h of a single bout of voluntary running. FIG. 14D shows Tibialis anterior muscle 3 h after tetanic contracture at a lengthening rate of 0.75 muscle lengths per second. Acute injury is shown by procion orange dye uptake; dystrophin counterstaining indicates the absence of complete membrane disintegration and non-specific proteolysis in these fibers. FIG. 14E shows dystrophin counterstain of muscle cryosection after 1 h of running wheel exercise. FIG. 14F shows Evans blue dye fluorescence in same section as in FIG. 14E. FIG. 14G provides Alizarin red S stain of same region of serial cryosection. Original magnifications: FIGS. 14A, 14B and 14E to 14G, 100×; FIG. 14C and FIG. 14D, 200×.

In FIG. 26A, Images as labeled are representative of 8-week old mdx mice injected as neonates with either AAV9 µU or PBS. Histological staining with MuRF-1 and TUNEL serves as biomarker for active proteolysis and apoptosis respectively. FIG. 26B provides a Table summarizing mean and standard deviation of centrally nucleated myofibers, MuRF-1, TUNEL and embryonic positive myofibers in mdx PBS-treated, mdx AAV9-µUtrophin treated and c57 wild type PBS-treated group (n=3). Central nucleation in mdx muscle fibers is indicative of at least one previous episode of necrosis followed by regeneration as mdx mice reach 8 weeks of age.

DETAILED DESCRIPTION OF THE INVENTION

Figure 1A:
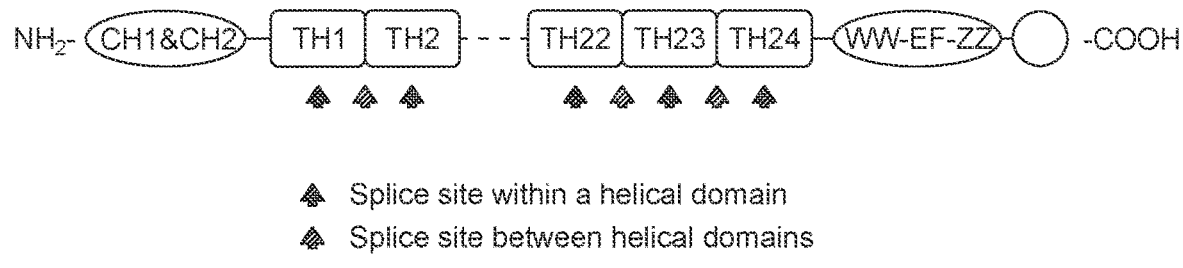
FIG. 1A to FIG. 1D provide an illustration of forming a hybrid triple helix domain.
Figure 1B:
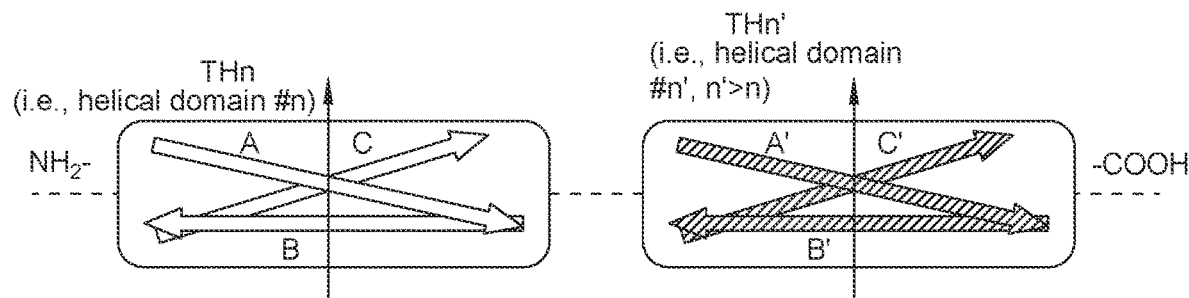

Compositions and methods are provided for treating Muscular Dystrophy (MD), including Duchenne Muscular Dystrophy (DMD) and Becker Muscular Dystrophy (BMD), and other related disease, via a dystrophin superfamily triple splice mutant protein, a nucleic acid sequence encoding thereof, or a vector comprising such nucleic acid sequence.

An unusual molecular evolution analysis of dystrophin and its supergene family was performed, leading to a paradigm shift. The inventors' analysis indicates that dystrophin's primary role is that of a strong, tethering, non-extensible, "strut"-like rod, not a shock absorber as previously theorized; that its length is secondary in importance to its strength; that its strength depends, throughout the rod domain which accounts for 80% of the protein's primary structure, on the interaction of amino acids at the boundaries between adjacent "triple-helical", "spectrin-like" repeats; that dystrophin is only as strong as its weakest link; that evolution has selected against internal deletions that weaken the protein. Thus, in order to shorten, without weakening the protein, is to cut the coding sequence for the polypeptide at multiple sites that can be aligned in the folded protein across the central triple helical domains of greatest sequence conservation (e.g. in dystrophin across the 2-dimensional plane that bisects the interacting tryptophan residues in the hydrophobic core). This is the strongest element in the Hidden Markov Models for all spectrin-like triple helical repeats, and applies to most of the repeats of dystrophin, utrophin, and the spectroplakins (MACF, dystonin, etc.)

I. Dystrophin, Utrophin and Others

As used herein, a dystrophin superfamily protein refers to a protein comprising a "spectrin-like" and "rod-like" domain which consists of three α-helices and occurs as either single copies or in tandem arrangements of multiple repeats in the protein, such as dystrophin, utrophin, alpha-actinin, alpha-spectrin, beta-spectrin, or other members of spectrin family, plakins, spectraplakins (i.e., spectroplakins). The three-α-helix domain comprises two similarly (Helices A and C) and one oppositely (Helix B) directed α-helices joined by non-helical linkers. A number of aromatic residues in the hydrophobic core of the domain are typically conserved. See, e.g., Parry D A et al. Analysis of the three-alpha-helix motif in the spectrin superfamily of proteins. Biophys J. 1992 April; 61(4):858-67; and Djinovic-Carugo K et al, The spectrin repeat: a structural platform for cytoskeletal protein assemblies. FEBS Lett. 2002 Feb. 20; 513(1):119-23. Examples of such repeats can be found in FIGS. 2A to 2E. In certain embodiments, the full-length dystrophin superfamily protein refers to a dystrophin superfamily protein or an isoform thereof, which may exist in a healthy control. In certain embodiments, the full-length dystrophin superfamily protein refers to the dystrophin superfamily protein or an isoform thereof considered as a canonical sequence by one of skill in the art. Such canonical sequences are available, e.g., on the world wide web at uniprot.org.

Spectrin is a cytoskeletal protein that lines the intracellular side of the plasma membrane in eukaryotic cells. Spectrin forms pentagonal or hexagonal arrangements, forming a scaffolding and playing an important role in maintenance of plasma membrane integrity and cytoskeletal structure. See, e.g., Huh G Y et al, Calpain proteolysis of alpha II-spectrin in the normal adult human brain. Neurosci Lett. 2001 Dec. 4; 316(1):41-4. Proteins in this superfamily can be defined by two features: (1) an N-terminal actin-binding domain; and (2) a section of α-helical spectrin repeats. See, e.g., Roper K et al. The 'spectraplakins': cytoskeletal giants with characteristics of both spectrin and plakin families. J Cell Sci. 2002 Nov. 15; 115(Pt 22):4215-25. Members of the spectrin Superfamily include but not limited to, alpha-actinin (for example, alpha-actin-1, see, e.g., UniProtKB-P12814 and on the world wide web at genecards.org/cgi-bin/carddisp.pl?gene=ACTN1; alpha-actin-2, see, e.g., UniProtKB-P35609 and on the world wide web at genecards.org/cgi-bin/carddisp.pl?gene=ACTN2; alpha-actin-3, see, e.g., UniProtKB-Q08043 and on the world wide web at genecards.org/cgi-bin/carddisp.pl?gene=ACTN3; and alpha-actin-4, see, e.g., UniProtKB-043707 and on the world wide web at genecards.org/cgi-bin/carddisp.pl?gene=ACTN4, each of which is incorporated herein by its entirety), alpha-spectrin (for example, Spectrin alpha chain, erythrocytic 1, see, e.g., UniProtKB-P02549 and on the world wide web at genecards.org/cgi-bin/carddisp.pl?gene=SPTA1; and Spectrin alpha chain, non-erythrocytic 1, see, e.g., UniProtKB-Q13813 and on the world wide web at genecards.org/cgi-bin/carddisp.pl?gene=SPTAN1, each of which is incorporated herein by its entirety), beta-spectrin (for example, Spectrin beta chain, erythrocytic, see, e.g., UniProtKB-P11277 and on the world wide web at genecards.org/cgi-bin/carddisp.pl?gene=SPTB; and Spectrin beta chain, non-erythrocytic 1, see, e.g., UniProtKB-Q01082 and on the world wide web at genecards.org/cgi-bin/carddisp.pl?gene=SPTBN1, each of which is incorporated herein by its entirety), dystrophin, and utrophin.

Plakins are cytolinker proteins that associate with cytoskeletal elements and junctional complexes. See, e.g., Leung Cl et al. Plakins: a family of versatile cytolinker proteins. Trends Cell Biol. 2002 January; 12(1):37-45. Seven plakin family members have been identified: desmoplakin (UniProtKB-P15924 and on the world wide web at genecards.org/cgi-bin/carddisp.pl?gene=DSP, which, including the sequences listed therein, are enclosed herein by their entireties), plectin (UniProtKB-P15924 and on the world wide web at genecards.org/cgi-bin/carddisp.pl?gene=PLEC, which, including the sequences listed therein, are enclosed herein by their entireties), bullous pemphigoid antigen 1 (BPAG1, Dystonin) (UniProtKB-Q03001 and on the world wide web at genecards.org/cgi-bin/carddisp.pl?gene=DST, which, including the sequences listed therein, are enclosed herein by their entireties), microtubule-actin crosslinking factor (MACF) (UniProtKB-Q9UPN3 and on the world wide web at genecards.org/cgi-bin/carddisp.pl?gene=MACF1, which, including the sequences listed therein, are enclosed herein by their entireties), envoplakin (UniProtKB-Q92817 and on the world wide web at genecards.org/cgi-bin/carddisp.pl?gene=EVPL, which, including the sequences listed therein, are enclosed herein by their entireties), periplakin (UniProtKB-060437 and on the world wide web at genecards.org/cgi-bin/carddisp.pl?gene=PPL, which, including the sequences listed therein, are enclosed herein by their entireties) and epiplakin (UniProtKB-P58107 and on the world wide web at genecards.org/cgi-bin/carddisp.pl?gene=EPPK1, which, including the sequences listed therein, are enclosed herein by their entireties). This family of proteins is defined by the presence of a plakin domain and/or a plakin repeat domain (PRD). In addition to these two domains, plakins also harbor other domains that are common in some but not all members: the actin-binding domain (ABD), coiled-coil rod, spectrin-repeat-containing rod and microtubule-binding domain.

Spectraplakins belong within both the spectrin and plakin superfamilies and are exceptionally long, intracellular proteins that have the rare ability to bind to all three cytoskeletal elements: actin, microtubules, and intermediate filaments. Spectraplakins are critically important for tissue integrity and function, operating with single cytoskeleton elements as well as coordinating these elements. See, e.g., Roper K et al. as cited above and Huelsmann S et al, Spectraplakins. Curr Biol. 2014 Apr. 14; 24(8):R307-8. doi: 10.1016/j.cub.2014.02.003. Members of spectraplakins include but not limited to BPAG1 and MACF as described above. Dystrophin anchors the extracellular matrix to the cytoskeleton via F-actin, and is a ligand for dystroglycan. Component of the dystrophin-associated glycoprotein complex accumulates at the neuromuscular junction (NMJ) and at a variety of synapses in the peripheral, and central nervous systems and has a structural function in stabilizing the sarcolemma. It is also implicated in signaling events and synaptic transmission. See, e.g., on the world wide web at uniprot.org/uniprot/P11532 and on the world wide web at genecards.org/cgi-bin/carddisp.pl?gene=DMD&keywords=dystrophin. There are 10 isoforms of dystrophin. Isoform 4 is considered as the canonical sequence and has an amino acid sequence with UniProtKB identifier: P11532-1, which is incorporated herein. The other isoforms including isoform 1 with UniProtKB identifier: P11532-2, isoform 2 with UniProtKB identifier: P11532-3, isoform 3 with UniProtKB identifier: P11532-4, isoform 5 with UniProtKB identifier: P11532-5, isoform 6 with UniProtKB identifier: P11532-6, isoform 7 with UniProtKB identifier: P11532-7, isoform 8 with UniProtKB identifier: P11532-8, isoform 9 with UniProtKB identifier: P11532-9, and isoform 10 with UniProtKB identifier: P11532-10, sequence of each of the isoform is incorporated herein. The term "full-length dystrophin" as used herein may refer to any dystrophin isoform. In certain embodiments, the term "full-length dystrophin" refers to the isoform 4 (Dp427). Homologs of dystrophin have been identified in a variety of organisms, including mouse (UniProt P11531), rat (UniProt P11530), and dog (UniProt 097592).

Possible nucleic acid sequence encoding Dp427 or any other isoform or homolog of dystrophin is available publicly, See, e.g., NCBI Reference Sequences: NM_000109.3, NM 004006.2, NM_004009.3, NM_004010.3, NM 004011.3, NM_004012.3, NM 004013.2, NM_004014.2, NM 004015.2, NM_004016.2 NM_004017.2, NM 004018.2, NM_004019.2, NM 004020.3, NM_004021.2, NM_004022.2, NM_004023.2, NM_004007.2, XM_006724468.2, XM_006724469.3, XM_006724470.3, XM_006724473.2, XM_006724474.3, XM_006724475.2, XM_011545467.1, XM_011545468.2, XM_011545469.1, XM_017029328.1, XM_017029329.1, XM_017029330.1, and XM_017029331.1, each of which is incorporated herein. Additional sequence encoding Dp427 or any other isoform or homolog of dystrophin may be generated via tools for reverse-translation, e.g., on the world wide web at ebi.ac.uk/Tools/st/, on the world wide web at ebi.ac.uk/Tools/st/emboss_transeq/, on the world wide web at ebi.ac.uk/Tools/st/emboss_sixpack/, on the world wide web at ebi.ac.uk/Tools/st/emboss_backtranseq/, and on the world wide web at ebi.ac.uk/Tools/st/emboss_backtranambig/. Furthermore, the coding sequences might be codon-optimized for expression in a subject, e.g., human, mice, rat or dog.

Dp427 is 3685 amino acids in length. Also, see, e.g., U.S. Pat. No. 7,892,824B2, and GenBank: AAA53189.1. The N-terminal 240 amino acids of Dp427 fold into two calponin homology domains (CH1&2) that have the capacity for high-affinity binding to cytoskeletal actin filaments. The central region from approximately amino acid 340 to 3040 is composed of 24 tandemly linked domains identifiable by Hidden Markov Modelling as triple helices (TH1-24) with measurable structural homology to crystalized repeats of the rod-like proteins spectrin and alpha-actinin. The region from 3057 to 3352 encompasses a modular, multi-domain globular region (WW-EF-ZZ) with high affinity for the membrane spanning complex of proteins centered around beta-dystroglycan. The extreme C-terminal region from 3353 to 3685 has seemingly expendable high-affinity binding domains for the proteins dystrobrevin and syntrophin. Dp427 has been modelled as a rod-like protein at the cortex of striated myocytes, bound to the outermost rim of cytoskeletal F-actin by the N-terminal calponin homology domains, and to the membrane spanning members of the DGC by the C-terminal WW-EF-ZZ domains. The central rod domain is composed of 24 domains with low level homology to the triple helical repeats hinges 1-4. Internal deletions of the spectrin-like repeats are generally associated with a slower rate of disease progression, in the allelic disease Becker MD (BMD). A central challenge for gene therapy for DMD is to safely, effectively, and durably substitute for Dp427 in the majority of skeletal and cardiac myocytes. Ideally this substitution would match the functionality of Dp427; there is concern that proteins substantially smaller than 427 kd might merely convert DMD to a severe BMD phenotype. An illustration of Dp427 can be found in FIG. 1A. Hidden Markov Modelling can be performed via conventional methods while parameters thereof may be adjusted by one of skill in the art. See, e.g., en.wikipedia.org/wiki/Hidden_Markov_model. Deletions of 19-20 contiguous TH domains and the region from 3353-3685 yield "AAV-sized" miniaturized dystrophins in the sense that synthetic coding sequences for these recombinant proteins are within the cloning capacity of AAV vectors. All such recombinant proteins share rod-like domains $⅕^{th}$ to $⅙^{th}$ of the length of the rod in Dp427, raising concerns that the shortening undermines the recombinant proteins' ability to "absorb" as much "shock" as the 24-repeat full-length protein.

Utrophin is a substantial homology to dystrophin, with significant divergence occurring in the rod domain, where utrophin lacks repeats 15 and 19 and two hinge regions (See e.g., Love et al., Nature 339:55 [1989]; Winder et al., FEBS Lett., 369:27 [1995]; on the world wide web at uniprot.org/uniprot/P46939; and on the world wide web at genecards.org/cgi-bin/carddisp.pl?gene=UTRN&keywords=Utrophin). Four isoforms of utrophin were discovered. Isoform 1 is considered as the canonical sequence and has an amino acid sequence with UniProt Identifier P46939-1, which is incorporated herein. Other isoforms include Isoform 2 with UniProt Identifier P46939-2; isoform Up71 with UniProt Identifier P46939-3; and isoform Up140 with UniProt Identifier P46939-4. Full-length utrophin may refer to any utrophin isoform. In certain embodiment, the full-length utrophin refers to utrophin isoform 1, which contains 22 spectrin-like repeats (SR1 to SR22, or TH1 to TH22) and two hinge regions. Homologs of utrophin have been identified in a variety of organisms, including mouse (Genbank accession number Y12229 and UniProt E9Q6R7), rat (Genbank accession number AJ002967 and UniProt G3V7L1), and dog (GenBank accession number NW-139836). The nucleic acid sequence of these or additional homologs can be compared to the nucleic acid sequence of human utrophin using any suitable methods. Nucleic acid sequence encoding utrophin isoform 1 or any other isoform or any homolog is available. See, e.g., NCBI Reference Sequence: NM_007124.2, XM_005267127.4, XM_005267130.2, XM_005267133.2, XM_006715560.3, XM_011536101.2, XM_011536102.2, XM_011536106.2, XM_011536107.2, XM_011536109.2, XM_017011243.1, XM_017011244.1, XM_017011245.1; Genbank accession number X69086 and GenBank accession number AL357149, each of which is incorporated herein. Additional sequence encoding utrophin isoform 1 or any other isoform or any homolog may be generated via tools for reverse-translation, e.g., on the world wide web at ebi.ac.uk/Tools/st/, on the world wide web at ebi.ac.uk/Tools/st/emboss_transeq/, on the world wide web at ebi.ac.uk/Tools/st/emboss_sixpack/, on the world wide web at ebi.ac.uk/Tools/st/emboss_backtranseq/, and on the world wide web at ebi.ac.uk/Tools/st/emboss_backtranambig/. Furthermore, the coding sequences might be codon optimized for expression in a subject, e.g., human, mice, rat or dog.

In one aspect, provided herein is a dystrophin superfamily triple splice mutant protein. In one embodiment, the triple splice mutant protein comprises an internal deletion of multiple helical repeats, and a hybrid helical domain formed by joining portions of helical repeats of the full-length dystrophin superfamily protein. In certain embodiments, the dystrophin superfamily triple splice mutant protein has a first helix with an N-terminal portion of a helix A fused to a C-terminal portion of a helix A', a second helix comprising an N-terminal portion of a helix B' fused to a C-terminal portion of a helix B, and a third helix comprising an N-terminal portion of a helix C fused to a C-terminal portion of helix C', wherein helices A, B, and C are present in a first triple helical repeat and helices A', B', and C' are present in a second triple helical domain in a native dystrophin superfamily protein. In certain, embodiments, the first and second triple helical domains are non-adjacent and, accordingly, provide a mutant dystrophin superfamily protein having a hybrid triple helical domain and a deletion of 1 or more triple helical domains present in the native dystrophin superfamily protein. Thus, the total number of the helical repeats in the triple splice mutant protein is selected from any integer from 3 to 1 less than the helical repeat number of the full-length dystrophin superfamily protein, for example, 4, 5, 6, 7, 8, 9, 10, 11, 12, 13, 14, 15, 16, 17, 18, 19, 20, 21, 22, and 23. In certain embodiments, provided herein are mutant dystrophin proteins that have deletions in at least helical repeat 3 to helical repeat 21 in the full-length dystrophin. In yet another embodiment, the mutant protein has a deletion in at least helical repeat 3 to 23 in the full-length dystrophin. In yet a further embodiment, the mutant protein has a deletion in at least helical repeat 2 to helical repeat 19 in the full-length dystrophin. In certain embodiments, the mutant utrophin proteins are provided having a deletion in at least helical repeat 3 to helical repeat 10 of full-length dystrophin. In a further embodiment, the mutant utrophin has a deletion in at least helical repeat 2 to helical repeat 17 of full length utrophin.

Figure 1C:
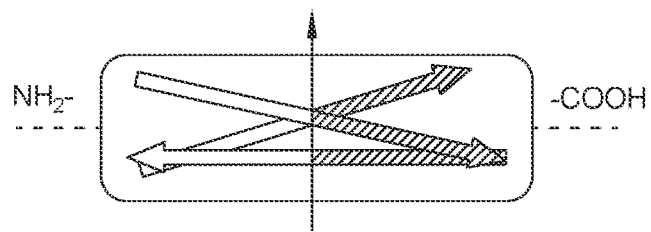

As used herein, the terms "triple helical domain", "triple helix domain", "triple helical repeat", "triple helix repeat", and "TH" are interchangeable and refers to the rod-like and spectrin-like repeat of a dystrophin superfamily protein consisting of three α-helices, i.e., two similarly (Helices A and C) and one oppositely (Helix B) directed α-helices, joined by nonhelical linkers. Those repeats can be identified by Hidden Markov Modelling. Examples of such repeats can be found in FIG. 2A to FIG. 2E. The hybrid triple helical repeat is formed by two helical repeats spliced on the plane that bisects the helical repeat perpendicular to its long axis. Such planes are further discussed below and exemplified in the Examples as well as in FIG. 2F. An illustration of forming such hybrid triple helical repeat is provided in FIG. 1 with an illustration of a hybrid triple helix domain (also noted herein as a hybrid triple helical repeat) presented in FIG. 1C and FIG. 1D. As used herein, a "splice junction" indicates a position in a nucleic acid sequence, an amino acid sequence, or a protein with secondary, tertiary or quaternary structure, where the internal deletion starts or ends in the full-length dystrophin superfamily protein or in either of the two triple helical repeats forming the hybrid triple helix domain; or where the sequences, corresponding sequences of which in the full-length protein are not immediately adjacent to each other, but are joined in the hybrid triple helix domain or in the dystrophin superfamily triple splice mutant protein. The term "immediately adjacent" means that two sequences, domains or repeats, are not separated by any other sequence, domains or repeats respectively. The term "join," "re-join," or any grammatical variations thereof indicates two sequences, domains or repeats become immediately adjacent. The term "form" or any grammatical variation thereof refers to splicing or joining sequences. The correspondence of sequences or positions in sequences may be determined by a sequence alignment or the Hidden Markov Model (HMM).

As used herein, an "N-terminal portion" refers to the amino acid sequence at the amino-terminal side of the splice junction for a selected helix. In certain embodiments, the "N-terminal portion" of a selected helix refers to the full-length amino acid sequence from the initial Met through to the last amino acid sequence prior to (on the N-terminal side) of the splice junction. In certain embodiments, there may be amino acid substitutions, deletions, truncations and/or insertions in the N-terminal portion. In certain embodiments, such substitutions are conservative amino acid changes. In certain embodiments, a deletion, truncation or insertion is from one to five amino acids in length which does not affect the folding of the helix.

The term "a "C-terminal portion" refers to the amino acid sequence at the carboxy-terminal side of the splice junction for a selected helix. In certain embodiments, the "C-terminal portion" of a selected helix refers to the full-length amino acid sequence from the first amino acid sequence after (on the C-terminal side) of the splice junction. In certain embodiments, there may be amino acid substitutions, deletions, truncations and/or insertions in the N-terminal portion. In certain embodiments, such substitutions are conservative amino acid changes. In certain embodiments, a deletion, truncation or insertion is from one to five amino acids in length which does not affect the folding of the helix.

For example, in certain embodiments, the triple mutant hybrid helical domains havcrosse three splice helices that are formed by joining segments of non-adjacent helical domains, wherein each helix comprises an N-terminal portion and a C-terminal portion of a helix in a helical repeat of a native dystrophin superfamily protein. Because the triple helical domains that are joined to form the mutant junction each have parallel A and C helices and an anti-parallel B helix, the N-terminal portions of the A and C helices in the triple helix mutant are from the same triple helical repeat in the native dystrophin superfamily protein, while the C-terminal portions of these helices are from another triple helical repeat in the native dystrophin superfamily protein. As result of the positioning of the junction to form the triple helical mutant domain, the N-terminal portions and C-terminal portions may be of varied lengths, but together form a helix of the mutant triple helix domain.

An ordinal number, such as "first," "second," "third," "fourth," or the term "additional" are used throughout this specification as reference terms to distinguish between various forms and components of the compositions and methods. Unless specified, if an ordinal number is used for indicating a TH, an amino acid sequence, or a nucleic acid sequence, such number is counted from N-terminal to C-terminal in an amino acid sequence or a protein, or from 5' to 3' in a nucleic acid sequence.

As used herein, a protein repeat followed by a number refers to the repeat number among all repeats in a reference protein or a reference amino acid sequence counting from the N-terminal unless particularly specified. For example, the triple helix domain 2 refers to TH2 illustrated by FIG. TA. When the repeat and the reference sequence are polynucleotides, the number of the repeats is counted from the 5' end to the 3'end unless particularly specified.

In certain embodiments, the dystrophin superfamily triple splice mutant protein comprises N-terminal helical repeat(s), a hybrid triple helical repeat, and C-terminal helical repeat(s). In certain embodiments, the dystrophin superfamily triple splice mutant protein comprises a hybrid triple helical repeat and C-terminal helical repeats. The total number of the helical repeat(s) in the triple splice mutant protein is selected from any integer from 3 to 1 less than the helical repeat number of the full-length dystrophin superfamily protein, for example, 4, 5, 6, 7, 8, 9, 10, 11, 12, 13, 14, 15, 16, 17, 18, 19, 20, 21, 22, and 23. In certain embodiments, sequence(s) in the full-length dystrophin superfamily protein, which corresponds to the N-terminal helical repeat(s) in the mutant protein, is immediately adjacent to sequence corresponding to the first of the two helical repeats which forms the hybrid triple helical repeat. In certain embodiments, sequence(s) in the full-length dystrophin superfamily protein, which corresponds to the C-terminal helical repeat(s) in the mutant protein, is immediately adjacent to sequence corresponding to the second of the two helical repeats which forms the hybrid triple helical repeat. In a further embodiment, the N-terminal helical repeat(s) may comprise TH1, TH2, TH3, TH4, TH5, TH6, TH7, TH8, TH9, TH10, TH11, TH12, TH13, TH14, TH15, TH16, TH17, TH18, and TH19. In yet a further embodiment, the C-terminal helical repeat(s) may comprise TH1, TH2, TH3, TH4, TH5, TH6, TH7, TH8, TH9, TH10, TH11, TH12, TH13, TH14, TH15, TH16, TH17, TH18, and TH19, each TH number of which is counted from the C-terminal. Additionally, there might be only one helical repeat in the mutant protein wherein the helical repeat is the hybrid triple helix domain formed by helical domain 1 and the last helical domain of the full-length dystrophin superfamily protein. Furthermore, there might be two helical repeats in the mutant protein. Such two-TH mutant protein may comprise helical repeat 1 of the full-length protein, and one hybrid triple helix domain formed by helical repeat 2 and the last helical repeat of the full-length protein. In another embodiment, the two-TH mutant protein may comprise the last helical repeat in the full-length protein, and one hybrid triple helix domain formed by helical repeat 1 and the second from the last helical repeat of the full-length protein. As used herein, the terms "dystrophin superfamily triple splice mutant protein", "triple splice mutant protein" and "mutant protein" are used interchangeably. Also, except at the splice junction(s) in the hybrid triple helical repeat, the repeats and sequences in the mutant protein are immediately adjacent to the same repeats and sequences respectively as they are in the full-length dystrophin superfamily protein.

In certain embodiments, the dystrophin superfamily triple splice mutant protein might be truncated at the C-terminal, for example, for any integer of 1 to 500 of amino acids. Such truncation does not comprise any triple helical repeat. In certain embodiments, such truncation may occur at a position corresponding to a beginning or an end of an exon of the full-length dystrophin superfamily protein.

Also provided herein is a nucleic acid sequence encoding the dystrophin superfamily triple splice mutant protein. Such coding sequence may be generated via tools for reverse-translation. Furthermore, the coding sequences might be codon optimized for expression in a subject, e.g., human, mice, rat or dog.

In one embodiment, the dystrophin superfamily mutant protein is a triple splice mutant dystrophin. In a further embodiment, the triple splice mutant dystrophin comprises a deletion in at least helical repeat 3 to helical repeat 21 of the full-length dystrophin. In another embodiment, the triple splice mutant dystrophin comprises a deletion in at least helical repeat 3 to helical repeat 23 of the full-length dystrophin. In yet another embodiment, the N-terminal helical repeat(s) of the mutant dystrophin comprises helical repeat 1 in the full-length dystrophin. The C-terminal helical repeat(s) of the mutant protein comprises helical repeat 23 and helical repeat 24 in the full-length dystrophin. In a further embodiment, the N-terminal helical repeat of the mutant protein consists of helical repeat 1 in the full-length dystrophin. The C-terminal helical repeats of the mutant protein consist of helical repeat 23 and helical repeat 24 in the full-length dystrophin. The first of the two helical repeats which forms the hybrid triple helical repeat is helical repeat 2 in the full-length dystrophin. The second of the two helical repeats which forms the hybrid triple helical repeat is helical repeat 22 in the full-length dystrophin. In yet another embodiment, the triple splice mutant dystrophin comprises a deletion in at least helical repeat 2 to helical repeat 19 of the full-length dystrophin protein. The C-terminal helical repeats comprise helical repeats 21, 22, 23, and 24 in the full-length dystrophin. The first of the two helical repeats which forms the hybrid triple helical repeat is helical repeat 1 in the full-length dystrophin, and the second of the two helical repeats which forms the hybrid triple helical repeat is helical repeat 19 in the full-length dystrophin. In certain embodiments, the triple splice mutant dystrophin may further comprise amino acid (aa) about 1 to about aa 338 of dystrophin isoform 4 at the N-terminal. In certain embodiments, the triple splice mutant dystrophin may further comprise about aa 3041 to about aa 3352, about aa 3041 to about aa 3054, about aa 3041 to about aa 3056, about aa 3041 to about aa 3057, about aa 3041 to about aa 3088, about aa 3041 to about aa 3408, or about aa 3041 to about aa 3685 of dystrophin isoform 4 at the C-terminal. In certain embodiments, there may be a further truncation of these C-terminal non-TH sequence of a triple splice mutant dystrophin. As used herein, a truncation refers to a deletion of consecutive amino acids starting from the C-terminal end. In certain embodiments, such truncation may occur at a position corresponding to a beginning or an end of an exon of the full-length dystrophin. In certain embodiment, the truncation may be 1, 2, 3, 4, 5, about 10, about 15, about 20, about 30, about 40, about 50, about 60, about 70, about 100, about 150, about 200, about 250, about 300, about 400, about 500, or about 600 aa in length. Also provided herein is a nucleic acid sequence encoding the triple splice mutant dystrophin. Such coding sequence may be generated via tools for reverse-translation. Furthermore, the coding sequences might be codon optimized for expression in a subject, e.g., human, mice, rat or dog.

In one embodiment, the triple mutant dystrophin is a nano-dystrophin (also noted as n-dystrophin) having the amino acid sequence of SEQ ID NO: 1. In yet a further embodiment, provided is a sequence encoding the triple splice mutant dystrophin having a nucleic acid sequence of SEQ ID NO: 2. In one embodiment, the nucleic acid sequence encoding SEQ ID NO: 1 is codon-optimized for expression in a subject. In a further embodiment, the nucleic acid sequence encoding SEQ ID NO: 1 is codon-optimized for expression in human. Conventional tools for codon optimization are available publicly or commercially to one of skill in the art. See, e.g., Fuglsang A (Codon optimizer: a freeware tool for codon optimization. Protein Expr Purif 2003 October; 31(2):247-9,) on the world wide web at genscript.com/codon-opt.html, on the world wide web at thermofisher.com/us/en/home/life-science/cloning/gene-synthesis/geneart-gene-synthesis/geneoptimizer.html, and on the world wide web at idtdna.com/CodonOpt.

In yet another embodiment, the triple mutant dystrophin is a nano-dystrophin having the amino acid sequence of SEQ ID NO: 13, 14, 15, 16, 17, or 18. In yet a further embodiment, provided herein are nucleic acid sequences encoding the triple splice mutant dystrophin having an amino acid sequence of SEQ ID NO: 13, 14, 15, 16, 17, or 18. In certain embodiments, the nucleic acid sequence encoding SEQ ID NO: SEQ ID NO: 13, 14, 15, 16, 17, or 18 is codon-optimized for expression in a subject. In a further embodiment, the nucleic acid sequence encoding SEQ ID NO: SEQ ID NO: 13, 14, 15, 16, 17, or 18 is codon-optimized for expression in human.

In yet another embodiment, the triple mutant dystrophin is a nano-dystrophin having the amino acid sequence of SEQ ID NO: 22.

The term "subject" as used herein means a male or female mammalian animal, including a human, a veterinary or farm animal, a domestic animal or pet, and animals normally used for clinical research. In one embodiment, the subject of these methods and compositions is a human. In one embodiment, the subject of these methods and compositions is a prenatal, a newborn, an infant, a toddler, a preschool, a grade-schooler, a teen, a young adult or an adult. A newborn human refers to a human with an age of 0 to 12 month; a human toddler is with an age of 1 to 3 years; a human preschool with an age of 3 to 5 years; a human grade-schooler with an age of 5 to 12 years; a human teen with 12 to 18 years old; a human young adult with an age of 18 to 21 years; while a human adult with an age beyond 18 years. A "healthy subject" refers to a subject without a disease. As used herein, the term "disease" may refer to DMD and/or BMD. In certain embodiments, the term "disease" may refer to another disease caused by an abnormal dystrophin superfamily protein. In certain embodiments, "disease" refers to von Willebrand's disease.

In one embodiment, the dystrophin superfamily mutant protein is a triple splice mutant utrophin and comprises a deletion in at least helical repeat 3 and helical repeat 19 of full-length utrophin. In one embodiment, the N-terminal helical repeat(s) of the mutant protein comprises helical repeat 1 in the full-length utrophin. The C-terminal helical repeat(s) of the mutant protein comprises helical repeat 21 and helical repeat 22 in the full-length utrophin. In a further embodiment, the N-terminal helical repeat of the mutant protein consists of helical repeat 1 in the full-length utrophin. The C-terminal helical repeats of the mutant protein consist of helical repeat 21 and helical repeat 22 in the full-length utrophin. The first of the two helical repeats which forms the hybrid triple helical repeat is helical repeat 2 in the full-length utrophin. The second of the two helical repeats which forms the hybrid triple helical repeat is helical repeat 20 in the full-length utrophin. In yet another embodiment, the dystrophin superfamily mutant protein is a triple splice mutant utrophin and include a deletion in at least helical repeat 2 to helical repeat 17 of full-length utrophin. The C-terminal helical repeats of the mutant protein include helical repeats 19, 20, 21, and 22 in the full-length utrophin. The first of the two helical repeats which forms the hybrid triple helical repeat is helical repeat 1 in the full-length utrophin, and the second of the two helical repeats which forms the hybrid triple helical repeat is helical repeat 18 in the full-length utrophin. In certain embodiments, the triple splice mutant utrophin may further comprise about aa 1 to about aa 311 of utrophin isoform 1 at the N-terminal. In certain embodiments, the triple splice mutant utrophin may further comprise about aa 2797 to about 2811, about aa 2797 to about 2845, about aa 2797 to about 3124, about aa 2797 to about 3134, about aa 2797 to about 3165, about aa 2797 to about 3168, or about aa 2797 to about 3433, of utrophin isoform 1 at the C-terminal. In certain embodiments, there may be a further truncation of these C-terminal non-TH sequence of a triple splice mutant utrophin. In certain embodiments, such truncation may occur at a position corresponding to a beginning or an end of an exon of the full-length utrophin. In certain embodiment, the truncation may be 1, 2, 3, 4, 5, about 10, about 15, about 20, about 30, about 40, about 50, about 60, about 70, about 100, about 150, about 200, about 250, about 300, about 400, about 500, or about 600 aa in length. Also provided herein is a nucleic acid sequence encoding the triple splice mutant utrophin. Such coding sequence may be generated via tools for reverse-translation. Furthermore, the coding sequences might be codon optimized for expression in a subject, e.g., human, mice, rat or dog.

In one embodiment, the triple mutant utrophin is a nano-utrophin (also noted as n-utrophin, or n-U with or without the dash mark) comprising the amino acid sequence of: SEQ ID NO: 3. In a further embodiment, provided herein is a sequence encoding the triple splice mutant utrophin and comprising a nucleic acid sequence of SEQ ID NO: 4. In certain embodiments, the triple mutant utrophin is a nano-utrophin (also noted as n-utrophin, or n-U with or without the dash mark) having the amino acid sequence of SEQ ID NO: 5. In a further embodiment, provided herein is a sequence encoding SEQ ID NO: 5 and having a nucleic acid sequence of SEQ ID NO: 6, or a nucleic acid sequence about 95% to about 99% identical to SEQ ID NO: 6. In certain embodiments, the triple mutant utrophin is a nano-utrophin having the amino acid sequence of SEQ ID NO: 7. In a further embodiment, provided herein is a sequence encoding SEQ ID NO: 7, and having a nucleic acid sequence of SEQ ID NO: 8 or a nucleic acid sequence about 95% to about 99% identical to SEQ ID NO: 8. In one embodiment, the nucleic acid sequence encoding SEQ ID NOs: 3, 5, or 7 is codon-optimized for expression in a subject. In certain embodiments, the triple mutant utrophin is a nano-utrophin having the amino acid sequence of SEQ ID NO: 20. In a further embodiment, provided herein is a sequence encoding SEQ ID NO: 20, and having a nucleic acid sequence of SEQ ID NO: 19 or a nucleic acid sequence about 95% to about 99% identical to SEQ ID NO: 19. In one embodiment, the nucleic acid sequence encoding SEQ ID NOs: 3, 5, 7, or 20 is codon-optimized for expression in a subject. In a further embodiment, the nucleic acid sequence encoding SEQ ID NOs: 3, 5, 7, or 20 is codon-optimized for expression in human. In yet another embodiment, the triple mutant utrophin is a nano-utrophin comprising the amino acid sequence of SEQ ID NO: 21.

In certain embodiments, this disclosure includes the amino acid and all encoding synthetic nucleic acid sequences for both human nano-utrophin and human nano-dystrophin featuring "triple-spliced". In certain embodiment, hybrid triple helices may join the middle of triple helical repeat 2 to that of the third-from-the-last triple helical repeat domain (#20 of 22 in utrophin, #22 of 24 in dystrophin), giving a total of four repetitive domains in both of the recombinant proteins as described herein and illustrated as features of SEQ ID NOs: 1 and 3. These amino acid sequences define the recombinant proteins of greatest strength that can be encoded within the coding capacity of a single AAV vector genome. See FIG. 4 and Examples 2 and 3.

Little was known of the mechanobiology of dystrophin, but indirect studies of the protein's physiological role suggest that the rod domain of the protein may be loaded longitudinally during muscle contraction. The examples presented herein provides the first direct evidence for this. In comparisons between juvenile and skeletally mature mdx (dystrophin null) mice expressing micro-utrophin, western blot analysis with antibodies directed against the N-terminus of the recombinant protein reveals evidence for disruption of the rod at the position of the single splice junction as the processes of muscle maturation and myosin isoform switching increase the mechanical loading across the muscle membrane. This strongly supports the hypothesis that the strength of the rod domain is compromised at the exact position of the single splice junction. The design principle underlying the development of nano-utrophin and nano-dystrophin compensates for this previous shortcoming by eliminating the juxtaposition of incompatible subdomains of the rod.

A. Splice Junctions in the Helices

Figure 1D:
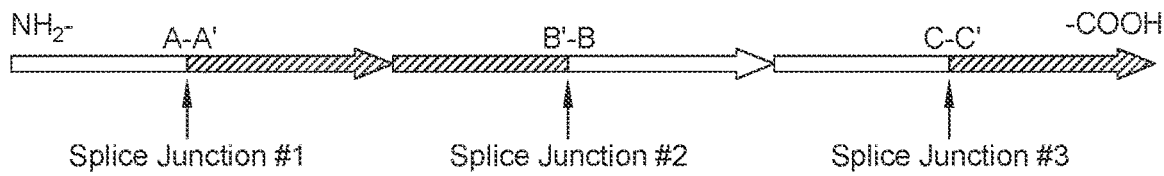
Figure 2A:
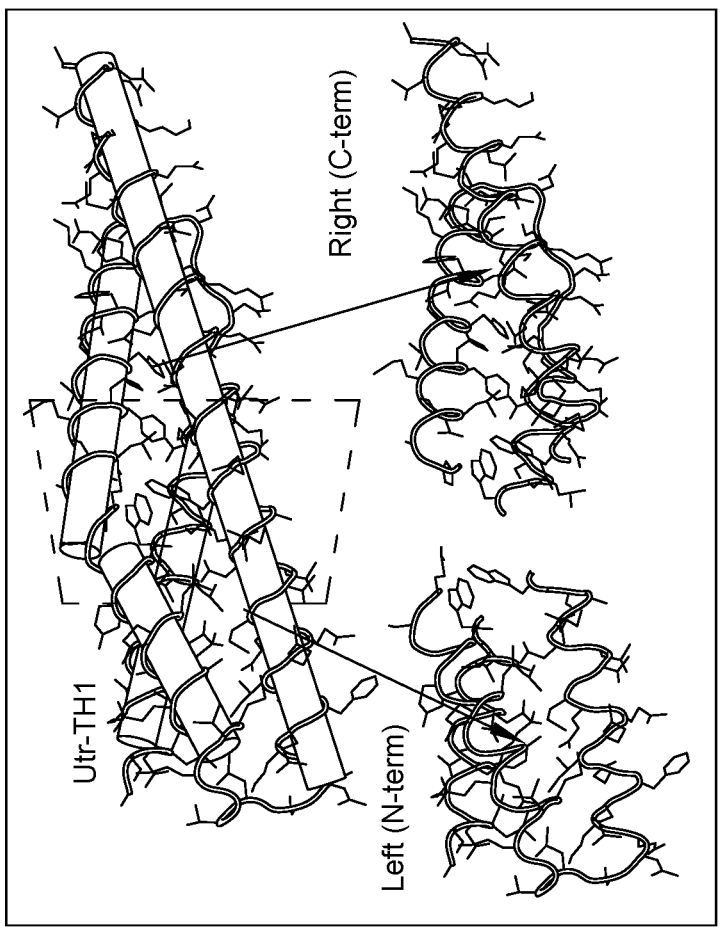
FIG. 2A to FIG. 2F illustrate the utrophin modifications provided herein. The lighter colored residues depict the tryptophans, which are the most conserved residues in the Hidden Markov Modelling (HMM) for the triple helical repeat domains shared by α-actinin, β- and α-spectrin, dystrophin, utrophin and the spectroplakins. The sequence divergence at all other positions with extensive evolutionary coupling establishes that these regions of individual repeats are not interchangeable from one repeat to another without destabilizing the triple helix. No single splice can resolve this problem, but a triple spice across the plane of the tryptophan residues can, by retaining the coupled amino acid left and right of the plane.
Figure 2B:
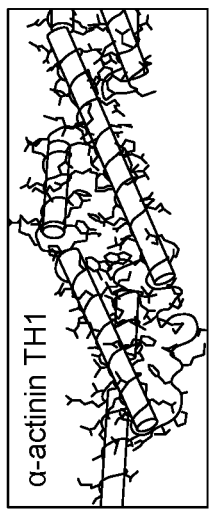
Figure 2C:
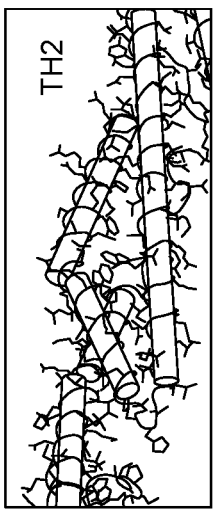
Figure 2D:
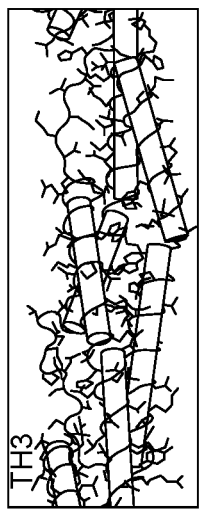
Figure 2E:
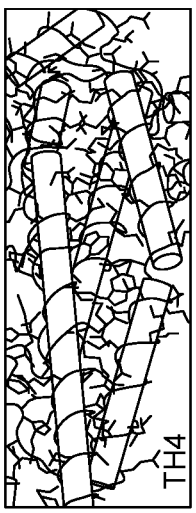
Figure 2F:
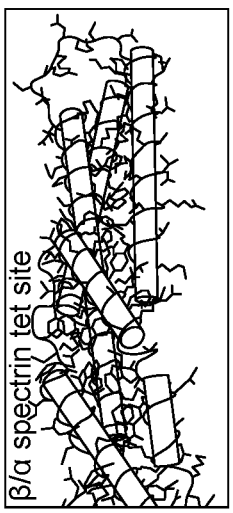

The hybrid triple helical repeat is formed by two helical repeats spliced on the plane that bisects the helical repeat perpendicular to its long axis as indicated in FIG. TA to FIG. 1D and FIG. 2F. The choice of splice junction in the antiparallel "B" helix is derived by indirect means. Only one X-ray crystal structure has been determined for a single repeat of a dystrophin triple helix, TH1 (i.e. no structures to date for TH2-24). The adjacent triple helices of dystrophin overlap more-so than do those of spectrin and alpha-actinin, thereby stabilizing the helices during longitudinal load-bearing, may partially explain the dearth of structural information as there may be difficulty in crystalizing sub-regions of the rod. Nonetheless, the conservation of tryptophan residues in the center of the hydrophobic core provides "anchor points" for two of the three splices, those in the "A" and "C" helices. Note for instance the prominence of the W at position 16 in the HMM logo shown in FIG. 3 (Wheeler et al., BMC Bioinformatics 2014). All crystal structures were analyzed for triple helical repeats containing the two interacting tryptophan residues and used the HMMscan analysis on the HMMer web portal to define the probability that individual positions within the "B" helix would correspond to the cross-sectional plane bisecting the tryptophans (i.e., the plane that bisects the helical repeat perpendicular to its long axis).

LQGEIEAHTDVY (N-terminal to C-terminal, an amino acid sequence in the full length dystrophin TH22) . . . QEDLEQEQV (N-terminal to C-terminal, an amino acid sequence in the full length dystrophin TH2) is the sequence surrounding the splice junction in helix B (helix 2, the second helice of the three helices in a TH) of the two TH of the full-length dystrophin forming the hybrid TH in the nano-dystrophin. The underlined letters E and Q indicate the splice junction in Helices B while both of E and Q are preserved in the resultant hybrid TH as illustrated in SEQ ID NO: 1. However, it would be understood by one of skill in the art that the triple splice mutant dystrophin used herein may have a splice junction in helix B other than between EQ as indicated as a feature of SEQ ID NO: 1. Such splice junction may be at the N-terminal or C-terminal of any amino acid in Helix B as indicated in LQGEIEAHTDVY . . . QEDLEQEQV as well as FIG. 5 and the corresponding amino acid sequences of SEQ ID NOs: 13-18, or an other corresponding position of a helix B in another TH. The correspondence of positions in sequences may be determined by amino acid sequence alignment between any two or more dystrophin TH or the Hidden Markov Model (HMM).

Similarly, the triple splice mutant utrophin used herein may have a splice junction in helix B between HQ as indicated as a feature of SEQ ID NO: 3, or may be at the N-terminal or C-terminal of any amino acid in Helix B in AEIDAHNDIFKS (N-terminal to C-terminal, an amino acid sequence in the full length utrophin TH20) . . . DL EAEQVKV (N-terminal to C-terminal, an amino acid sequence in the full length utrophin TH2), or an other corresponding position of a helix B in another utrophin TH. The correspondence of positions in sequences may be determined by amino acid sequence alignment between any two or more utrophin TH or the Hidden Markov Model (HMM).

In certain embodiments, the splice junction in Helices A or C (which are helix 1, i.e., the first helix, and helix 3, i.e., the third helix, of the three helices in a triple helical repeat) may be at Tryptophan (W) at the core of the Hidden Markov Model (HMM) and all crystal structures for proteins in this superfamily. In a further embodiment, the splice junction in Helices A or C may be at a position which is 1 amino acid, 2 amino acids, 3 amino acids, 4 amino acids, or 5 amino acids from the W(s) to the C-terminal side or to the N-terminal side of the protein.

B. Human Nano-Utrophin Sequence

The larger capital letters in sequences below designate the portion identical to N-terminal region of full-length human utrophin. The smaller capital letters designate the region identical to C-terminal region of full length human utrophin. W's in italics correspond to tryptophan residues in the "A" and "C" helices at the core of the Hidden Markov Model (HMM) and all crystal structures for proteins in this superfamily, HQ in italics correspond to the positions within the superfamily HMM for the "B" helix that flank the hypothetical plane of transection as depicted in the FIG. 2F. The anticipated secondary and tertiary structures of the folded protein correspond to the hybrid TH depicted in FIG. 4.

(SEQ ID NO: 3)
MAKYGEHEASPDNGQNEFSDIIKSRSDEHNDVQKKTFTKWINARFSKSGK
PPINDMFTDLKDGRKLLDLLEGLTGTSLPKERGSTRVHALNNVNRVLQVL
HQNNVELVNIGGTDIVDGNHKLTLGLLWSIILHWQVKDVMKDVMSDLQQT
NSEKILLSWVRQTTRPYSQVNVLNFTTSWTDGLAFNAVLHRHKPDLFSWD
KVVKMSPIERLEHAFSKAQTYLGIEKLLDPEDVAVQLPDKKSIIMYLTSL
FEVLPQQVTIDAIREVETLPRKYKKECEEEAINIQSTAPEEEHESPRAET
PSTVTEVDMDLDSYQIALEEVLTWLLSAEDTFQEQDDISDDVEEVKDQFA

-continued
THEAFMMELTAHQSSVGSVLQAGNQLITQGTLSDEEEFEIQEQMTLLNAR
WEALRVESMDRQSRLHDVLMELQKKQLQQLSA*W*IQEAETTVNVLVDAS
HRENALQDSILARELKQQMQDIQAEIDA*HQ*VKVNSLTHMVVIVDENSG
ESATAILEDQLQKLGER*W*NDLKAKSASIRAHLEASAEKWNRLLMSLEEL
IKWLNMKDEELKKQMPIGGDVPALQLQYDHCKALRRELKEKEYSVLNAVD
QARVFLADQPIEAPEEPRRNLQSKTELTPEERAQKIAKAMRKQSSEVKEK
WESLNAVTSNWQKQVDKALEKLRDLQGAMDDLDADMKEAESVRNGWKPVG
DLLIDSLQDHIEKIMAFREEIAPINFKVKTVNDLSSQLSPLDLHPSLKMS
RQLDDLNMRWKLLQVSVDDRLKQLQEAHRDFGPSSQHFLSTSVQLPWQRS
ISHNKVPYYINHQTQTTCWDHPKMTELFQSLADLNNVRFSAYRTAIKIRR
LQKALCLDLLELSTTNEIFKQHKLNQNDQLLSVPDVINCLTTTYDGLEQM
HKDLVNVPLCVDMCLNWLLNVYDTGRTGKIRVQSLKIGLMSLSKGLLEEK
YRYLFKEVAGPTEMCDQRQLGLLLHDAIQIPRQLGEVAAFGGSNIEPSVR
SCFQQNNNKPEISVKEFIDWMHLEPQSMVWLPVLHRVAAAETAKHQAKCN
ICKECPIVGFRYRSLKHFNYDVCQSCFFSGRTAKGHKLHYPMVEYCIPTT
SGE In certain embodiments, the nano-utrophin provided herein comprises the following amino acid sequence, which includes a triple splice mutation joining repeats 2 and 20 in full-length utrophin:

(SEQ ID NO: 20)
MAKYGEHEASPDNGQNEFSDIIKSRSDEHNDVQKKTFTKWINARFSKSGK
PPINDMFTDLKDGRKLLDLLEGLTGTSLPKERGSTRVHALNNVNRVLQVL
HQNNVELVNIGGTDIVDGNHKLTLGLLWSIILHWQVKDVMKDVMSDLQQT
NSEKILLSWVRQTTRPYSQVNVLNFTTSWTDGLAFNAVLHRHKPDLFSWD
KVVKMSPIERLEHAFSKAQTYLGIEKLLDPEDVAVQLPDKKSIIMYLTSL
FEVLPQQVTIDAIREVETLPRKYKKECEEEAINIQSTAPEEEHESPRAET
PSTVTEVDMDLDSYQIALEEVLTWLLSAEDTFQEQDDISDDVEEVKDQFA
THEAFMMELTAHQSSVGSVLQAGNQLITQGTLSDEEEFEIQEQMTLLNAR
WEALRVESMDRQSRLHDVLMELQKKQLQQLSA*W*IQEAETTVNVLVDASHR
ENALQDSILARELKQQMQDIQAEIDA*HQ*VKVNSLTHMVVIVDENSGESAT
AILEDQLQKLGER*W*NDLKAKSASIRAHLEASAEKWNRLLMSLEELIKWLN
MKDEELKKQMPIGGDVPALQLQYDHCKALRRELKEKEYSVLNAVDQARVF
LADQPIEAPEEPRRNLQSKTELTPEERAQKIAKAMRKQSSEVKEKWESLN
AVTSNWQKQVDKALEKLRDLQGAMDDLDADMKEAESVRNGWKPVGDLLID
SLQDHIEKIMAFREEIAPINFKVKTVNDLSSQLSPLDLHPSLKMSRQLDD
LNMRWKLLQVSVDDRLKQLQEAHRDFGPSSQHFLSTSVQLPWQRSISHNK
VPYYINHQTQTTCWDHPKMTELFQSLADLNNVRFSAYRTAIKIRRLQKAL
CLDLLELSTTNEIFKQHKLNQNDQLLSVPDVINCLTTTYDGLEQMHKDLV
NVPLCVDMCLNWLLNVYDTGRTGKIRVQSLKIGLMSLSKGLLEEKYRYLF
KEVAGPTEMCDQRQLGLLLHDAIQIPRQLGEVAAFGGSNIEPSVRSCFQQ

-continued
NNNKPEISVKEFIDWMHLEPQSMVWLPVLHRVAAAETAKHQAKCNICKEC

PIVGFRYRSLKHFNYDVCQSCFFSGRTAKGHKLHYPMVEYCIPTTSGEDV

RDFTKVLKNKFRSKKYFAKHPRLGYLPVQTVLEGDNLET

The detailed design of nano-Utrophin to address structural constraints are described herein. Phylogenetic analysis suggests that the ancestral triple helical repeat existed in a protein orthologous to alpha-actinin, as this is the only protein in the proteomes of most single celled eukaryotes to match the spectrin consensus. Training sets including alpha-actinins, alpha- and beta-spectrins, and dystroplakins create HMMs for which the logos show exceptional conservation of the tryptophan residues. In available high resolution crystal structures, the position of the side chains and aromatic interaction is highly conserved, as is the structure of the third "B" alpha helix. In the sequences above, note the positions of the underlined W's and the B helix amino acids H and Q. The rearrangement or "splicing" of polypeptide sequences corresponding to these subdomains is depicted by different font size, with three sites of focal discontinuity corresponding to the plane of section illustrated in FIG. 2F, creating a 3-D hybrid between utrophin repeats 2 and 20.

Also provided herein is a nano-utrophin having five spectrin-like triple-helical repeats, including a hybrid triple helical domain formed by splicing TH 1 and 18 in the full-length human utrophin protein. In certain embodiments, the nano-utrophin has the following sequence:

```
                                        (SEQ ID NO: 21)
MAKYGEHEASPDNGQNEFSDIIKSRSDEHNDVQKKTFTKWINARFSKSGK

PPINDMFTDLKDGRKLLDLLEGLTGTSLPKERGSTRVHALNNVNRVLQVL

HQNNVELVNIGGTDIVDGNHKLTLGLLWSIILHWQVKDVMKDVMSDLQQT

NSEKILLSWVRQTTRPYSQVNVLNFTTSWTDGLAFNAVLHRHKPDLFSWD

KVVKMSPIERLEHAFSKAQTYLGIEKLLDPEDVAVQLPDKKSIIMYLTSL

FEVLPQQVTIDAIREVETLPRKYKKECEEEAINIQSTAPEEEHESPRAET

PSTVTEVDMDLDSYQIALEEVLTWLVLIDQMLKSNIVTVGDVEEINKTVS

RMKITKADLEQKQSSVGSVLQAGNQLITQGTLSDEEEFEIQEQMTLLNAR

WDGTQHGVELRQQQLEDMIIDSLQWDDHREETEELMRKYEARLYILQQAR

RDPLTKQISDNQILLQELGPGDGIVMAFDNVLQKLLEEYGSDDTRNVKET

TEYLKTSWINLKQSIADRQNALEAEWRTVQASRRDLENFLKWIQEAETTV

NVLVDASHRENALQDSILARELKQQMQDIQAEIDAHNDIFKSIDGNRQKM

VKALGNSEEATMLQHRLDDMNQRWNDLKAKSASIRAHLEASAEKWNRLLM

SLEELIKWLNMKDEELKKQMPIGGDVPALQLQYDHCKALRRELKEKEYSV

LNAVDQARVFLADQPIEAPEEPRRNLQSKTELTPEERAQKIAKAMRKQSS

EVKEKWESLNAVTSNWQKQVDKALEKLRDLQGAMDDLDADMKEAESVRNG

WKPVGDLLIDSLQDHIEKIMAFREEIAPINFKVKTVNDLSSQLSPLDLHP

SLKMSRQLDDLNMRWKLLQVSVDDRLKQLQEAHRDFGPSSQHFLSTSVQL

PWQRSISHNKVPYYINHQTQTTCWDHPKMTELFQSLADLNNVRFSAYRTA

IKIRRLQKALCLDLLELSTTNEIFKQHKLNQNDQLLSVPDVINCLTTTYD

GLEQMHKDLVNVPLCVDMCLNWLLNVYDTGRTGKIRVQSLKIGLMSLSKG
```

-continued
```
LLEEKYRYLFKEVAGPTEMCDQRQLGLLLHDAIQIPRQLGEVAAFGGSNI

EPSVRSCFQQNNNKPEISVKEFIDWMHLEPQSMVWLPVLHRVAAAETAKH

QAKCNICKECPIVGFRYRSLKHFNYDVCQSCFFSGRTAKGHKLHYPMVEY

CIPTTSGE
```

C. Human Nano-Dystrophin Sequence

The larger capital letters below designate portion identical to N-terminal region of full length human dystrophin. Smaller capital letters designate region identical to C-terminal region of full length human dystrophin. W's underlined correspond to tryptophan residues in the "A" and "C" helices at the core of the Hidden Markov Model (HMM) and all crystal structures for proteins in this superfamily. The EQ underlined corresponds to the positions within the superfamily HMM for the "B" helix that flank the hypothetical plane of transection as depicted in FIG. 2F. The anticipated secondary and tertiary structures of the folded protein correspond to the hybrid TH depicted in FIG. 4.

```
                                        (SEQ ID NO: 1)
MLWWEEVEDCYEREDVQKKTFTKWVNAQFSKFGKQHIENLFSDLQDGRRL

LDLLEGLTGQKLPKEKGSTRVHALNNVNKALRVLQNNNVDLVNIGSTDIV

DGNHKLTLGLIWNIILHWQVKNVMKNIMAGLQQTNSEKILLSWVRQSTRN

YPQVNVINFTTSWSDGLALNALIHSHRPDLFDWNSVVCQQSATQRLEHAF

NIARYQLGIEKLLDPEDVDTTYPDKKSILMYITSLFQVLPQQVSIEAIQE

VEMLPRPPKVTKEEHFQLHHQMHYSQQITVSLAQGYERTSSPKPRFKSYA

YTQAAYVTTSDPTRSPFPSQHLEAPEDKSFGSSLMESEVNLDRYQTALEE

VLSWLLSAEDTLQAQGEISNDVEVVKDQFHTHEGYMMDLTAHQGRVGNIL

QLGSKLIGTGKLSEDEETEVQEQMNLLNSRWECLRVASMEKQSNLHRVLM

DLQNQKLKELNDWLTEAETTANVLQDATRKERLLEDSKGATKELMKQWQD

LQGEIEQEQVRVNSLTHMVVVVDESSGDHATAALEEQLKVLGDRWANICR

WSELRKKSLNIRSHLEASSDQWKRLHLSLQELLVWLQLKDDELSRQAPIG

GDFPAVQKQNDVHRAFKRELKTKEPVIMSTLETVRIFLTEQPLEGLEKLY

QEPRELPPEERAQNVTRLLRKQAEEVNTEWEKLNLHSADWQRKIDETLER

LQELQEATDELDLKLRQAEVIKGSWQPVGDLLIDSLQDHLEKVKALRGEI

APLKENVSHVNDLARQLTTLGIQLSPYNLSTLEDLNTRWKLLQVAVEDRV

RQLHEAHRDFGPASQHFLSTSVQGPWERAISPNKVPYYINHETQTTCWDH

PKMTELYQSLADLNNVRFSAYRTAMKLRRLQKALCLDLLSLSAACDALDQ

HNLKQNDQPMDILQIINCLTTIYDRLEQEHNNLVNVPLCVDMCLNWLLNV

YDTGRTGRIRVLSFKTGIISLCKAHLEDKYRYLFKQVASSTGFCDQRRLG

LLLHDSIQIPRQLGEVASFGGSNIEPSVRSCFQFANNKPEIEAALFLDWM

RLEPQSMVWLPVLHRVAAAETAKHQAKCNICKECPIIGFRYRSLKHFNYD

ICQSCFFSGRVAKGHKMHYPMVEYCTPTTSGE.
```

Also provided herein is a nano-dystrophin having five spectrin-like triple-helical repeats, including a hybrid triple helical domain formed by splicing TH 1 and 20 in the full-length human dystrophin. In certain embodiments, the nano-utrophin has the following sequence:

(SEQ ID NO: 22)

```
MLWWEEVEDCYEREDVQKKTFTKWVNAQFSKFGKQHIENLFSDLQDGRRL

LDLLEGLTGQKLPKEKGSTRVHALNNVNKALRVLQNNNVDLVNIGSTDIV

DGNHKLTLGLIWNIILHWQVKNVMKNIMAGLQQTNSEKILLSWVRQSTRN

YPQVNVINFTTSWSDGLALNALIHSHRPDLFDWNSVVCQQSATQRLEHAF

NIARYQLGIEKLLDPEDVDTTYPDKKSILMYITSLFQVLPQQVSIEAIQE

VEMLPRPPKVTKEEHFQLHHQMHYSQQITVSLAQGYERTSSPKPRFKSYA

YTQAAYVTTSDPTRSPFPSQHLEAPEDKSFGSSLMESEVNLDRYQTALEE
VLSWLSLLDQVIKSQRVMVGDLEDINEMIIKQKATMQDLEQRQGRVGNIL
QLGSKLIGTGKLSEDEETEVQEQMNLLNSRWDEVQEHLQNRRQQLNEMLK
DSTQWLEAKEEAEQVLGQARAKLESWKEGPYTVDAIQKKITETKQLAKDL
RQWQTNVDVANDLALKLLRDYSADDTRKVHMITENINASWRSIHKRVSER
EAALEETHRLLQQFPLDLEKFLAWLTEAETTANVLQDATRKERLLEDSKG
VKELMKQWQDLQGEIEAHTDVYHNLDENSQKILRSLEGSDDAVLLQRRLD
NMNFKWSELRKKSLNIRSHLEASSDQWKRLHLSLQELLVWLQLKDDELSR
QAPIGGDFPAVQKQNDVHRAFKRELKTKEPVIMSTLETVRIFLTEQPLEG
LEKLYQEPRELPPEERAQNVTRLLRKQAEEVNTEWEKLNLHSADWQRKID
ETLERLQELQEATDELDLKLRQAEVIKGSWQPVGDLLIDSLQDHLEKVKA
LRGEIAPLKENVSHVNDLARQLTTLGIQLSPYNLSTLEDLNTRWKLLQVA
VEDRVRQLHEAHRDFGPASQHFLSTSVQGPWERAISPNKVPYYINHETQT
TCWDHPKMTELYQSLADLNNVRFSAYRTAMKLRRLQKALCLDLLSLSAAC
DALDQHNLKQNDQPMDILQIINCLTTIYDRLEQEHNNLVNVPLCVDMCLN
WLLNVYDTGRTGRIRVLSFKTGIISLCKAHLEDKYRYLFKQVASSTGFCD
QRRLGLLLHDSIQIPRQLGEVASFGGSNIEPSVRSCFQFANNKPEIEAAL
FLDWMRLEPQSMVWLPVLHRVAAAETAKHQAKCNICKECPIIGFRYRSLK
HFNYDICQSCFFSGRVAKGHKMHYPMVEYCTPTTSGE
```

D. Others

Many high-molecular weight proteins have repetitive internal domains. Dystrophin exemplifies the large class of proteins for which limited three dimensional structural information is available for the repetitive internal domains. A conceptually identical approach may be applicable to other genetic diseases. For instance, the common inherited coagulopathy von Willebrand's disease is caused by mutations in the 8 kilobase coding sequence for a protein with multiple repeats ("vWF"). Recently published studies have revealed that transgenic expression of the recombinant protein in the liver is sufficient to treat the disease, but the coding sequence is too large for a single AAV genome, and trans-splicing between two AAV genomes is too inefficient to achieve therapeutic levels of recombinant protein expression. There is no crystal structure for the entire protein, but analysis by the methods outlined herein immediately suggest opportunities to create a miniaturized nano-vWF protein that may substitute for full length vWF.

Von Willebrand disease is typically an inherited disease caused by variations (mutations) in the VWF gene. The VWF gene provides instructions for making a blood clotting protein called von Willebrand factor, which is important for forming blood clots and preventing further blood loss after an injury. If von Willebrand factor does not function normally or too little of the protein is available, blood clots cannot form properly. VWF gene mutations that reduce the amount of von Willebrand factor or cause the protein to function abnormally (or not at all) are responsible for the signs and symptoms associated with the condition. These variations may be inherited in an autosomal dominant or autosomal recessive manner, or may occur for the first time in the affected person without any other cases in the family (known as a de novo mutation). See, e.g., ghr.nlm.nih.gov/condition/von-willebrand-disease. It would be understood by one of skill in the art that, any composition, regiment, aspect, embodiment and method described herein across the Specification are intended to be applied to Von Willebrand disease von, a mutant von Willebrand factor, a nucleic acid sequence encoding a mutant von Willebrand factor, or a vector comprising such coding sequence.

Von Willebrand factor (vWF) is important in the maintenance of hemostasis. It promotes adhesion of platelets to the sites of vascular injury by forming a molecular bridge between sub-endothelial collagen matrix and platelet-surface receptor complex GPIb-IX-V. It also acts as a chaperone for coagulation factor VIII, delivering it to the site of injury, stabilizing its heterodimeric structure and protecting it from premature clearance from plasma. There are 2 isoforms of von Willebrand factor. Isoform 1 is considered as the canonical sequence and has an amino acid sequence with UniProtKB identifier: P04275-1, which is incorporated herein. The other isoform is isoform 2 with UniProtKB identifier: P04275-2, sequence of the isoform is incorporated herein. "Full-length" vWF may refers to isoform 1. In certain embodiments, "Full-length" vWF may refers to isoform 2 or other homologs of vWF. Homologs of von Willebrand factor have been identified in a variety of organisms, including mouse (UniProt Q8CIZ8), rat (UniProt Q62935), pig (UniProt Q28833), and dog (UniProt Q28295). Possible nucleic acid sequence encoding von Willebrand factor or any other isoform or homolog thereof is available publicly, See, e.g., NCBI Reference Sequences: NM_000552.4, X04385.1, M10321.1, X04146.1, AK128487.1, AK297600.1, AK292122.1, BC069030.1, BC022258.1, U81237.1, K03028.1, M17588.1, AF086470.1, and X02672.1, each of which is incorporated herein.

As used herein, "mutant von Willebrand factor" or "mutant vWF" refers to a von Willebrand factor having an internal deletion of repeat(s) and a splice junction joining two repeats, wherein the splice junction sites are within a repeat instead of between repeats. In certain embodiment, the splice junction is determined via a method similar to that of A. Splice junctions in the helices, I, Dystrophin, utrophin and others, or of any Examples. Identification or characterization of the repeat(s) in vWF may be determined by the Hidden Markov Model (HMM), or any other conventional methods. See, for example, Zhou Y F et al. Sequence and structure relationships within von Willebrand factor. Blood. 2012 Jul. 12; 120(2):449-58. doi: 10.1182/blood-2012-01-405134. Epub 2012 Apr. 6.; Sadler J E. Biochemistry and genetics of von Willebrand factor. Annu Rev Biochem. 1998; 67:395-424; and Perkins S J, et al. The secondary structure of the von Willebrand factor type A domain in factor B of human complement by Fourier transform infrared spectroscopy. Its occurrence in collagen types VI, VII, XII and XIV, the integrins and other proteins by averaged structure predictions. J Mol Biol. 1994 Apr. 22; 238(1):104-19. Nucleic acid sequence encoding mutant vWF may be generated via tools for reverse-translation. Furthermore, the coding sequences might be codon-optimized for expression in a subject, e.g., human, mice, rat or dog.

It should be understood that any composition described herein are intended to be applied to other compositions, regiments, aspects, embodiments and methods described across the Specification.

II. Expression Cassette

Provided herein is an expression cassette which comprises a nucleic acid sequence encoding a dystrophin superfamily triple splice mutant protein under control of regulatory sequences which direct expression thereof.

As used herein, the term "expression" or "gene expression" refers to the process by which information from a gene is used in the synthesis of a functional gene product. The gene product may be a protein, a peptide, or a nucleic acid polymer (such as a RNA, a DNA or a PNA). In certain embodiments, the functional gene product is a dystrophin superfamily triple splice mutant protein. In certain embodiments, the terms "gene" "minigene" and "transgene" refers to the sequence coding a dystrophin superfamily triple splice mutant protein, for example, nano-dystrophin or nano-utrophin.

As used herein, an "expression cassette" refers to a nucleic acid polymer which comprises a coding sequences, promoter, and may include other regulatory sequences therefor, which cassette may be packaged into a vector.

As used herein, the term "regulatory sequence", or "expression control sequence" refers to nucleic acid sequences, such as initiator sequences, enhancer sequences, and promoter sequences, which induce, repress, or otherwise control the transcription of protein encoding nucleic acid sequences to which they are operably linked.

As used herein, the term "operably linked" refers to both expression control sequences that are contiguous with a coding sequence and expression control sequences that act in trans or at a distance to control the coding sequence. In certain embodiment, the coding sequence encodes a dystrophin superfamily triple splice mutant protein.

The term "heterologous" when used with reference to a protein or a nucleic acid indicates that the protein or the nucleic acid comprises two or more sequences or subsequences which are not found in the same relationship to each other in nature. For instance, the nucleic acid is typically recombinantly produced, having two or more sequences from unrelated genes arranged to make a new functional nucleic acid. For example, in one embodiment, the nucleic acid has a promoter from one gene arranged to direct the expression of a coding sequence from a different gene. Thus, with reference to the coding sequence, the promoter is heterologous.

Identity or similarity with respect to a sequence is defined herein as the percentage of amino acid residues in the candidate sequence that are identical (i.e., same residue) or similar (i.e., amino acid residue from the same group based on common side-chain properties, see below) with the peptide and polypeptide regions provided herein, after aligning the sequences and introducing gaps, if necessary, to achieve the maximum percent sequence identity. Percent (%) identity is a measure of the relationship between two polynucleotides or two polypeptides, as determined by comparing their nucleotide or amino acid sequences, respectively. In general, the two sequences to be compared are aligned to give a maximum correlation between the sequences. The alignment of the two sequences is examined and the number of positions giving an exact amino acid or nucleotide correspondence between the two sequences determined, divided by the total length of the alignment and multiplied by 100 to give a % identity figure. This % identity figure may be determined over the whole length of the sequences to be compared, which is particularly suitable for sequences of the same or very similar length and which are highly homologous, or over shorter defined lengths, which is more suitable for sequences of unequal length or which have a lower level of homology. There are a number of algorithms, and computer programs based thereon, which are available to be used the literature and/or publicly or commercially available for performing alignments and percent identity. The selection of the algorithm or program is not a limitation of the present invention.

Examples of suitable alignment programs including, e.g., the software CLUSTALW under Unix and then be imported into the Bioedit program (Hall, T. A. 1999, BioEdit: a user-friendly biological sequence alignment editor and analysis program for Windows 95/98/NT. Nucl. Acids. Symp. Ser. 41:95-98); the Clustal Omega available from EMBL-EBI (Sievers, Fabian, et al. "Fast, scalable generation of high-quality protein multiple sequence alignments using Clustal Omega." Molecular systems biology 7.1 (2011): 539 and Goujon, Mickael, et al. "A new bioinformatics analysis tools framework at EMBL-EBI." Nucleic acids research 38.suppl 2 (2010): W695-W699); the Wisconsin Sequence Analysis Package, version 9.1 (Devereux J. et al., Nucleic Acids Res., 12:387-395, 1984, available from Genetics Computer Group, Madison, Wis., USA). The programs BESTFIT and GAP, may be used to determine the % identity between two polynucleotides and the % identity between two polypeptide sequences.

Other programs for determining identity and/or similarity between sequences include, e.g, the BLAST family of programs available from the National Center for Biotechnology Information (NCB), Bethesda, Md., USA and accessible through the home page of the NCBI on the world wide web at ncbi.nlm.nih.gov), the ALIGN program (version 2.0) which is part of the GCG sequence alignment software package. When utilizing the ALIGN program for comparing amino acid sequences, a PAM120 weight residue table, a gap length penalty of 12, and a gap penalty of 4 can be used; and FASTA (Pearson W. R. and Lipman D. J., Proc. Natl. Acad. Sci. USA, 85:2444-2448, 1988, available as part of the Wisconsin Sequence Analysis Package). SeqWeb Software (a web-based interface to the GCG Wisconsin Package: Gap program).

In one embodiment, the expression cassette is designed for expression and secretion in a subject, for example, human, rat, mouse or dog. In one embodiment, the expression cassette is designed for expression in the muscle, including cardiac muscles, skeletal muscles and smooth muscles.

In certain embodiments, the regulatory control elements include a promoter sequence as part of the expression control sequences, e.g., located between the selected 5' ITR sequence and the coding sequence. Constitutive promoters, regulatable promoters [see, e.g., WO 2011/126808 and WO 2013/04943], tissue specific promoters (see, e.g., on the world wide web at invivogen.com/tissue-specific-promoter), or a promoter responsive to physiologic cues may be used may be utilized in the vectors described herein. In certain embodiment, muscle-specific promoter may be used, e.g., a muscle creatine kinase (MCK) promoter, a Desmin promoter, a Mb promoter, or a promoter for Myosin—heavy polypeptide 2, Myosin, Troponin T type 3, Troponin C type 2, Myosin binding protein C, fast skeletal myosin light chain 2, Actinin α2, Vesicle-associated membrane protein 5, thyroid hormone receptor interactor 10, tropomyosin 3, Sarcoglycan γ, Myogenic differentiation 1, Myogenic factor 6 (herculin) or Calcium channel, voltage-dependent γ1. Another useful promoter is a synthetic SPc5-12 promoter, which allows for robust expression in skeletal and cardiac muscles. (see for example, Rasowo et al, European Scientific Journal, June 2014, edition vol. 10, No. 18 and US Patent Application Publication Nos. 20040192593 and 2017/0275649, all of which are incorporated herein by reference).

In certain embodiments, the regulatory control elements include a cardiac-specific cis-acting regulatory module (CS-CRM), which includes any of CS-CRM elements 1-8. In certain embodiments, the regulatory sequences include the CS-CRM4 element or the CS-CRM4 element in combination with the SPc5-12 promoter, such as the chimeric synthetic CS-CRM4/SPc5-12 promoter described previously (Rincon et al. Genome-wide computational analysis reveals cardiomyocyte-specific transcriptional Cis-regulatory motifs that enable efficient cardiac gene therapy. Mol Ther. 2015 January; 23(1):43-52), which is incorporated herein by reference).

Examples of constitutive promoters suitable for controlling expression of the therapeutic products include, but are not limited to chicken β-actin (CB) promoter, human cytomegalovirus (CMV) promoter, ubiquitin C promoter (UbC), the early and late promoters of simian virus 40 (SV40), U6 promoter, metallothionein promoters, EF1α promoter, ubiquitin promoter, hypoxanthine phosphoribosyl transferase (HPRT) promoter, dihydrofolate reductase (DHFR) promoter (Scharfmann et al., Proc. Natl. Acad. Sci. USA 88:4626-4630 (1991), adenosine deaminase promoter, phosphoglycerol kinase (PGK) promoter, pyruvate kinase promoter phosphoglycerol mutase promoter, the β-actin promoter (Lai et al., Proc. Natl. Acad. Sci. USA 86: 10006-10010 (1989), the long terminal repeats (LTR) of Moloney Leukemia Virus and other retroviruses, the thymidine kinase promoter of Herpes Simplex Virus and other constitutive promoters known to those of skill in the art. Examples of tissue- or cell-specific promoters suitable for use in the present invention include, but are not limited to, endothelin-I (ET-I) and Flt-I, which are specific for endothelial cells, FoxJ1 (that targets ciliated cells).

Inducible promoters suitable for controlling expression of the therapeutic product include promoters responsive to exogenous agents (e.g., pharmacological agents) or to physiological cues. These response elements include, but are not limited to a hypoxia response element (HRE) that binds HIF-Iα and β, a metal-ion response element such as described by Mayo et al. (1982, Cell 29:99-108); Brinster et al. (1982, Nature 296:39-42) and Searle et al. (1985, Mol. Cell. Biol. 5:1480-1489); or a heat shock response element such as described by Nouer et al. (in: Heat Shock Response, ed. Nouer, L., CRC, Boca Raton, Fla., pp167-220, 1991).

In one embodiment, expression of the coding sequence is controlled by a regulatable promoter that provides tight control over the transcription of the coding sequence, e.g., a pharmacological agent, or transcription factors activated by a pharmacological agent or in alternative embodiments, physiological cues. Promoter systems that are non-leaky and that can be tightly controlled are preferred. Examples of regulatable promoters which are ligand-dependent transcription factor complexes that may be used in the invention include, without limitation, members of the nuclear receptor superfamily activated by their respective ligands (e.g., glucocorticoid, estrogen, progestin, retinoid, ecdysone, and analogs and mimetics thereof) and rTTA activated by tetracycline. In one aspect of the invention, the gene switch is an EcR-based gene switch. Examples of such systems include, without limitation, the systems described in U.S. Pat. Nos. 6,258,603, 7,045,315, U.S. Published Patent Application Nos. 2006/0014711, 2007/0161086, and International Published Application No. WO 01/70816. Examples of chimeric ecdysone receptor systems are described in U.S. Pat. No. 7,091,038, U.S. Published Patent Application Nos. 2002/0110861, 2004/0033600, 2004/0096942, 2005/0266457, and 2006/0100416, and International Published Application Nos. WO 01/70816, WO 02/066612, WO 02/066613, WO 02/066614, WO 02/066615, WO 02/29075, and WO 2005/108617, each of which is incorporated by reference in its entirety. An example of a non-steroidal ecdysone agonist-regulated system is the RheoSwitch Mammalian Inducible Expression System (New England Biolabs, Ipswich, MA).

Still other promoter systems may include response elements including but not limited to a tetracycline (tet) response element (such as described by Gossen & Bujard (1992, Proc. Natl. Acad. Sci. USA 89:5547-551); or a hormone response element such as described by Lee et al. (1981, Nature 294:228-232); Hynes et al. (1981, Proc. Natl. Acad. Sci. USA 78:2038-2042); Klock et al. (1987, Nature 329:734-736); and Israel & Kaufman (1989, Nucl. Acids Res. 17:2589-2604) and other inducible promoters known in the art. Using such promoters, expression of the transgene can be controlled, for example, by the Tet-on/off system (Gossen et al., 1995, Science 268:1766-9; Gossen et al., 1992, Proc. Natl. Acad. Sci. USA., 89(12):5547-51); the TetR-KRAB system (Urrutia R., 2003, Genome Biol., 4(10):231; Deuschle U et al., 1995, Mol Cell Biol. (4):1907-14); the mifepristone (RU486) regulatable system (Geneswitch; Wang Y et al., 1994, Proc. Natl. Acad. Sci. USA., 91(17): 8180-4; Schillinger et al., 2005, Proc. Natl. Acad. Sci. USA. 102(39):13789-94); the humanized tamoxifen-dep regulatable system (Roscilli et al., 2002, Mol. Ther. 6(5):653-63). The gene switch may be based on heterodimerization of FK506 binding protein (FKBP) with FKBP rapamycin associated protein (FRAP) and is regulated through rapamycin or its non-immunosuppressive analogs. Examples of such systems, include, without limitation, the ARGENT™ Transcriptional Technology (ARIAD Pharmaceuticals, Cambridge, Mass.) and the systems described in U.S. Pat. Nos. 6,015,709, 6,117,680, 6,479,653, 6,187,757, and 6,649,595, U.S. Publication No. 2002/0173474, U.S. Publication No. 200910100535, U.S. Pat. Nos. 5,834,266, 7,109,317, 7,485, 441, 5,830,462, 5,869,337, 5,871,753, 6,011,018, 6,043,082, 6,046,047, 6,063,625, 6,140,120, 6,165,787, 6,972,193, 6,326,166, 7,008,780, 6,133,456, 6,150,527, 6,506,379, 6,258,823, 6,693,189, 6,127,521, 6,150,137, 6,464,974, 6,509,152, 6,015,709, 6,117,680, 6,479,653, 6,187,757, 6,649,595, 6,984,635, 7,067,526, 7,196,192, 6,476,200, 6,492,106, WO 94/18347, WO 96/20951, WO 96/06097, WO 97/31898, WO 96/41865, WO 98/02441, WO 95/33052, WO 99110508, WO 99110510, WO 99/36553, WO 99/41258, WO 01114387, ARGENT™ Regulated Transcription Retrovirus Kit, Version 2.0 (9109102), and ARGENT™ Regulated Transcription Plasmid Kit, Version 2.0 (9109/02), each of which is incorporated herein by reference in its entirety. The Ariad system is designed to be induced by rapamycin and analogs thereof referred to as "rapalogs". Examples of suitable rapamycins are provided in the documents listed above in connection with the description of the ARGENT system. In one embodiment, the molecule is rapamycin [e.g., marketed as Rapamune by Pfizer]. In another embodiment, a rapalog known as AP21967 [ARIAD] is used. Examples of these dimerizer molecules that can be used in the present invention include, but are not limited to rapamycin, FK506, FK1012 (a homodimer of FK506), rapamycin analogs ("rapalogs") which are readily prepared by chemical modifications of the natural product to add a "bump" that reduces or eliminates affinity for endogenous FKBP and/or FRAP. Examples of rapalogs include, but are not limited to such as AP26113 (Ariad), AP1510 (Amara, J. F., et al., 1997, Proc Natl Acad Sci USA, 94(20): 10618-23) AP22660, AP22594, AP21370, AP22594, AP23054, AP1855, AP1856, AP1701, AP1861, AP1692 and AP1889, with designed 'bumps' that minimize interactions with endogenous FKBP. Still other rapalogs may be selected, e.g., AP23573 [Merck].

Other suitable enhancers include those that are appropriate for a desired target tissue indication. In one embodiment, the expression cassette comprises one or more expression enhancers. In one embodiment, the expression cassette contains two or more expression enhancers. These enhancers may be the same or may differ from one another. For example, an enhancer may include a CMV immediate early enhancer. This enhancer may be present in two copies which are located adjacent to one another. Alternatively, the dual copies of the enhancer may be separated by one or more sequences. In still another embodiment, the expression cassette further contains an intron, e.g, the chicken beta-actin intron. Other suitable introns include those known in the art, e.g., such as are described in WO 2011/126808. Examples of suitable polyA sequences include, e.g., rabbit binding globulin (rBG), SV40, SV50, bovine growth hormone (bGH), human growth hormone, and synthetic polyAs. Optionally, one or more sequences may be selected to stabilize mRNA. An example of such a sequence is a modified WPRE sequence, which may be engineered upstream of the polyA sequence and downstream of the coding sequence [see, e.g., MA Zanta-Boussif, et al, Gene Therapy (2009) 16: 605-619. In one embodiment, the enhancer is a double or triple tandem MCK enhancer.

In one embodiment, the regulatory sequence further comprises a Polyadenylation signal (polyA). In a further embodiment, the polyA is a rabbit globin poly A. See, e.g., WO 2014/151341. Alternatively, another polyA, e.g., a human growth hormone (hGH) polyadenylation sequence, an SV40 polyA, or a synthetic polyA may be included in an expression cassette.

It should be understood that the compositions in the expression cassette described herein are intended to be applied to other compositions, regiments, aspects, embodiments and methods described across the Specification.

III. Vectors

In certain embodiments, the nucleic acid sequence encoding a dystrophin superfamily triple splice mutant protein are engineered in a vector, including a viral vector and a non-viral vector.

A "vector" as used herein is a biological or chemical moiety comprising a nucleic acid sequence which can be introduced into an appropriate target cell for replication or expression of said nucleic acid sequence. Examples of a vector includes but not limited to a recombinant virus, a plasmid, Lipoplexes, a Polymersome, Polyplexes, a dendrimer, a cell penetrating peptide (CPP) conjugate, a magnetic particle, or a nanoparticle. Such vectors preferably have one or more origin of replication, and one or more site into which the coding sequences or an expression cassette can be inserted. Vectors often have means by which cells with vectors can be selected from those without, e.g., they encode drug resistance genes. Common vectors include plasmids, viral genomes, and "artificial chromosomes". Conventional methods of generation, production, characterization or quantification of the vectors are available to one of skill in the art.

As used herein, the term "host cell" may refer to the packaging cell line in which a vector (e.g., a recombinant AAV) is produced. A host cell may be a prokaryotic or eukaryotic cell (e.g., human, insect, or yeast) that contains exogenous or heterologous DNA that has been introduced into the cell by any means, e.g., electroporation, calcium phosphate precipitation, microinjection, transformation, viral infection, transfection, liposome delivery, membrane fusion techniques, high velocity DNA-coated pellets, viral infection and protoplast fusion. Examples of host cells may include, but are not limited to an isolated cell, a cell culture, an *Escherichia coli* cell, a yeast cell, a human cell, a non-human cell, a mammalian cell, a non-mammalian cell, an insect cell, an HEK-293 cell, a liver cell, a kidney cell, a muscle cell, a cell of smooth muscle, a cell of cardiac muscle or a cell of skeletal muscle.

The term "exogenous" as used to describe a nucleic acid sequence or protein means that the nucleic acid or protein does not naturally occur in the position in which it exists in a chromosome, or host/target cell. An exogenous nucleic acid sequence also refers to a sequence derived from and inserted into the same host cell or subject, but which is present in a non-natural state, e.g. a different copy number, or under the control of different regulatory elements.

As used herein, the term "target cell" refers to any target cell in which expression of the dystrophin superfamily triple splice mutant protein is desired. In certain embodiments, the term "target cell" is intended to reference the cells of the subject being treated for MD, including DIMD and BMD. Examples of target cells may include, but are not limited to, a liver cell, a kidney cell, a muscle cell, a cell of smooth muscle, a cell of cardiac muscle or a cell of skeletal muscle. In certain embodiments, the vector is delivered to a target cell ex vivo. In certain embodiments, the vector is delivered to the target cell in vivo.

A non-viral vector may be a plasmid carrying an expression cassette which includes, at a minimum, nucleic acid sequence encoding a dystrophin superfamily triple splice mutant protein and optionally, a promoter or other regulatory elements, which is delivered to the heart. Non-viral delivery of nucleic acid molecules to smooth and cardiac muscle systems may include chemical or physical methods. Chemical methods include the use of cationic liposomes ("lipoplex"), polymers ("polyplex"), combinations of the two ("lipopolyplex"), calcium phosphate, and DEAE dextran. Additionally, or optionally, such nucleic acid molecules may be used in a composition further comprising one or more reagents, including, e.g., liposomal reagents such as, e.g., DOTAP/DOPE, Lipofectin, Lipofectamine, etc, and cationic polymers such as PEI, Effectene, and dendrimers. Such reagents are effective for transfecting smooth muscle cells. In addition to the chemical methods, a number of physical methods exist that promote the direct entry of uncomplexed DNA into the cell. These methods can include microinjection of individual cells, hydroporation, electroporation, ultrasound, and biolistic delivery (i.e., the gene gun).

In certain embodiments, an expression cassette comprising the nucleic acid sequence encoding a dystrophin superfamily triple splice mutant protein is carried by a viral vector, e.g., a recombinant adenovirus, lentivirus, a bocavirus, a hybrid AAV/bocavirus (see, e.g., Yan Z et al, A novel chimeric adenoassociated virus 2/human bocavirus 1 parvovirus vector efficiently transduces human airway epithelia. Mol Ther. 2013 December; 21(12):2181-94. doi: 10.1038/mt.2013.92. Epub 2013 Jul. 30.), a herpes simplex virus, or adeno-associated virus. In such embodiments, the viral vector may be a replication-defective virus.

A "replication-defective virus" or "viral vector" refers to a synthetic or artificial viral particle in which a vector genome comprising an expression cassette is packaged in a viral capsid or envelope, where any viral genomic sequences also packaged within the viral capsid or envelope are replication-deficient; i.e., they cannot generate progeny virions but retain the ability to infect target cells. In one embodiment, the genome of the viral vector does not include genes encoding the enzymes required to replicate (the genome can be engineered to be "gutless"—containing only the transgene of interest flanked by the signals required for amplification and packaging of the artificial genome), but these genes may be supplied during production. Therefore, it is deemed safe for use in gene therapy since replication and infection by progeny virions cannot occur except in the presence of the viral enzyme required for replication.

The vector may be any vector known in the art or disclosed above, including naked DNA, a plasmid, phage, transposon, cosmids, episomes, viruses, etc. Introduction into the host cell of the vector may be achieved by any means known in the art or as disclosed above, including transfection, and infection. One or more of the adenoviral genes may be stably integrated into the genome of the host cell, stably expressed as episomes, or expressed transiently. The gene products may all be expressed transiently, on an episome or stably integrated, or some of the gene products may be expressed stably while others are expressed transiently. Furthermore, the promoters for each of the adenoviral genes may be selected independently from a constitutive promoter, an inducible promoter or a native adenoviral promoter. The promoters may be regulated by a specific physiological state of the organism or cell (i.e., by the differentiation state or in replicating or quiescent cells) or by exogenously-added factors, for example.

Introduction of the molecules (as plasmids or viruses) into the host cell may also be accomplished using techniques known to the skilled artisan and as discussed throughout the specification. In preferred embodiment, standard transfection techniques are used, e.g., $CaPO_4$ transfection or electroporation. Assembly of the selected DNA sequences of the adenovirus (as well as the transgene and other vector elements into various intermediate plasmids, and the use of the plasmids and vectors to produce a recombinant viral particle are all achieved using conventional techniques. Such techniques include conventional cloning techniques of cDNA such as those described in texts [Sambrook et al, Molecular Cloning: A Laboratory Manual], use of overlapping oligonucleotide sequences of the adenovirus genomes, polymerase chain reaction, and any suitable method which provides the desired nucleotide sequence. Standard transfection and co-transfection techniques are employed, e.g., $CaPO_4$ precipitation techniques. Other conventional methods employed include homologous recombination of the viral genomes, plaquing of viruses in agar overlay, methods of measuring signal generation, and the like.

Dosages of the viral vector will depend primarily on factors such as the condition being treated, the age, weight and health of the patient, and may thus vary among patients. For example, a therapeutically effective adult human or veterinary dosage of the viral vector is generally in the range of from about 100 µL to about 100 mL of a carrier containing concentrations of from about $1\times10^6$ to about $1\times10^{15}$ particles, about $1\times10^{11}$ to $1\times10^{13}$ particles, or about $1\times10^9$ to $1\times10^{12}$ particles virus. Dosages will range depending upon the size of the animal and the route of administration. For example, a suitable human or veterinary dosage (for about an 80 kg animal) for intramuscular injection is in the range of about $1\times10^9$ to about $5\times10^{12}$ particles per mL, for a single site. Optionally, multiple sites of administration may be delivered. In another example, a suitable human or veterinary dosage may be in the range of about $1\times10^{11}$ to about $1\times10^{15}$ particles for a formulation. One of skill in the art may adjust these doses, depending the route of administration, and the therapeutic or vaccinal application for which the recombinant vector is employed. The levels of expression of the transgene can be monitored to determine the frequency of dosage administration. Yet other methods for determining the timing of frequency of administration will be readily apparent to one of skill in the art.

As used herein, a "vector genome" refers to the nucleic acid sequence packaged inside a vector.

A. Replication-Defective Adenovirus Vector

In one embodiment, replication-defective adenoviral vectors are used. Any of a number of suitable adenoviruses may be used as a source of the adenoviral capsid sequence and/or in production. See, e.g., U.S. Pat. Nos. 9,617,561; 9,592,284; 9,133,483; 8,846,031; 8,603,459; 8,394,386; 8,105,574; 7,838,277; 7,344,872; 8,387,368; 6,365,394; 6,287,571; 6,281,010; 6,270,996; 6,261,551; 6,251,677; 6,203,975; 6,083,716; 6,019,978; 6,001,557; 5,872,154; 5,871,982; 5,856,152; 5,698,202. Still other adenoviruses are available from the American Type Culture Collection. In one embodiment, the adenoviral particles are rendered replication-defective by deletions in the E1a and/or E1b genes. Alternatively, the adenoviruses are rendered replication-defective by another means, optionally while retaining the E1a and/or E1b genes. The adenoviral vectors can also contain other mutations to the adenoviral genome, e.g., temperature-sensitive mutations or deletions in other genes. In other embodiments, it is desirable to retain an intact E1a and/or E1b region in the adenoviral vectors. Such an intact E1 region may be located in its native location in the adenoviral genome or placed in the site of a deletion in the native adenoviral genome (e.g., in the E3 region).

In the construction of useful adenovirus vectors for delivery of a gene to the human (or other mammalian) cell, a range of adenovirus nucleic acid sequences can be employed in the vectors. For example, all or a portion of the adenovirus delayed early gene E3 may be eliminated from the adenovirus sequence which forms a part of the recombinant virus. The function of E3 is believed to be irrelevant to the function and production of the recombinant virus particle. Adenovirus vectors may also be constructed having a deletion of at least the ORF6 region of the E4 gene, and more desirably because of the redundancy in the function of this region, the entire E4 region. Still another adenoviral vector contains a deletion in the delayed early gene E2a. Deletions may also be made in any of the late genes L1 through L5 of the adenovirus genome. Similarly, deletions in the intermediate genes IX and $IVa_2$ may be useful for some purposes. Other deletions may be made in the other structural or non-structural adenovirus genes. The above discussed deletions may be used individually, i.e., an adenovirus sequence for use as described herein may contain deletions in only a single region. Alternatively, deletions of entire genes or portions thereof effective to destroy their biological activity may be used in any combination. For example, in one exemplary vector, the adenovirus sequence may have deletions of the E1 genes and the E4 gene, or of the E1, E2a and E3 genes, or of the E1 and E3 genes, or of E1, E2a and E4 genes, with or without deletion of E3, and so on. As discussed above, such deletions may be used in combination with other mutations, such as temperature-sensitive mutations, to achieve a desired result.

An adenoviral vector lacking any essential adenoviral sequences (e.g., E1a, E1b, E2a, E2b, E4 ORF6, L1, L2, L3, L4 and L5) may be cultured in the presence of the missing adenoviral gene products which are required for viral infectivity and propagation of an adenoviral particle. These helper functions may be provided by culturing the adenoviral vector in the presence of one or more helper constructs (e.g., a plasmid or virus) or a packaging host cell. See, for example, the techniques described for preparation of a "minimal" human Ad vector in International Patent Application WO96/13597, published May 9, 1996, and incorporated herein by reference.

a. Helper Viruses

Thus, depending upon the adenovirus gene content of the viral vectors employed to carry the expression cassette, a helper adenovirus or non-replicating virus fragment may be necessary to provide sufficient adenovirus gene sequences necessary to produce an infective recombinant viral particle containing the expression cassette. Useful helper viruses contain selected adenovirus gene sequences not present in the adenovirus vector construct and/or not expressed by the packaging cell line in which the vector is transfected. In one embodiment, the helper virus is replication-defective and contains a variety of adenovirus genes in addition to the sequences described above. Such a helper virus is desirably used in combination with an E1-expressing cell line.

Helper viruses may also be formed into poly-cation conjugates as described in Wu et al, J. Biol. Chem., 264: 16985-16987 (1989); K. J. Fisher and J. M. Wilson, Biochem. J., 299:49 (Apr. 1, 1994). Helper virus may optionally contain a second reporter minigene. A number of such reporter genes are known to the art. The presence of a reporter gene on the helper virus which is different from the transgene on the adenovirus vector allows both the Ad vector and the helper virus to be independently monitored. This second reporter is used to enable separation between the resulting recombinant virus and the helper virus upon purification.

b. Complementation Cell Lines

To generate recombinant adenoviruses (Ad) deleted in any of the genes described above, the function of the deleted gene region, if essential to the replication and infectivity of the virus, must be supplied to the recombinant virus by a helper virus or cell line, i.e., a complementation or packaging cell line. In many circumstances, a cell line expressing the human E1 can be used to trans-complement the Ad vector. However, in certain circumstances, it will be desirable to utilize a cell line which expresses the E1 gene products can be utilized for production of an E1-deleted adenovirus. Such cell lines have been described. See, e.g., U.S. Pat. No. 6,083,716.

If desired, one may utilize the sequences provided herein to generate a packaging cell or cell line that expresses, at a minimum, the adenovirus E1 gene under the transcriptional control of a promoter for expression in a selected parent cell line. Inducible or constitutive promoters may be employed for this purpose. Examples of such promoters are described in detail elsewhere in this specification. A parent cell is selected for the generation of a novel cell line expressing any desired adenovirus gene. Without limitation, such a parent cell line may be HeLa [ATCC Accession No. CCL 2], A549 [ATCC Accession No. CCL 185], HEK 293, KB [CCL 17], Detroit [e.g., Detroit 510, CCL 72] and WI-38 [CCL 75] cells, among others. These cell lines are all available from the American Type Culture Collection, 10801 University Boulevard, Manassas, Virginia 20110-2209. Other suitable parent cell lines may be obtained from other sources.

Such E1-expressing cell lines are useful in the generation of recombinant adenovirus E1 deleted vectors. Additionally, or alternatively, cell lines that express one or more adenoviral gene products, e.g., E1a, E1b, E2a, and/or E4 ORF6, can be constructed using essentially the same procedures are used in the generation of recombinant viral vectors. Such cell lines can be utilized to transcomplement adenovirus vectors deleted in the essential genes that encode those products, or to provide helper functions necessary for packaging of a helper-dependent virus (e.g., adeno-associated virus). The preparation of a host cell involves techniques such as assembly of selected DNA sequences. This assembly may be accomplished utilizing conventional techniques. Such techniques include cDNA and genomic cloning, which are well known and are described in Sambrook et al., cited above, use of overlapping oligonucleotide sequences of the adenovirus genomes, combined with polymerase chain reaction, synthetic methods, and any other suitable methods which provide the desired nucleotide sequence.

In still another alternative, the essential adenoviral gene products are provided in trans by the adenoviral vector and/or helper virus. In such an instance, a suitable host cell can be selected from any biological organism, including prokaryotic (e.g., bacterial) cells, and eukaryotic cells, including, insect cells, yeast cells and mammalian cells. Particularly desirable host cells are selected from among any mammalian species, including, without limitation, cells such as A549, WEHI, 3T3, 10T1/2, HEK 293 cells or PERC6 (both of which express functional adenoviral E1) [Fallaux, F J et al, (1998), Hum Gene Ther, 9:1909-1917], Saos, C2C12, L cells, HT1080, HepG2 and primary fibroblast, hepatocyte and myoblast cells derived from mammals including human, monkey, mouse, rat, rabbit, and hamster. The selection of the mammalian species providing the cells is not a limitation of this invention; nor is the type of mammalian cell, i.e., fibroblast, hepatocyte, tumor cell, etc.

c. Assembly of Viral Particle and Transfection of a Cell Line

Generally, when delivering the vector comprising the minigene by transfection, the vector is delivered in an amount from about 5 μg to about 100 g DNA, and preferably about 10 to about 50 μg DNA to about $1 \times 10^4$ cells to about $1 \times 10^{13}$ cells, and preferably about $10^5$ cells. However, the relative amounts of vector DNA to host cells may be adjusted, taking into consideration such factors as the selected vector, the delivery method and the host cells selected.

B. Lentivirus Systems

A variety of different lentivirus systems are known in the art. See, e.g., WO2001089580 A1 for a method for obtaining stable cardiovascular transduction with a lentivirus system. See, e.g., U.S. Pat. No. 6,521,457. See, also, discussion in NB Wasala et al. The evolution of heart gene delivery vectors, J Gen Med., 2011 October; 13(10): 557-565, which is incorporated herein by reference.

C. Recombinant AAV

In certain embodiments, the vector genome refers to the nucleic acid sequence packaged inside a vector, e.g., an rAAV. For a rAAV, such a nucleic acid sequence may contain AAV inverted terminal repeat sequences (ITRs) and an expression cassette. In one example, a vector genome contains, at a minimum, from 5' to 3', an AAV 5' ITR, a nucleic acid sequence encoding a dystrophin superfamily triple splice mutant protein, and an AAV 3' ITR. In one example, a vector genome contains, at a minimum, from 5' to 3', an AAV 5' ITR, an expression cassette, and an AAV 3' ITR. The ITRs may be from AAV2 or from aa different source AAV other than AAV2. In other embodiments, a vector genome may contain the terminal repeats (TRs) needed for self-complementary AAV vector.

In one embodiment, provided herein is a recombinant adeno-associated virus (rAAV) having an AAV capsid and a vector genome, wherein the vector genome comprises an expression cassette as described herein, or a nucleic acid sequence encoding a dystrophin superfamily triple splice mutant protein (i.e., cDNA as used herein) under the control of regulatory sequences which direct expression thereof.

In some embodiments, the dystrophin superfamily triple splice mutant protein is designed to be expressed from a recombinant adeno-associated virus, and the vector genome also contains AAV inverted terminal repeats (ITRs). In one embodiment, the rAAV is pseudotyped, i.e., the AAV capsid is from a different source AAV than that the AAV which provides the ITRs. In one embodiment, the ITRs of AAV serotype 2 are used. However, ITRs from other suitable sources may be selected. Optionally, the AAV may be a self-complementary AAV.

The abbreviation "sc" refers to self-complementary. "Self-complementary AAV" refers a construct in which a coding region carried by a recombinant AAV nucleic acid sequence has been designed to form an intra-molecular double-stranded DNA template. Upon infection, rather than waiting for cell mediated synthesis of the second strand, the two complementary halves of scAAV will associate to form one double stranded DNA (dsDNA) unit that is ready for immediate replication and transcription. See, e.g., D M McCarty et al, Self-complementary recombinant adeno-associated virus (scAAV) vectors promote efficient transduction independently of DNA synthesis, Gene Therapy, (August 2001), Vol 8, Number 16, Pages 1248-1254. Self-complementary AAVs are described in, e.g., U.S. Pat. Nos. 6,596,535; 7,125,717; and 7,456,683, each of which is incorporated herein by reference in its entirety.

Where the gene is to be expressed from an AAV, the expression cassettes described herein include an AAV 5' inverted terminal repeat (ITR) and an AAV 3' ITR. However, other configurations of these elements may be suitable. A shortened version of the 5' ITR, termed ΔITR, has been described in which the D-sequence and terminal resolution site (trs) are deleted. In other embodiments, the full-length AAV 5' and/or 3' ITRs are used. Where a pseudotyped AAV is to be produced, the ITRs in the expression are selected from a source which differs from the AAV source of the capsid. For example, AAV2 ITRs may be selected for use with an AAV capsid having a particular efficiency for targeting muscle. In one embodiment, the ITR sequences from AAV2, or the deleted version thereof (ΔITR), are used for convenience and to accelerate regulatory approval. However, ITRs from other AAV sources may be selected. Where the source of the ITRs is from AAV2 and the AAV capsid is from another AAV source, the resulting vector may be termed pseudotyped. However, other sources of AAV ITRs may be utilized.

As used herein, "recombinant AAV viral particle" or "AAV viral particle" refers to nuclease-resistant particle (NRP) which has a capsid and packaged therein a heterologous nucleic acid molecule (vector genome) comprising an expression cassette for a dystrophin superfamily triple splice mutant protein. Such an expression cassette typically contains an AAV 5' and/or 3' inverted terminal repeat sequence flanking a gene sequence, in which the gene sequence is operably linked to expression control sequences. Such capsid packaged therein a vector genome may also be referred to as a "full" AAV capsid. Such a rAAV viral particle is termed "pharmacologically active" when it delivers the transgene to a host cell which is capable of expressing the desired gene product carried by the expression cassette.

In many instances, rAAV particles are referred to as "DNase resistant." However, in addition to this endonuclease (DNase), other endo- and exo-nucleases may also be used in the purification steps described herein, to remove contaminating nucleic acids. Such nucleases may be selected to degrade single stranded DNA and/or double-stranded DNA, and RNA. Such steps may contain a single nuclease, or mixtures of nucleases directed to different targets, and may be endonucleases or exonucleases.

The term "nuclease-resistant" indicates that the AAV capsid has fully assembled around the expression cassette which is designed to deliver a transgene to a host cell and protects these packaged genomic sequences from degradation (digestion) during nuclease incubation steps designed to remove contaminating nucleic acids which may be present from the production process.

As used herein, an "AAV9 capsid" is a self-assembled AAV capsid composed of multiple AAV9 vp proteins. The AAV9 vp proteins are typically produced as alternative splice variants from a nucleic acid sequence of SEQ ID NO: 10 or a sequence at least 70%, at least 75%, at least 80%, at least 85%, at least 90%, at least 95%, at least 97%, at least 99% thereto, which encodes the vp1 amino acid sequence of SEQ ID NO: 9 (GenBank accession: AAS99264). These splice variants result in proteins of different length of SEQ ID NO: 9. In certain embodiments, "AAV9 capsid" includes an AAV having an amino acid sequence which is 99% identical to SEQ ID NO: 9 (i.e., less than about 1% variation from the referenced sequence). See, also U.S. Pat. No. 7,906,111 and WO 2005/033321. Such AAV may include, e.g., natural isolates (e.g., hu31, vp1 of which is encoded by SEQ ID NO: 11; or hu32, vp1 of which is encoded by SEQ ID NO: 12), or variants of AAV9 having amino acid substitutions, deletions or additions, e.g., including but not limited to amino acid substitutions selected from alternate residues "recruited" from the corresponding position in any other AAV capsid aligned with the AAV9 capsid; e.g., such as described in U.S. Pat. Nos. 9,102,949, 8,927,514, 8,734, 809; and WO 2016/049230A1. However, in other embodiments, other variants of AAV9, or AAV9 capsids having at least about 95% identity to the above-referenced sequences may be selected. See, e.g., US Published Patent Application No. 2015/0079038. Methods of generating the capsid, coding sequences therefore, and methods for production of rAAV viral vectors have been described. See, e.g., Gao, et al, Proc. Natl. Acad. Sci. U.S.A. 100 (10), 6081-6086 (2003) and US 2013/0045186A1.

Besides AAV9, other AAV vectors may be used, for example, AAV1, AAV5, AAV6, AAV8, AAV8 triple, AAV9, Anc80, Anc81 and Anc82. See, e.g, Santiago-Ortiz et al., Gene Ther., 22(12):934-46 (2015); US20170051257A1; and Zinn et al., Cell Rep., 12(6): 1056-1068 (2015).

The sequences of any of the AAV capsids can be readily generated synthetically or using a variety of molecular biology and genetic engineering techniques. Suitable production techniques are well known to those of skill in the art. See, e.g., Sambrook et al, Molecular Cloning: A Laboratory Manual, Cold Spring Harbor Press (Cold Spring Harbor, NY). Alternatively, oligonucleotides encoding peptides (e.g., CDRs) or the peptides themselves can generated synthetically, e.g., by the well-known solid phase peptide synthesis methods (Merrifield, (1962) *J. Am. Chem. Soc.*, 85:2149; Stewart and Young, Solid Phase Peptide Synthesis (Freeman, San Francisco, 1969) pp. 27-62). These and other suitable production methods are within the knowledge of those of skill in the art and are not a limitation of the present invention.

Methods of preparing AAV-based vectors are known. See, e.g., US Published Patent Application No. 2007/0036760 (Feb. 15, 2007), which is incorporated by reference herein. The use of AAV capsids having tropism for muscle cells and/or cardiac cells are particularly well suited for the compositions and methods described herein. However, other targets may be selected. The sequences of AAV9 and methods of generating vectors based on the AAV9 capsid are described in U.S. Pat. No. 7,906,111; US2015/0315612; WO 2012/112832; and WO2017160360A3, which are incorporated herein by reference. In certain embodiments, the sequences of AAV1, AAV5, AAV6, AAV9, AAV8triple, Anc80, Anc81 and Anc82 are known and may be used to generate AAV vector. See, e.g., U.S. Pat. No. 7,186,552, WO 2017/180854, U.S. Pat. No. 7,282,199 B2, U.S. Pat. Nos. 7,790,449, and 8,318,480, which are incorporated herein by reference. The sequences of a number of such AAV are provided in the above-cited U.S. Pat. No. 7,282,199 B2, U.S. Pat. Nos. 7,790,449, 8,318,480, 7,906,111, WO/2003/042397, WO/2005/033321, WO/2006/110689, U.S. Pat. Nos. 8,927,514, 8,734,809; WO2015054653A3, WO-2016065001-A1, WO-2016172008-A1, WO-2015164786-A1, US-2010186103-A1, WO-2010138263-A2, and WO 2016/049230A1, and/or are available from GenBank. Corresponding methods have been described for AAV1, AAV8, and AAVrh10-like vectors. See, WO2017100676 A1; WO2017100674A1; and WO2017100704A1.

The recombinant adeno-associated virus (AAV) described herein may be generated using techniques which are known. See, e.g., WO 2003/042397; WO 2005/033321, WO 2006/110689; U.S. Pat. No. 7,588,772 B2. Such a method involves culturing a host cell which contains a nucleic acid sequence encoding an AAV capsid; a functional rep gene; an expression cassette composed of, at a minimum, AAV inverted terminal repeats (ITRs) and a transgene; and sufficient helper functions to permit packaging of the expression cassette into the AAV capsid protein. The host cell may be a 293 cell or a suspension 293 cell. See, e.g., Zinn, E., et al., as cited herein; Joshua C Grieger et al. Production of Recombinant Adeno-associated Virus Vectors Using Suspension HEK293 Cells and Continuous Harvest of Vector From the Culture Media for GMP FIX and FLT1 Clinical Vector. Mol Ther. 2016 February; 24(2): 287-297. Published online 2015 Nov. 3. Prepublished online 2015 Oct. 6. doi: 10.1038/mt.2015.187; Laura Adamson-Small, et al. Sodium Chloride Enhances Recombinant Adeno-Associated Virus Production in a Serum-Free Suspension Manufacturing Platform Using the Herpes Simplex Virus System. Hum Gene Ther Methods. 2017 Feb. 1; 28(1): 1-14. Published online 2017 Feb. 1. doi: 10.1089/hgtb.2016.151; US20160222356A1; and Chahal P S et al. Production of adeno-associated virus (AAV) serotypes by transient transfection of HEK293 cell suspension cultures for gene delivery. J Virol Methods. 2014 February; 196:163-73. doi: 10.1016/j.jviromet.2013.10.038. Epub 2013 Nov. 13.

Other methods of producing rAAV available to one of skill in the art may be utilized. Suitable methods may include without limitation, baculovirus expression system (e.g., baculovirus-infected-insect-cell system) or production via yeast. See, e.g., WO2005072364A2; WO2007084773A2; WO2007148971A8; WO2017184879A1; WO2014125101A1; U.S. Pat. No. 6,723,551B2; Bryant, L. M., et al., Lessons Learned from the Clinical Development and Market Authorization of Glybera. Hum Gene Ther Clin Dev, 2013; Robert M. Kotin, Large-scale recombinant adeno-associated virus production. Hum Mol Genet. 2011 Apr. 15; 20(R1): R2-R6. Published online 2011 Apr. 29. doi: 10.1093/hmg/ddr141; Aucoin M G et al., Production of adeno-associated viral vectors in insect cells using triple infection: optimization of baculovirus concentration ratios. Biotechnol Bioeng. 2006 Dec. 20; 95(6):1081-92; SAMI S. THAKUR, Production of Recombinant Adeno-associated viral vectors in yeast. Thesis presented to the Graduate School of the University of Florida, 2012; Kondratov O et al. Direct Head-to-Head Evaluation of Recombinant Adeno-associated Viral Vectors Manufactured in Human versus Insect Cells, Mol Ther. 2017 Aug. 10. pii: S1525-0016(17)30362-3. doi: 10.1016/j.ymthe.2017.08.003. [Epub ahead of print]; Mietzsch M et al, OneBac 2.0: Sf9 Cell Lines for Production of AAV1, AAV2, and AAV8 Vectors with Minimal Encapsidation of Foreign DNA. Hum Gene Ther Methods. 2017 February; 28(1):15-22. doi: 10.1089/hgtb.2016.164.; Li L et al. Production and characterization of novel recombinant adeno-associated virus replicative-form genomes: a eukaryotic source of DNA for gene transfer. PLoS One. 2013 Aug. 1; 8(8):e69879. doi: 10.1371/journal.pone.0069879. Print 2013; Galibert L et al, Latest developments in the large-scale production of adeno-associated virus vectors in insect cells toward the treatment of neuromuscular diseases. J Invertebr Pathol. 2011 July; 107 Suppl:S80-93. doi: 10.1016/j.jip.2011.05.008; and Kotin R M, Large-scale recombinant adeno-associated virus production. Hum Mol Genet. 2011 Apr. 15; 20(R1):R2-6. doi: 10.1093/hmg/ddr141. Epub 2011 Apr. 29.

To calculate empty and full particle content, VP3 band volumes for a selected sample (e.g., in examples herein an iodixanol gradient-purified preparation where # of GC=# of particles) are plotted against GC particles loaded. The resulting linear equation (y=mx+c) is used to calculate the number of particles in the band volumes of the test article peaks. The number of particles (pt) per 20 µL loaded is then multiplied by 50 to give particles (pt)/mL. Pt/mL divided by GC/mL gives the ratio of particles to genome copies (pt/GC). Pt/mL-GC/mL gives empty pt/mL. Empty pt/mL divided by pt/mL and ×100 gives the percentage of empty particles.

Generally, methods for assaying for empty capsids and AAV vector particles with packaged genomes have been known in the art. See, e.g., Grimm et al., *Gene Therapy* (1999) 6:1322-1330; Sommer et al., *Molec. Ther.* (2003) 7:122-128. To test for denatured capsid, the methods include subjecting the treated AAV stock to SDS-polyacrylamide gel electrophoresis, consisting of any gel capable of separating the three capsid proteins, for example, a gradient gel containing 3-8% Tris-acetate in the buffer, then running the gel until sample material is separated, and blotting the gel onto nylon or nitrocellulose membranes, preferably nylon. Anti-AAV capsid antibodies are then used as the primary antibodies that bind to denatured capsid proteins, preferably an anti-AAV capsid monoclonal antibody, most preferably the B1 anti-AAV-2 monoclonal antibody (Wobus et al., *J. Virol.* (2000) 74:9281-9293). A secondary antibody is then used, one that binds to the primary antibody and contains a means for detecting binding with the primary antibody, more preferably an anti-IgG antibody containing a detection molecule covalently bound to it, most preferably a sheep anti-mouse IgG antibody covalently linked to horseradish peroxidase. A method for detecting binding is used to semi-quantitatively determine binding between the primary and secondary antibodies, preferably a detection method capable of detecting radioactive isotope emissions, electromagnetic radiation, or colorimetric changes, most preferably a chemiluminescence detection kit. For example, for SDS-PAGE, samples from column fractions can be taken and heated in SDS-PAGE loading buffer containing reducing agent (e.g., DTT), and capsid proteins were resolved on pre-cast gradient polyacrylamide gels (e.g., Novex). Silver staining may be performed using SilverXpress (Invitrogen, CA) according to the manufacturer's instructions or other suitable staining method, i.e. SYPRO ruby or coomassie stains. In one embodiment, the concentration of AAV vector genomes (vg) in column fractions can be measured by quantitative real time PCR (Q-PCR). Samples are diluted and digested with DNase I (or another suitable nuclease) to remove exogenous DNA. After inactivation of the nuclease, the samples are further diluted and amplified using primers and a TaqMan™ fluorogenic probe specific for the DNA sequence between the primers. The number of cycles required to reach a defined level of fluorescence (threshold cycle, Ct) is measured for each sample on an Applied Biosystems Prism 7700 Sequence Detection System. Plasmid DNA containing identical sequences to that contained in the AAV vector is employed to generate a standard curve in the Q-PCR reaction. The cycle threshold (Ct) values obtained from the samples are used to determine vector genome titer by normalizing it to the Ct value of the plasmid standard curve. End-point assays based on the digital PCR can also be used.

In one aspect, an optimized q-PCR method is used which utilizes a broad spectrum serine protease, e.g., proteinase K (such as is commercially available from Qiagen). More particularly, the optimized qPCR genome titer assay is similar to a standard assay, except that after the DNase I digestion, samples are diluted with proteinase K buffer and treated with proteinase K followed by heat inactivation. Suitably samples are diluted with proteinase K buffer in an amount equal to the sample size. The proteinase K buffer may be concentrated to 2 fold or higher. Typically, proteinase K treatment is about 0.2 mg/mL, but may be varied from 0.1 mg/mL to about 1 mg/mL. The treatment step is generally conducted at about 55° C. for about 15 minutes, but may be performed at a lower temperature (e.g., about 37° C. to about 50° C.) over a longer time period (e.g., about 20 minutes to about 30 minutes), or a higher temperature (e.g., up to about 60° C.) for a shorter time period (e.g., about 5 to 10 minutes). Similarly, heat inactivation is generally at about 95° C. for about 15 minutes, but the temperature may be lowered (e.g., about 70 to about 90° C.) and the time extended (e.g., about 20 minutes to about 30 minutes). Samples are then diluted (e.g., 1000 fold) and subjected to TaqMan analysis as described in the standard assay.

Additionally, or alternatively, droplet digital PCR (ddPCR) may be used. For example, methods for determining single-stranded and self-complementary AAV vector genome titers by ddPCR have been described. See, e.g., M. Lock et al, Hu Gene Therapy Methods, Hum Gene Ther Methods. 2014 April; 25(2):115-25. doi: 10.1089/hgtb.2013.131. Epub 2014 Feb. 14.

In brief, the method for separating rAAV particles having packaged genomic sequences from genome-deficient AAV intermediates involves subjecting a suspension comprising recombinant AAV viral particles and AAV capsid intermediates to fast performance liquid chromatography, wherein the AAV viral particles and AAV intermediates are bound to a strong anion exchange resin equilibrated at a high (e,g., pH of 10.2 for AAV9), and subjected to a salt gradient while monitoring eluate for ultraviolet absorbance at about 260 and about 280. Although less optimal for rAAV9, the pH may be in the range of about 10.0 to 10.4. In this method, the AAV full capsids are collected from a fraction which is eluted when the ratio of A260/A280 reaches an inflection point. In one example, for the Affinity Chromatography step, the diafiltered product may be applied to a Capture Select Poros-AAV2/9 affinity resin (Life Technologies) that efficiently captures the AAV2/9 serotype. Under these ionic conditions, a significant percentage of residual cellular DNA and proteins flow through the column, while AAV particles are efficiently captured.

As used herein, the term "treatment" or "treating" refers to composition(s) and/or method(s) for the purposes of amelioration of one or more symptoms of MD, including DMD and BMD, restore of a desired function of the full-length dystrophin, or improvement of biomarker of disease. In some embodiments, the term "treatment" or "treating" is defined encompassing administering to a subject one or more compositions described herein for the purposes indicated herein. "Treatment" can thus include one or more of preventing disease, reducing the severity of the disease symptoms, retarding their progression, removing the disease symptoms, delaying progression of disease, or increasing efficacy of therapy in a given subject. As used herein, the term disease refers to MD, including DMD and BMD, or any other dystrophin-related disease.

It should be understood that the compositions in the vector described herein are intended to be applied to other compositions, regiments, aspects, embodiments and methods described across the Specification.

IV. Methods and Kits

In other embodiments, methods for targeting muscle, including skeletal muscle, cardiac muscle, and/or smooth muscle, is desired. This may involve an intravenous injection or intramuscular injection. However, other routes of delivery may be selected.

In certain embodiments, the composition of the invention is specifically targeted (e.g., via direct injection) to the heart. In certain embodiments, the composition or specifically expressed in the heart (e.g., cardiomyocytes). Methods for preferentially targeting cardiac cells and/or for minimizing off-target non-cardiac gene transfer have been described. See, e.g., Matkar P N et al, Cardiac gene therapy: are we there yet?Gene Ther. 2016 August; 23(8-9):635-48. doi: 10.1038/gt.2016.43. Epub 2016 Apr. 29; Patent publications US20030148968A1, US20070054871A1, WO2000038518A1, U.S. Pat. No. 7,078,387B1, U.S. Pat. No. 6,162,796A, and WO1994011506A1.

In certain embodiments, a method such as that in U.S. Pat. No. 7,399,750, is used to increase the dwell time of the vector carrying the gene of interest in the heart by the induction of hypothermia, isolation of the heart from circulation, and near or complete cardiac arrest. Permeabilizing agents are an essential component of this method and are used during the administration of the virus to increase the uptake of the virus by the cardiac cells. This method is particularly well suited to viral vectors, where the gene expression may be highly specific to cardiac muscle and, in particularly in the case of rAAV vectors, expression may be maintained long-term, with no signs of myocardiac inflammation. Still another systems and techniques may used including, without limitation, e.g., a "bio-pacemaker", such as that described in U.S. Pat. No. 8,642,747, US-2011-0112510.

In one embodiment, delivery is accomplished by the global myocardial perfusion method described in International publication number WO2005027995A2. In another embodiment, delivery is accomplished by the gene transfer methods described in International Patent Application No. PCT/US2004/031322, filed Sep. 24, 2004. Briefly, this method involves transferring a microutrophin of the invention to muscle cells by exsanguinating a region of the subject's microvasculature and delivering the complex to this region under high hydrostatic pressure using a configuration of perfusion cannulae and balloon as required to protect heart and lung to protein the organs during perfusion. A balloon catheter having a balloon that extends substantially the full length of the aorta or vessel that is inserted into the subject is provided for use in the systemic delivery of vector. In still another embodiment, the invention provides for delivery via a perfusion circuit and surgical method is provided for delivering a substance to a subject's heart in situ during cardiopulmonary bypass surgery. The perfusion circuit defines a path for re-circulating a solution containing a macromolecular complex through a coronary circulation circuit through a subject's heart during a surgical procedure in which the substance is prevented from being delivered to the subject's other organs.

In one aspect, provided herein is a pharmaceutical composition comprising a dystrophin superfamily triple splice mutant protein, a nucleic acid sequence encoding the dystrophin superfamily triple splice mutant protein, an expression cassette or a vector comprising such nucleic acid sequence in a formulation buffer (i.e., vehicle). In one embodiment, the formulation further comprises a surfactant, preservative, excipients, and/or buffer dissolved in the aqueous suspending liquid. In one embodiment, the buffer is PBS. Various suitable solutions are known including those which include one or more of: buffering saline, a surfactant, and a physiologically compatible salt or mixture of salts adjusted to an ionic strength equivalent to about 100 mM sodium chloride (NaCl) to about 250 mM sodium chloride, or a physiologically compatible salt adjusted to an equivalent ionic concentration. Suitably, the formulation is adjusted to a physiologically acceptable pH, e.g., in the range of pH 6 to 8, or pH 6.5 to 7.5, pH 7.0 to 7.7, or pH 7.2 to 7.8.

A suitable surfactant, or combination of surfactants, may be selected from among non-ionic surfactants that are non-toxic. In one embodiment, a difunctional block copolymer surfactant terminating in primary hydroxyl groups is selected, e.g., such as Pluronic® F68 [BASF], also known as Poloxamer 188, which has a neutral pH, has an average molecular weight of 8400. Other surfactants and other Poloxamers may be selected, i.e., nonionic triblock copolymers composed of a central hydrophobic chain of polyoxypropylene (poly (propylene oxide)) flanked by two hydrophilic chains of polyoxyethylene (poly (ethylene oxide)), SOLUTOL HS 15 (Macrogol-15 Hydroxystearate), LABRASOL (Polyoxy capryllic glyceride), polyoxy 10 oleyl ether, TWEEN (polyoxyethylene sorbitan fatty acid esters), ethanol and polyethylene glycol. In one embodiment, the formulation contains a poloxamer. These copolymers are commonly named with the letter "P" (for poloxamer) followed by three digits: the first two digits×100 give the approximate molecular mass of the polyoxypropylene core, and the last digit×10 gives the percentage polyoxyethylene content. In one embodiment Poloxamer 188 is selected. The surfactant may be present in an amount up to about 0.0005% to about 0.001% of the suspension.

In one example, the formulation may contain, e.g., buffered saline solution comprising one or more of sodium chloride, sodium bicarbonate, dextrose, magnesium sulfate (e.g., magnesium sulfate ·7H2O), potassium chloride, calcium chloride (e.g., calcium chloride ·2H2O), dibasic sodium phosphate, and mixtures thereof, in water. Suitably, for intrathecal delivery, the osmolarity is within a range compatible with cerebrospinal fluid (e.g., about 275 to about 290); see, e.g., emedicine.medscape.com/article/2093316-overview. Optionally, for intrathecal delivery, a commercially available diluent may be used as a suspending agent, or in combination with another suspending agent and other optional excipients. See, e.g., Elliotts B® solution [Lukare Medical].

In other embodiments, the formulation may contain one or more permeation enhancers. Examples of suitable permeation enhancers may include, e.g., mannitol, sodium glycocholate, sodium taurocholate, sodium deoxycholate, sodium salicylate, sodium caprylate, sodium caprate, sodium lauryl sulfate, polyoxyethylene-9-laurel ether, or EDTA.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. Delivery vehicles such as liposomes, nanocapsules, microparticles, microspheres, lipid particles, vesicles, and the like, may be used for the introduction of the compositions of the present invention into suitable host cells. In particular, the rAAV vector may be formulated for delivery either encapsulated in a lipid particle, a liposome, a vesicle, a nanosphere, or a nanoparticle or the like. In one embodiment, a therapeutically effective amount of said vector is included in the pharmaceutical composition. The selection of the carrier is not a limitation of the present invention. Other conventional pharmaceutically acceptable carrier, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

The phrase "pharmaceutically-acceptable" refers to molecular entities and compositions that do not produce an allergic or similar untoward reaction when administered to a host.

As used herein, the term "dosage" or "amount" can refer to the total dosage or amount delivered to the subject in the course of treatment, or the dosage or amount delivered in a single unit (or multiple unit or split dosage) administration.

Also, the vector compositions can be formulated in dosage units to contain an amount of vector that is in the range of about $1.0 \times 10^9$ particles to about $1.0 \times 10^{18}$ particles (to treat one subject) including all integers or fractional amounts within the range, and preferably $1.0 \times 10^{12}$ particles to $1.0 \times 10^{14}$ particles for a human patient. In one embodiment, the compositions are formulated to contain at least $1 \times 10^9$, $2 \times 10^9$, $3 \times 10^9$, $4 \times 10^9$, $5 \times 10^9$, $6 \times 10^9$, $7 \times 10^9$, $8 \times 10^9$, or $9 \times 10^9$ particles per dose including all integers or fractional amounts within the range. In another embodiment, the compositions are formulated to contain at least $1 \times 10^{10}$, $2\times10^{10}$, $3\times10^{10}$, $4\times10^{10}$, $5\times10^{10}$, $6\times10^{10}$, $7\times10^{10}$, $8\times10^{10}$, or $9\times10^{10}$ particles per dose including all integers or fractional amounts within the range. In another embodiment, the compositions are formulated to contain at least $1\times10^{11}$, $2\times10^{11}$, $3\times10^{11}$, $4\times10^{11}$, $5\times10^{11}$, $6\times10^{11}$, $7\times10^{11}$, $8\times10^{11}$, or $9\times10^{11}$ particles per dose including all integers or fractional amounts within the range. In another embodiment, the compositions are formulated to contain at least $1\times10^{12}$, $2\times10^{12}$, $3\times10^{12}$, $4\times10^{12}$, $5\times10^{12}$, $6\times10^{12}$, $7\times10^{12}$, $8\times10^{12}$, or $9\times10^{12}$ particles per dose including all integers or fractional amounts within the range. In another embodiment, the compositions are formulated to contain at least $1\times10^{13}$, $2\times10^{13}$ $3\times10^{13}$, $4\times10^{13}$, $5\times10^{13}$, $6\times10^{13}$, $7\times10^{13}$, $8\times10^{13}$, or $9\times10^{13}$ particles per dose including all integers or fractional amounts within the range. In another embodiment, the compositions are formulated to contain at least $1\times10^{14}$, $2\times10^{14}$, $3\times10^{14}$, $4\times10^{14}$, $5\times10^{14}$, $6\times10^{14}$, $7\times10^{14}$, $8\times10^{14}$, or $9\times10^{14}$ particles per dose including all integers or fractional amounts within the range. In another embodiment, the compositions are formulated to contain at least $1\times10^{15}$, $2\times10^{15}$, $3\times10^{15}$, $4\times10^{15}$, $5\times10^{15}$, $6\times10^{15}$, $7\times10^{15}$, $8\times10^{15}$, or $9\times10^{15}$ particles per dose including all integers or fractional amounts within the range. In another embodiment, the compositions are formulated to contain at least $1\times10^{16}$, $2\times10^{16}$, $3\times10^{16}$, $4\times10^{16}$, $5\times10^{16}$, $6\times10^{16}$, $7\times10^{16}$, $8\times10^{16}$, or $9\times10^{16}$ particles per dose including all integers or fractional amounts within the range. In another embodiment, the compositions are formulated to contain at least $1\times10^{17}$, $2\times10^{17}$, $3\times10^{17}$, $4\times10^{17}$, $5\times10^{17}$, $6\times10^{17}$, $7\times10^{17}$, $8\times10^{17}$, or $9\times10^{17}$ particles per dose including all integers or fractional amounts within the range. In one embodiment, for human application the dose can range from $1\times10^{12}$ to about $1\times10^{12}$ particles per dose including all integers or fractional amounts within the range. In one embodiment, the subject is delivered a therapeutically effective amount of the vectors described herein. As used herein, a "therapeutically effective amount" refers to the amount of the composition comprising the nucleic acid sequence encoding a dystrophin superfamily triple splice mutant protein which delivers and expresses in the target cells an amount of enzyme sufficient to achieve efficacy. Or a "therapeutically effective amount" refers to the amount of the composition comprising the dystrophin superfamily triple splice mutant protein which delivers to a subject. In one embodiment, the dosage of the vector is about $1\times10^{9}$ particles (e.g., genome copies, GC) per kg of body mass to about $1\times10^{16}$ particles per kg of body mass, including all integers or fractional amounts within the range and the endpoints. In another embodiment, the dosage is $1\times10^{10}$ particles per kg of body mass to about $1\times10^{13}$ particles per kg of body mass.

Dosages of the vector will depend primarily on factors such as the condition being treated, the age, weight and health of the patient, and may thus vary among patients. For example, a therapeutically effective human dosage of the vector is generally in the range of from about 1 ml to about 100 ml of solution containing concentrations of from about $1\times10^{7}$ to $1\times10^{16}$ genomes or particles vector. The dosage will be adjusted to balance the therapeutic benefit against any side effects and such dosages may vary depending upon the therapeutic application for which the recombinant vector is employed. The levels of expression of the transgene can be monitored to determine the frequency of dosage resulting in vectors, preferably AAV vectors containing the minigene. Optionally, dosage regimens similar to those described for therapeutic purposes may be utilized for immunization using the compositions of the invention.

Optionally, therapy with a dystrophin superfamily triple splice mutant protein (e.g., nano-utrophin or nano-dystrophin) or a vector expressing a dystrophin superfamily triple splice mutant protein can be combined with other therapies.

Expression of the dystrophin superfamily triple splice mutant protein (e.g., nano-utrophin or nano-dystrophin) may be detected by immunofluorescent staining and immunoblotting (Western blotting). The dystrophin superfamily triple splice mutant protein (e.g., nano-utrophin or nano-dystrophin) therapy may be monitored by measuring missing DAP complexes on the myofiber plasma membrane, including the sarcoglycan complex which is typically not found in untreated dystrophic muscle due to the primary deficiency of dystrophin. Alternatively, the dystrophin superfamily triple splice mutant protein (e.g., nano-utrophin or nano-dystrophin) therapy can be monitored by assessing that muscle is protected from pathological phenotypes.

In one aspect, the invention provides a kit for use by a clinician or other personnel. Typically, such a kit will contain a mutant protein or a vector of the invention and, optionally, instructions for reconstitution and/or delivery thereof. In another embodiment, the kit will contain a mutant protein or a vector in a physiologically compatible saline solution and, optionally, instructions for dilution, and performing a method as described herein.

The kit of the invention may also contain a balloon catheter to facilitate somatic gene transfer as described (International Patent Application No. PCT/US2004/030463, or by the gene transfer methods described in International Patent Application No. PCT/US2004/031322, filed Sep. 24, 2004), oxygen-transporting agent and/or at least one disposable element of an extracorporeal circulatory support and oxygenation system. For example, at least one disposable element can be an oxygenator having a hollow body, a liquid inlet in fluid communication with the interior of the body, a liquid outlet in fluid communication with the interior of the body, a gas inlet for providing gas to the interior of a gas chamber, at least one gas-permeable membrane separating the gas chamber from the interior of the body, and a gas outlet for permitting gas to exit from the gas chamber, whereby gas exchange is enabled between a fluid in the interior of the body and a gas in the gas chamber. The oxygenator may be constructed as described in U.S. Pat. No. 6,177,403, wherein the gas-permeable membrane comprises PTFE tubing extending within at least a portion of the tube, and wherein the gas chamber comprises the interior of the PTFE tubing.

It should be understood that the compositions in the Methods and Kits described herein are intended to be applied to other compositions, regiments, aspects, embodiments and methods described across the Specification.

The term "a" or "an" refers to one or more. As such, the terms "a" (or "an"), "one or more," and "at least one" are used interchangeably herein.

The words "comprise", "comprises", and "comprising" are to be interpreted inclusively rather than exclusively. The words "consist", "consisting", and its variants, are to be interpreted exclusively, rather than inclusively. While various embodiments in the specification are presented using "comprising" language, under other circumstances, a related embodiment is also intended to be interpreted and described using "consisting of" or "consisting essentially of" language.

The term "about" encompasses a variation within and including ±10%, unless otherwise specified.

Unless defined otherwise in this specification, technical and scientific terms used herein have the same meaning as commonly understood by one of ordinary skill in the art and by reference to published texts, which provide one skilled in the art with a general guide to many of the terms used in the present application.

EXAMPLE

The primary structure of dystrophin and the molecular basis of the milder-than-DMD disease BMD suggested a conceptually simple means of constructing smaller, partially functional proteins for therapy in DMD. Internal deletions of single, contiguous portions of a long repetitive domain of dystrophin were used to achieve BMD-like partial length dystrophin variants which localize to the cellular address normally occupied by full-length dystrophin, and thereby partially substitute for the dystrophin's key physiological function(s). It was widely assumed that, based on the view that dystrophin serves as a molecular "shock absorber", that the protein's full length would be required for normal function in this role. The anticipated result was that under appropriate testing this entire class of recombinant proteins would confer BMD-like phenotypes to DMD patients. No somatically delivered partial length recombinant dystrophin has completely normalized the most sensitive assays of pathology in preclinical studies, suggesting that vectors poised for clinical development by several teams will at best temporarily "Beckerize" the rate of disease progression in DMD. Both shorter and longer than wild type dystrophins can be associated with severe disease in Becker Muscular Dystrophy (BMD), indicating that dystrophin's mechanical role is not as simple as that of a length-dependent "shock absorber". Such genotype/phenotype correlations in Duchenne and Becker Muscular Dystrophy served as starting points for the development of low molecular weight substitutes for Dp427, including potentially non-immunogenic derivatives of the dystrophin paralog utrophin. Based on novel insight into the mechanobiology of dystrophin and utrophin, we have developed utrophin or dystrophin variants that can be delivered to a patient to supersede the efficacy and safety of previously studied gene therapies in addressing DMD-specific limitations noted above.

Example 1—Evolution of Titin but not Dystrophin Correlates with the Scalability of Locomotive Power A. Results and Discussions In large animals, rapid locomotion is invariably powered by sarcomeric myosin, whereas the fastest moving unicellular eukaryotes and earliest branching animal lineages use ciliary dynein as the dominant locomotive power source (Colin, S. P., et al. Stealth predation and the predatory success of the invasive ctenophore *Mnemiopsis leidyi*. Proc Natl Acad Sci USA 107, 17223-17227 (2010); Srivastava, M. et al. The Trichoplax genome and the nature of placozoans. Nature 454, 955-960 (2008); Srivastava, M. et al. The *Amphimedon queenslandica* genome and the evolution of animal complexity. Nature 466, 720-726 (2010); Ryan, J. F. et al. The genome of the ctenophore *Mnemiopsis leidyi* and its implications for cell type evolution. Science 342, 1242592, doi:10.1126/science.1242592 (2013); and Moroz, L. L. et al. The ctenophore genome and the evolutionary origins of neural systems. Nature 510, 109-114, doi: 10.1038/nature13400 (2014)). Selective pressures driving the evolutionary transition from dynein to myosin must reflect geometric constraints imposed by the organelles in which these motors achieve maximal power density, with sarcomeres but not cilia amenable to three-dimensional scaling. The molecular basis of this pivotal transition is poorly understood. Here we show that the emergence of sarcomeres correlates with the phylogenomically reconstructed appearance of massive, poly-IgG-repeat containing proteins orthologous to chordate titins, whereas dystrophin and its associated complex of membrane-bound glycoproteins arose piecemeal, before the divergence of earlier branching lineages. We have identified invertebrate species that retain the inferred ancestral titin supergene structure, providing a unified view of gene rearrangements that previously obscured gene orthology and the common origin of sarcomeres in animals with radial and bilateral symmetry. Surprisingly, gene structures provide compelling evidence that the extraordinary size of dystrophin's rod domain reflects the historical legacy of a paralogous class of microtubule-binding proteins in which selection for increasing length occurred before the dawn of sarcomeres. These findings have critical implications for the mechanobiology of dystrophin and the design of miniaturized proteins for therapeutic use in muscular dystrophy (Examples 2 and 3). Our reconstruction suggests that geometric constraints on cell morphology and body plan required a strong yet pliable connection between cortical cytoskeleton and extracellular matrix before myosin could be safely arrayed into sarcomeres at the density required to power rapid, scale-independent locomotion.

Titin is the largest protein in the human proteome, serving in monomeric form as the primary scaffold for sarcomere formation (Zoghbi, M. E., Woodhead, J. L., Moss, R. L. & Craig, R. Three-dimensional structure of vertebrate cardiac muscle myosin filaments. Proc Natl Acad Sci USA 105, 2386-2390, doi:10.1073/pnas.0708912105 (2008); and Kontrogianni-Konstantopoulos, A., Ackermann, M. A., Bowman, A. L., Yap, S. V. & Bloch, R. J. Muscle giants: molecular scaffolds in sarcomerogenesis. Physiol Rev 89, 1217-1267, doi:10.1152/physrev.00017.2009 (2009)). In vertebrates, titin is primarily composed of immunoglobulin (IgG) and fibronectin type-III (Fn3) domains organized into "super-repeats" that form a polarized filament spanning hemi-sarcomeres, with unique N- and C-termini located within the Z-disc and M-line, respectively. However, titin-like proteins previously identified in invertebrate species are widely divergent in number, primary structure, domain composition, and length, complicating the delineation of functional orthology (Tskhovrebova, L. & Trinick, J. Titin: properties and family relationships. Nat Rev Mol Cell Biol 4, 679-689 (2003)). Our findings indicate that an "ancestral titin supergene" of this general structure has undergone extensive lineage-specific genomic re-arrangements and modular repeat expansions.

Figure 6A:
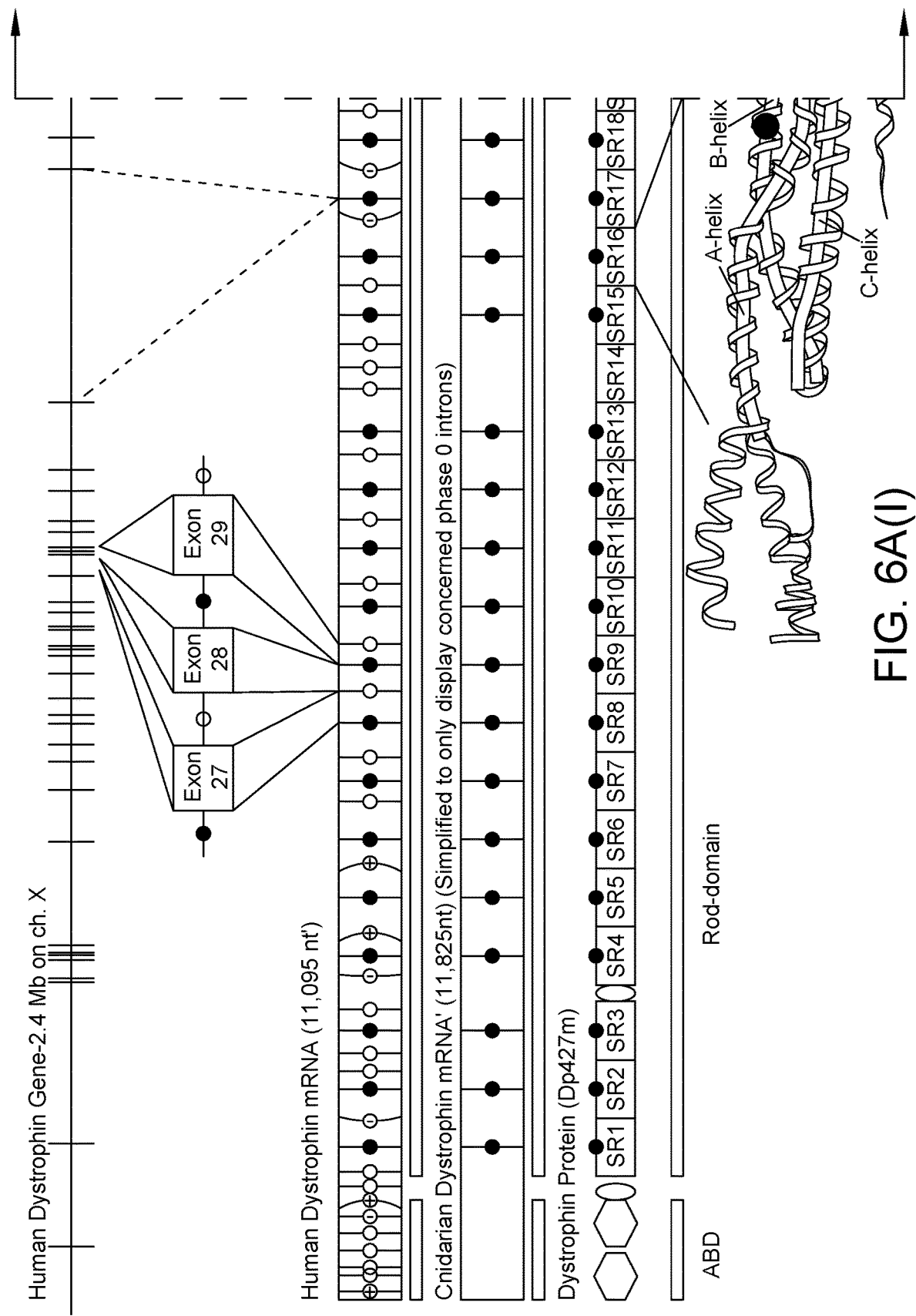
FIG. 6A to FIG. 6C show that the length of the Dystrophin rod was established prior to the emergence of sarcomeres.

In vertebrates, the viability of striated muscle fibers under workload is dependent on membrane protection conferred by a dystrophin-dependent mechanical linkage between the outermost sarcomeres and the extracellular matrix (Hoffman, E. P., Brown, R. H., Jr. & Kunkel, L. M. Dystrophin: the protein product of the Duchenne muscular dystrophy locus. Cell 51, 919-928, doi:0092-8674(87)90579-4 [pii] (1987)). Approximately 75% of dystrophin's molecular weight is contributed by a large central "rod-domain" composed of 24 spectrin repeat domains, with the flanking domains establishing adhesive contacts at opposite ends (FIG. 6A; and data not shown). Patients with Becker muscular dystrophy (BMD) can have either truncating deletions or lengthening duplications confined to exons encoding the rod domain, begging the question of whether the physiological function of dystrophin has been optimized at 24 repeats. We asked whether the number of spectrin-like repeats in dystrophin orthologs grew under selective pressure throughout metazoan phylogeny, perhaps correlating with increasing power output in selected taxa during the evolution of hierarchical predatory food chains. As shown (FIG. 6C), the ancestral dystrophin in existence before the Cnidarian-Bilatarian split is predicted to have had a rod domain of length identical to that in humans, but we could find no evidence for significantly shorter rods in earlier orthologs. Interestingly, our phylogenetic analysis provided strong evidence that the membrane-spanning dystrophin-associated protein complex emerged far earlier than metazoan multicellularity, with orthologs of nearly all disease-implicated components present in the unicellular sister groups to metazoa (data not shown). The earliest ancestral dystrophin orthologs lacked both the N-terminal actin-binding domain (ABD) and the entire rod domain and only consisted of a putative dystroglycan-binding C-terminal "WW-EF-ZZ" domain (FIG. 6A, FIG. 6E; and data not shown). The earliest branching lineage with a "modern" dystrophin ortholog (i.e. an N-terminal ABD and an elongated rod-domain) is the Placozoan species *T. adherens* in which the rod domain is of similar size to that of humans (data not shown). Thus dystrophin was at "full length" prior to the IgG expansions of titin and the emergence of sarcomeres; however, the evolutionary lineage of the rod domain is hitherto unresolved because significant sequence divergence among homologous proteins invites the "long branch attraction" artifact.

Figure 6B:
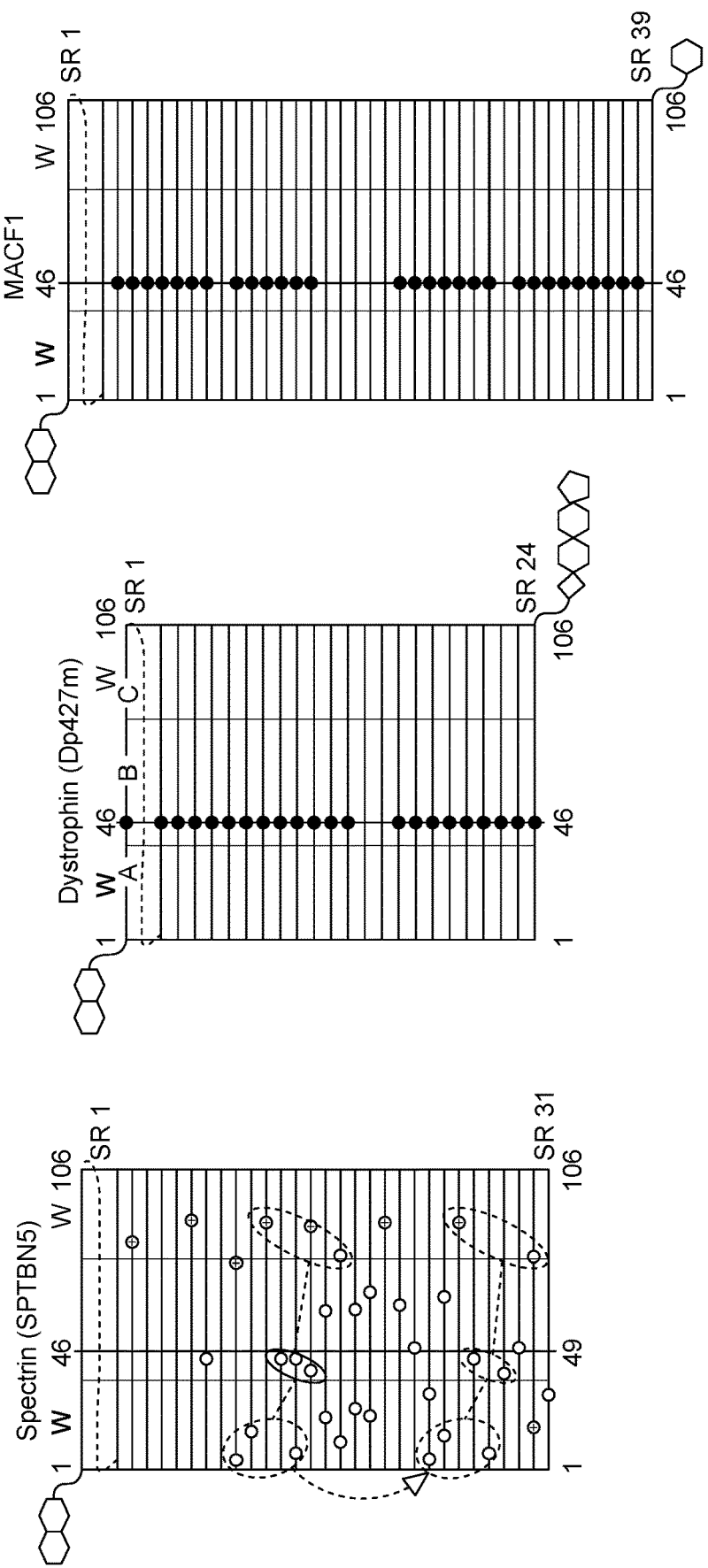
Figure 6C:
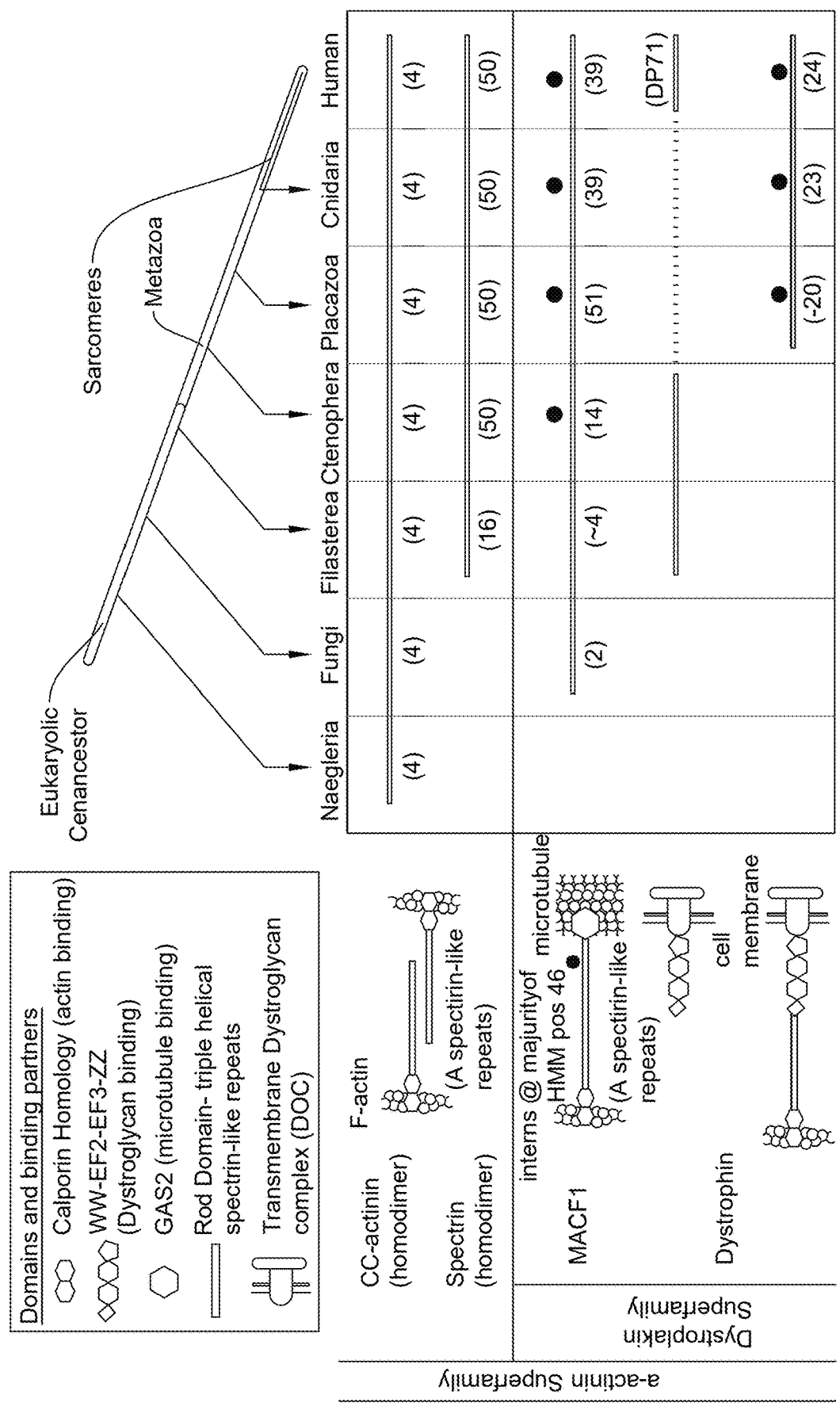

We addressed this problem by identifying ancestral character states that evolve more slowly than individual amino acids or nucleotides within a sequence: the position and phase of introns relative to hidden Markov models for encoded protein domains. We discovered that spectrin repeats of dystrophin and MACF1 share conserved phase 0 introns in a visually striking pattern at HMM consensus position 46, sharply contrasting with the randomly distributed introns of the spectrin genes (FIG. 6A and FIG. 6B). Illustration of the evolutionary stasis of the relevant intron positions is accentuated by our depiction of only those shared in orthologous genes of remotely related species (e.g. note evidence of the ancestral partial gene duplication that extended the beta heavy spectrin ORF by 13 repeats) (FIG. 6B). This rod-domain character state analysis identifies an MACF ortholog, not a beta-spectrin, as the proximate donor of the dystrophin CH and rod domains, suggesting the name "dystroplakin" for this cladistic group (FIG. 6C). The gene structures constitute strong evidence that dystrophin arose evolutionarily when a partial duplication of a gene encoding the N-terminal portion of an ancestral MACF1-like spectroplakin became linked in cis to the gene encoding the ancestral Dp71-like (WW-EF-ZZ) dystrophin ortholog. In the giant MACF orthologs of selected lineages there is evidence for recent tandem duplication of exons encoding spectrin repeats. This supports a reconstruction in which the selective pressure for progressive lengthening of the rod domain occurred (and in some lineages continues) in the cellular context of a microtubule-actin crosslinking "strut", but not in that of dystrophin per se.

Comparing the molecular evolution of the repetitive domains in titin and dystrophin revealed important contrasts. Dot matrices reveal evidence for lineage-specific "treadmilling" of titin IgG and Fn3 repeat regions (data not shown), presumably on the basis of regional tandem multiplication interchangeable as long as the overall protein is long enough to facilitate sarcomerogenesis. Among dystrophin orthologs, analogous turnover of individual spectrin repeats appears to have been almost nonexistent, suggesting strong negative selection against this for at least 600 million years (data not shown). Based on these results we propose a model for the non-interchangeability of dystrophin's spectrin repeats, reflecting the protein's role in longitudinal force transmission, whereby amino acid interactions between adjacent spectrin repeats must be preserved by evolutionary coupling (Hopf, T. A. et al. Mutation effects predicted from sequence co-variation. Nat Biotechnol 35, 128-135, doi:10.1038/nbt.3769 (2017)) to maintain tensile strength (data not shown). In this model, purifying selection has countered the novel juxtaposition, by internal gene deletion or duplication, of divergent spectrin-like repeats which had previously undergone coupled amino-acid evolution with their ancestrally adjacent partners (as observable in BMD pathogenesis). This reconstruction of ancestral events is further supported by contrasting alternative homology models of adjacent triple helices of the dystrophin rod domain on the basis the divergent templates provided by spectrins and plakins. (data not shown). In other words, the molecular evolution of dystrophin is consistent with the proposal that the rod domain's tensile strength is more important than its length, where the latter is a byproduct of its historical legacy. The metabolic cost of perpetuating a structurally redundant ancestral solution to the problem of transmembrane force transmission is inconsequentially small because of the protein's localization to an ultrathin rim of cytoskeletal cortex. This concept has critical implications for the design of transgenes for disease therapeutics, as demonstrated in detail in Examples 2 and 3.

B. Materials and Methods

RNA-Seq: The reference transcriptome for *Nematostella vectensis*, was assembled from the original clustered ESTs published by the JGI genome assembly (Putnam, N. H. et al. Sea anemone genome reveals ancestral eumetazoan gene repertoire and genomic organization. Science 317, 86-94 (2007)) along with transcriptomes produced from a clonal lineage originating in New Jersey, USA, (strain NJ3) generated by the Finnerty Lab [Lubinski, et al., in revision]. Redundant contigs were removed from the merged assembly using CD-HIT with a cutoff of 100% sequence identity.

Basic local alignment search tool (BLAST) searches: Genomes were blasted using BLASTp and/or tBLASTn algorithms with pre-set parameters (BLOSUM62 matrix, expected E value threshold: 10, gap cost existence: 11, gap cost extension: 1). In cases where full-length homologs were not identified, the genomic region surrounding the highest scoring partial-length hits was downloaded and de novo gene modeling was performed (see gene modeling methods section). Transcriptomes were blasted from the NCBI BLAST server using the tBLASTn algorithm against the transcriptome shotgun assembly (TSA) database, again with pre-set parameters.

Gene Modeling: In the absence of corresponding RNAseq data, protein-coding gene models were derived from programs of the FGENESH suite (on the world wide web at softberry.com) using organism-specific gene-finding parameters for the listed organism most closely related to the species under consideration.

Protein domain analysis: Protein domains were analyzed by running the primary amino acid sequence against the Pfam, TIGRFAM, CATH-Gene3D, Superfamily, and PIRSF protein family HMM databases using the European Bioinformatics Institute's HMMscan function of the HMMER software package (on the world wide web at ebi.ac.uk/Tools/ hmmer/-search/hmmscan) (Finn, R. D. et al. HMMER web server: 2015 update. Nucleic Acids Res 43, W30-38, doi: 10.1093/nar/gkv397 (2015)).

Spectrin Repeat Alignment for Intron Position/Phase Identification: All Pfam profile-HMM identifiable spectrin repeat domains were aligned to the Pfam spectrin repeat consensus sequence within HMMscan. These spectrin repeats were sequentially aligned into a multiple sequence alignment according to their alignment relative to the consensus sequence.

Intron Position/Phase Identification: ORF annotated cDNA sequences were aligned to their encoding genomic scaffold using the dot matrix function in MacVector (v15.1) (macvector.com) with 94% sequence identity cut-off. The position and phase of the introns were identified as breakpoints in the alignment. Each intron position and phase was confirmed by the presence of consensus splice site donor (-GT) and acceptor sites (AG-) present within the genomic DNA sequence immediately after and before each 100% identity aligned block, respectively.

Inferred Ancestral Intron Identification: Inferred ancestral introns are those that are shared between orthologous proteins in *H. sapiens* and either *A. queenslandica* or *N. vectensis*.

Dot matrices: cDNA/DNA, protein/genomic DNA, and protein/protein dot matrices were generated within MacVector (v15.1) (macvector.com).

Homology modeling of dystrophin spectrin repeats: Phyre2 was used to model adjacent spectrin repeats from human dystrophin (on the world wide web at sbg.bio.ic.ac.uk/phyre2/html/page.cgi?id=index) (Kelley, L. A., Mezulis, S., Yates, C. M., Wass, M. N. & Sternberg, M. J. The Phyre2 web portal for protein modeling, prediction and analysis. Nat Protoc 10, 845-858, doi:10.1038/nprot.2015.053 (2015)). Distinct homologymodels were generated using the crystal structure of either beta2-spectrin (PDB-ID=3EDV) (Davis, L. et al. Localization and structure of the ankyrin-binding site on beta2-spectrin. J Biol Chem 284, 6982-6987, doi:10.1074/jbc.M809245200 (2009)) or plectin (PDBID=5J1G) (Ortega, E. et al. The Structure of the Plakin Domain of Plectin Reveals an Extended Rod-like Shape. J Biol Chem 291, 18643-18662, doi:10.1074/jbc.M116.732909 (2016)) as the template for the homology model.

Data Availability: Sequence data used to support the findings in this paper are provided in the Supplementary Information. All other data are available from the corresponding author upon request.

Example 2—Effective Gene Therapy for Muscular Dystrophy Using AAV-Mediated Delivery of Micro-Utrophin A. Results and Discussion The essential protein product of the Duchenne muscular dystrophy (DMD) gene is dystrophin (Hoffman, E. P., Brown, R. H., Jr. & Kunkel, L. M. Dystrophin: the protein product of the Duchenne muscular dystrophy locus. Cell 51, 919-928, doi:0092-8674(87)90579-4 [pii](1987)), a rod-like 427 kd protein (Koenig, M., Monaco, A. P. & Kunkel, L. M. The complete sequence of dystrophin predicts a rod-shaped cytoskeletal protein. Cell 53, 219-226 (1988)) that protects striated myocytes from contraction-induced injury (Petrof, B. J., Shrager, J. B., Stedman, H. H., Kelly, A. M. & Sweeney, H. L. Dystrophin protects the sarcolemma from stresses developed during muscle contraction. Proceedings of the National Academy of Sciences of the United States of America 90, 3710-3714 (1993)) by linking the cortical cytoskeleton to the extracellular matrix (Ibraghimov-Beskrovnaya, O. et al. Primary structure of dystrophin-associated glycoproteins linking dystrophin to the extracellular matrix. Nature 355, 696-702, doi:10.1038/355696a0 (1992)). Most patients with DMD have multi-exon frame-shifting deletions, while many with the milder allelic disease Becker MD have frame-preserving mutations that change the length of dystrophin's 150 nm rod domain (Monaco, A. P., Bertelson, C. J., Liechti-Gallati, S., Moser, H. & Kunkel, L. M. An explanation for the phenotypic differences between patients bearing partial deletions of the DMD locus. Genomics 2, 90-95 (1988); and Koenig, M. et al. The molecular basis for Duchenne versus Becker muscular dystrophy: correlation of severity with type of deletion. American journal of human genetics 45, 498-506 (1989)). Our analysis of the deep evolutionary history of dystrophin suggests that the rod domain was coopted from a longer cytoskeletal protein, and arose prior to the emergence of powerful striated muscle (Example 1). Here we show that a codon-optimized synthetic transgene encoding a non-immunogenic, 25 nm substitute for dystrophin, rationally designed from the paralogous protein utrophin (Tinsley, J. M. et al. Primary structure of dystrophin-related protein. Nature 360, 591-593, doi: 10.1038/360591a0 (1992)) to preserve the tensile strength of the miniaturized rod domain, prevents the most deleterious histological and physiological aspects of muscular dystrophy in animal models. Following systemic administration of an AAV vector to neonatal dystrophin-deficient mdx mice, all histological and biochemical markers of myonecrosis and regeneration are completely suppressed throughout growth to adult weight. In dystrophin-deficient dogs similarly treated at up to 4 kg body weight, systemic distribution and expression of the transgene prevented myonecrosis without cell mediated immune recognition of the protein product, suggesting protection by central immunological tolerance to full-length utrophin. These findings support a model in which tensile strength is the essential feature of the dystrophin and utrophin rods, with their 150 nm length in most lineages preserved by purifying selection against mutations that reduce length at the expense of strength.

Although internally deleted vectors derived from human adenoviruses have been used to achieve somatic transfer of 12 kb cDNAs encoding full length dystrophin, this approach has been abandoned because of the immunogenicity and limited biodistribution of the complex vector capsid (Clemens, P. R. et al. In vivo muscle gene transfer of full-length dystrophin with an adenoviral vector that lacks all viral genes. Gene therapy 3, 965-972 (1996)). Multiple vectors derived from human adeno-associated viruses (AAVs) have been shown to facilitate systemic gene transfer (Wang, B., et al. Adeno-associated virus vector carrying human minidystrophin genes effectively ameliorates muscular dystrophy in mdx mouse model. Proc Natl Acad Sci USA 97, 13714-13719. (2000); Harper, S. Q. et al. Modular flexibility of dystrophin: implications for gene therapy of Duchenne muscular dystrophy. Nat Med 8, 253-261. (2002); Gregorevic, P. et al. Systemic delivery of genes to striated muscles using adeno-associated viral vectors. Nat Med 10, 828-834 (2004); and Gregorevic, P. et al. rAAV6-microdystrophin preserves muscle function and extends lifespan in severely dystrophic mice. Nat Med 12, 787-789 (2006)), but their cloning capacity is limited to that of the wild type virus, approximately 5 kb. An equally important second constraint on gene therapy for DMD is the deletional nature of the protein deficiency in most patients, with the potential for recombinant dystrophin as a "non-self" protein (Mendell, J. R. et al. Dystrophin immunity in Duchenne's muscular dystrophy. N Engl J Med 363, 1429-1437 (2010)) to trigger chronic autoimmune myositis. We hypothesized that detailed analysis of the molecular evolution of dystrophin might inform a synthetic biology approach to both of these constraints by revealing previously un-appreciated aspects of the protein's historical legacy. Our reconstruction of the remote history of dystrophin suggested that at the protein's inception, its rod domain contained 24 repeats of the "spectrin-like" triple helical domain coopted from an N-terminal portion of another much larger strut-like cytoskeletal protein (Example 1). Crystal structures of triple helical repeats from dystrophin, utrophin, and a closely related spectroplakin suggest that amino-acid side-chain interactions between adjacent repeats create an interlocking interface critical to the strength of the rod. This principle may explain the phenotypes resulting from in-frame deletions and duplications in BMD patients and the rarity of deletions in chordate paralogs (e.g. Lamprey) as most disruptions of the native sequence of triple helical repeats have the potential to focally weaken the rod domain. To minimize the risk of creating a "weakest link", we focused on deletions flanked on one side by the disordered domain classically labeled as "Hinge 2", and also deleted C-terminal sequences beyond the approximate end of the ZZ domain (Ishikawa-Sakurai, M., Yoshida, M., Imamura, M., Davies, K. E. & Ozawa, E. ZZ domain is essentially required for the physiological binding of dystrophin and utrophin to beta-dystroglycan. Hum Mol Genet 13, 693-702, (2004); Hnia, K. et al. ZZ domain of dystrophin and utrophin: topology and mapping of a beta-dystroglycan interaction site. Biochem J 401, 667-677, (2007)). To take advantage of central immunological tolerance achieved through early developmental expression in the thymus (Mesnard-Rouiller, L., et al. Thymic myoid cells express high levels of muscle genes. J Neuroimmunol 148, 97-105, 2003), we mapped these deletions in dystrophin onto the paralogous protein utrophin, which diverged from dystrophin early in vertebrate evolution. Based on these considerations we synthesized transgenes based on the wild-type utrophin mRNA sequences, and then improved expression using an engineered version of the sequence. Here we report on the results obtained in blinded pre-clinical studies using vectors based on AAV9 and the derived ancestral capsid "Anc80" to systemically deliver a 3.5 kb synthetic transgene (AAV9-µU, AAV9-µUtrophin) to all striated muscles.

Figures 7A, 7B:
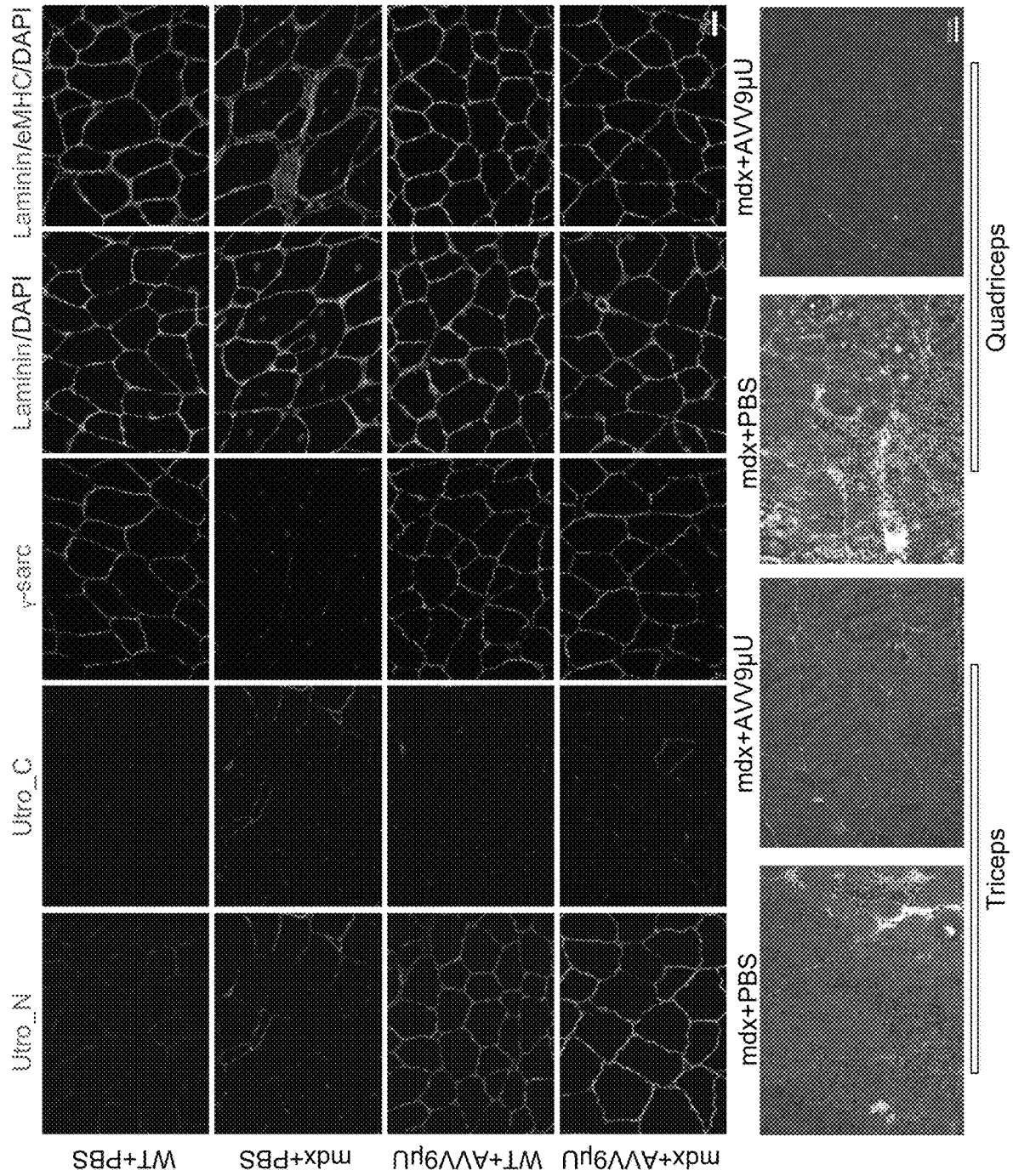
FIG. 7A to FIG. 7F show that widespread transduction restores the Dystrophin Associated Protein Complex, prevents myofiber degeneration, normalizes serum CK level and improves muscle function in AAV9-µUtrophin treated mdx mice.
Figure 7D:
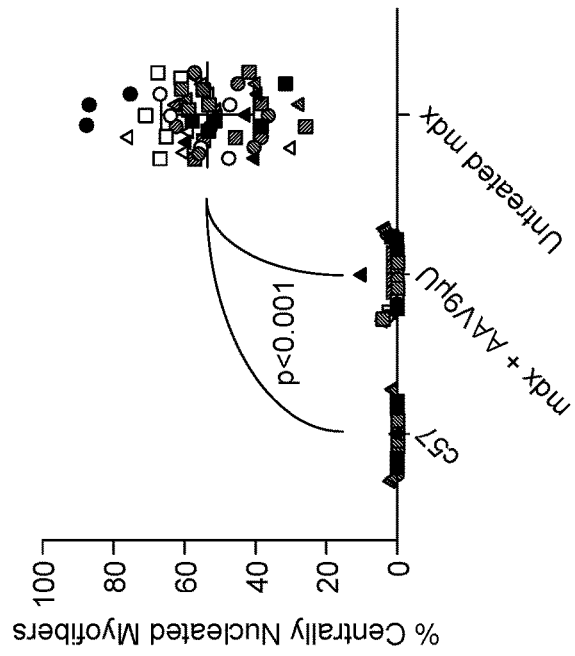
Figure 7C:
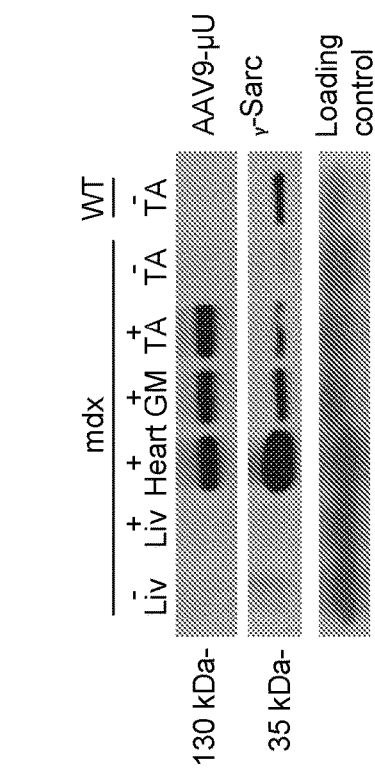
Figure 9A:
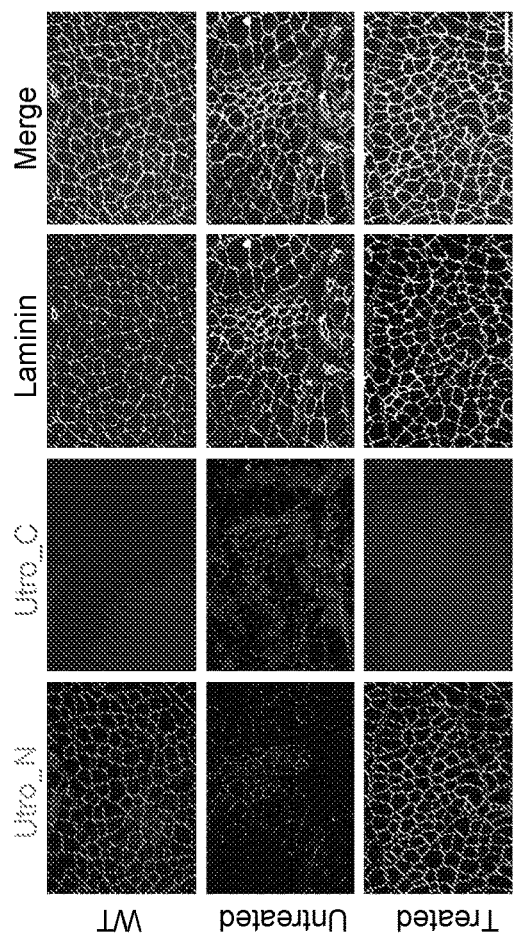
FIG. 9A to FIG. 9D show that widespread expression of µUtrophin rescues the dystrophin-associated protein complex proteins in treated GRMD dogs after systemic delivery at age of 7 weeks.

We initially performed intraperitoneal injections of doses up to $2.5 \times 10^{12}$ vg of AAV-µUtrophin into neonatal mdx mice weighing about 5 gm, and investigated the degree of myoprotection throughout muscle development. In these randomized, blinded studies, we observed equivalent global biodistribution to muscle with both AAV9 and Anc80, and both were well tolerated in mice without any signs of toxicity (FIG. 7A-FIG. 7C). At the $2.5 \times 10^{12}$ vg/mouse dose, recombinant µUtrophin was expressed at a level sufficient for qualitatively complete suppression of all tested histological signs of muscular dystrophy, including myofiber centronucleation (FIG. 7A and FIG. 7D), embryonic myosin heavy chain expression (FIG. 7A and FIG. 7B), native utrophin upregulation (FIG. 7A and FIG. 9A), MURF1 expression as a marker of protein degradation, myonuclear apoptosis (data not shown), ongoing myonecrosis, and mononuclear cell infiltration (FIG. 7B). Of these signs, centronucleation is quantitatively the most sensitive indicator of myoprotection in mdx mice since it reflects previous cycles of regeneration. For the first time, we demonstrate normalization (or prevention) of centronucleation to a level biologically indistinguishable from wild type (FIG. 7D). This observed myoprotection was associated with sustained normalization of the dystrophin-associated glycoprotein complex (DGC) in the sarcolemma of cardiac and skeletal muscles (FIG. 7A). Western blot analysis further confirmed that expressed µUtrophin protein was sufficient to stabilize the DGC (FIG. 7C). Sustained expression of µUtrophin in skeletal and cardiac muscles was observed throughout a 4-month period post vector delivery (the end point of study), indicating the durable level of myoprotection conferred by the single-dose treatment. Strikingly, creatine kinase, a biomarker that reflects sarcolemmal permeability, was statistically indistinguishable from that of wild type mice (FIG. 7E), suggesting that codon optimization and recombinant protein over-expression early in development improved the response relative to administration of alternative transgenes via tail vein injection after the onset of myopathology (Gregorevic, P. et al. Systemic delivery of genes to striated muscles using adeno-associated viral vectors. Nat Med 10, 828-834, 2004; Odom, G. L., e al. Microutrophin delivery through rAAV6 increases lifespan and improves muscle function in dystrophic dystrophin/utrophin-deficient mice. Mol Ther 16, 1539-1545, 2008; Kennedy, T. L. et al. Micro-utrophin Improves Cardiac and Skeletal Muscle Function of Severely Affected D2/mdx Mice. Mol Ther Methods Clin Dev 11, 92-105, 2018).

Figure 7F:
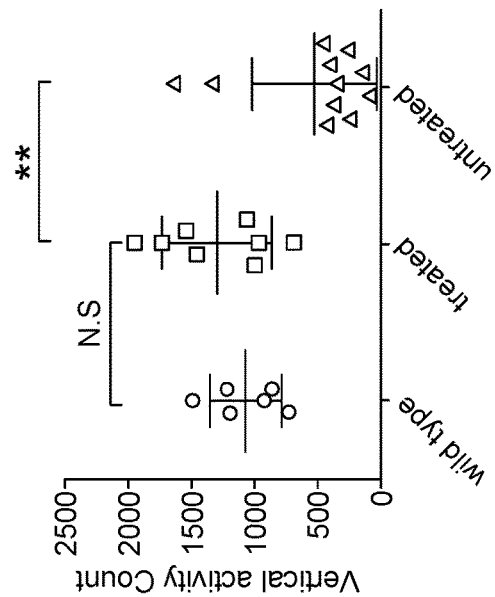
Figure 7E:
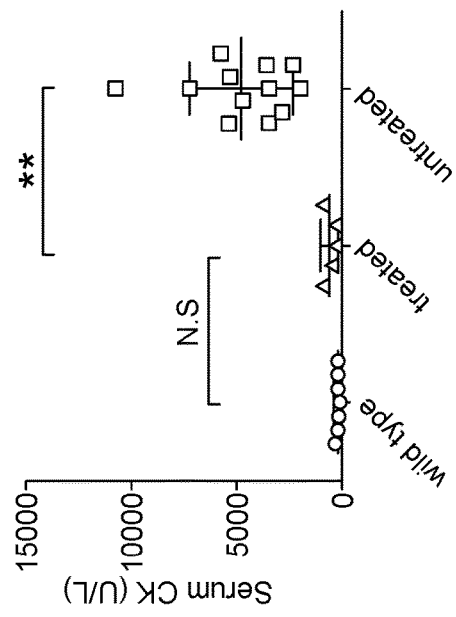

To test whether AAV9-µUtrophin confers functional improvement in mdx mice, we utilized an established hybrid assay which links force grip testing with a volitional component in which we non-invasively measure animals' post-force grip vertical activity (Song, Y. et al. Suite of clinically relevant functional assays to address therapeutic efficacy and disease mechanism in the dystrophic mdx mouse. J Appl Physiol 122, 593-602, 2017). Our previous studies show that this hybrid test provides one of the most sensitive, clinically relevant parameters distinguishing mdx and wild-type mice, capturing behavior causally linked to the exaggerated fatigue response of dystrophin-deficient muscle (Kobayashi, Y. M. et al. Sarcolemma-localized nNOS is required to maintain activity after mild exercise. Nature 456, 511-515, 2008). This test demonstrated an objective, dramatic, and statistically significant difference between untreated and AAV9-µUtrophin treated mdx mice, while the latter group was indistinguishable from wild type mice (FIG. 7F). Also, treated mdx mice showed not only increased voluntary wheel (8 weeks) and downhill treadmill running (16 weeks) distances relative to the untreated mice, but their ex vivo isolated EDL muscles displayed enhanced resistance to eccentric contraction-induced injury as well as enhanced muscle performance in vivo by force grip testing. These findings suggest that early over-expression of µUtrophin is capable of full phenotypic amelioration in the absence of full-length dystrophin, despite the comparatively short length of the reverse-engineered protein's rod-like linkage to the actin cytoskeleton and the lack of an R16-17 nNOS-binding motif.

These results raised the hope of achieving full, rather than BMD-like partial reversal of the pathophysiology of DMD through systemic muscle transduction; however, it was not clear whether scale-dependent differences between small and large dystrophic animals would reveal limitations to this approach. The histological and immunological consequences of µUtrophin gene transfer were further investigated in a blinded study in which five Golden Retriever Muscular Dystrophy (GRMD) dogs 4-7 days of age were randomized to intravenous administration of AAV9-µUtrophin at doses of $1\times10^{13}$ and $3.2\times10^{13}$ vg/kg at time of injection, without immunosuppression. Six weeks post-injection we observed robust Utrophin expression and stabilization of wild type levels of sarcoglycan expression in the sarcolemma (data not shown). In addition, these treated dogs achieved a fourfold increase in weight similar to that of carrier females, in contrast to the previously reported weight decrement associated with immune myositis following systemic administration of xenogenic human dystrophin in the same GRMD model Kornegay, J. N. et al. Widespread muscle expression of an AAV9 human mini-dystrophin vector after intravenous injection in neonatal dystrophin-deficient dogs. Mol Ther 18, 1501-1508, 2010). This sustained µUtrophin expression was associated with visibly reduced levels of myonecrosis, mononuclear infiltration normalization of myofiber minimal Feret diameter (data not shown). At 5 and 8 weeks post-vector administration, canine interferon-γ ELISpot assays revealed no cell-mediated immunity against either the AAV capsid or the µUtrophin transgene product in our non-immunosuppressed treated GRMD dogs (data not shown). The major limitation of this proof-of-concept study stems from the 1000-fold difference between the adult weight of mdx mice and GRMD dogs, 25 g and 25 kg respectively, limiting our achievable AAV9 dose in the dog to $2.0\times10^{12}$ vg/kg based on anticipated adult weight. At this dose, the dogs would inevitably "outgrow" the vector, as did mdx mice treated with $2.15\times10^{11}$ vg as 5 gm neonates (data not shown). We therefore focused on relatively early histological analysis to detect recombinant µUtrophin expression, myocyte protection and the immune response to systemic vector administration.

Figures 8E, 8F, 8G:
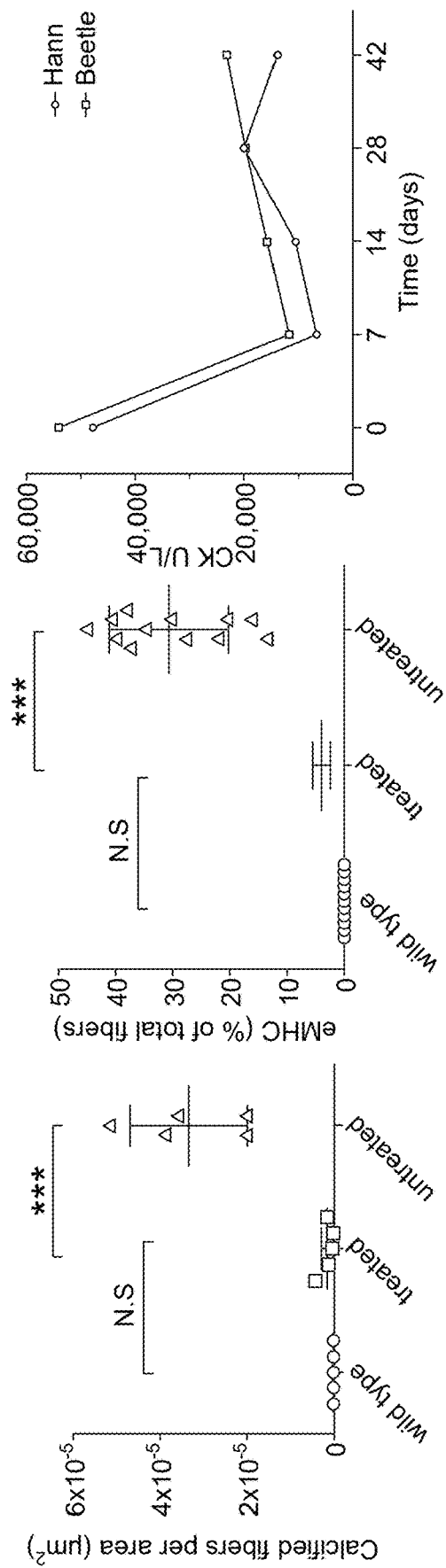
Figure 9B:
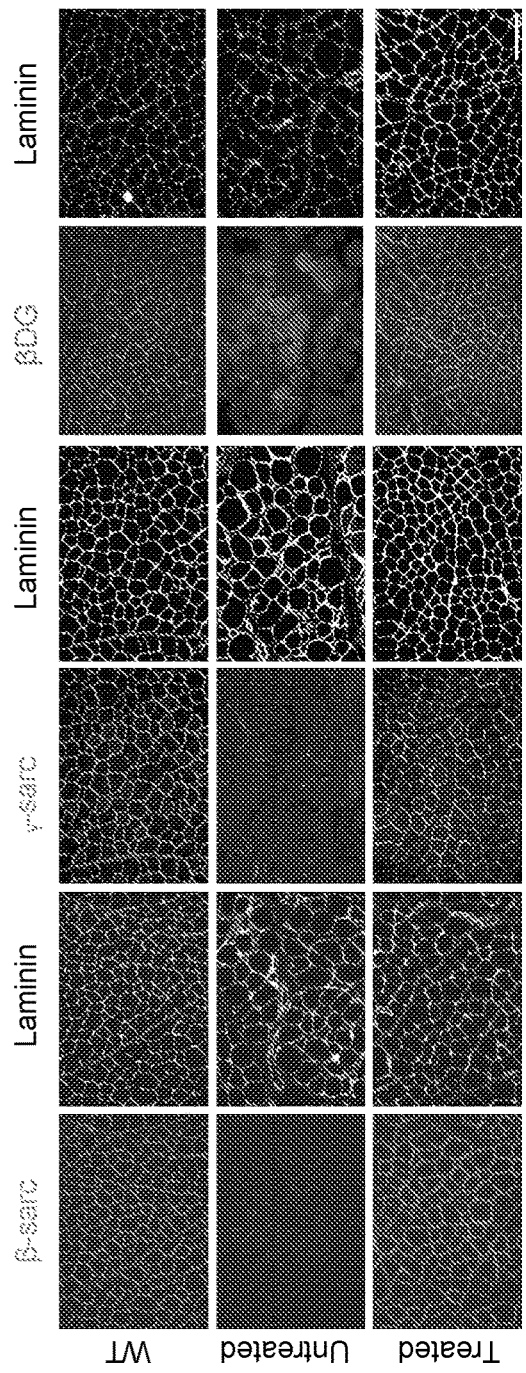
Figures 9C, 9D:
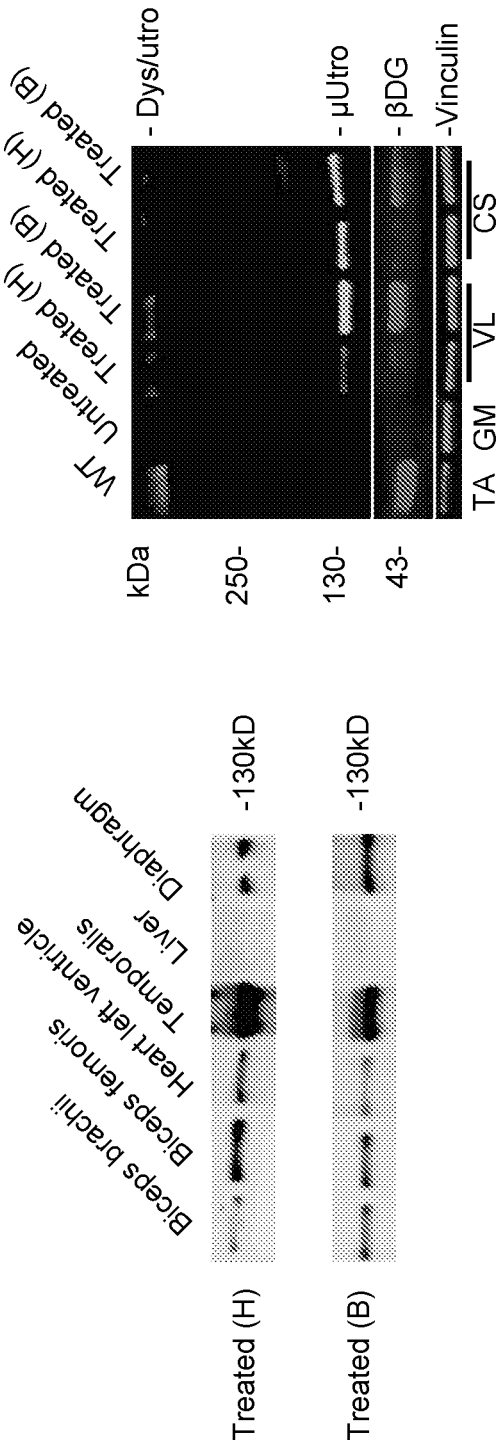

Our neonatal approach both offers the possibility of early preventative treatment before the onset of irreversible muscle damage and minimizes the risk of immune reaction against vector capsid antigens, as memory T cells recognizing the wild type AAV develop through serial environmental exposure Nichols, T. et al. Translational Data from AAV-Mediated Gene Therapy of Hemophilia B in Dogs. Hum Gene Ther Clin Dev, 2014; Calcedo, R. et al. Adeno-associated virus antibody profiles in newborns, children, and adolescents. Clin Vaccine Immunol 18, 1586-1588, 2011). However, the majority of DMD patients are typically diagnosed after the age of two, by which time massive muscle fiber degeneration, necrosis with mononuclear cell invasion, and increased fiber size variability have already occurred (Yiu, E. M. & Kornberg, A. J. Duchenne muscular dystrophy. Journal of paediatrics and child health 51, 759-764, 2015). To explore the feasibility of our approach in young boys with DMD, two juvenile GRMD dogs at 7.5 weeks of age (Hann and Beetle) were injected intravenously with AAV9-µUtrophin at a dose as high as $1.25\times10^{14}$ vg/kg at time of injection, during transient use of an anti-inflammatory dose of prednisone, 1 mg/kg daily (Liu, J. M. et al. Effects of prednisone in canine muscular dystrophy. Muscle Nerve 30, 767-773, 2004) (FIG. 8A). Immunostaining of muscle biopsies, taken four weeks post-injection, showed homogeneous sarcolemmal expression of µUtrophin (FIG. 9A and data not shown), suppression of native utrophin (FIG. 9A), as well as rescue of the DGC (FIG. 9B). This was further confirmed by western blot (FIG. 9D).

Figures 10A, 10B:
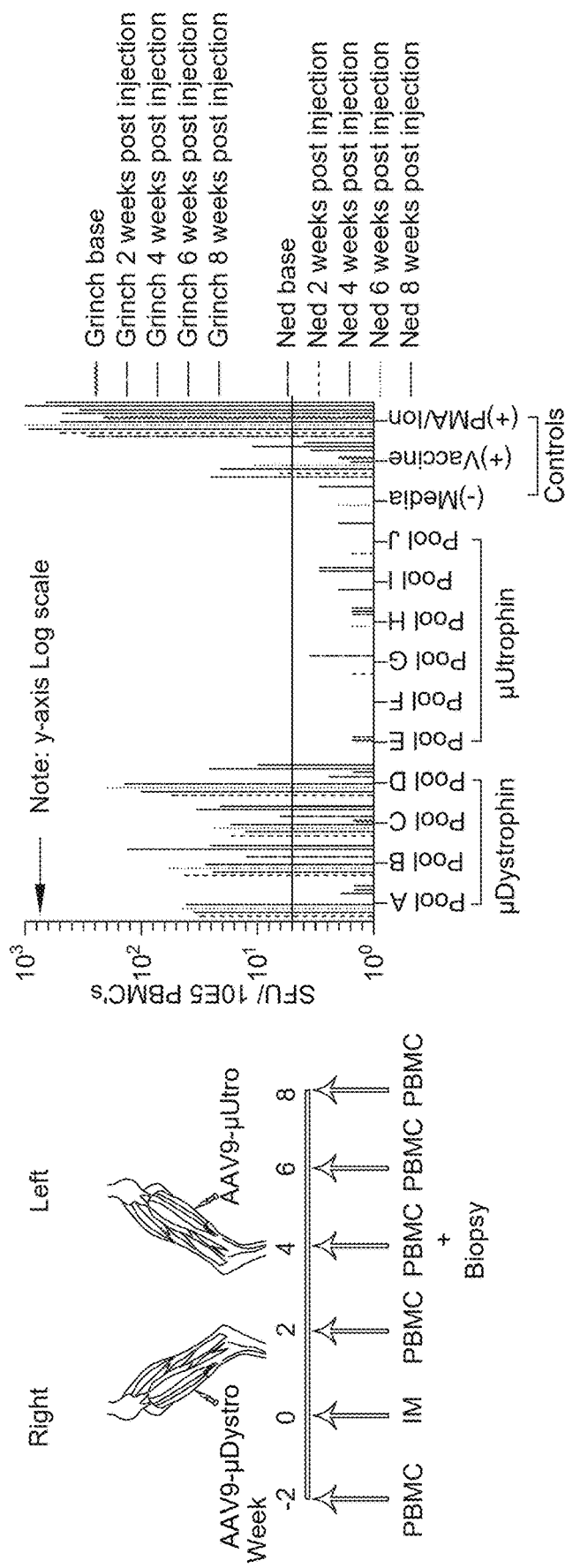

Histopathological characterization of limb muscle from treated GRMD dogs demonstrates near-complete suppression of ongoing muscle injury, as evidenced in untreated age-matched controls by a high rate of myonecrotic fibers, excessive calcium accumulation (FIG. 8C and FIG. 8E), clustered regenerating muscle fibers (FIG. 8D and FIG. 8F), abundant inflammatory cell infiltration and fat infiltration (FIG. 10B and data not shown). Impressively, AAV9-µUtrophin treated dogs also showed nearly complete prevention of muscle degeneration and regeneration in masticatory muscles (FIG. 8B and data not shown), which are severely affected in untreated dogs because they express the uniquely powerful MYH16 myosin isoform (Stedman, H. H. et al. Myosin gene mutation correlates with anatomical changes in the human lineage. Nature 428, 415-418 (2004); Toniolo, L. et al. Masticatory myosin unveiled: first determination of contractile parameters of muscle fibers from carnivore jaw muscles. Am J Physiol Cell Physiol 295, C1535-1542 (2008)). Further western blot analysis at necropsy (3.5 months of age) showed persistent widespread expression of µUtrophin in skeletal and cardiac muscle (FIG. 9C). Consistent with our previous GRMD neonatal dog studies, interferon-γ ELISpot assays revealed no signal above background against µUtrophin (data not shown), Furthermore, no signs of severe acute toxicity were seen, in contrast to previous studies in GRMD dogs and non-human primates (Kornegay, J. N. et al. Widespread muscle expression of an AAV9 human mini-dystrophin vector after intravenous injection in neonatal dystrophin-deficient dogs. Mol Ther 18, 1501-1508 (2010); Hinderer, C. et al. Severe Toxicity in Nonhuman Primates and Piglets Following High-Dose Intravenous Administration of an Adeno-Associated Virus Vector Expressing Human SMN. Hum Gene Ther, (2018); Hordeaux, J. et al. The Neurotropic Properties of AAV-PHP.B Are Limited to C57BL/6J Mice. Mol Ther, (2018)). Importantly, an 80% drop in serum CK levels was measured 1 week post-infusion with AAV9-µUtrophin in both dogs (FIG. 8G), a finding that is consistent with observed histological improvements. In order to achieve durable myoprotection throughout muscle growth from infancy to skeletal maturity, dystrophic dogs and boys with DMD may require systemic administration of AAV vector at doses proportional to those required in mdx mouse pups to maintain robust, homogeneous expression in the most severely affected muscle, the diaphragm (Stedman, H. H. et al. The mdx mouse diaphragm reproduces the degenerative changes of Duchenne muscular dystrophy. Nature 352, 536-539, (1991)), e.g. $1\times10^{15}$ vg/kg neonatal body weight (data not shown).

Figures 10C, 10D:
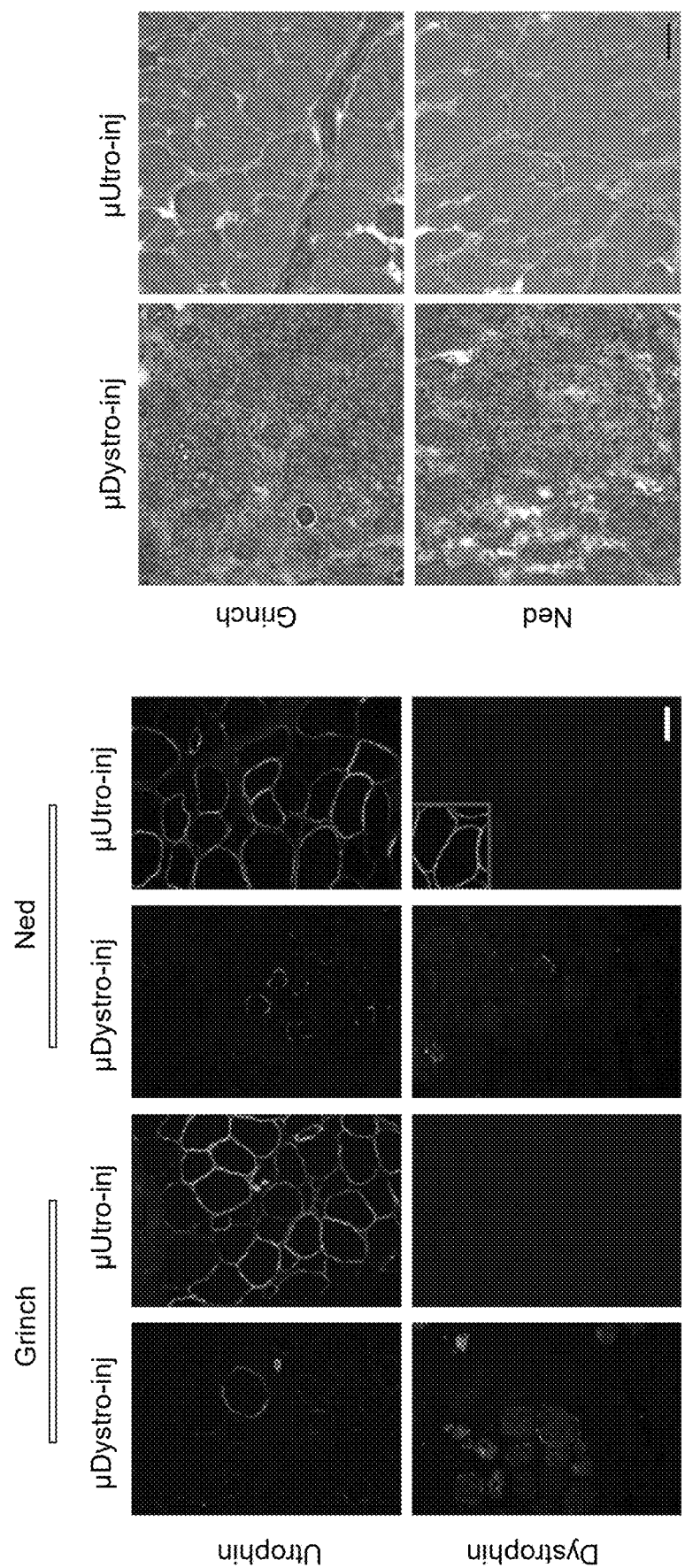
Figure 11:
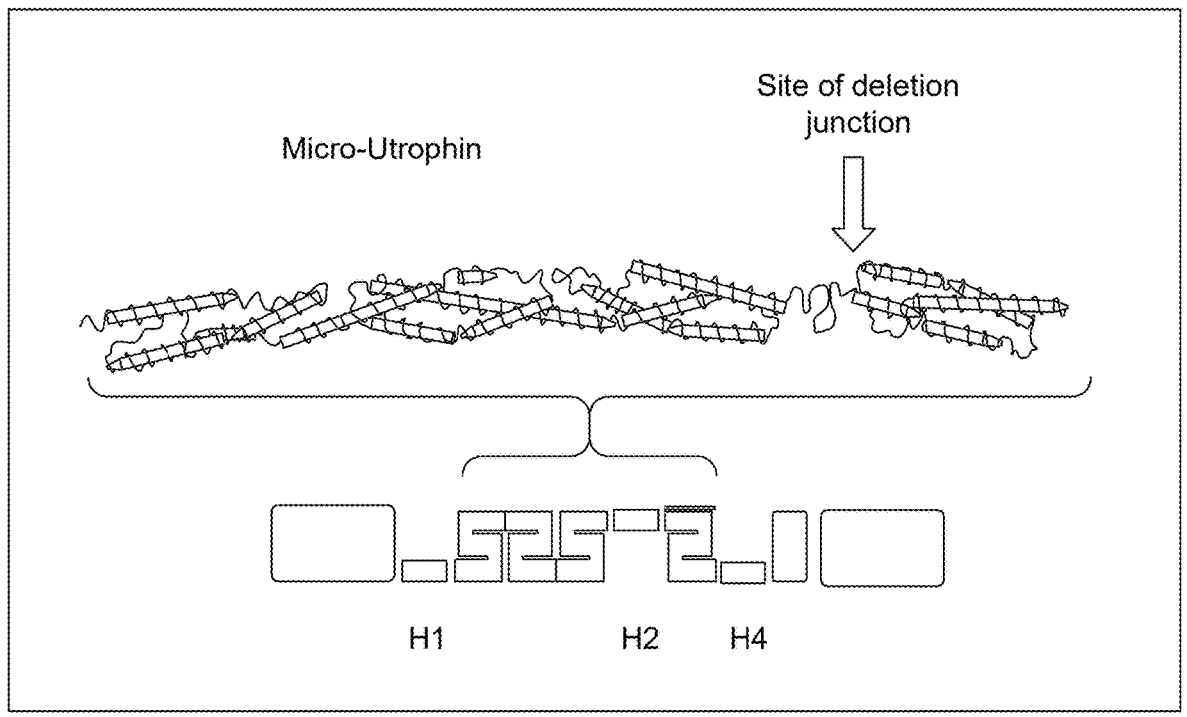
Figure 12A:
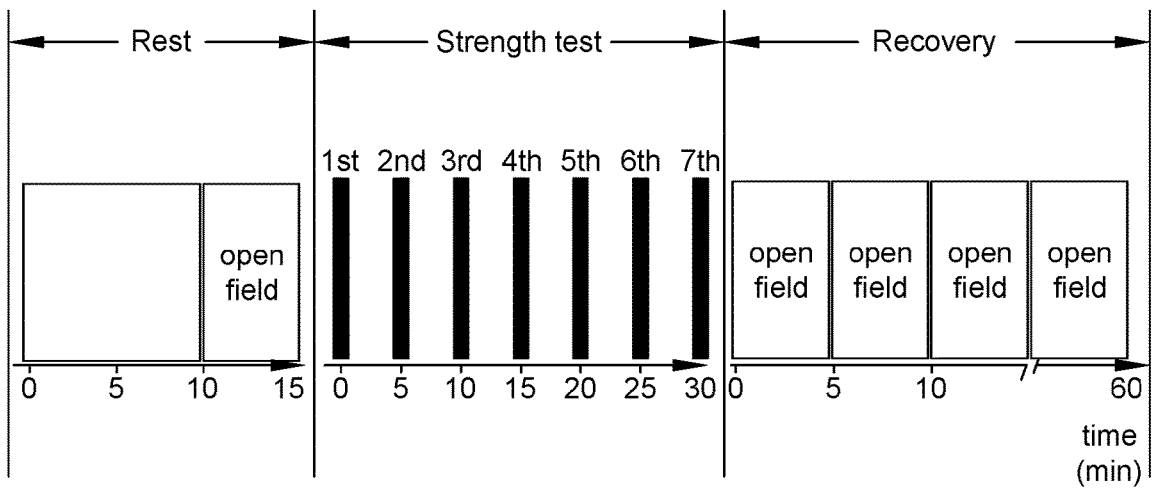
FIG. 12A to FIG. 12D provide a design of a hybrid test: vertical activity monitoring and the whole limb force test.
Figure 12B:
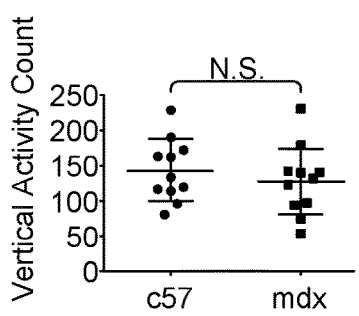
Figure 12C:
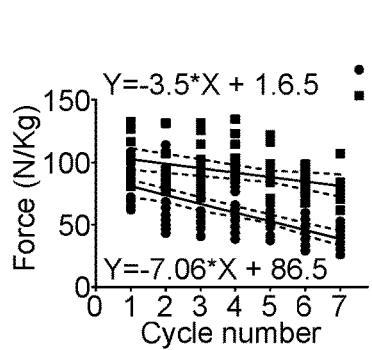
Figure 12D:
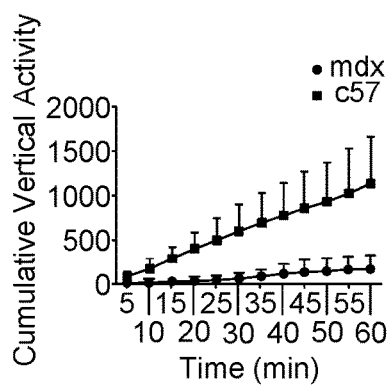
Figure 13:
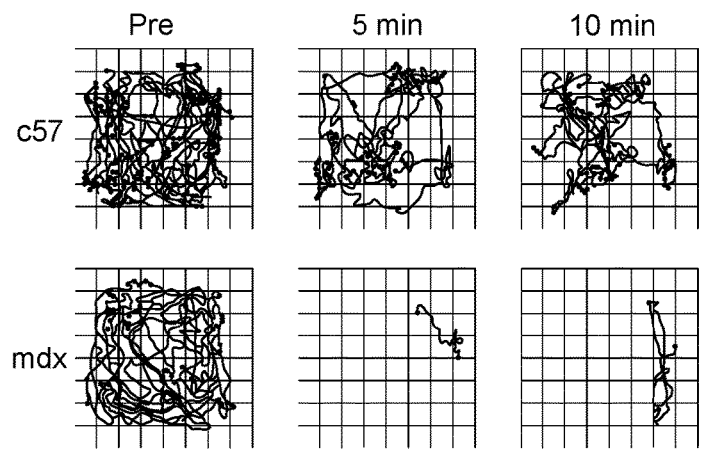
FIG. 13 provides a visual representation of the locomotor activity of both c57 and mdx mice for 5 min before the whole limb force test (Pre), as well as the first 5 min and the second 5 min after the force test. Lines represent horizontal activity, and dots represent vertical activity.

For the rigorous preclinical assessment of vector and/or transgene immunotoxicity, we took advantage of the unique German Shorthaired Pointer (GSHPMD) deletional-null canine model (Schatzberg, S. J. et al. Molecular analysis of a spontaneous dystrophin 'knockout' dog. Neuromuscul Disord 9, 289-295. (1999); VanBelzen, D. J. et al. Mechanism of Deletion Removing All Dystrophin Exons in a Canine Model for DMD Implicates Concerted Evolution of X Chromosome Pseudogenes. Mol Ther Methods Clin Dev 4, 62-71, (2017)). The GSHPMD provides a superior platform for the study of central tolerance, since alternative splicing in the GRMD model allows detectable read-through of near-full-length dystrophin at potentially tolerizing levels, as might be expected to facilitate previously demonstrated therapeutic, long term body-wide expression of AAV-encoded canine microdystrophins (Schatzberg, S. J. et al. Alternative dystrophin gene transcripts in golden retriever muscular dystrophy. Muscle Nerve 21, 991-998. (1998); Yue, Y. et al. Safe and bodywide muscle transduction in young adult Duchenne muscular dystrophy dogs with adeno-associated virus. Hum Mol Genet 24, 5880-5890, (2015); Le Guiner, C. et al. Long-term microdystrophin gene therapy is effective in a canine model of Duchenne muscular dystrophy. Nat Commun 8, 16105, (2017)). Adult GSHPMD dogs (Ned and Grinch) each received equivalent doses ($2\times10^{12}$ vg/kg) of both AAV9-µDystrophin and AAV9-µUtrophin via intramuscular injection into contralateral tibialis compartments (FIG. 10A). Interferon-γ detection via ELISPOT revealed the presence of a strong systemic cell-mediated immune response against µDystrophin, as early as 2 weeks post-injection, but not to µUtrophin despite expression from the constitutive CMV promoter, indicating the strength of central immunological tolerance (FIG. 10B). Immunostaining of muscle biopsies collected 4 weeks post-injection revealed persistent expression of µUtrophin, but only sparse amounts of µDystrophin (FIG. 10C). H&E showed severe inflammation and mononuclear cell infiltration on the µDystrophin-injected side compared to their virtual absence on the µUtrophin-injected side (FIG. 10D and data not shown). These findings indicate that the observed immune response is driven by µDystrophin and not the vector capsid, as equivalent doses of vector were injected to both limbs.

In summary, after leveraging a comparative phylogenomic approach to identify evolutionary constraints, we have reverse-engineered a highly therapeutic, 3.5 kb synthetic transgene for safe systemic delivery to muscles of murine and canine models for DMD. Our blinded studies reveal surprisingly complete myoprotection as long as the initial level of gene delivery is sufficient to accommodate subsequent muscle growth. Taken together, these findings may refocus the field towards the use of a functionally optimized, non-immunogenic Utrophin-based gene therapy approach as a treatment for Duchenne Muscular Dystrophy.

B. Materials and Methods a. Bioinformatics and Phylogenetic Analysis

Publicly available genomic DNA sequences for species listed in figure legends and manuscript text were queried by multiple blast algorithms, in particular tBLASTn26,27, to identify the coding sequences homologous to the full-length human dystrophin and utrophin. For most species, supporting evidence from mRNA sequences was available to define intron/exon boundaries. Where such evidence was lacking, FGENESH+ (Softberry) was used with organism specific gene-finding parameters and Hidden Markov Model plus similar protein-based gene prediction to identify putative coding sequences from assembled contigs. As an internal test of this approach, virtually all transcriptome-defined coding sequences were properly identified by the FGENESH+ program28. We recognize that these mRNA and protein sequence files are missing sporadic exons in indeterminate regions of publicly available genomic DNA. HMMER (hmmer.janelia.org/search/hmmscan) was used with E-value defined cut-offs to define protein coding domains matching Hidden Markov Models for calponin homology, spectrin-like repeat, WW, EF hand, and ZZ domains. All deduced peptide sequence files were aligned by ClustalW using the default settings in MacVector version 13.5.1: Gonnet Series Matrix with parameters for pairwise alignment open gap penalty of 10, extend gap penalty of 0.1 and parameters for multiple alignment open gap series 10, extend gap penalty of 0.2 and delay divergence 30%. Phylogenetic reconstructions were generated with both full length and truncated sequences using the neighbor-joining tree building method with ties in trees resolved randomly and distances Poisson-corrected with gaps distributed proportionally or ignored to establish whether the choice impacted on tree topology. In all such cases, tree topology was insensitive to the management of gaps when the "best tree" mode was selected. Alternative use of the bootstrap mode, with 10000 replications, confirmed all nodes in the distance phylograms. Protein and DNA matrix analyses were based on the pam250 scoring matrix. Abbreviations used: Purple sea urchin, *Strongylocentrotus purpuratus*, S. pur; Amphioxus, *Branchiostoma floridae*, B. flo; Elephant shark, *Callorhinchus milii*, C. mil; Chinese alligator, *Alligator sinensis*, A. sin; Mouse, *Mus musculus*, M. mus; Dog, *Canis familiaris*, C. fam; Human, *Homo sapiens*, H. sap; Carolina anole, *Anolis carolinensis*, A. car; common chimpanzee, *Pan troglodytes*, P. tro; duck-billed platypus, *Ornithorhynchidae anatinus*, O. ana.; Japanese pufferfish, *Takifugu rubripes*, T. rub; tropical clawed frog, *Xenopus tropicalis*, X. tro; D—dystrophin; U—utrophin.

b. Microutrophin Transgene Design and Vector Production

Based on phylogenomic analysis of sequence conservation and genotype-phenotype correlations among BMD/DMD patients, we modeled in silico the spectrum of AAV-encodable miniaturized utrophins that preserve the calponin homology domains, the first three and last three spectrin-like repeats, and the combination of the WW, EF hand, and ZZ domains. To preserve amino acid side chain interactions between interhelical loops of adjacent spectrin-like repeats, we focused on only the subset of µUtrophin in which either the first or last three repeats were preserved intact. To minimize immunogenicity, we considered only those µUtrophin that could be created by the combination of a single internal deletion and a C-terminal truncation. Although the spectrin-like repeats are homologous to a consensus sequence, the divergence is such that no splice could be found between identical decapeptides in any of the mammalian utrophins. Thus, we used profile Hidden Markov Models, as implemented online at hmmer.janelia.org/search/hmmscan, to define and annotate spectrin-like triple helical repeat boundaries in the full length canine utrophin sequence (3456 aa, XP_005615306). We used transgenes encoding proteins matching the canine and human proteins in neonatal mice, in which antigen-specific tolerance is easily induced by intraperitoneal injection of AAV45, but only the canine versions in neonatal and older dogs in which tolerance is anticipated to require earlier prenatal exposure to the isogenic native protein during immune ontogeny (Davey, M. G. et al. Induction of Immune Tolerance to Foreign Protein via Adeno-Associated Viral Vector Gene Transfer in Mid-Gestation Fetal Sheep. PLoS One 12, e0171132, (2017)). The µUtrophin transgene was designed to contain the actin binding domain, triple helical repeats 1-3 and 22, a disordered, proline-rich region approximating that previously identified as "hinge" 2, and the C-terminal WW, EF hand, and ZZ domains, thus creating a recombinant protein designed to match the canine and human utrophin sequence with the exception of a single splice site at the deletion junction, thereby minimizing potential immunogenicity in dystrophin deficient dogs and ultimately humans relative to previously reported transgenes (Wang, B., et al. Adeno-associated virus vector carrying human minidystrophin genes effectively ameliorates muscular dystrophy in mdx mouse model. Proc Natl Acad Sci USA 97, 13714-13719. (2000); Harper, S. Q. et al. Modular flexibility of dystrophin: implications for gene therapy of Duchenne muscular dystrophy. Nat Med 8, 253-261. (2002); Gregorevic, P. et al. Systemic delivery of genes to striated muscles using adeno-associated viral vectors. Nat Med 10, 828-834 (2004); Gregorevic, P. et al. rAAV6-microdystrophin preserves muscle function and extends lifespan in severely dystrophic mice. Nat Med 12, 787-789 (2006); and Odom, G. L., et al. Microutrophin delivery through rAAV6 increases lifespan and improves muscle function in dystrophic dystrophin/utrophin-deficient mice. Mol Ther 16, 1539-1545 (2008)). The coding sequence chosen for use in our studies was selected as the highest-expressing candidate of a pool of cDNAs that were optimized and synthesized by competing biotech companies (GeneArt and DNA 2.0). Expression was determined by immunofluorescence staining and western blotting following electroporation of 50 g DNA in tibialis anterior muscle of mdx mice. The synthetic coding sequence chosen for further use was found to drive expression approximately 30-fold higher in in vitro and in vivo assays than the wild type canine cDNA sequence encoding a recombinant protein of identical primary structure. A notable difference between the best synthetic cDNA and the wild type is the level of codon bias, with only the optimized synthetic cDNA closely matching the extreme bias of the mammalian myosin heavy chains (e.g. 154 CTG leucines, 0 TTA leucines). The synthetic canine µUtrophin cDNA was subcloned into an AAV2 expression vector cassette driven by an 833 bp fragment of the CMV immediate early enhancer/promoter or a synthetic promoter spc5-12 (CMV and SP, respectively). AAV9 vectors were generated and purified by the University of Pennsylvania preclinical vector core using the triple transfection method in HEK 293 cells as previously described (Vandenberghe, L. H. et al. Efficient serotype-dependent release of functional vector into the culture medium during adeno-associated virus manufacturing. Hum Gene Ther 21, 1251-1257, doi: 10.1089/hum.2010.107 (2010)). Vector preparations were assayed for quality, purity and endotoxin levels prior to pooling for injection of $2 \times 10^{11}$ AAV9 µUtrophin vg into the tibialis anterior muscles of mdx mice (Lock, M., et al. Analysis of particle content of recombinant adenoassociated virus serotype 8 vectors by ion-exchange chromatography. Hum Gene Ther Methods, 23, 56-64, doi:10.1089/hgtb.2011.217 [pii]).

c. Animals—General

The Animal Care and Use Committee of the A&M University and the University of Pennsylvania approved all animal experiment protocols in mice and dogs.

d. Murine Model Vector Administration

Mouse strains C57BL/10SnJ and mdx were purchased from the Jackson laboratory (Bar Harbor, ME). This study involved 23 C57BL/10SnJ mice and 30 mdx mice, all injected at 9±2 days of age. Prior to receiving intraperitoneal injection of AAV9 µUtrophin or Phosphate Buffered Saline (PBS), individual pups were toe-tattooed with the Aramis Micro tattoo kit (Ketchum Manufacturing Inc, Canada) and randomly assigned to different dosage groups. Investigators were blinded during all injections and tissue harvesting. Based on this protocol, C57BL/10SnJ and mdx pups were injected with 50-250 1 of either PBS as negative control or AAV9 µUtrophin diluted in PBS via 32-gauge insulin syringe. Prior to injection, each mouse was weighed. After vector administration, all mice were returned to their litters and separated after weaning.

e. Murine Model Tissue Procurement and Storage

At approximately 8 weeks of age, mdx and C57BL/10SnJ mice underwent $CO_2$ euthanasia in accordance with the institutional policy. The heart, tibialis anterior, gastrocnemius, quadriceps, triceps, abdominal, diaphragm, temporalis muscles, and liver were harvested and further processed; others were stored but not utilized based on studies showing <100-fold lower off-target gene expression in AAV9 in mice Zincarelli, C. et al. Analysis of AAV serotypes 1-9 mediated gene expression and tropism in mice after systemic injection. Mol Ther 16, 1073-1080 (2008)). Designated histological tissue samples were placed in OCT (Tissue—Tek) containing embedding molds (Richard-Allan Scientific) and rapidly frozen in liquid nitrogen-cooled isopentane. Additional designated biological tissue samples were placed in tissue containers and rapidly frozen in liquid nitrogen. All the specimens were stored at −80° C. Cryosections of 5-7 m thickness were cut on a cryostat (Microm HM550, Thermo Scientific, USA) at −25° C. and mounted on glass slides (Superfrost Plus, Fisher Scientific, USA).

f. Basic Histology—Haematoxylin and Eosin Staining (H&E) and Alizarin Red Staining (ARS)

7 µm thick cross sections were air dried for 15 min at room temperature. Then the slides were stained with Harris' hematoxylin dye for 2.5 minutes, rinsed in distilled water, dipped in 0.1% acetic acid for 15 seconds, followed by a repeat rinse in tap water for 4 mins and counterstaining with 1% eosin for 1 min. As a final step, the slides were dehydrated in ethanol three times, 2 mins each. Representative, non-overlapping high-powered fields (HPF) were photographed for scoring (data now shown). Alizarin red staining was also carried out on 7 m thick cross sections. After 10 min fixation by 10% buffered formalin phosphate, the sections were washed 3×5 min with PBS and incubated with alizarin red dye for 15 min at room temperature. After this procedure, the slides were washed in ethanol 3 times and mounted by cytoseal 60 (Thermo Scientific).

g. Morphometric Analysis

Three groups of mice, C57BL/Sn10J (control), and mdx randomized to either injection with PBS or AAV9 µUtrophin, were studied by investigators blinded to specimen identification. Four to five randomly chosen areas from each tibialis anterior, gastrocnemius, quadriceps, triceps, temporalis and abdominal muscles muscle were stained with H&E and screened with light microscope for quantification of centrally nucleated myofibers. Areas at the myotendonous junctions were excluded from the measurements as they are rich in centrally nucleated fibers in both mdx and controls. In total, 11,649 fibers were evaluated.

h. Immunofluorescence Staining Procedures: N-Terminal and C-Terminal Utrophin Double Staining Sections from all muscle specimens were processed for utrophin immunostaining by using both N-terminal polyclonal (against full-length and recombinant utrophin) as well as C-terminal monoclonal (against full-length utrophin) antibodies. After initial incubation for 20 mins in a 1% solution of Triton X-100 (Roche Diagnostics GmbH, Mannheim, Germany) diluted in 0.01M PBS (Roche Diagnostics GmbH, Mannheim, Germany), the specimens were rinsed three times in PBS for 5 minutes each (3×5 mins). Sections were then incubated in 5% normal donkey serum for 15 mins, followed by an incubation with N-terminal utrophin antibody (N-19, sc-7460, goat polyclonal IgG, Santa Cruz, CA, USA, dilution 1:50) for 60 min at 37° C. After a second cycle 3×5 min PBS wash, the slides were incubated with 5% normal donkey serum for 15 mins in room temperature. The prepared sections were then incubated in donkey anti-goat IgG-FITC (sc-2024, Santa Cruz, CA, USA, dilution 1:300) for 30 min at 37° C. Following a third PBS wash for 3×5 mins, the sections were first incubated with 10% normal goat serum (Invitrogen, Scotland, UK) for 15 mins and then with the C-terminal utrophin antibody (MANCHO7, mouse monoclonal IgG2a, Santa Cruz, CA, USA, dilution 1:25) at 37° C. for 60 mins. After a PBS wash for 3×5 mins and incubation with 10% normal goat serum, the sections were incubated in goat anti-mouse IgG2a-Alexa Fluor® 594 (A-21140, Life Technologies, USA, dilution 1:300) for 30 min at 37° C. The sections were again washed in PBS for 3×5 mins and mounted in Vectashield Mounting Medium (H-1000) (Vector Laboratories, CA, USA) or Mounting Medium with DAPI (H-1500) (Vector Laboratories). Photographs were taken with Leica DM6000B microscope (Leica, Germany).

i. Immunofluorescence Staining Procedures: Double Immunofluorescence Staining for γ-Sarcoglycan/Laminin, MuRF-1/Laminin and MyHC-Embryonic/Laminin The staining procedures for these proteins followed the same protocol as described previously (Song, Y., et al. Effects on contralateral muscles after unilateral electrical muscle stimulation and exercise. PloS one 7, e52230, doi: 10.1371/journal.pone.0052230 (2012)). Rabbit anti-γ-sarcoglycan (NBP1-59744, Novus Biologicals, Littleton, CO), and MURF1 (NBP1-31207, Novus Biologicals, Littleton, CO) polyclonal antibodies were used at a dilution of 1:50 in PBS with Bovine Serum Albumin (BSA). MyHC-embryonic monoclonal antibody (F1.652) (Developmental studies, Hybridoma Bank, Iowa, USA) was used at a dilution of 1:50-1:100 in PBS. Laminin chicken polyclonal antibody (ab14055-50, Abcam, Cambridge, MA, USA) at a dilution of 1:500-1:1000 together with second goat anti-chicken IgY (TR) antibody (ab7116, Abcam, Cambridge, MA, USA, dilution 1:300) were applied to identify muscle fibers. MYH16 rabbit polyclonal antibody peptide sequence was generated using the human canine sequence of MYH16's "Loop 2" region. Peptide Sequence: LLALLFKEEEAPAGS j. TUNEL Assay Sections were initially fixed in 10% buffered formalin phosphate (Fisher Scientific, USA) for 20 min. In situ nick end labeling of fragmented DNA was then performed using TACS 2 TdT Fluorescein apoptosis detection kit (Trevigen, Gaithersburg, MD, USA), as described by the manufacturer's instruction.

k. Serum Creatine Kinase (CK) Assay

Blood serum was collected via venipuncture of the submandibular vein using a 5 mm animal lancet (Goldenrod Animal Lancet, Braintree Scientific, Inc, Braintree, MA). Total of 150 µL were collected in a heparinized blood collection tube (Terumo, Catalog Number: TMLH). The mice were carefully monitored for 30 minutes post blood withdraw to observe for potential signs of distress. CK levels were determined by the Clinical Pathology Laboratory at the Matthew J. Ryan Veterinary Hospital of The University of Pennsylvania.

l. Ex Vivo Evaluation of EDL Muscle Contractile Properties

Ex vivo assessments was performed by Muscle Physiology Assessment Core of The University of Pennsylvania. The physiological properties, including isometric twitch force, isometric tetanic force, and force drop after ECCs, were quantified on freshly isolated EDL muscles from 2 months old mdx mice using an Aurora Mouse 1200A System equipped with Dynamic Muscle Control v.5.3 software. All of these mice had undergone in vivo force grip testing 24 hours prior to euthanasia an ex vivo testing. EDL muscles were maintained in constantly oxygenated Ringer's solution (100 mM NaCl, 4.7 mM KCl, 3.4 mM $CaCl_2$, 1.2 mM $KH_2PO_4$, 1.2 mM $MgSO_4$, 25 mM HEPES and 5.5 mM D-glucose) at 24° C. The twitch stimulation protocol applied was a single stimulus with a duration of 0.2 ms. For measuring tetanic maximal force generation, the same stimulus was repeated at a frequency of 120 Hz for 500 ms. Five min were allowed between two tetanic contractions to ensure muscle recovery. Muscle length was adjusted to obtain the maximal twitch response and this length was measured between the outermost visible tips of the myotendinous junctions and recorded as optimal length (L0). Muscle cross-sectional area (CSA) of EDL muscles were calculated by dividing the muscle mass by the product of the muscle density coefficient (1.06 $g/cm^3$), muscle L0, and the fiber length coefficient (0.45 for EDL). Specific force was determined by normalizing the force to CSA.

After testing the isometric properties of EDL, a series of five eccentric contractions (ECCs—one every five minutes) was applied in cycles beginning with repeated 500 ms isometric contractions followed by stretching the muscle by 10% of $L_0$ while administering a maximal tetanic stimulation. The reported absolute force for each ECC corresponds to the peak force during the isometric phase of the ECC.

m. Vertical Activity & Grip Strength Test

Mice were carefully placed in the open field cage and their baseline vertical activity was determined for five minutes. Mice were then returned to their original cages and allowed to rest for three minutes. An axial force transducer was used to measure force (Vernier LabPro & Vernier Dual-Range Force Sensor ±10N, Beaverton Oregon), while data were collected using the accompanying software (Logger Lite version 1.8.1). All experiments were performed by the same experimenter in a blinded fashion. To reduce chances of bias and to ensure the robustness of the blinded experiment we used the approach as described (Song, Y. et al. Suite of clinically relevant functional assays to address therapeutic efficacy and disease mechanism in the dystrophic mdx mouse. J Appl Physiol 122, 593-602, doi:10.1152/japplphysiol.00776.2016 (2017)).

n. Canine Model

Two groups of dogs were used for our experiment. The first group was bred in a colony at the A&M University and whelped at the University of Pennsylvania. This study involved five affected GRMD dogs and four age matched littermates including one wild type and three carrier females that served as a control group. All dystrophic dogs were identified by elevated serum creatine phosphokinase (CPK) levels and genotyped by PCR assay. All pups were randomly assigned to treatment groups, and the investigators were kept blinded during clinical and histological assessment.

The pups were injected with AAV9 μUtrophin at 6-10 days of age at the dose of $1.0\times10^{13}$ vg/kg and $1.0\times10^{13.5}$ vg/kg via external jugular vein approach. Two pups were injected with low dose AAV9 μUtrophin, two were injected with high dose, and the remaining one was injected with saline only. Each dog was weighed daily for the first 6 weeks and weekly thereafter.

The second canine group involved two GRMD dogs at the age of approximately 7.5 weeks. Three days prior to vector administration, the dogs were placed on oral prednisolone 1 mg/kg regimen for 25 days. AAV9 μUtrophin was injected using the same approach at two different single doses of $1.25\times10^{14}$ vg/kg and $5.0\times10^{13}$ vg/kg respectively. The dogs were randomly assigned to dose and the investigators were kept blinded during the clinical and histological assessments.

Deletional-null German Short Hairpointer (GSHPMD) dogs were bred and housed in Texas A&M University. Two seven year old affected GSHPMD dogs, Ned and Grinch, weighed 21 kg and 24.2 kg respectively, Each dog received five intramuscular injections of AAV9-μDystrophin (Right) and AAV9-μUtrophin (Left), with a total equivalent dose of $1.0\times10^{12}$ vg/kg, into their tibialis anterior compartment. All five injection sites were tattooed, allowing us to pinpoint the injection sites for muscle biopsies 4 weeks post-injection. Peripheral blood was collected pre-, 2, 4, 6, 8 weeks post-injection in order to collect Peripheral blood mononuclear cells (PBMCs).

o. Canine Tissue Procurement and Storage

The first group of GRMD dogs underwent needle biopsy of the cranial sartorius, vastus lateralis, and triceps brachii muscles at approximately 6 weeks post vector injection. The specimens were stored with a set of blinding codes to prevent bias during analysis and interpretation. Biopsies were obtained through a spring loaded 14-gauge needle trocar, thereby significantly minimizing the post-procedural pain in the animals. Muscles biopsies were then snap-frozen in liquid nitrogen-cooled isopentane, embedded in OCT medium (Sakuru, USA) and stored at −80° C. Blinding codes were broken after tissue analysis by individuals not associated with authorship of this study. One month after vector exposure the second group of injected dogs underwent open muscle biopsy of the same muscles. Seven weeks post vector administration these dogs were euthanized and the harvested tissue was cryopreserved in the same way.

p. Canine Histological Analysis

Transversely cut 7 μm serial sections were used for bright-field microscopy analysis and immunofluorescence (IF) staining to examine microutrophin expression and sarcoglycan rescue. Muscle sections were stained with H&E for bright-field microscopy and mounted with permount. For IF staining, sections were blocked in 5% donkey serum in PBS for 45 mins followed by incubation for 60 min at 37° C. using a 1:350 dilution of polyclonal goat anti-utrophin antibody (N-19, sc-7460, Santa Cruz, USA) and 1:250 dilution of monoclonal γ-sarcoglycan antibody (ab55683, Abcam, USA). The sections were then rinsed three times in PBS and incubated for 45 mins in Alexa488 donkey anti-goat secondary antibody or Alexa540 donkey anti-mouse secondary antibody at a dilution of 1:1000. The slides were washed twice with PBS for 5 mins followed by single wash of water and mounted with fade resistant mounting media containing DAPI (H-1500, Vector Labs). Images were captured at the same setting and processed via identical way by setting the limits and gain throughout to avoid any disparity in IF images using an Olympus B-65 fluorescent microscope. Minimal Feret's diameter and the coefficients of variance were calculated according to TREAT_NMD protocol DMD_M.1.2.001 as updated Jan. 28, 2014.

q. Immunoblot Analysis

Immunoblot analysis was carried out by loading 20-40 g/lane of whole cell or whole muscle lysate on 10% sodium dodecyl sulfate-polyacrylamide gel. Protein was transferred to a polyvinylidene difluoride membrane. Microutrophin was detected by goat polyclonal antibody against the N-terminal epitope at 1:500 dilution (N-19, sc-7460, Santa Cruz, USA) and a secondary antibody, a donkey anti-goat antibody conjugated with horseradish peroxidase (Sigma-Aldrich) at 1:5000 dilution. Protein detection and quantification was performed using the Odyssey infrared imaging system (LI-COR). Gamma-sarcolgycan was detected by a mouse monoclonal antibody (Vector Labs VP-G803) and a donkey, anti-mouse HRP conjugated secondary antibody (Santa Cruz Biotechnology).

r. Detection of Neutralizing Anti-AAV Antibodies

To assess the humoral immune response against AAV 9 capsid proteins, blood sera were collected at the day of birth, then at weeks 4 and 8 via peripheral vein. HEK 293 cells were seeded in a 48-well plate at a density of $10^5$ cells/well in 200 μl DMEM containing 10% fetal bovine serum. The cells were cultured for 3-4 hours at 37° C. and allowed to adhere to the well.

AAV9-Green Fluorescence Protein (GFP) vector ($1\times10^8$ particles) was incubated with mice sera at serial dilution with PBS for two hours at 4° C. in a total volume of 25 μL. The mixture was then added to cells in a final volume of 200 μl which contained $4\times10^6$ particles of AAV9 and incubated for 24 or 48 hours at 37° C. Cells expressing GFP were counted under a fluorescent microscope. The neutralizing antibody titer was calculated using the highest dilution where the percentage of GFP-positive cells was 50% less than control without sera.

s. Evaluation of T-Cell Reactivity to Capsid Derived Peptides

Peripheral blood T cell responses to the novel AAV capsid antigens were quantified by IFN-γ ELISpot assay (Mingozzi, F. et al. AAV-1-mediated gene transfer to skeletal muscle in humans results in dosedependent activation of capsid-specific T cells. Blood 114, 2077-2086 (2009)). Briefly, peripheral blood mononuclear cells (PBMC) were isolated on Ficoll hypaque gradients and cultured with synthetic peptides (20 amino acids in length, overlapping by 10 residues) that spanned the VP1 capsid protein. To identify individual peptides within a pool that elicited IFN-γ activity, each peptide was present in two of the intersecting mapping sub-pools. After incubation at 37° C. for 36 hours, IFN-γ SFU were counted. Fewer than 10 SFU/well were observed with peptides from a control pool (enhanced GFP). Responses were considered positive when SFU exceeded $50/10^6$ PBMC in duplicate wells.

t. Statistical Analysis

Informative group sizes for AAV vector injections in mdx mice were estimated based on one of the most sensitive and widely used histological assays available: the proportion of centrally nucleated muscle fibers from mice necropsied at 8 weeks of age. To maximize the statistical power for the number of animals used, we adopted the approach described by Aarts, et al. (Aarts, E., et al., A solution to dependency: using multilevel analysis to accommodate nested data. Nat Neurosci, 2014. 17(4): p. 491-6), to accommodate dependency among the multiple high-powered fields (HPFs) within a mouse. Mixed effects models accounting for clustering within mouse, using an exchangeable correlation structure, were used to compare the three groups defined by genotype and treatment. Estimation of the intracluster correlation (ICC) from these models indicated a low value (<10%), suggesting a relatively high effective sample size despite the necessarily small numbers of mice per group (at least four). Other random-effects parameters calculated in this analysis include: the variance between clusters, $\sigma^2_u$; the variance within clusters, $\sigma^2_e$; and the effective sample size, $n_{\it eff}$.

To characterize the distribution of minimum Feret diameter in wild type, treated, and untreated dystrophic dogs, dots representing individual measurements from representative HPFs were plotted. Due to the small number of dogs, this analysis is entirely descriptive.

All analysis except the proportion of centrally nucleated muscle fibers were presented as mean±S.D. Statistical analysis was processed using Prism 7 software (GraphPad). Statistical significance of p values is indicated in the figures: *$p<0.05$; $p<0.001$; *$p<0.0001$; n.s., not significant.

Example 3—Systemic Gene Therapy for DMD Using AAV-Mediated Delivery of Nano-Utrophin and Nano-Dystrophin A. Human Nano-Utrophin Design A major role of the rod domain is the longitudinal transmission of force, and the extraordinary length of dystrophin reflects the protein's evolutionary legacy. As a result of this insight, we have identified a way of addressing a central limitation of other approaches, and to design novel transgenes to achieve force transduction and myoprotection at levels indistinguishable from wild type.

Figure 4:
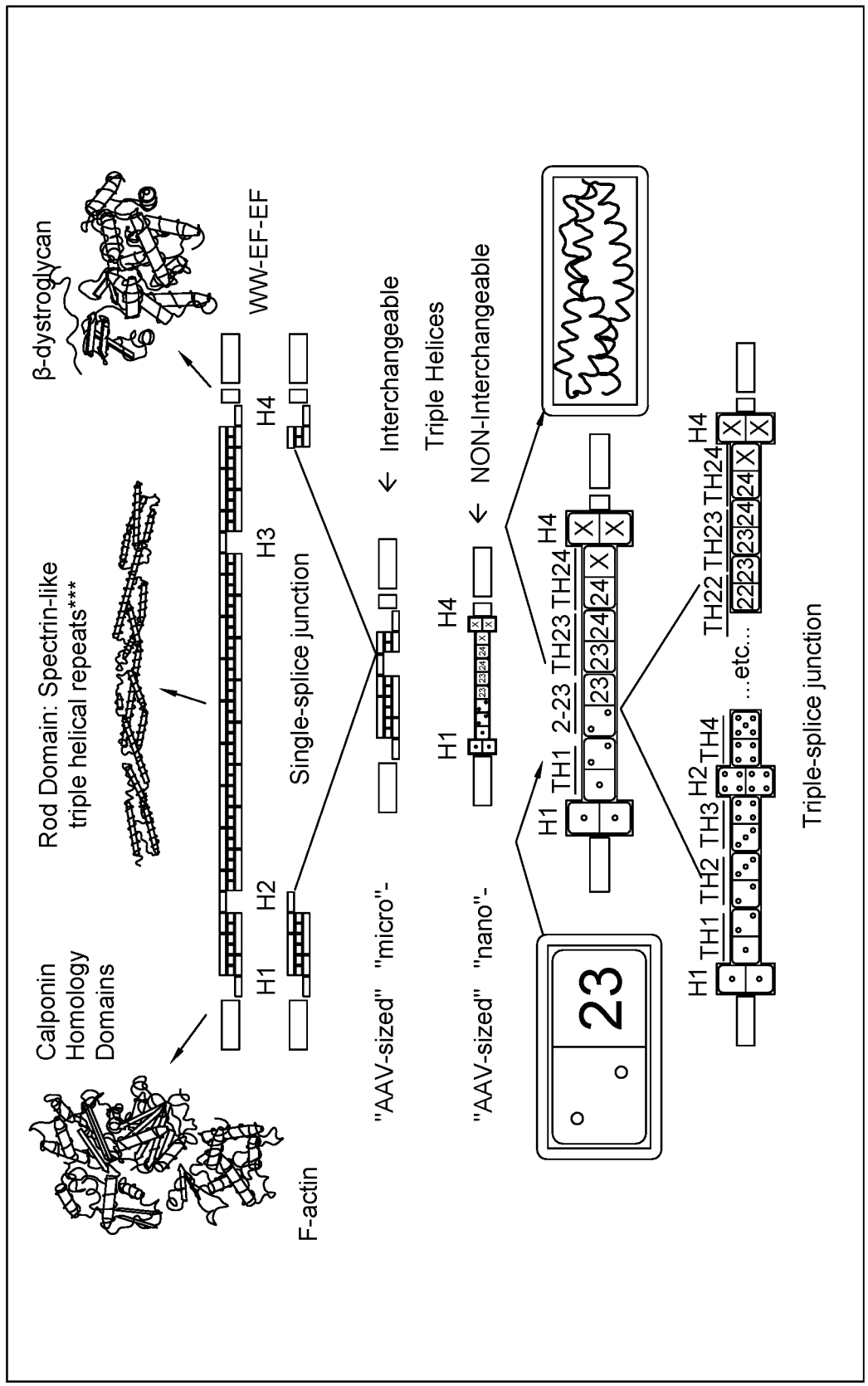
FIG. 4 provides an overview of forming a nano-dystrophin as described herein as well as a comparison with forming a micro-dystrophin.

Our analysis of sequences for orthologs and paralogs of the dystrophin genes and transcripts from a broad sampling of metazoan taxa led us to hypothesize that BMD in patients with frame-preserving deletions or duplications results from focal destabilization of the rod domain during mechanical loading. This hypothesis is supported by crystallographic data from dystrophin and other proteins containing triple helical repeat domains, bioinformatic analysis of evolutionary coupling among amino acids in adjacent triple helical repeats, and unpublished data from our studies of miniaturized recombinant proteins in mechanically loaded muscle. None of the recombinant mini-dystrophins reported to date have avoided the potential for a weakest link at the internal deletion site, as all of the design approaches used model the triple helical repeats as interchangeable, modular units. Despite its impressive phenotypic amelioration in animal models, even micro-Utrophin risks this limitation. To address this possibility and to further shorten the transgene, we have developed a model for a triple-spliced "nano-utrophin" (FIG. 4). We "cut" and "weld" the dystrophin and utrophin rod across the structurally most conserved three-dimensional planes of two non-adjacent triple helical repeats in order to preserve all the evolutionarily-coupled amino acid side chain interactions at the less conserved, loadbearing loop-to-loop interfaces between adjacent repeats. This is modeled in FIG. 4 using the domino metaphor. In the next section this is described in greater detail using graphical representations from molecular modeling. Evaluations are performed regarding the triple-spliced nano-utrophin, for potential improvement over the micro-utrophin to identify therapeutic transgenes through sequential testing in dystrophin deficient mice (immediate) and rats (better pathogenetic model for DMD fibrosis, degeneration, and weakness but requiring 10× more vector).

B. Scalable Production of AAV for Systemic Delivery in DMD.

The AAV9 and Anc80 vectors utilized in our preclinical studies in dystrophic mice and dogs to date have been prepared in human HEK 293 cells by applying the triple plasmid transfection method. This technology relies on the growth of anchorage-dependent cells in rich culture media, with the input plasmids propagated at large scale in bacterial strains prior to transfection such that the end-product retains the potentially immunogenic bacterial DNA methylation patterns. AAV vector discovery and production using a wide range of capsids and platforms are performed including anchorage-dependent and suspended HEK 293 cells as well as baculovirus-infected Sf9 insect cells.

C. Animal Models

Rigorous, blinded tests of AAVμ- versus n-Utrophin systemic therapy are investigated using primary, secondary, and exploratory endpoints that inform the design and execution of future clinical trials. Two primary endpoints are selected: performance in the most sensitive of our published suite of integrative physiological assays in mdx mice (the hybrid limb force vertical activity test, see figures from (Song, Y., et al., Suite of Clinically Relevant Functional Assays to Address Therapeutic Efficacy and Disease Mechanism in the Dystrophic mdx Mouse. J Appl Physiol, 2016: p. jap 00776 2016), and the quantitative immunodetection of the N-terminal 25 kDa fragment of titin (Robertson, A. S., et al., Dramatic elevation in urinary amino terminal titin fragment excretion quantified by immunoassay in Duchenne muscular dystrophy patients and in dystrophin deficient rodents. Neuromuscul Disord, 2017. 27(7): p. 635-645). See, e.g., FIG. 12A-12D and FIG. 13. The latter is a non-invasive, urine-based bioassay that has extraordinary dynamic range, uniquely reflects the systemic level of myonecrosis, and builds on the role of titin isoforms in myofibrillogenesis (Example 1). A major goal of this aim of the project is to quantitatively characterize the extent and durability of phenotypic amelioration in a cost-effective model that recapitulates the major pathological features of DMD. Studies in mdx mice are systematically extended to dystrophin-deficient rats because this latter model more closely resembles the hallmark pathological myo-degeneration and fibrosis seen in DMD with easily quantified indices of progressive muscle weakness and cardiomyopathy Robertson, A. S., et al., Dramatic elevation in urinary amino terminal titin fragment excretion quantified by immunoassay in Duchenne muscular dystrophy patients and in dystrophin deficient rodents. See, Petrof, B. J., et al., Dystrophin protects the sarcolemma from stresses developed during muscle contraction. Proc Natl Acad Sci, 1993. 90: p. 3710-14; Neuromuscul Disord, 2017. 27(7): p. 635-645; Larcher, T., et al., Characterization of dystrophin deficient rats: a new model for Duchenne muscular dystrophy. PLoS One, 2014. 9(10): p. e110371; Nakamura, K., et al., Generation of muscular dystrophy model rats with a CRISPR/Cas system. Sci Rep, 2014. 4: p. 5635; Stedman, H. H., et al., The mdx mouse diaphragm reproduces the degenerative changes of Duchenne muscular dystrophy. Nature, 1991. 352(6335): p. 536-

9; Shrager, J. B., et al., The mdx mouse and mdx diaphragm implications for the pathogenesis of Duchenne Muscular Dystrophy., in Neuromuscular Development and Disease, A. M. Kelly and H. M. Blau, Editors. 1992, Raven Press, Ltd.: New York. p. 317-328; Krupnick, A. S., et al., Inspiratory loading does not accelerate dystrophy in mdx mouse diaphragm: implications for regenerative therapy. J Appl Physiol, 2003. 94(2): p. 411-9; and Song, Y., et al., Suite of clinically relevant functional assays to address therapeutic efficacy and disease mechanism in the dystrophic mdx mouse. J Appl Physiol, 2017. 122(3): p. 593-602. Several canine disease models (Cooper, B. J., et al., The homologue of the Duchenne locus is defective in X-linked muscular dystrophy of dogs. Nature, 1988. 334(6178): p. 154-6; Smith, B. F., et al., Molecular basis of canine muscle type phosphofructokinase deficiency. J Biol Chem, 1996. 271 (33): p. 20070-4; Bridges, C. R., et al., Global cardiac-specific transgene expression using cardiopulmonary bypass with cardiac isolation. Ann Thorac Surg, 2002. 73(6): p. 1939-46; Arruda, V. R., et al., Regional intravascular delivery of AAV-2-F.IX to skeletal muscle achieves long-term correction of hemophilia B in a large animal model. Blood, 2004. Epub ahead of print; Arruda, V. R., et al., Peripheral transvenular delivery of adeno-associated viral vectors to skeletal muscle as a novel therapy for hemophilia B. Blood, 2010. 115(23): p. 4678-88; Mead, A. F., et al., Diaphragm remodeling and compensatory respiratory mechanics in a canine model of Duchenne muscular dystrophy. J Appl Physiol (1985), 2014. 116(7): p. 807-15; and Su, L. T., et al., Uniform scale-independent gene transfer to striated muscle after transvenular extravasation of vector. Circulation, 2005. 112(12): p. 1780-8), may be used, as well as the hamster model for LGMD (e.g. histological assays in FIG. 14A-FIG. 14G, from Greelish, et al, Nature Medicine, (Greelish, J. P., et al., Stable restoration of the sarcoglycan complex in dystrophic muscle perfused with histamine and a recombinant adeno-associated viral vector. Nat Med, 1999. 5(4): p. 439-43), which formed an essential part of the background for the first phase I clinical trial of gene therapy using AAV vectors in human muscular dystrophy: Stedman, et al, Human Gene Therapy. Stedman, H., et al., Phase I clinical trial utilizing gene therapy for limb girdle muscular dystrophy: alpha-, beta-, gamma-, or delta-sarcoglycan gene delivered with intramuscular instillations of adeno-associated vectors. Hum Gene Ther, 2000. 11(5): p. 777-90).

D. Product Profile

Target Product Profile for AAVµUtrophin or AAVnUtrophin.

| Product Targets | Minimum Acceptable Result | Ideal Results |
| --- | --- | --- |
| Primary Product Indication | Symptoms and signs of extremity muscle dysfunction in Duchenne and Becker Muscular Dystrophy resulting from any dystrophin gene mutation | Symptoms and signs of locomotive, respiratory, and cardiac muscle dysfunction in Duchenne and Becker Muscular Dystrophy resulting from any dystrophin gene mutation |
| Patient Population | Ambulatory or post-ambulatory patients with progressive symptoms and signs of DMD | Presymptomatic infants, symptomatic boys and young adults with DMD/BMD |
| Treatment Duration | Single dose | Single dose |
| Delivery Mode | IV | IV |
| Dosage Form | Frozen suspension of recombinant AAV vector, for single use after thawing | Frozen suspension of recombinant AAV vector, for single use after thawing |
| Regimen | Infusion—long catheter in antecubetal vein for systemic infusion; cephalic and/or saphenous vein distal to tourniquet for extremity | Infusion—long catheter in antecubetal vein for systemic infusion; cephalic and/or saphenous vein distal to tourniquet for extremity |
| Efficacy | Multiyear slowing in rate of progression of functional loss in injected extremities | Complete prevention of symptoms of locomotive, respiratory, and cardiac disease associated with DMD/BMD, based on confirmed early pre-symptomatic diagnosis |
| Risk/Side Effect | Devoid of long-term immunotoxicity from encoded recombinant protein. May require transient immunsuppression to minimize risk of immune response to vector capsid. Readministration may be prohibited by the development of antibodies against the vector's protein capsid. Applicable maximal dose may be limited by the risk of toxicity involving innate immunity and/or hepatotoxicity. | Devoid of long-term immunotoxicity from encoded recombinant protein. May require transient immunsuppression to minimize risk of immune response to vector capsid. Readministration may be prohibited by the development of antibodies against the vector's protein capsid. |
| Therapeutic modality | Myotropic adeno-asociated virus vector encoding artificially spliced isoform of utrophin | Myotropic adeno-asociated virus vector encoding artificially spliced isoform of utrophin |

The chart above depicts the target product profiles for AAVµUtrophin or AAVnUtrophin, Our current understanding of the progressive loss and fibro-fatty replacement of striated myocytes in DMD suggests that significant reversal of the disease in older subjects may be limited, but prevention of further myocyte loss may be possible at any stage following the onset of recombinant µ- or n-Utrophin expression. Experiments are performed directed primarily at dystrophin-deficient mice and rats to inform expectations for ideal parameters in DMD patients treated in infancy. Transduction with sufficient AAVµ- or n-Utrophin in infancy to normalize sarcoglycan expression throughout growth to skeletal maturity may allow for relatively normal growth of muscle and hence normal maturational increase in strength. At least four factors may limit therapeutic benefit in older patients: 1) the extent of irreversible myocyte loss prior to treatment, 2) the extent to which fibro-fatty replacement of muscle impairs vector delivery and myocyte transduction, 3) the maturational decrease in endothelial permeability to vector, potentially requiring forced extravasation from the vascular lumen distal to a tourniquet in older patients, and 4) the anticipated increase in natural exposure to AAV viruses with advancing patient age, thereby increasing the proportion with both high titer antibodies to multiple AAV serotypes and memory T cells to conserved AAV capsid-derived peptides. Dose-limiting toxicity may involve the innate immune system and/or the liver.

E. Experimental and Theoretical Basis for μ- or n-Utrophin Substitution in Dystrophin Deficiency Utrophin was originally discovered on the basis of its coding sequence homology to dystrophin (Love, D. R., et al., An autosomal transcript in skeletal muscle with homology to dystrophin. Nature, 1989. 339(6219): p. 55-8). We have recently reconstructed the evolutionary histories of dystrophin and utrophin on the basis of publicly available whole genome sequences from a wide range of taxons. Two observations are relevant: 1) the "donor" gene for the rod-like domain of both proteins had at least 21 tandem spectrin-like repeat domains long before it was joined, by partial gene duplication, to the Dp71-like domain prior to the emergence of striated muscle, 2) separate genes for utrophin and dystrophin were fixed after the divergence of cephalochordates along the lineage leading to a common ancestor of jawless and jawed vertebrates and before the evolutionary appearance of oligodendrocytes (Putnam, N. H., et al., The amphioxus genome and the evolution of the chordate karyotype. Nature, 2008. 453(7198): p. 1064-71; and Smith, J. J., et al., Sequencing of the sea lamprey (*Petromyzon marinus*) genome provides insights into vertebrate evolution. Nat Genet, 2013. 45(4): p. 415-21, 421e1-2). Both proteins retain binding interfaces for cytoskeletal actin and the membrane-spanning glycoproteins of the Dystrophin(/Utrophin) Associated Protein Complex (D/UAPC). It is well established that full length recombinant derivatives of utrophin can reverse even severe muscular dystrophy phenotypes in mice (Tinsley, J., et al., Expression of full-length utrophin prevents muscular dystrophy in mdx mice. Nat Med, 1998. 4(12): p. 1441-4; Gilbert, R., et al., Adenovirus-mediated utrophin gene transfer mitigates the dystrophic phenotype of mdx mouse muscles. Hum Gene Ther, 1999. 10(8): p. 1299-310; and Odom, G. L., et al., Microutrophin delivery through rAAV6 increases lifespan and improves muscle function in dystrophic dystrophin/utrophin-deficient mice. Mol Ther, 2008. 16(9): p. 1539-45). The unresolved gap in our knowledge has been the nature of the selective pressures that led to the initial tandem replication of the triple helical repeats of the ancestral protein, and whether the current physiological role(s) of dystrophin "requires" the estimated 6 nm/repeat×24 repeats or 144 nm length of the native protein Dp427. The severe clinical phenotype of some BMD patients with small internal deletions has suggested that Dp427's length is essential for its role as a shock absorber, but duplicational-BIMD challenges this interpretation because these patients have longer than wild type dystrophins. An alternative interpretation emerges from our reconstruction of dystrophin's remote evolutionary history (Example 1).

Figure 15:
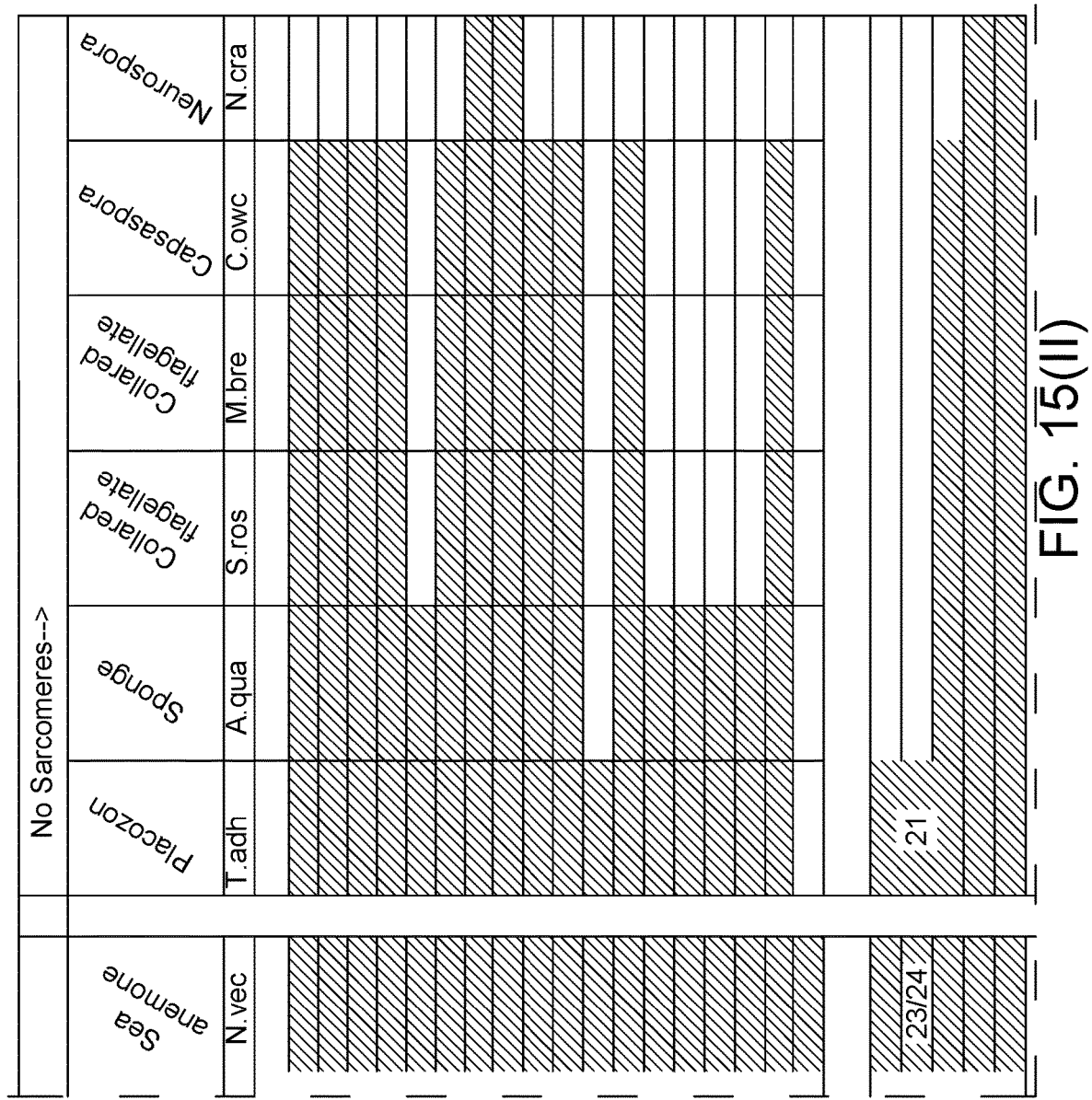
FIG. 15 provides an analysis of dystrophin-associated protein complex glycosylases, ligands, Actinin Spectrin superfamily, motor proteins and titin-obsurin superfamily. More discussion regarding this figure can be found in Example 3.
Figure 15:
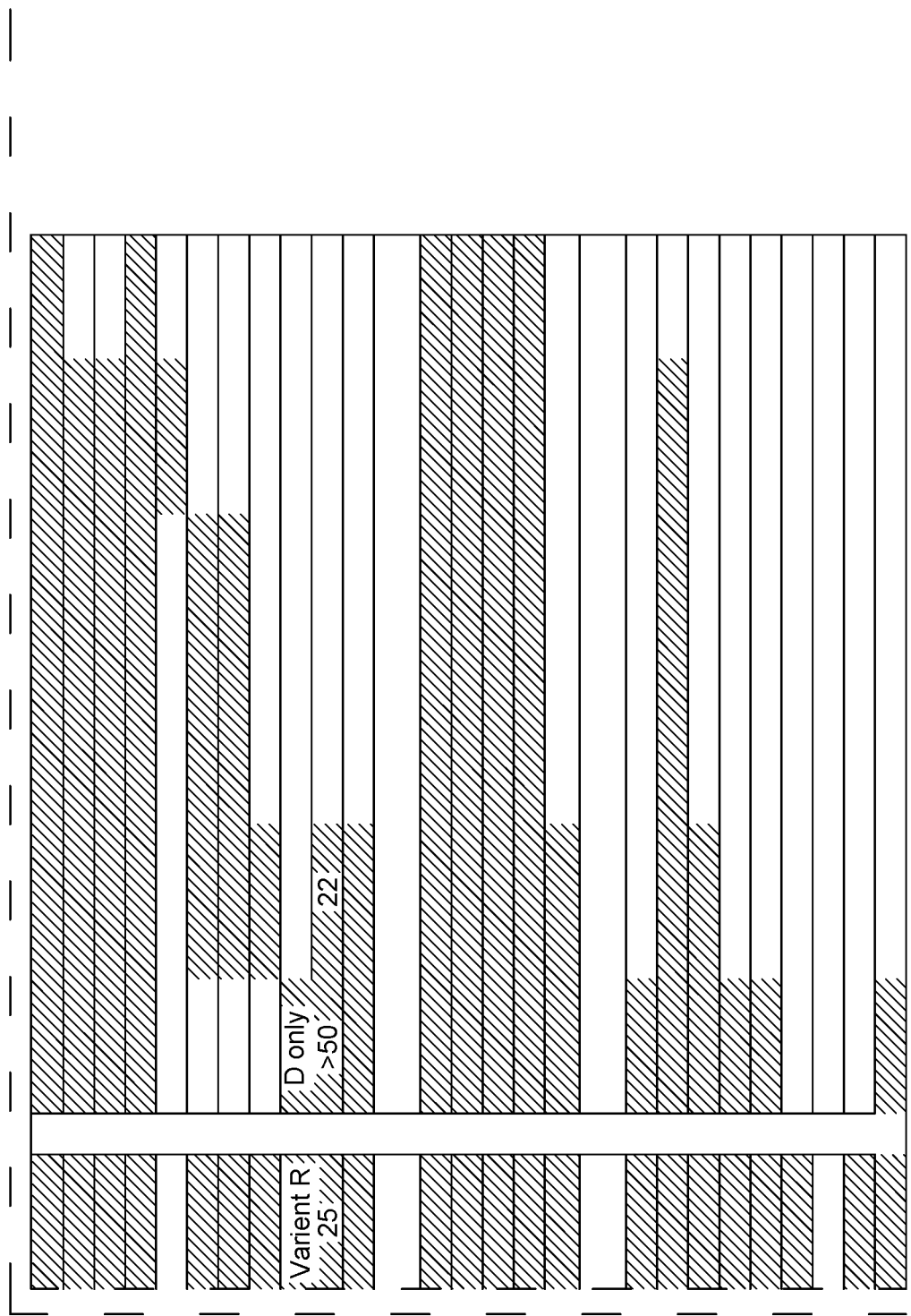
Figure 16A:
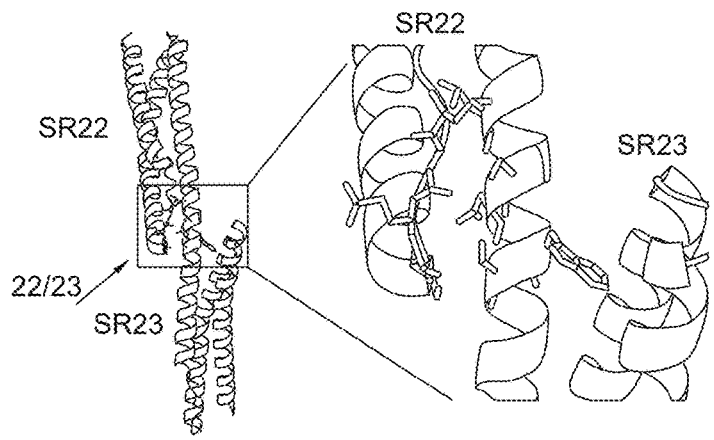
FIG. 16A and FIG. 16B provide a model of adjacent triple helical repeats of human utrophin using templates derived from human beta2-spectrin (3EDV, FIG. 16A) and human plectin (5J1G). More details can be found in Example 3.
Figure 16B:
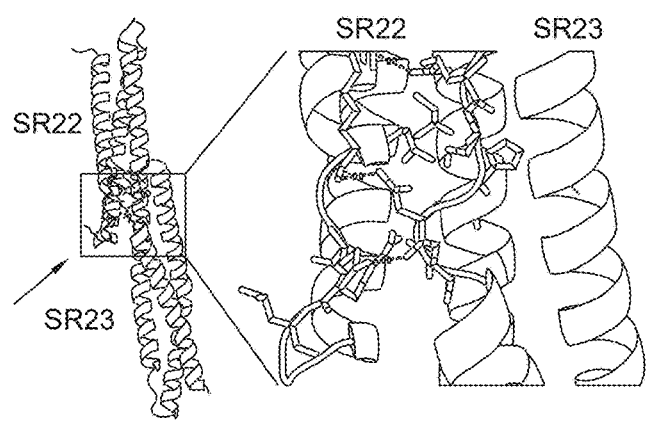

We asked the deceptively simple question "which came first, dystrophin or the sarcomere?" The goal was to ascertain whether available evidence from genomes and inferred proteomes of extant species was consistent with a model in which the length of the dystrophin rod increased during the period from the emergence of sarcomeres to the recent evolution of specialized fast-twitch muscles that are most susceptible to acute injury in dystrophin deficient mammals (Webster, C., et al., Fast muscle fibers are preferentially affected in Duchenne muscular dystrophy. Cell, 1988. 52(4): p. 503-13; and Petrof, B. J., et al., Adaptations in myosin heavy chain expression and contractile function in dystrophic mouse diaphragm. Am. J. Physiol., 1993. 265: p. C834-C841). As shown in FIG. 15, the evidence supports a reconstruction in which dystrophin predated the sarcomere. Detailed analysis shows that dystrophin is identical in length in extant Vertebrate and Cnidarian (jellyfish) species, with highly conserved gene structures as shown in FIG. 6A to FIG. 6C. The length of dystrophin was likely achieved well before the emergence of sarcomeres, even before the divergence of Placozoa, a phylum represented by the simplest free-living animal species, *Trichoplax adhaerens*. This species uses ciliary dynein (not myosin) as its primary locomotive power source, and its body plan features only four cell types, none of which exhibit identifiable sarcomeres (Srivastava, M., et al., The Trichoplax genome and the nature of placozoans. Nature, 2008. 454(7207): p. 955-60). An innovative analysis of gene structure provides compelling evidence that the rod-like domain of dystrophin, accounting for 80% of the protein's length, appears to have been co-opted in its entirety from a larger ancestral protein (not spectrin, note distinct patterns in FIG. 6B), with a distinct role in crosslinking actin filaments and microtubules (MACF). The essential implication of this finding is that an MACF-like protein, not dystrophin per se, was the subject of the selective pressure that drove the original lengthening of the two proteins' common ancestral rod domain. The crystal structure of MACF is distinct from that of spectrin with regard to the potential for longitudinal force transmission, providing an explanation for the preservation of the length of dystrophin and utrophin in a wide range of taxa. As shown in FIGS. 16A and 16B, spectrins and dystroplakins have triple helices that fold distinctly with regard to the extent of overlap and the number of stabilizing amino acid side chain interactions. In FIG. 16A and FIG. 16B, we model adjacent triple helical repeats of human utrophin using templates derived from (FIG. 16A) human beta2-spectrin (3EDV) and (FIG. 16B) human plectin (5J1G). Our model predicts that force is transmitted longitudinally across the broad interdomain interface in vivo, as required to transmit mechanical power from cell interior to extracellular matrix without disruption of the sarcolemma. Any major disruption in the side chain bonding between adjacent and potentially overlapping triple helical repeats would therefore destabilize dystrophin and utrophin during force transmission.

Figure 17:
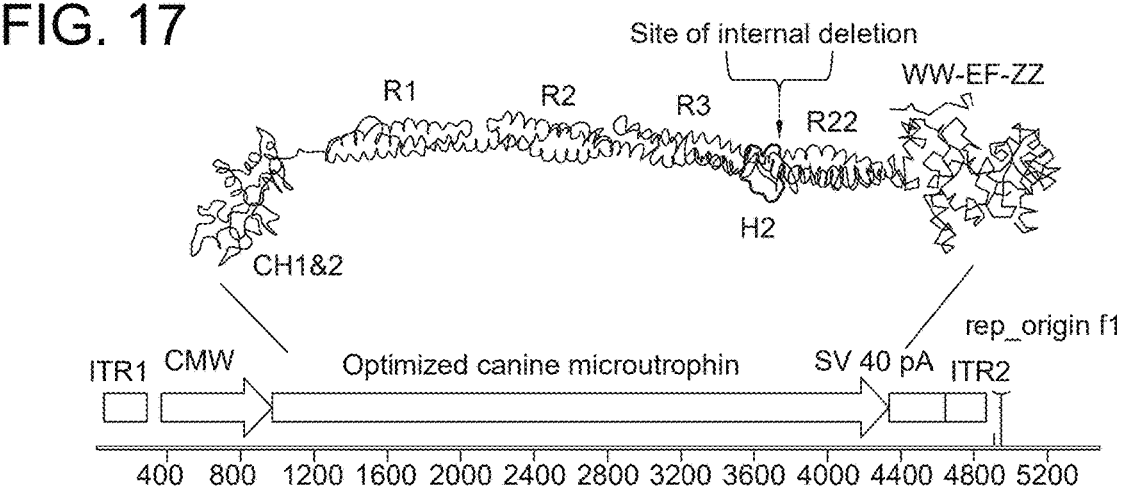
FIG. 17 provides an overview of micro-Utrophin. This micro-Utrophin juxtaposes an unstructured, proline-rich inter-helical "hinge-2" domain (H2) against the last triple helical repeat, number 22 of full length Utrophin. R1, R2, R3 and R22 correspond to TH1, TH3, TH3 and TH22 of a full-length utrophin. More details can be found in Example 3, Section F.

This model is entirely consistent with the proposition that the most important feature of the rod domains is strength and not length, with the extraordinary size of the proteins attributable to their historical legacy as derivatives by partial gene duplication of a much longer MACF homolog. Thus, short recombinant proteins specifically designed to optimize the structural integrity of the rod domain at all inter-repeat interfaces should fully complement the mechanical function of the full-length proteins, e.g. Dp427. The conceptually simplest way to approach this is to avoid internal rearrangements that directly juxtapose incompatible triple helical repeats. The problem is that crystallographic information on structure exists for only one of dystrophin's 24 triple helical repeats, and the inter-repeat primary structural homolog is low except for the conserved tryptophan residues in the center of helices A and C. We chose to initially focus on a recombinant protein with one internal and one C-terminal deletion relative to full length utrophin, and named it micro- or μ-Utrophin. As depicted in FIG. 17, this construct juxtaposes an unstructured, proline-rich inter-helical "hinge-2" domain against the last triple helical repeat, number 22 of full length Utrophin. In a best case scenario, the "hinge" could serve as an inter-helical spacer with the capacity to transmit longitudinal force without precise matching to the triple helical repeat 22 sequence. This was our rationale for a focused evaluation of μ-Utrophin, as described in detail below and in Example 2.

Figure 18:
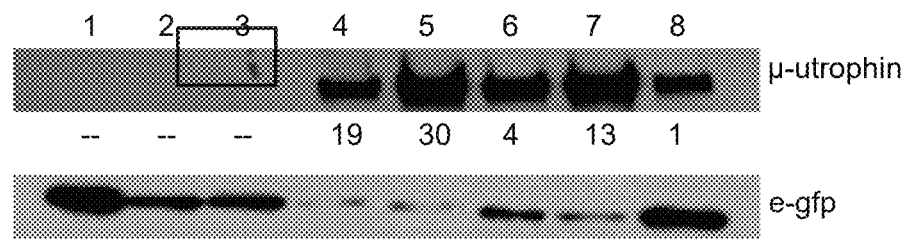
FIG. 18 provides expression level of the optimized micro-Utrophin as described in Example 3.
Figure 19:
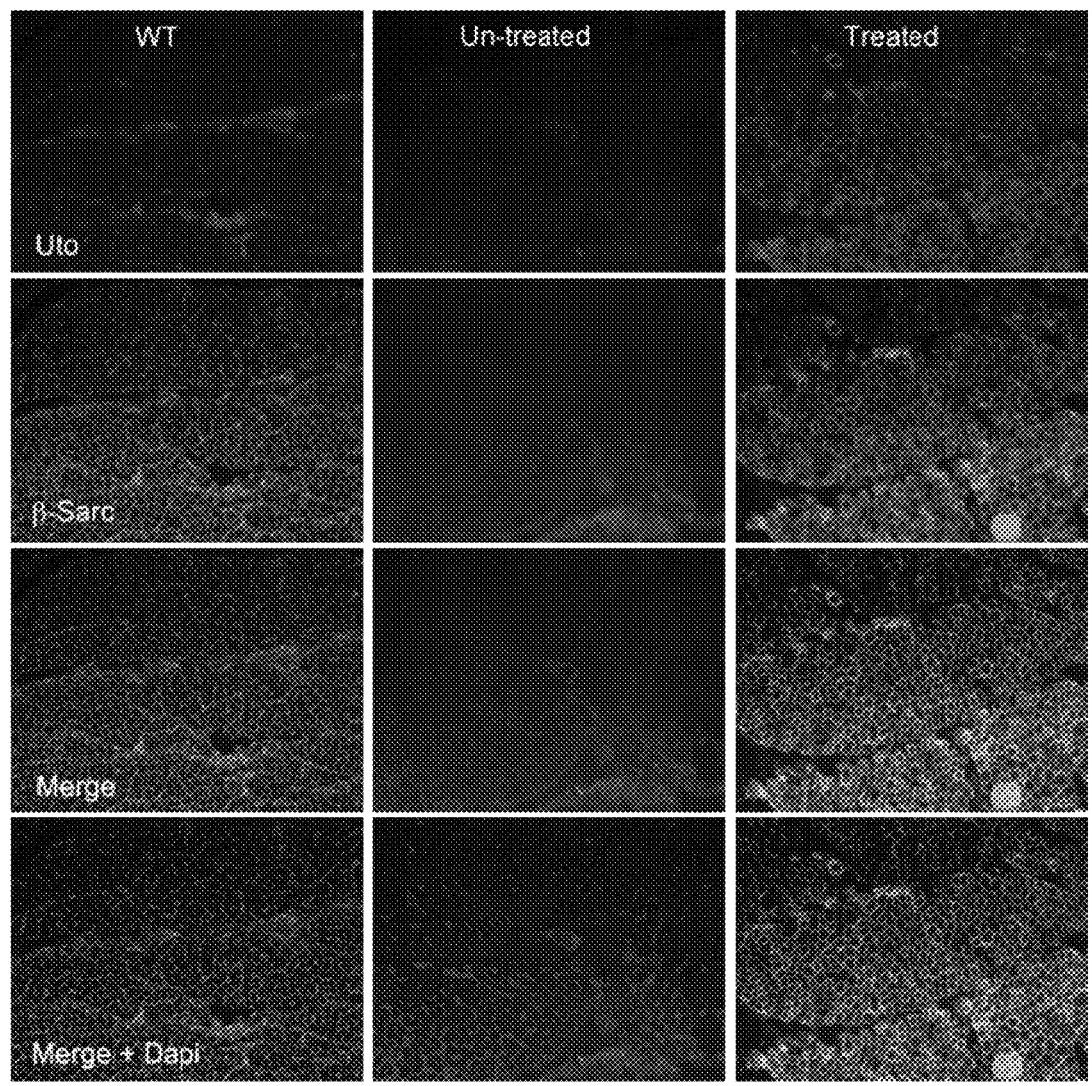
FIG. 19 shows robust dose-dependent μUtrophin expression and stabilization of wild type levels of sarcoglycan expression in the sarcolemma six weeks post-injection in the GRMD dogs as described in Example 3.
Figure 20I:
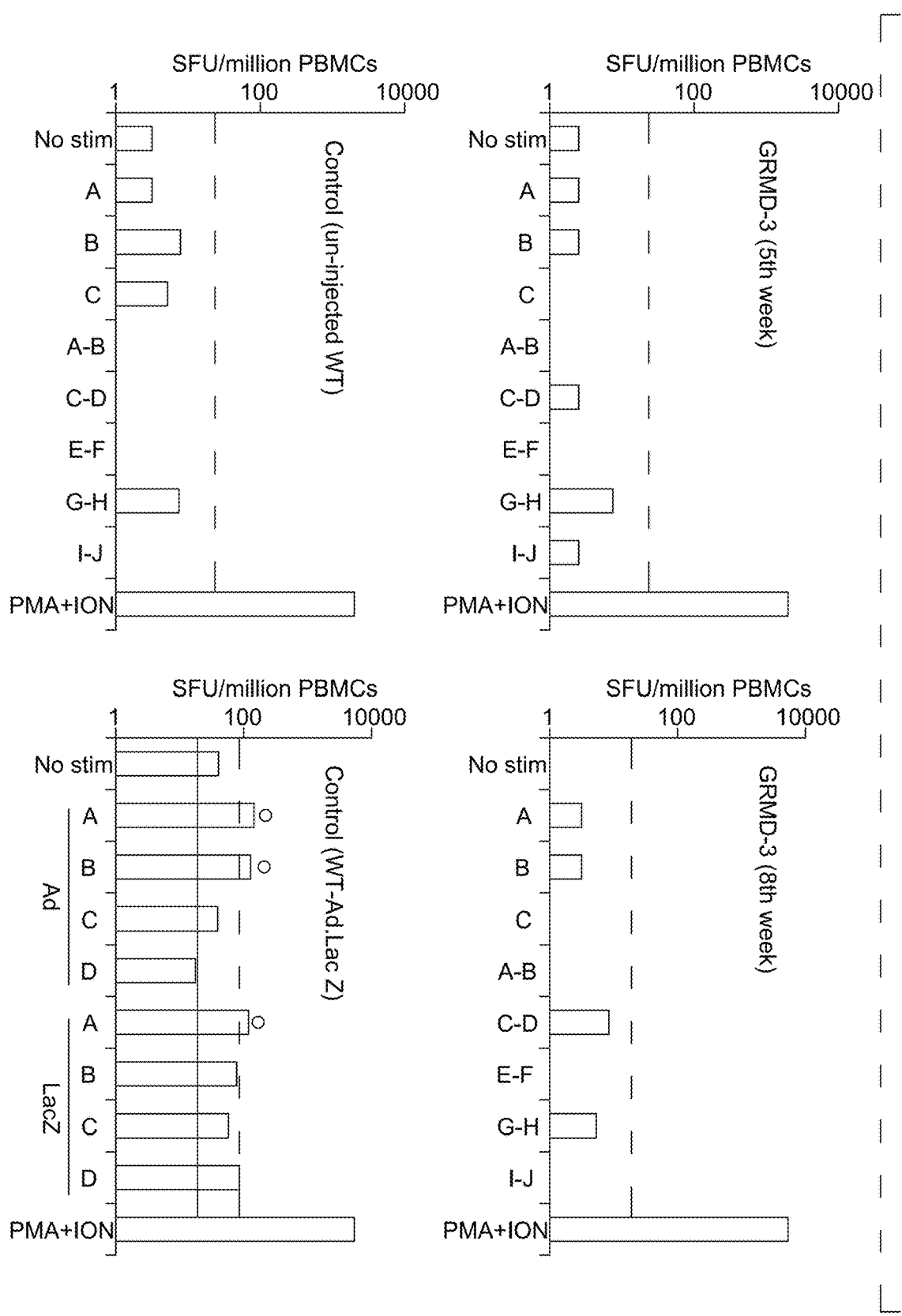
FIG. 20(I) and FIG. 20(II) show μUtrophin specific T cell response in injected GRMD dogs as discussed in the Examples 2 and 3. Peripheral blood mononuclear cells (PBMCs) collected at 5 and 8 weeks post injection were cultured with three pools of synthetic peptides corresponding to the AAV9 capsid (A, B, and C) as well as five pools of synthetic peptides spanning the entire μUtrophin peptide sequence (A-B, C-D, E-F, G-H, I-J). γ-interferon production was assessed by counting the spot forming units per million PBMCs, with no response above background against AAV9 capsid or utrophin-derived peptide pools in injected dogs. Lower right, control assay following Adenovirus-CMV-lacZ injection, showing positive response (asterisk) to both Had5 (1-4) and lacZ (5-8) peptide pools based on the most conservative interpretation of a positive result (dotted line).
Figure 20:
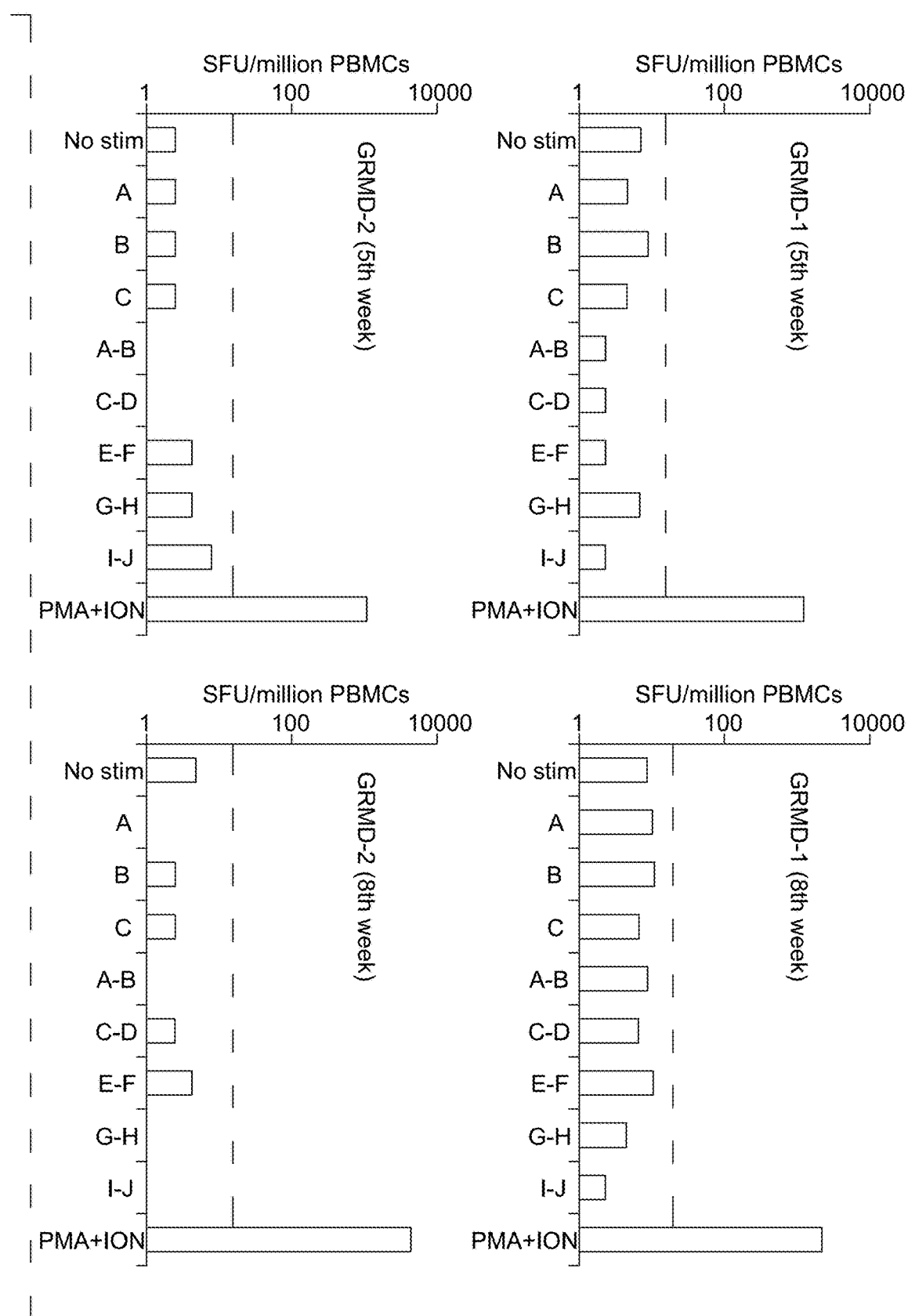

A systematic approach to μ-Utrophin transgene optimization determined that use of the codon bias for sarcomeric myosin heavy chain increased immunodetectable protein expression by 30-fold over wild type in vitro (lane 5 versus lane 8, FIG. 18). In fact the level of expression was so high that it competed effectively with expression of the cotransfected e-gfp control. To analyze the therapeutic efficacy of the optimized µU construct after packaging into AAV9, we performed a series of randomized, blinded investigations in the mdx mouse model of DMD, as described in Example 2.

On the basis of in silico analysis of MHC binding of minimal T cell peptide epitopes, the µUtrophin has fewer than 100th the number of potentially immunodominant foreign peptides compared with all hypothetical µDystrophins in the dystrophin-deficient host. This minimizes the risk of post-therapy autoimmunity in DMD, and the potential requirement for chronic immunosuppression. Our blinded studies of systemic µUtrophin expression in non-immunosuppressed GRMD dogs provided further reassurance by documenting the complete absence of peripheral T cell reactivity by interferon gamma ELISpot assay. These studies were necessarily performed with a dose (normalized to adult body weight) 1/10th of the maximal dose used in mdx mice, and could only be extended at a future date to assess the maximal tolerated dose in the large animal DIMD model with the scalable production technology.

F. Mechanobiology of Dystrophin Rationale and Structure—Nano-Utrophin

Our findings have important implications for the entire field, as it pertains equally to all AAV-sized dystrophin candidates that are being developed for translation into clinical studies.

Figure 21:
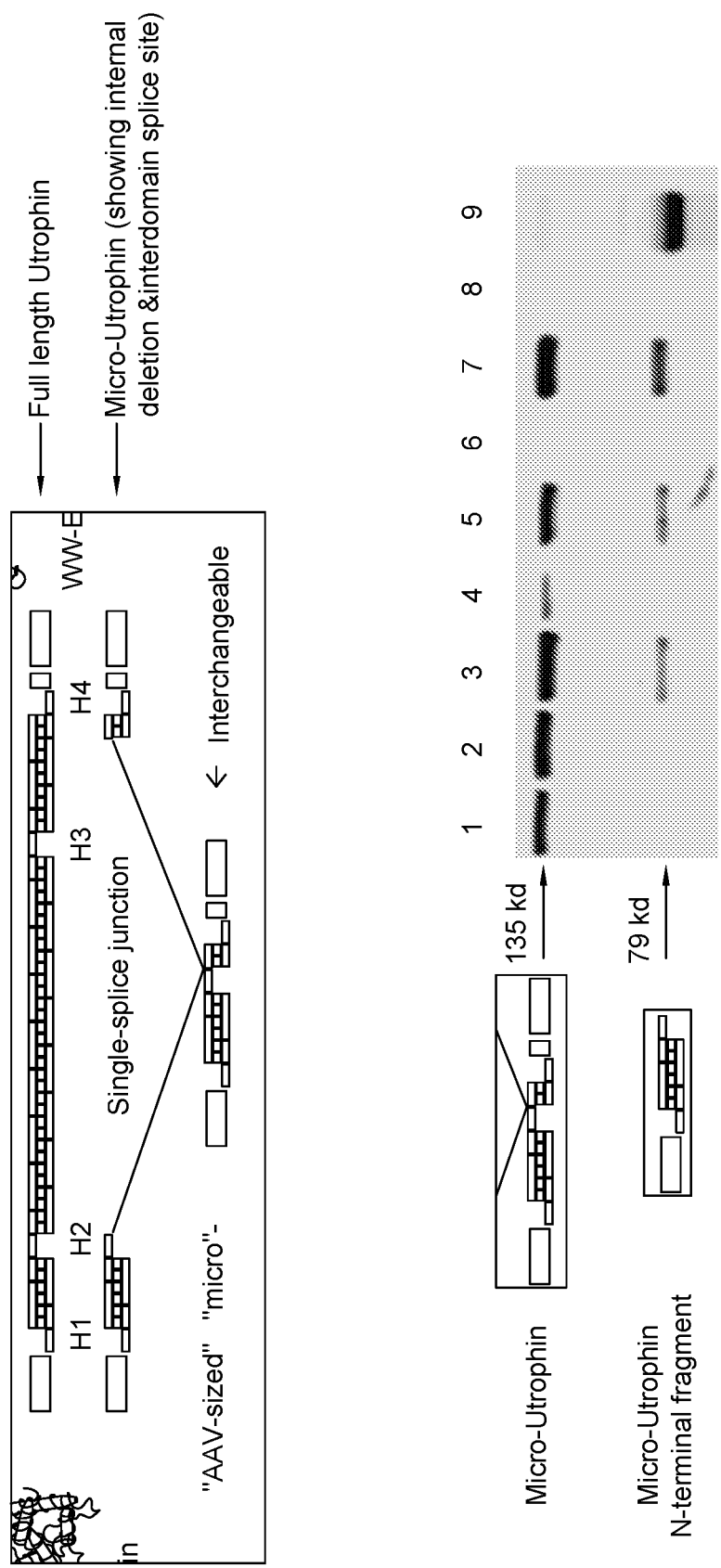
FIG. 21 shows a 79 kd band in load-bearing muscles of AAV-μ-U injected mdx mice as discussed in Example 3, Section G. Lanes 1, 2, and 4: non-load-bearing (e.g. flexor) muscles; 3, 5, and 7: load-bearing (e.g. extensor) muscles; 6 liver; 8 PBS-injected mdx muscle; 9, molecular weight marker.
Figure 22I:
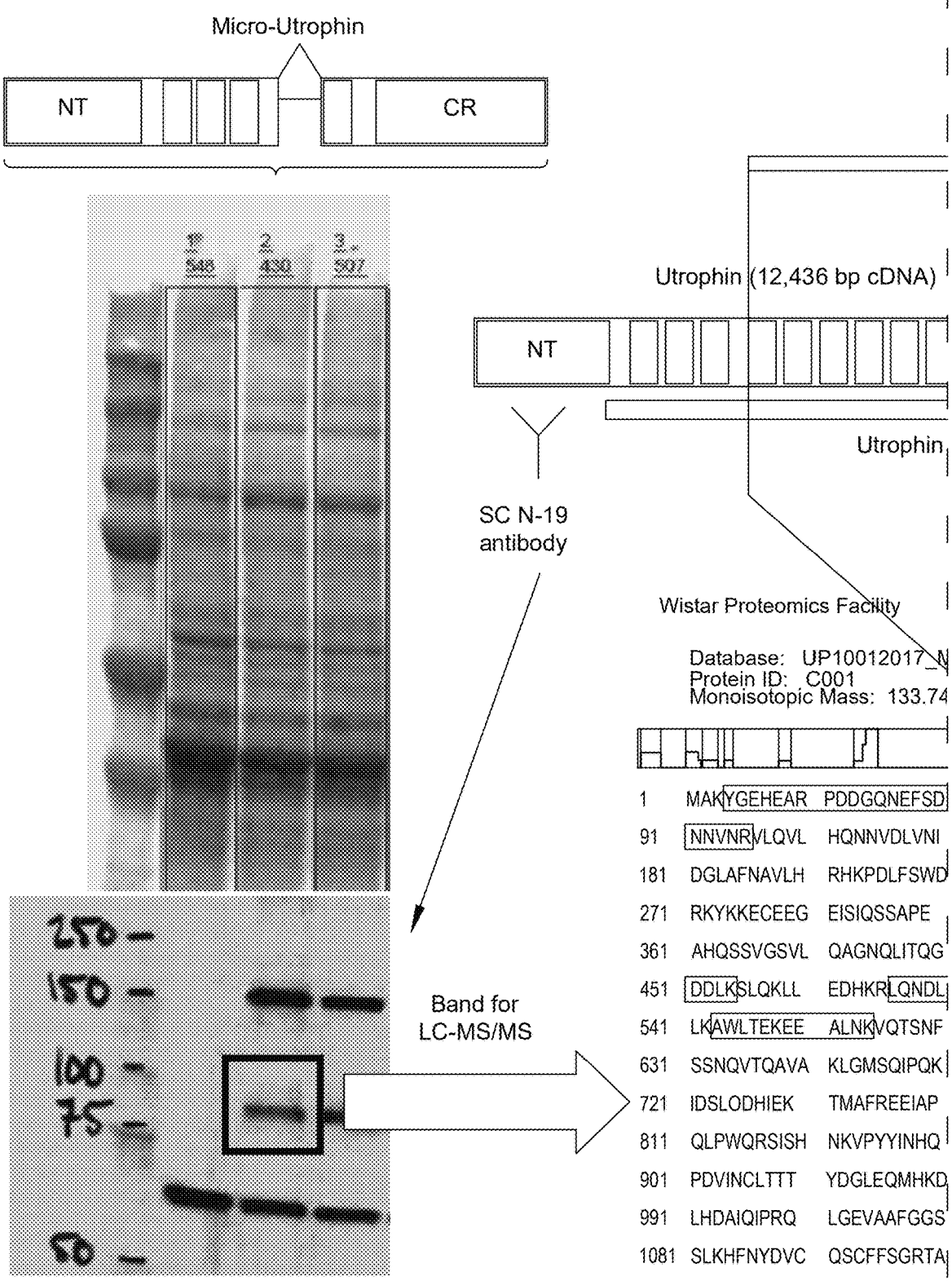
FIG. 22(I) and FIG. 22(II) show a combination of western blotting, immunoaffinity purification, and LC/MS-MS identifying a 79 kd fragment as the N-terminal portion of micro-Utrophin (SEQ ID NO: 25). The box encompasses the sequence PPPPP, a portion of "Hinge 2" immediately upstream of the deletional junction, as shown.
Figure 22:
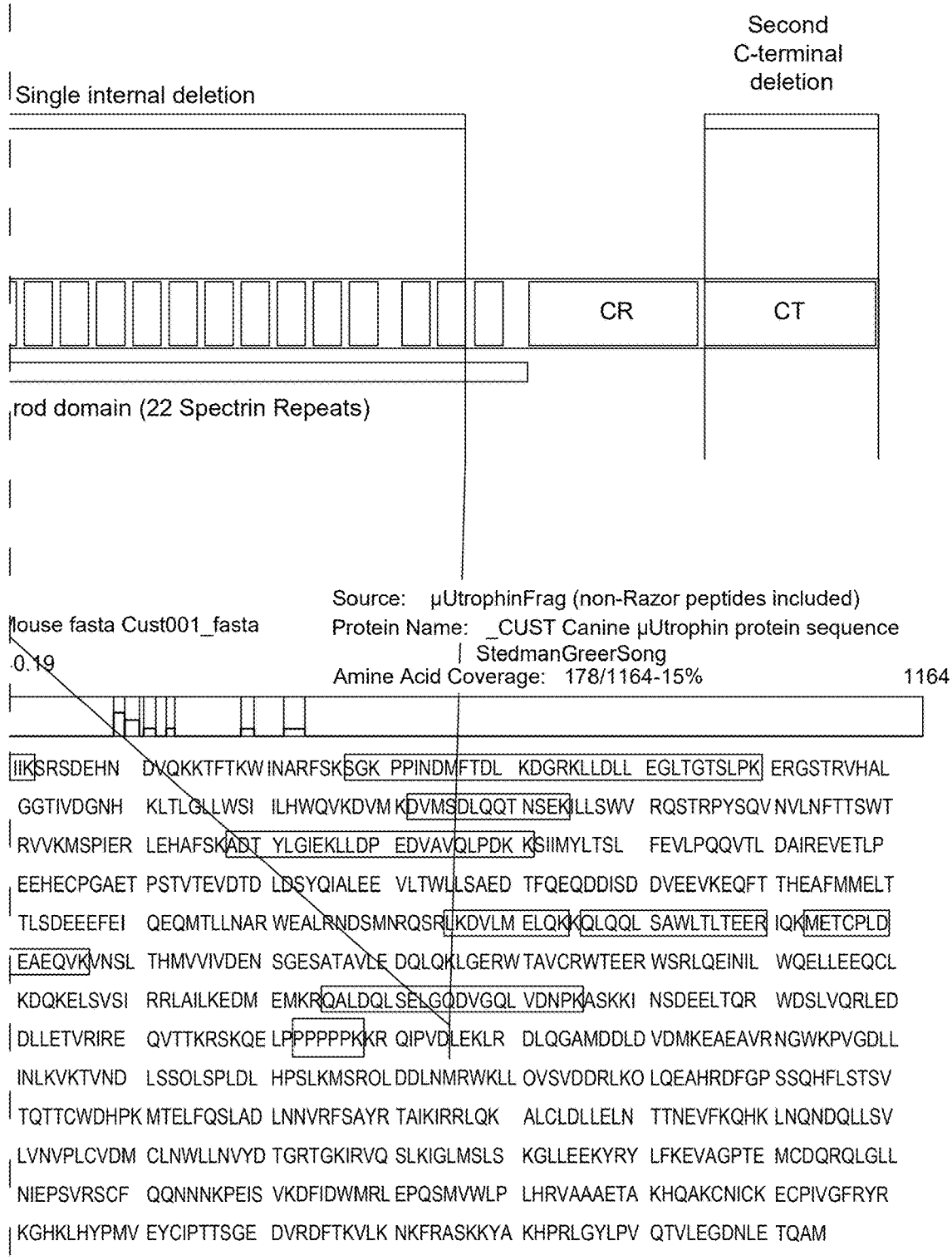

We initiated a series of blinded experiments to address the stability of µ-Utrophin in AAV-injected mdx mice. These quantitative studies have already provided very favorable data at intermediate timepoints with regard to the levels of µ-utrophin expression. However, in further analysis we noted an unanticipated "extra band" on western blots after staining with an antibody specific to the N-terminus of utrophin. As summarized in FIG. 21, the molecular weight assigned to this crisp band exactly matches that of the 79 kd N-terminal portion of µ-Utrophin. In other words, the findings suggest that the 135 kd µ-Utrophin was disrupted in immediate proximity to the junction between the portion from "Hinge 2" and spectrin-like repeat 22, flanking the coding sequence deletion corresponding to full length utrophin, thereby releasing as a fragment the 79 kd N-terminal "subdomain". In our studies there appears to be a correlation between the appearance and intensity of the 79 kd band and the maximal recent level of force transduction by the muscle. We next subjected the 79 kd region of additional gels to proteomic analysis by the combination of liquid chromatography and tandem mass spectroscopy. This confirmed our hypothesis, as shown in FIG. 22. This finding compelled us to reconsider our assumption about the interchangeability of spectrin repeats, specifically 4 and 22 when placed in immediate primary structural proximity to hinge 2. In revisiting the findings of our bioinformatic analysis of dystrophin, utrophin, and titin, it became clear that the poly IgG domains of titin show strong evidence for interchangeability over evolutionary time, but that in identical species comparisons we see no evidence for interchangeability in the other two proteins (Example 1). This provides a compelling explanation for the genotype-phenotype correlation in selected cases of Becker MD, especially severe cases associated with gene duplications in which by inference there exists a longer than wild type dystrophin that has a weakest link for axial force transmission across the novel junction of two ancestrally non-adjacent portions of the rod.

Figure 23:
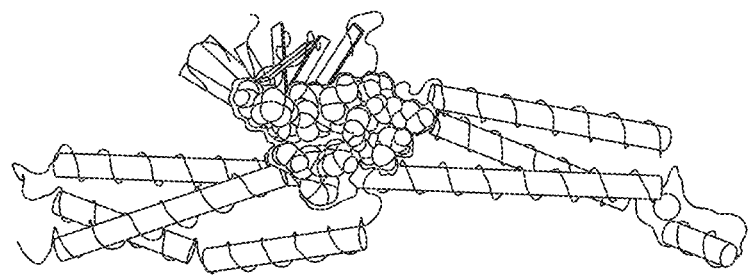
FIG. 23 shows that SH3 domain makes multiple high affinity contacts with compatible amino acid side chains from the adjacent triple helices on both sides, a configuration with the potential to transmit longitudinal force and resist unfolding.

One crystal structure from the MACF/plakin protein family is potentially informative, as structural data for dystrophin and utrophin are limited to the first triple helical repeat (i.e. extreme N-terminal end of the rod), and the hinge domains are predicted to be "unstructured". Prior to the determination of this structure there was speculation that the SH3 domain between triple helical repeats also served as a hinge, conjuring images of a wobbly interface between two strong portions of a rod. The structure reveals, in contrast, that the SH3 domain makes multiple high affinity contacts with compatible amino acid side chains from the adjacent triple helices on both sides, a configuration with the potential to transmit longitudinal force and resist unfolding (FIG. 23 showing 3PEo structure SR4 & 5 of plakin domain, SH3: SR4/5 binding interface in spacefill). Analysis of the primary structures of several dystrophin/utrophin orthologs from species of Cnidaria (jellyfish) shows the presence of intercalated but HMM recognizable domains but no unstructured "hinges", further supporting our hypotheses about both the evolutionary origin of the dystrophin rod domain from an MACF-like protein and the magnitude of long-axis force transmission across the broad surface area of the interdomain interfaces.

Figure 3:
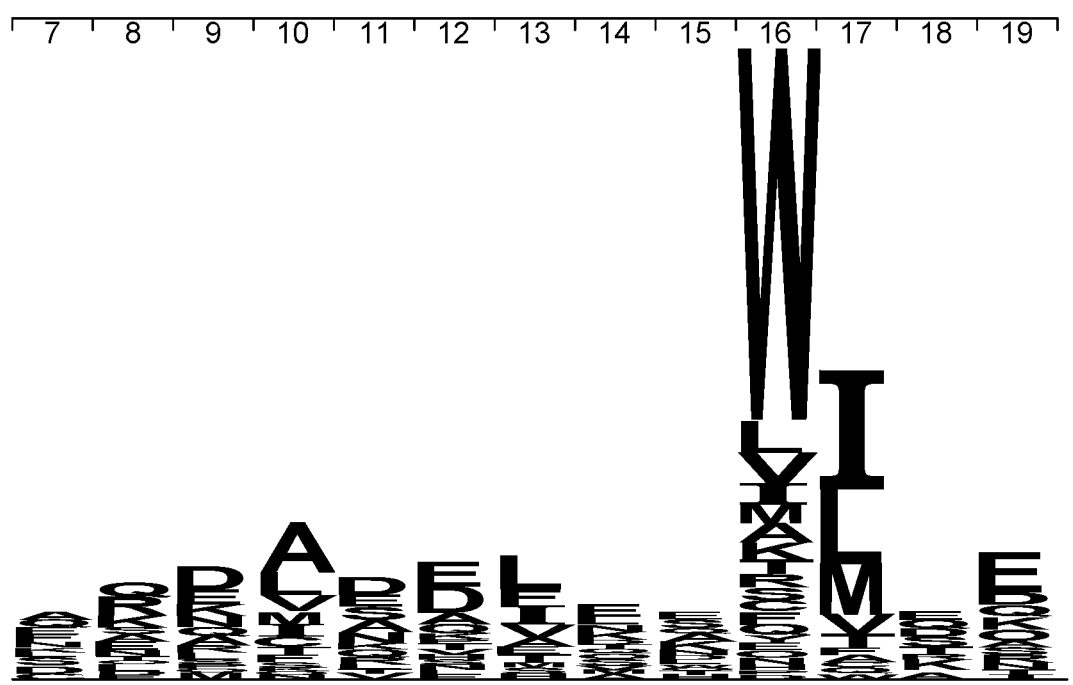
FIG. 3 shows part of the HMM logo of Spectrin family (PF00435). More details can be found at pfam.xfam.org/family/PF00435#tabview=tab4. This HMM logo provides a quick overview of the properties of an HMM in a graphical form. Relative conservation of each of two anchoring tryptophans, as depicted in the HMM logo for spectrin-like triple helical repeats at position #16. One of skill in the art can find out how to interpret the logo as described for example, in Schuster-Böckler B et al, HMM Logos for visualization of protein families. BMC Bioinformatics. 2004 Jan. 21; 5:7.
Figure 28:
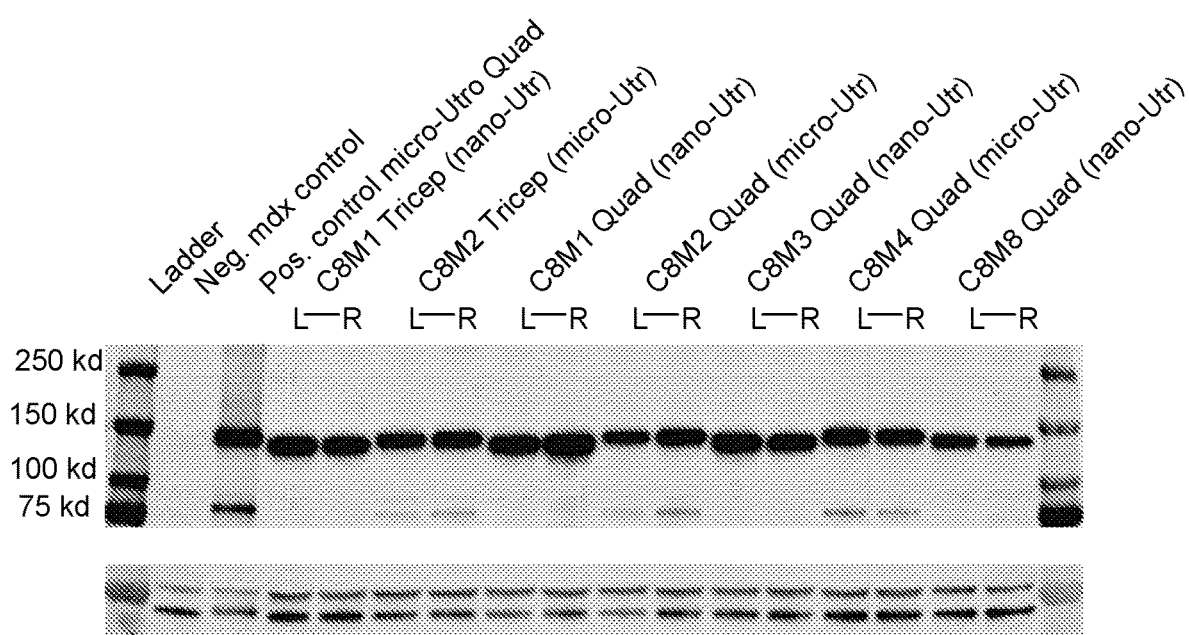
FIG. 28 shows a western blot from a study comparing the stability of micro-utrophin and nano-utrophin in vivo. Mdx mice were injected with AAV vectors encoding either micro-utrophin or nano-utrophin followed by detection of the protein (including a 79 kd N-terminal subfragment) in muscle tissue.

With these structural and functional constraints in mind, we revisited the design of AAV-compatible, miniaturized substitutes for Dp427, i.e. full length dystrophin. We designed a nano-Utrophin that takes advantage of a unique opportunity to internally rearrange the rod domain with the least disruption to the interdomain interfaces. This is accomplished in silico by merging pairs of disparate triple helices across a conserved axial cross section, the one illustrated at the site of the interacting, highly-conserved tryptophan residues stabilizing the core of the triple helix (FIG. 3). We have synthesized codon-optimized cDNAs for this construct, created and maxi-prepped the ITR-flanked transcriptional cassette vectors for triple transfection of 293 cells. Further, we conducted a blinded experiment in which mdx mice were randomized to receive AAVs encoding either "micro-" or "nano-" utrophin. The results showed that micro-utropin was cleaved precisely at the end of the 79 kd N-terminal subfragment, while there was no detectable cleavage of the nano-utrophin under similar physiological loading (FIG. 28). Both proteins were properly localized to the sarcolemma in muscles of mdx mice. The findings from this experiment indicate that the superior strength of nano-utrophin compared to micro-utrophin more closely approximates the mechanobiology of dystrophin isoform Dp427. Additional studies are performed utilizing the methods used above in these Examples to evaluate phenotypic amelioration in various disease models. In parallel, the extent of any improvement in the efficiency of transgene packaging into AAV is established on the basis of reduced vector genome size.

G. Reconstructed Ancestral AAV Capsids for DIMD Therapeutics: Anc80, 81, 82

AAV vectors based on the naturally occurring capsid serotype 9 achieve spectacular global biodistribution to striated muscle in dogs and non-human primates. The structural basis for this is poorly understood, although the capsid residues involved in binding to selected membrane receptors are well defined for other serotypes. AAV8 is a better choice for efficient cardiac gene transfer in dogs, reflecting a species difference since AAV9 provides robust transduction of the myocardium in primates. Both AAV8 and 9 are associated with neutralizing antibodies in significant proportions of the adult human population. In an effort to circumvent this limitation while maintaining global biodistribution to striated muscle, Zinn, et al (Zinn, E., et al., In Silico Reconstruction of the Viral Evolutionary Lineage Yields a Potent Gene Therapy Vector. Cell Rep, 2015. 12(6): p. 1056-68), used the combination of ancestral sequence reconstruction in silico and gene synthesis in vitro to prepare AAVs with "novel" vector capsids (i.e. likely recapitulating naturally occurring but long ago extinct capsid variants). Among these, the ones labeled Anc80, 81, and 82 represent the most immediate opportunities to replicate or extend the favorable biodistribution of AAV8 and 9 while expanding the eligibility pool from patient populations with the potential for high titer neutralizing antibodies after historical exposure to naturally occurring extant AAVs, as described in detail (Zinn et al, as cited above).

Figure 24A:
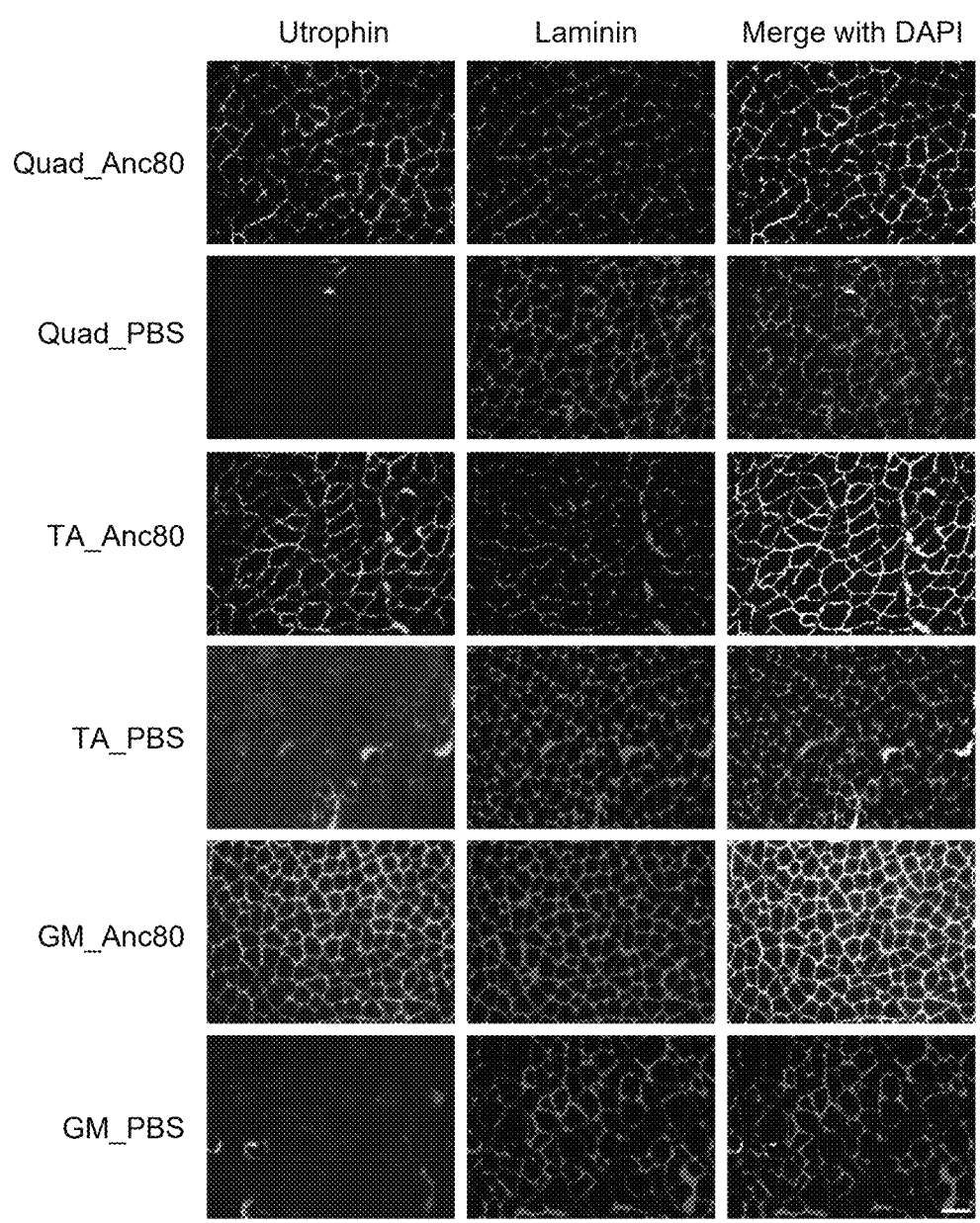
FIG. 24A to FIG. 24C show that Anc80 achieves a global biodistribution of micro Utrophin comparable to that of AAV9 in this context, with strong transduction of cardiac and skeletal muscle (see micrographs in FIG. 24A and FIG. 24B, and western blots in FIG. 24C) as discussed in Example 3.
Figure 24B:
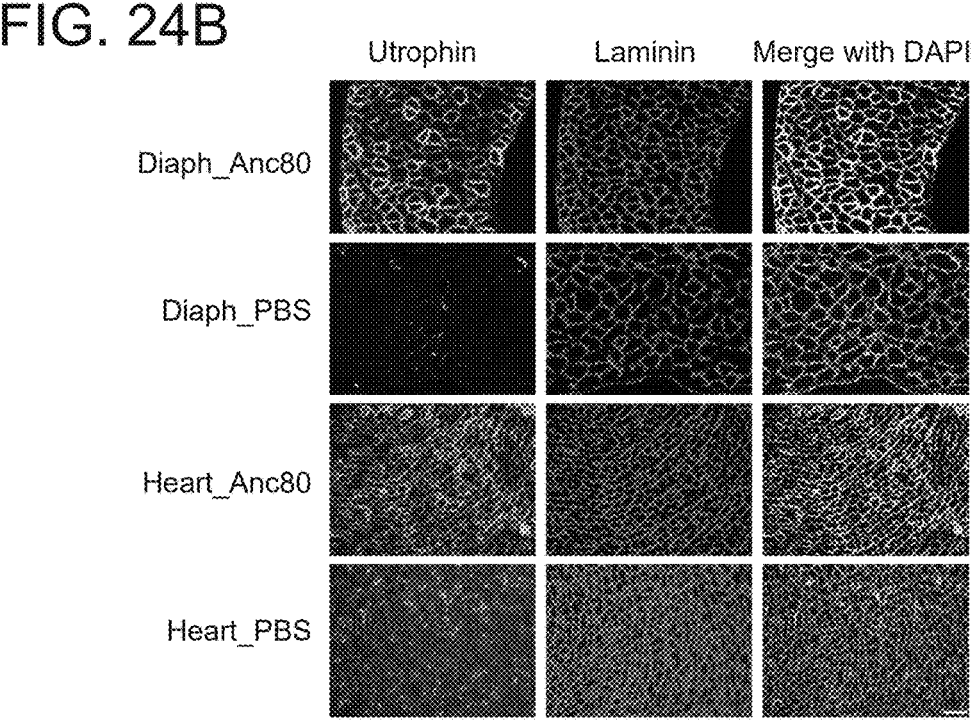
Figure 24C:

We recently packaged our μUtrophin genome in the Anc80 capsid and used the resulting vector to evaluate transduction of relevant muscles in mdx mice. These studies show that Anc80 achieves a global biodistribution comparable to that of AAV9 in this context, with strong transduction of cardiac and skeletal muscle (FIG. 24A to 24C).

Data from randomized, blinded experiments confirm that Anc80 and AAV9 have the capacity for comparable infectivity in vivo in dystrophic muscle, based on the levels of expression of a therapeutic transgene.

Figure 25:
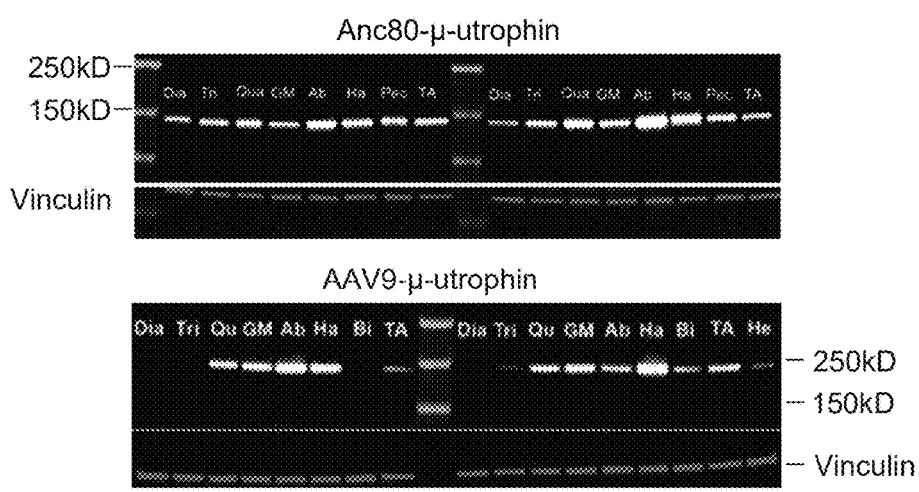
FIG. 25 shows a qualitative comparation of AAV9 and Anc80 for biodistribution of μUtrophin in cohorts of mdx mice following systemic administration of these vectors in equal doses of $2.5 \times 10^{12}$ vg/mouse. Representative western blots from multiple muscles from two mice for each vector are shown, demonstrating widespread and efficient transduction of striated muscles with both vectors. The uppermost band is µUtrophin, as labeled with a polyclonal antibody that specifically recognizes an epitope corresponding to the protein's N-terminus. The sample loading control is the lowermost band labeled with an antibody to the protein vinculin. Represented striated muscles: Diaphragm, Triceps, Quadriceps, Gastrocnemius, Abdominal wall, Pectoralis, Tibialis Anterior, Heart.
Figures 26A, 26B:
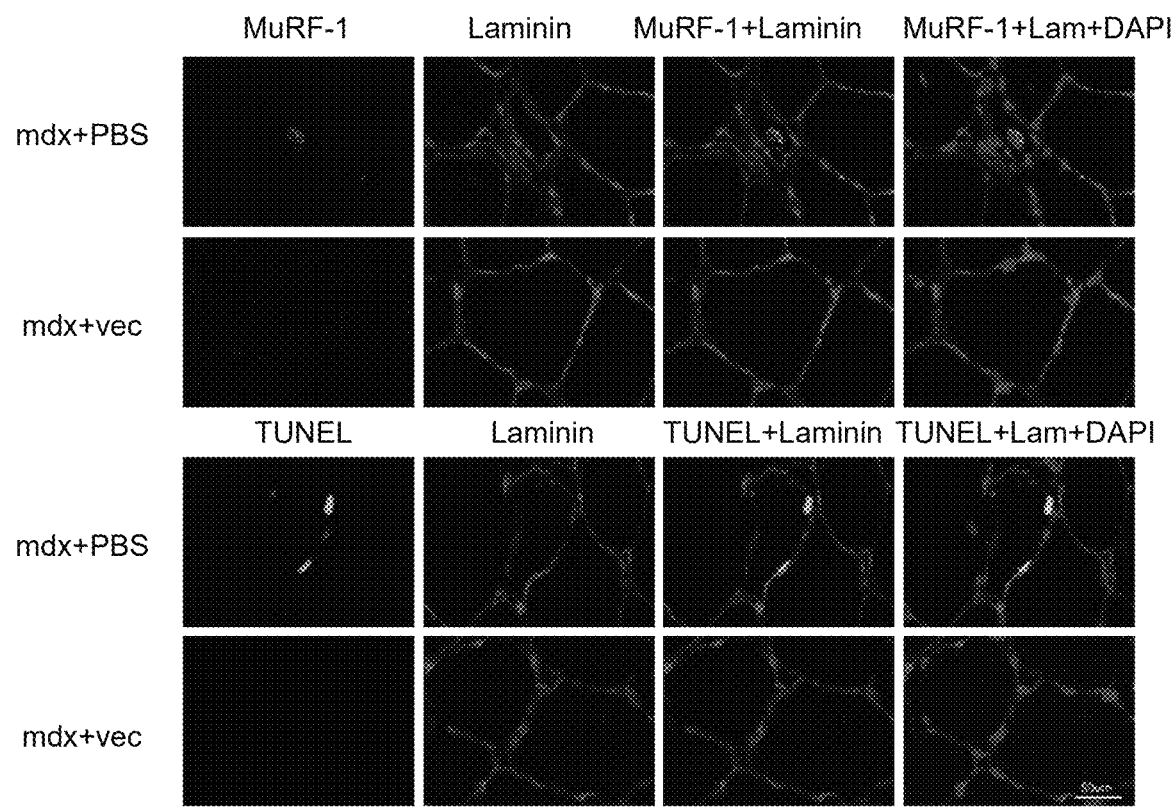
FIG. 26A and FIG. 26B show that AAV9-µUtrophin eliminates MuRF-1(+), TUNEL (+) and centrally nucleated myofibers and in mdx mouse muscle.
Figure 27:
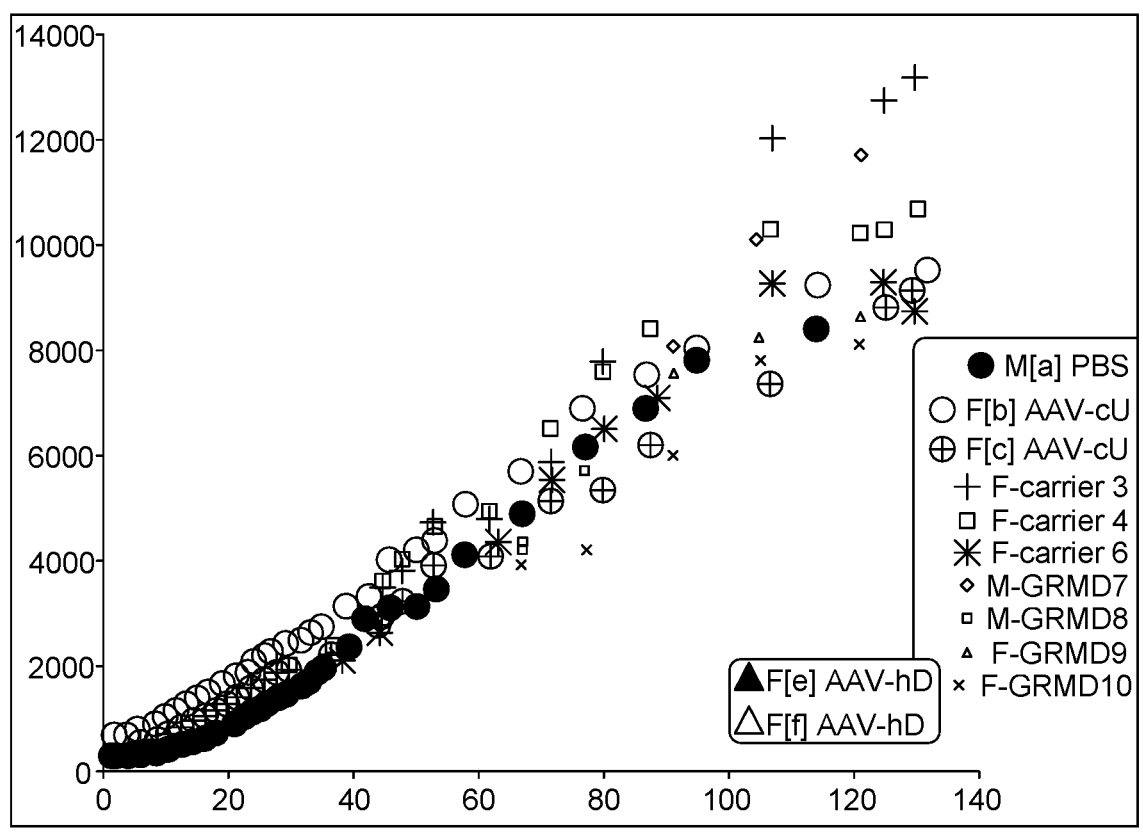
FIG. 27 provides that normal growth of GRMD dogs randomized to AAV9-µUtrophin as evidence against immune-mediated myositis. Individual weights of dogs randomized to the highest doses ($1 \times 10^{13.5}$ vg/kg) of AAV9-cU (canine µ-Utrophin) without immunosuppression, as well as relevant controls including littermate randomized to PBS and other littermate carrier females and non-littermate GRMD males and females. Also included for comparison are relevant weights of previously reported GRMD females receiving AAV9-hD (human µ-Dystrophin) showing rapid weight loss immediately prior to euthanasia and necropsy showing signs of systemic myositis (Kornegay, J. N., et al., Widespread muscle expression of an AAV9 human mini-dystrophin vector after intravenous injection in neonatal dystrophin-deficient dogs. Mol Ther, 2010. 18(8): p. 1501-8.).

Experiments designed to qualitatively compare AAV9 and Anc80 were performed for biodistribution of μUtrophin in cohorts of mdx mice following systemic administration of these vectors in equal doses of $2.5 \times 10^{12}$ vg/mouse. Representative western blots from multiple muscles from two mice for each vector are shown in FIG. 25, demonstrating widespread and efficient transduction of striated muscles with both vectors.

Example 4—Five-Repeat Mutant Utrophin and Dystrophin

Figure 29A:
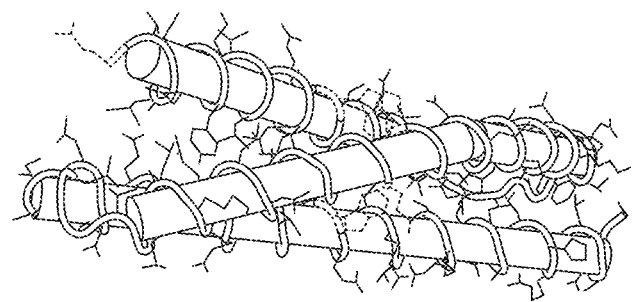
FIG. 29A and FIG. 29B show alternate viewpoints of a 3-D rendition of a mutant hybrid helical repeat formed by splicing TH 1 and TH 20 of full-length dystrophin. The splice in the B antiparallel helix is positioned in the plane with the W residues (yellow) on the parallel A and C helices.
Figure 29B:
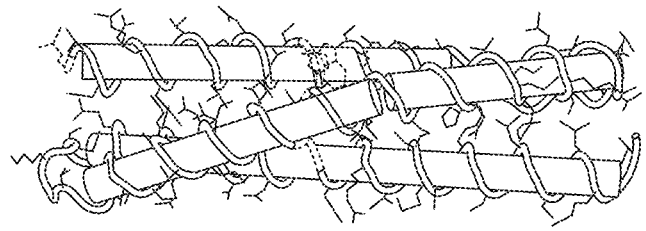
Figure 30A:
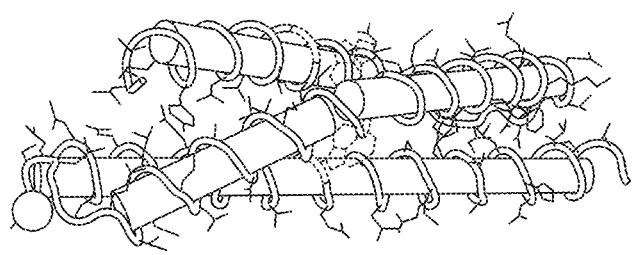
FIG. 30A and FIG. 30B show alternate viewpoints of a 3-D rendition of a mutant hybrid helical repeat formed by splicing TH 1 and TH 18 of full-length utrophin. The splice in the B antiparallel helix is positioned in the plane with the W residues (yellow) on the parallel A and C helices.
Figure 30B:
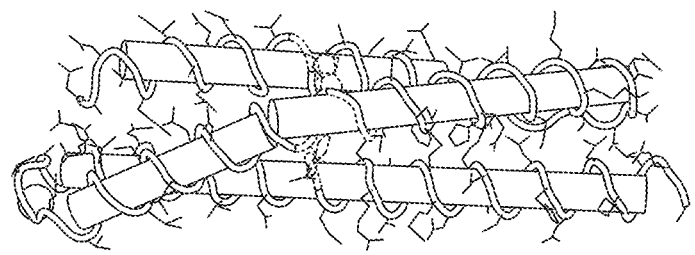

We have designed utrophin and dystrophin recombinant proteins which contain an additional triple helix relative to the original "nano" mutants described above. These "five-repeat" mutants have 5 spectrin-like triple-helical repeats between the N-terminal calponin homology domains and the C-terminal "WW-EF-ZZ" domains present in the full-length proteins. These variants also have improved stability due to the presence of a triple splice mutation and, further, are capable of being packaged into AAV vectors. Importantly, the development of these mutants illustrates that the principles relied on to design four-repeat nano-dystrophins and nano-utrophins, including those described herein, can be extended to variants having five helical repeats. An amino acid sequence corresponding to a five-repeat dystophin is provided in SEQ ID NO: 22, wherein a splice mutation was formed by joining helical repeats 1 and 20 of the full-length dystophin protein (FIG. 29A and FIG. 29B). An amino acid sequence corresponding to a five-repeat utrophin is provided in SEQ ID NO: 21, wherein a splice mutation was formed by joining helical repeats 1 and 18 of the full-length utrophin protein (FIG. 30A and FIG. 30B).

Sequence Listing Free Text

The following information is provided for sequences containing free text under numeric identifier <223>.

| SEQ ID NO: (containing free text) | Free text under <223> |
| --- | --- |
| 1 | <223> amino acid sequence of nano-dystrophin<br><220><br><221> MISC_FEATURE<br><222> (1)..(463)<br><223> amino acid sequence identical to N-terminal region of full-length human dystrophin.<br><220><br><221> MISC_FEATURE<br><222> (463)..(463)<br><223> tryptophan residue in the "A" helix at the core of the Hidden Markov Model (HMM) and all crystal structures for proteins in this superfamily.<br><220><br><221> MISC_FEATURE<br><222> (464)..(505)<br><223> amino acid sequence identical to C-terminal region of full-length human dystrophin.<br><220><br><221> MISC_FEATURE<br><222> (505)..(506)<br><223> positions within the superfamily HMM for the "B" helix that flank the hypothetical plane of transection as depicted in FIG. 2F<br><220><br><221> MISC_FEATURE<br><222> (506)..(550)<br><223> amino acid sequence identical to N-terminal region of full-length human dystrophin.<br><220><br><221> MISC_FEATURE<br><222> (550)..(550)<br><223> tryptophan residue in the "C" helix at the core of the Hidden Markov Model (HMM) and all crystal structures for proteins in this superfamily.<br><220><br><221> MISC_FEATURE<br><222> (551)..(1131)<br><223> amino acid sequence identical to C-terminal region of full-length human dystrophin. |
| 2 | <223> a nucleic acid sequence encoding nano-dystrophin |
| 3 | <223> amino acid sequence of nano-utrophin 1<br><220><br><221> MISC_FEATURE<br><222> (1)..(433)<br><223> amino acid sequence identical to N-terminal region of full length human utrophin<br><220><br><221> MISC_FEATURE<br><222> (433)..(433)<br><223> tryptophan residue in the "A" helix at the core of the Hidden Markov Model (HMM) and all crystal structures for proteins in this superfamily<br><220><br><221> MISC_FEATURE<br><222> (434)..(477)<br><223> amino acid sequence identical to C-terminal region of full length human utrophin<br><220><br><221> MISC_FEATURE<br><222> (477)..(478)<br><223> positions within the superfamily HMM for the "B" helix that flank the hypothetical plane of transection as depicted in the FIG. 2F<br><220><br><221> MISC_FEATURE<br><222> (478)..(514)<br><223> amino acid sequence identical to N-terminal region of full length human utrophin<br><220><br><221> MISC_FEATURE<br><222> (514)..(514)<br><223> tryptophan residue in the "C" helix at the core of the Hidden Markov Model (HMM) and all crystal structures for proteins in this superfamily<br><220><br><221> MISC_FEATURE |

| SEQ ID NO: (containing free text) | Free text under <223> |
|---|---|
| | <222> (515)..(1098) <223> amino acid sequence identical to C-terminal region of full length human utrophin |
| 4 | <223> nucleic acid sequence encoding nano-utrophin-1 protein |
| 5 | <223> amino acid sequence of nano-utrophin-2 |
| 6 | <223> nucleic acid sequence encoding nano-utrophin-2 protein |
| 7 | <223> amino acid sequence of nano-utrophin-3 |
| 8 | <223> nucleic acid sequence encoding nano-utrophin-3 protein |
| 9 | <223> amino acid sequence with GenBank accession: AAS99264 |
| 10 | <223> coding sequence for AAV9 capsid vp1 |
| 11 | <223> coding sequence for hu31 vp1 |
| 12 | <223> coding sequence for hu32 vp1 |
| 13 | <223> amino acid sequence for nano-dystrophin |
| 14 | <223> amino acid sequence for nano-dystrophin |
| 15 | <223> amino acid sequence for nano-dystrophin |
| 16 | <223> amino acid sequence for nano-dystrophin |
| 17 | <223> amino acid sequence for nano-dystrophin |
| 18 | <223> amino acid sequence for nano-dystrophin |
| 19 | <223> engineered sequence encoding nano-utrophin |
| 20 | <223> Synthetic Construct |
| 21 | <223> human utrophin mutant <220> <221> MISC_FEATURE <222> (1)..(324) <223> amino acid sequence identical to N-terminal region of full length human utrophin <220> <221> MISC_FEATURE <222> (311)..(417) <223> hybrid triple helix <220> <221> MISC_FEATURE <222> (325)..(362) <223> amino acid sequence identical to C-terminal region of full length human utrophin <220> <221> MISC_FEATURE <222> (363)..(401) <223> amino acid sequence identical to N-terminal region of full length human utrophin |
| 22 | <220> <221> MISC_FEATURE <222> (402)..(1208) <223> amino acid sequence identical to C-terminal region of full length human utrophin <223> mutant human dystrophin protein <220> <221> MISC_FEATURE <222> (1)..(354) <223> amino acid sequence identical to N-terminal region of full length human dystrophin <220> <221> MISC_FEATURE <222> (340)..(447) <223> hybrid triple helix <220> <221> MISC_FEATURE <222> (355)..(392) <223> amino acid sequence identical to C-terminal region of full length human dystrophin <220> <221> MISC_FEATURE <222> (393)..(431) <223> amino acid sequence identical to N-terminal region of full length human dystrophin <220> <221> MISC_FEATURE <222> (432)..(1237) <223> amino acid sequence identical to C-terminal region of full length human dystrophin |

All publications, patents, patent applications, cited in this application and the Sequence Listing referenced herein, as well as U.S. Provisional Patent Application No. 62/658,464, filed Apr. 16, 2018, are hereby incorporated by reference in their entireties as if each individual publication or patent application were specifically and individually indicated to be incorporated by reference. Numerous modifications and variations are included in the scope of the above-identified specification and are expected to be obvious to one of skill in the art. Such modifications and alterations to the compositions and processes, such as selections of different coding sequences or selection or dosage of the vectors or immune modulators are believed to be within the scope of the claims appended hereto.

The invention claimed is:

1. A recombinant adeno-associated virus (AAV) having an AAV capsid and a vector genome, wherein the vector genome comprises a nucleic acid sequence encoding a dystrophin superfamily mutant protein comprising a hybrid triple helical repeat under control of regulatory sequences which direct expression thereof, the hybrid triple helical repeat comprising
a first hybrid helix, a second hybrid helix, a third hybrid helix, and a mutant splice junction having joined segments of a first triple helical repeat and a second non-adjacent triple helical repeat of a native dystrophin superfamily protein;
wherein the first triple helical repeat of the native dystrophin superfamily protein has parallel helices A and C and an anti-parallel B helix;
wherein the second non-adjacent triple helical repeat of the native dystrophin superfamily protein has parallel helices A' and C' and an anti-parallel B' helix;
each helix of the hybrid triple helical repeat comprising an N-terminal portion and a C-terminal portion of a helix in the triple helical repeats of the native dystrophin superfamily protein, wherein the hybrid triple helical repeat has parallel first and third helices and an anti-parallel second helix, wherein the N-terminal portion of the first helix and the N-terminal portion of the third helix in the hybrid triple helical repeat are from the first triple helical repeat of the native dystrophin superfamily protein, and the C-terminal portion of the first helix and the C-terminal portion of the third helix are from the second non-adjacent triple helical repeat of the native dystrophin superfamily protein;
the first hybrid helix of the hybrid triple helical repeat comprising an N-terminal portion of helix A fused to a C-terminal portion of helix A';
the second hybrid helix of the hybrid triple helical repeat comprising an N-terminal portion of helix B' fused to a C-terminal portion of helix B, wherein helix B and helix B' are spliced at a position adjacent to the central conserved tryptophan residues at the center of the hydrophobic cores of the first triple helical repeat and the second non-adjacent triple helical repeat joined in the hybrid triple helical repeat, the hydrophobic cores corresponding to the cross-section plane bisecting the tryptophan residues as determined by a Hidden Markov Model and sequence alignment; and
the third hybrid helix of the hybrid triple helical repeat comprising an N-terminal portion of helix C fused to a C-terminal portion of helix C';
wherein the first hybrid helix and the third hybrid helix are spliced adjacent to the conserved tryptophan residues at the center of the hydrophobic cores of the first triple helical repeat and the second non-adjacent triple helical repeat joined in the hybrid triple helical repeat, the hydrophobic cores corresponding to the cross-section plane bisecting the tryptophan residues as determined by a Hidden Markov Model and sequence alignment.

2. The recombinant AAV according to claim 1, wherein the native dystrophin superfamily mutant protein is human dystrophin and the dystrophin superfamily mutant protein comprises a deletion of:
(a) triple helical repeat 3 to triple helical repeat 21 of human dystrophin;
(b) triple helical repeat 3 to triple helical repeat 23 of human dystrophin; or
(c) triple helical repeat 2 to triple helical repeat 19 of human dystrophin.

3. The recombinant AAV according to claim 1, wherein the dystrophin superfamily mutant protein comprises the amino acid sequence of SEQ ID NO: 1.

4. The recombinant AAV according to claim 1, wherein the dystrophin superfamily mutant protein comprises the amino acid sequence of SEQ ID NO: 22.

5. The recombinant AAV according to claim 1, wherein the native dystrophin superfamily mutant protein is human utrophin and the dystrophin superfamily mutant protein comprises a deletion of:
(a) triple helical repeat 3 to triple helical repeat 19 of utrophin; or (b) triple helical repeat 2 to triple helical repeat 17 of human utrophin.

6. The recombinant AAV according to claim 5, wherein the dystrophin superfamily mutant protein comprises the amino acid sequence of SEQ ID NO: 3.

7. The recombinant AAV according to claim 1, wherein the dystrophin superfamily mutant protein comprises the amino acid sequence of SEQ ID NO: 20.

8. The recombinant AAV according to claim 7, wherein the nucleic acid sequence encoding the dystrophin superfamily mutant protein comprises SEQ ID NO: 19, or a sequence at least 95% identical to SEQ ID NO: 19.

9. The recombinant AAV according to claim 5, wherein the dystrophin superfamily mutant protein comprises the amino acid sequence of SEQ ID NO: 21.

10. The recombinant AAV according to claim 1, wherein the AAV capsid an AAV1, AAV5, AAV6, AAV8, AAV8 triple, AAV9, Anc80, Anc81, or Anc82 capsid.

11. A pharmaceutical composition comprising the recombinant AAV according to claim 1 in a formulation buffer.

12. A method of treating Duchenne muscular dystrophy in a subject in need thereof, the method comprising administering to the subject the composition of claim 11.

13. The recombinant AAV according to claim 1, wherein the native dystrophin superfamily protein is human dystrophin and the dystrophin superfamily mutant protein comprises an N-terminal triple helical repeat that consists of triple helical repeat 1 of human dystrophin, the first of the two triple helical repeats which forms the hybrid triple helical repeat is triple helical repeat 2 of human dystrophin and the second of the two triple helical repeats which forms the hybrid triple helical repeat is triple helical repeat 22 of human dystrophin, and the C-terminal helical repeats of the dystrophin superfamily mutant dystrophin protein consist of triple helical repeat 23 and triple helical repeat 24 of human dystrophin.

14. The recombinant AAV according to claim 1, wherein the native dystrophin superfamily protein is human dystrophin and the dystrophin superfamily mutant protein comprises five triple-helical repeats, including a hybrid triple helical repeat formed by splicing triple helical repeat 1 and triple helical repeat 20 of human dystrophin.

15. The recombinant AAV according to claim 1, wherein the native dystrophin superfamily protein is human utrophin and the dystrophin superfamily mutant protein comprises an N-terminal triple helical repeat that consists of triple helical repeat 1 of human utrophin, the first of the two triple helical repeats which forms the hybrid triple helical repeat is triple helical repeat 2 of human utrophin and the second of the two helical repeats which forms the hybrid triple helical repeat is triple helical repeat 20 of human utrophin, and C-terminal triple helical repeats consisting of triple helical repeat 21 and triple helical repeat 22 of human utrophin.

16. The recombinant AAV according to claim 1, wherein the native dystrophin superfamily protein is human utrophin and the dystrophin superfamily mutant protein comprises C-terminal triple helical repeats that include triple helical repeats 19, 20, 21, and 22 of human utrophin, and the first of the two triple helical repeats which forms the hybrid triple helical repeat is triple helical repeat 1 of human utrophin and the second of the two triple helical repeats which forms the hybrid triple helical repeat is triple helical repeat 18 of human utrophin.

17. The recombinant AAV according to claim 1, wherein the native dystrophin superfamily protein is human utrophin and the dystrophin superfamily mutant protein comprises a deletion of triple helical repeat 2 to triple helical repeat 17 of human utrophin, the dystrophin superfamily mutant protein having five triple helical repeats, including a hybrid triple helical repeat formed by splicing triple helical repeat 1 and triple helical repeat 18 of human utrophin.

* * * * *